(12) United States Patent
Borrill

(10) Patent No.: US 11,930,107 B2
(45) Date of Patent: Mar. 12, 2024

(54) ENTANGLED LINKS, TRANSACTIONS AND TREES FOR DISTRIBUTED COMPUTING SYSTEMS

(71) Applicant: Eric Litak, Reno, NV (US)

(72) Inventor: Paul Borrill, Palo Alto, CA (US)

(73) Assignee: Eric Litak, Reno, NV (US)

( * ) Notice: Subject to any disclaimer, the term of this patent is extended or adjusted under 35 U.S.C. 154(b) by 0 days.

(21) Appl. No.: 18/045,457

(22) Filed: Oct. 10, 2022

(65) Prior Publication Data

US 2023/0111678 A1    Apr. 13, 2023

Related U.S. Application Data

(63) Continuation of application No. 15/687,529, filed on Aug. 27, 2017, now Pat. No. 11,516,007, which is a continuation of application No. 14/331,225, filed on Jul. 14, 2014, now Pat. No. 9,774,401.

(60) Provisional application No. 61/846,602, filed on Jul. 15, 2013, provisional application No. 61/893,285, (Continued)

(51) Int. Cl.
  *H04L 9/08*   (2006.01)
(52) U.S. Cl.
  CPC .................. *H04L 9/0852* (2013.01)
(58) Field of Classification Search
  CPC ....... H04L 9/0852; H04L 12/44; H04L 41/40; H04L 41/0803; H04L 45/02; H04L 45/04; H04L 45/48; H04L 45/121; H04L 45/125; H04L 63/0227; H04L 67/1095; H04L 69/40; G06F 17/30; G06F 17/30212; G06Q 10/06; G06Q 10/10; G06Q 10/107; G06Q 50/18
  See application file for complete search history.

(56) References Cited

U.S. PATENT DOCUMENTS

2010/0165886 A1 * 7/2010 Borrill .................... H04L 45/48
                                                              370/256

FOREIGN PATENT DOCUMENTS

WO    WO 97/05725    *  7/1996

OTHER PUBLICATIONS

Brassard, Teleportation as a quantum computation, arXiv, 3 pages, May 23, 1996.*

(Continued)

*Primary Examiner* — Frank Duong

(74) *Attorney, Agent, or Firm* — BHASIN LAW, A PC

(57) ABSTRACT

An entangled links mechanism to establish and maintain bipartite temporal intimacy between pairs of computers using an idempotent, reversible token method, which presents no observable external "change" until communication of information needs to occur between the computers and which maintains the potential for "bounded (or unbounded) reversibility" in case the intended information dispatched by a source computational entity is not captured or properly accepted by a destination computational entity. The mechanism enables distributed computers in a network to remain continuously aware of each other's presence; to communicate on a logically nearest neighbor basis in a secure and reliable manner in which packets passed over these links do not conflict with normal traffic or cause the available resources of the link to exceeded; and that atomicity, isolation, and "reversible durability" may be maintained for transactions when perturbations occur.

20 Claims, 69 Drawing Sheets

Related U.S. Application Data filed on Oct. 21, 2013, provisional application No. 61/913,302, filed on Dec. 8, 2013.

(56) References Cited

OTHER PUBLICATIONS

Rieffel et al., An Introduction to Quantum Computing for Non-Physicists, ACM, 36 pages, Sep. 2000.*
Jennewein et al., Entangled State Teleportation, Information Society Technologies, 13 pages, Dec. 20, 2002.*
Kim et al., Quantum teleportation with a complete Bell state measurement, journal of modern optics, 16 pages, 2002.*
AFRL-IF-RS-TR-2007-180, Final Technical Report, Darpa Quantum Network Testbed, 164 pages, Jul. 2007.*

* cited by examiner

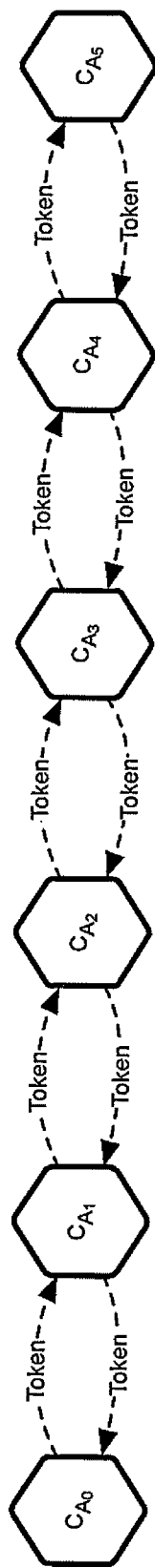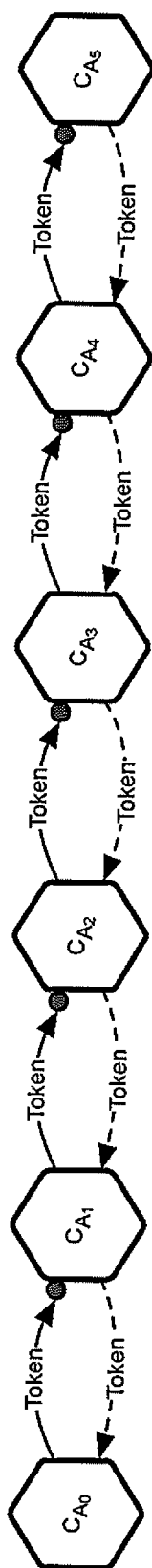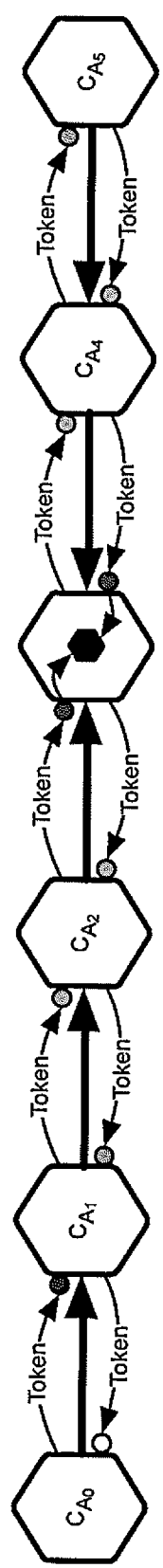
Figure 18 A
Figure 18 B
Figure 18 C

ENTANGLED LINKS, TRANSACTIONS AND TREES FOR DISTRIBUTED COMPUTING SYSTEMS

CROSS REFERENCE TO RELATED APPLICATIONS

This application is a continuation of U.S. patent application Ser. No. 15/687,529, entitled "ENTANGLED LINKS, TRANSACTIONS AND TREES FOR DISTRIBUTED COMPUTING SYSTEM," filed on Aug. 27, 2017, which is a continuation of U.S. patent application Ser. No. 14/331,225, entitled "ENTANGLED LINKS, TRANSACTIONS AND TREES FOR DISTRIBUTED COMPUTING SYSTEM," filed on Jul. 14, 2014 and issued as U.S. Pat. No. 9,774,401 issued on Sep. 6, 2017, which claims the benefit under 35 U.S.C. § 119(e) of U.S. Provisional Application No. 61/846,602, entitled "EARTH COMPUTING," filed on Jul. 15, 2013, the entire contents of which are incorporated herein by reference; of U.S. Provisional Application No. 61/893,285, entitled "A FRAMEWORK FOR EARTH COMPUTING," filed on Oct. 21, 2013, the entire contents of which are incorporated herein by reference; of U.S. Provisional Application No. 61/913,302, entitled "EARTH COMPUTING, VARIOUS EMBODIMENTS & METHODS," filed on Dec. 8, 2013, the entire contents of which are incorporated herein by reference.

BACKGROUND OF THE INVENTION

Field of the Invention

The present invention relates to systems and methods for the storage, computation, reliable communication and ordering of events in systems that operate across geographically and/or locally distributed computer systems. More particularly, the present invention relates to entangled links to establish and maintain bipartite temporal intimacy between computers. Still, more specifically, the present invention relates to entangled transactions and their composition over entangled trees for managing exchanged and conserved quantities, awareness of time, and recovery from failures in a distributed computing system.

Description of Related Art

Distributed Computing. Conventional transactions use two-phase commit or consensus protocols to achieve their ACID (Atomic, Consistent, Indivisible, and Durable) properties. Shared objects in application memory are manipulated by algorithms which enforce the linearizability abstraction. Unfortunately, as attractive as this abstraction is in theory, there is an enormous amount of mechanism (application code, libraries, operating system, kernel, driver, I/O device) before this 'atomic' abstraction can be translated into bit and packet activity on the connection (wires or fiber) between computers.

Conventional transactions based on two-phase commit or Paxos (or similar consensus algorithms) in the App layer are complex, slow, brittle, and don't survive disasters. A new mechanism is needed to provide a simpler and more fundamental way to implement transactions that are faster and more robust.

Thus, there is a need for a new way of organizing the design of hardware and software to address the performance, reliability and complexity challenges of conventional transactions and mechanisms to manage the ordering of events.

Conventional networks incorporate addressable (port) endpoints. An example is nodes in a network with Ethernet or IP addresses. This "endpoint addressing" abstracts away latency, failures and the physical network topology and presents only a shared or aggregated bandwidth channel. This was useful in the past because the original purpose of the internet protocols was to share resources (such as printers), not data. Current cloud computer architectures are based on the TCP/IP model with those same endpoint addresses; however, their communication and addressability needs are greatly expanded beyond the original endpoint (port) addressing model of early computers connected to the internet.

Cluster Computing. Servers in conventional clusters use multicast or unicast to broadcast regular server heartbeat messages to other members of the cluster. Each heartbeat message uniquely identifies the server that sends the message. Servers broadcast their heartbeat messages at regular intervals of (for example) 10 seconds. In turn, each server in a cluster monitors the multicast or unicast address to ensure that all peer servers' heartbeat messages are being sent. If a server monitoring the multicast or unicast address misses three heartbeats from a peer server (i.e., if it does not receive a heartbeat from the server for 30 seconds or longer), the monitoring server marks the peer server as "failed." It then updates its local status, if necessary, to retract the services that were hosted on the failed server.

Several mechanisms have been proposed to manage the heartbeat between computers in a cluster or distributed computing environment. Examples include ORACLE, VERITAS Cluster Server, Hadoop and IBM Scale Out NAS.

Some prior art software uses an internal peer-to-peer global cluster heartbeat mechanism to recover from multiple disks, node, and connectivity failures. The server software uses a scalable, point-to-point heartbeat architecture to efficiently detect failures without flooding the server farm's network with heartbeat packets. Heartbeat failures automatically trigger a multicast discovery protocol to automatically determine the set of surviving servers. This is followed by "self-healing" recovery, which restores access to grid data and dynamically rebalances the storage load across the grid. The prior art uses heartbeat channels to detect server and networking outages.

They define a heartbeat as: a software method used to determine whether a network outage has occurred or a host has failed. Pairs of hosts periodically exchange small messages, and uninterrupted reception of these messages indicates that the hosts are functioning and able to communicate. Heartbeat exchanges are used to efficiently monitor the health of a server farm, and the default heartbeat interval is frequently one or more seconds.

Other examples use the cluster interconnect for network communications between cluster systems. Each system runs as an independent unit and shares information at the cluster level. On each system, a High Availability Daemon (HAD), which is the decision logic for the cluster, maintains a view of the cluster configuration. This daemon operates as a replicated state machine, which means all systems in the cluster have a synchronized state of the cluster configuration. This is accomplished by the following: a) All systems run an identical copy of HAD; b) HAD on each system maintains the state of its own resources, and sends all cluster information about the local system to all other machines in the cluster; c) HAD on each system receives information from the other cluster systems to update its own view of the cluster; and d) Each system follows the same code path for actions on the cluster.

In these classical distributed programming models, a programmer specifies computational resources, data structures, and their relationships a priori or constructs them during the initial phase of program execution. Hence the expression of such resources, data structures and relationships lie within the program. The challenge such systems face is maintaining the integrity and structure of these relationships through failure and reconfiguration of the communication paths between the computational resources as the program executes. If this could be done simply and reliably (from the perspective of a programmer or system administrator), this would provide a rich characterization of connectedness, where previously TRUE and FALSE were the only assignable values for the property "connected" in conventional link-state management. This would enable more diverse responses by an agent, beyond a simpletimeout and a specified number of retries.

Quantum Mechanics. Quantum Mechanics (QM) describes the relationship between probabilities, information and observables. Put simply, QM may be regarded as the generalization of probability theory, which deals exclusively in positive numbers, to the domain of probability amplitudes which may take on positive, negative or complex values.

A classical computer stores bits (two-state symbols) such as 0 or 1. A quantum system stores qubits, representing, for example, photon polarization ↑ or ↓, AND any superposition (linear combination) of those two states ($\alpha\uparrow+\beta\downarrow$), where the coefficients $\alpha$ and $\beta$ represent the probability (over a series of measurements) of detecting the photon in that state.

Matrices are the mathematical language of quantum systems. The state |0> is equivalent to a column vector (e.g., 1 at the top, 0 at the bottom) and |1> represents another column vector (this time with 0 at the top and 1 at the bottom). This is the well-known Dirac Bra-ket formalism for a complex vector. In this formalism, <0| represents a row vector, with 1 on the left, and 0 on the right. <1| represents another row vector, this time with 0 on the left and 1 on the right. Since matrix mechanics involves the multiplication of a row vector by a column vector, this may be represented, for example, by <0|1> for the standard inner product and |0><1| for the standard outer product. Multiplying out the standard inner product yields a number, 0, in the above example. Multiplying the standard outer-product yields a 2×2 matrix, (0,1;0,0) in the above example.

There are a number of 2×2 matrix operations with interesting properties, for example:

A Hadamard matrix (1,1;1,−1) is its own Inverse. e.g., HH*=I (the identity matrix) (1,0;0,1).

The bit flip operation is (0,1;1,0).//The phase flip operation is (1,0,0,−1).

Quantum operations are always unitary: quantum computations do not erase the information or dissipate energy.

The publication "*An insight into the nature of information, entanglement and time*" predicted that: (a) time emerges from entanglement and (b) that entanglement exists, but quantum computing may be an illusion.

Experimental verification that time emerges from quantum entanglement has since been published and benchmarks of the D-Wave Machine appear to show no evidence of quantum speedup. While these results may be far from conclusive from a scientific perspective, if this insight turns out to be even partly correct, it opens up the potential for a revolution in the computer industry by transforming the way we incorporate the concept of time in the design of hardware, software, networks and information storage, and the algorithms that govern their reliability, performance and consistency of distributed data as our systems scale.

SUMMARY OF THE INVENTION

The present disclosure relates to systems and methods for entangled links and entangled transactions. According to one innovative aspect of the subject matter in this disclosure, a computer-implemented method for creating an entangled link between a first computing entity and a second computing entity comprising: identifying, using one or more processors, a first computing entity; discovering, using one or more processors, the second computing entity by the first computing entity; connecting, using one or more processors, the first computing entity to the second computing entity; and establishing an entanglement between the first computing entity and the second computing entity to create the entangled link as a single abstract computational entity.

In general, another innovative aspect of the subject matter described in this disclosure may be implemented in a method for composing an entangled tree over a clique of cells, the method comprising: identifying a set of cells from the clique of cells; identifying a root cell from the set of cells from the clique of cells; creating a plurality of entangled links between cells in the set; and associating the plurality of entangled links to create an entangled state in which entangled transactions can be created between any two or more cells in the set of cells.

These and other implementations may each optionally include one or more of the following features. For example, features may include wherein the entangled link is a software synchronization domain, the first computing entity and the second computing entity are each a cell including an encapsulated computer node, a cell agent and a transformation unit, and the transformation unit of the first computing entity and the transformation unit second computing entity are coupled by a medium; wherein the entangled link is maintained using a hot-potato packet-exchange mechanism between the first computing entity and the second computing entity. And wherein the first computing entity and the second computing entity together maintain the entangled link as the single abstract computational entity; wherein the packet-exchange hot-potato mechanism represents a unique, idempotent, and reversible token exchange which presents no visible indication of progress until a communication of information needs to occur between the first computing entity and the second computing entity, and which maintains the potential for bounded or unbounded reversibility; wherein the token exchange uses a token, and the token is uniquely identifiable only to each of the first computing entity and the second computing entity, and is encrypted; wherein the entangled link is maintained using an atomic information transfer between the first computing entity and the second computing entity, the atomic information transfer synchronizing a first data structure for the first computing entity, the first data structure describing a combined state of the first computing entity and the second computing entity from a perspective of the first computing entity a second data structure for the second computing entity, the second data structure describing the combined state of the first computing entity and the second computing entity from a perspective of the second computing entity; wherein a beacon is used to discover and connect the first computing entity and the second computing entity; wherein communication for the entangled transaction uses an entangled transaction packet that is associated with one or more tokens used to maintain the entangled links between the first computing entity, the second computing entity and the third computing entity; and wherein the entangled link emulates quantum teleportation for atomic information transfer that preserves conserved quantities and exchanged quantities. For example, features may include operations including creating a second entangled link between the second computing entity and a third computing entity; and creating an entangled transaction between the first computing entity and the third computing entity by associating the entangled link and the second entangled link with atomic information transfer between the first computing entity and the third computing entity. Still, other features may include operations of detecting unentanglement between the second computing entity and the third computing entity; creating a third entangled link between the third computing entity and a fourth computing entity; and reassigning the entangled transaction between the first computing entity and the third computingentity by associating the entangled link and the third entangled link for atomic information transfer between the first computing entity and the third computing entity.

Additional features may include wherein the entangled transaction is maintained using a packet-exchange heartbeat mechanism between the first computing entity and the third computing entity and wherein the first computing entity and the third computing entity together maintain the entangled transaction as the single abstract computational entity; wherein the packet-exchange heartbeat mechanism is a unique, idempotent, and reversible token exchange which presents no visible indication of progress until a communication of information needs to occur between the first computing entity and the second computing entity, and which maintains the potential for bounded or unbounded reversibility; wherein the entangled tree includes entangled link structures that are long-lived, easily detectable and repaired failures, and have explicit entangled token management for recovery; wherein the tree is labeled and identified with an identifier of the root node; wherein the set of cells from the clique of cells are connected by chained entanglements; wherein at least two cells from the set of cells from the clique are connected by a skip entanglement; wherein at there is a second tree overlaid on the clique of cells.

Further other features may include operations of detecting unentanglement of a departing cell in the set of cells; and reconnecting the set of cells without the departing cell by establishing at least one entangled link between two cells from the set of cells.

Other implementations of one or more of these aspects include corresponding systems, apparatus, and computer programs, configured to perform the actions of the methods encoded on computer storage devices.

It should be understood, however, that the above features and advantages are not all-inclusive, and many additional features and advantages are contemplated and fall within the scope of the present disclosure. Moreover, it should be understood that the language used in the present disclosure has been principally selected for readability and instructional purposes and not to limit the scope of the subject matter disclosed herein.

BRIEF DESCRIPTION OF THE DRAWINGS

The present disclosure is illustrated by way of example and not by way of limitation in the figures of the accompanying drawings in which like reference numerals are used to refer to similar elements.

FIG. 18A shows an example token transfer with no order.

FIG. 18B shows an example token transfer with order in the entangled chain.

FIG. 18C shows an example token transfer with a serialization focus.

DETAILED DESCRIPTION

Figure 1:
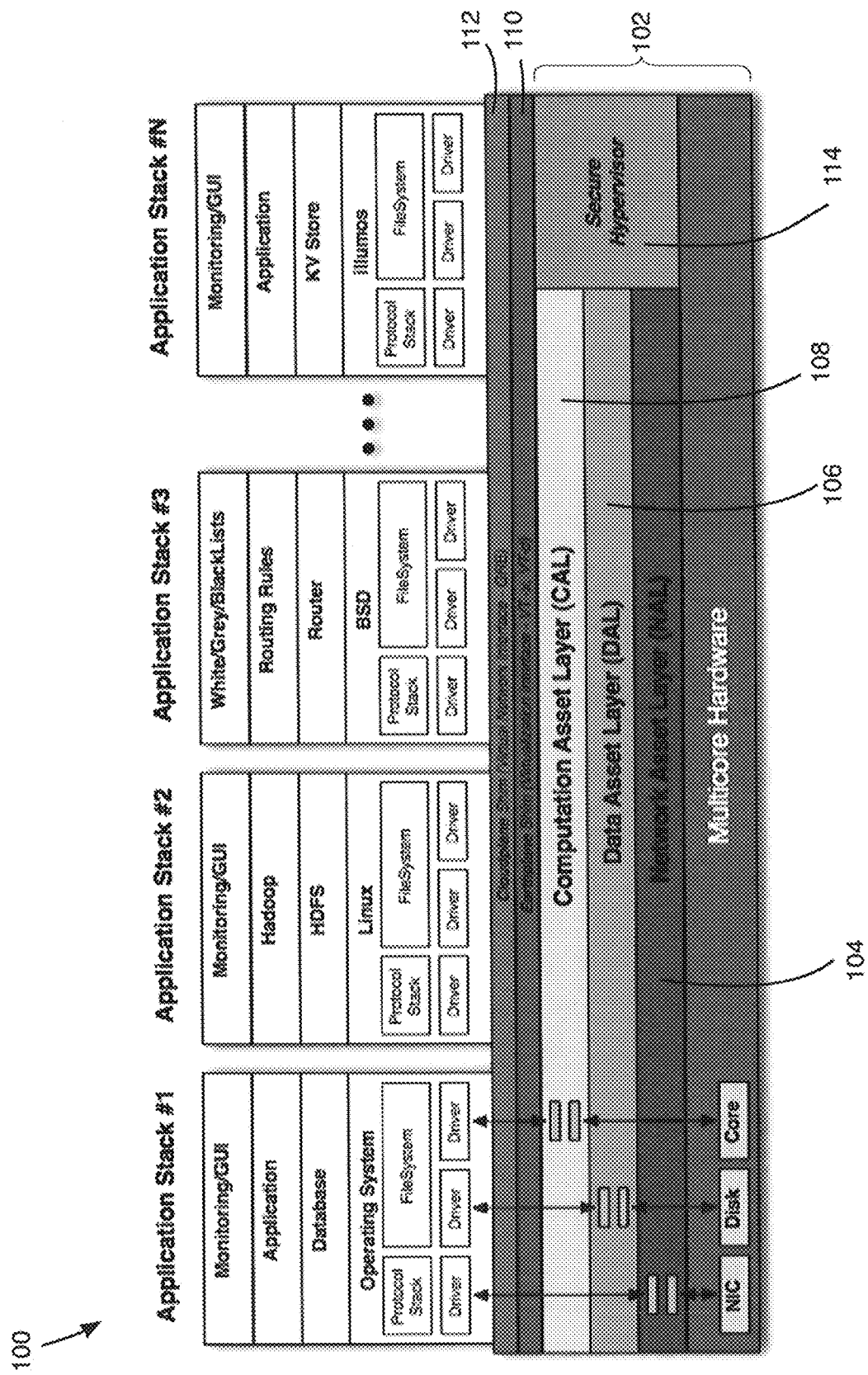
FIG. 1 shows an example of a cell software stack as an embodiment of the present invention.

The present invention fundamentally advances the ability to make fast and reliable transactions over a network, as well as enables a substrate (graph topology) upon which to dynamically organize the ordering of events in distributed computer systems and ensure the consistency of data. More specifically, the present invention solves fundamental issues in datacenter design and internet services and enables the construction of online services which can: (a) Provide alternative recovery options, leading to infrastructures which are much more robust to perturbations (failures, disasters, attacks) particularly as they grow in scale; (b) Enable self-healing systems which require less administration, and thus less opportunity for human error (the biggest impediment to robust, agile and scalable infrastructures today); (c) Resolve fundamental issues regarding file (object) synchronization in online (and offline) services; (d) Distribute transactions far faster, more reliably and more securely than existing systems; and (e) Enable core mechanisms for a secure systems foundation for robust infrastructures. For example, it leads the way to system defenses, which can be compromised only if the attacker defeats the speed of light.

Entanglement is a quantum mechanical phenomenon between pairs of particles which exhibit quantum superposition. Quantum entanglement is a real, measurable phenomenon, which has been proposed to provide unique capabilities for applications in, for example, secure communications and quantum computing systems. A new model of time predicts that time emerges from entanglement and can be modeled by photons in a hot potato protocol bouncing back and forth between atoms.

This invention pertains to a common architecture for use in classical systems based on a quantum entanglement/teleportation model, which may initially be "emulated" by a classical network mechanism (the ENTangled Link—ENTL), which is composable into higher level structures (dynamic lattices) which provide a foundation upon which to build high performance scalable systems which remain stable in the face of perturbations (failures, disasters, attacks), and assist in the recovery thereof.

The present invention fundamentally advances the ability to make fast and reliable transactions over a network, as well as enables a substrate (graph topology) upon which to dynamically organize the ordering of events in distributed computer systems and ensure the consistency of data.

These technical issues are important because, for anyone who can solve them, they address fundamental issues in datacenter design and internet services and open up new market opportunities by enabling the construction of online services which can:

Provide alternative recovery options, leading to Infrastructures which are much more robust to perturbations (failures, disasters, attacks), particularly as they grow in scale.

Enable self-healing systems which require less administration and thus less opportunity for human error (the biggest impediment to robust, agile and scalable infrastructures today).

Resolve fundamental issues regarding file (object) synchronization in online (and offline) services.

Distribute transactions far faster, more reliably and more securely than existing systems.

Enable core mechanisms for a secure systems foundation for robust infrastructures. For example, it leads the way to system defenses which can be compromised only if the attacker defeats the speed of light.

We leverage a quantum "model" for some distributed computing functions (locking, transactions, serialization foci, etc., in addition to Quantum Key Distribution (QKD)). We introduce secure bipartite behavior algorithmically as long as our cells are directly connected using standard classical packets. To provide the full security benefits across a Wide Area Network (WAN) we may need a quantum implementation and direct access to the fiber and the photon generators/detectors implemented in the PHY adaptor, with additional control signals into the NIC to manage the fragile entangled state. There are two motivations for this approach: (1) to maintain common architecture roles, functions and manipulation mechanisms whether the system is implemented classically or quantum mechanically, and (2) to expose previously unanticipated advantages of emulation of this 'quantum entanglement/teleportation' model using classical network packets. As a minimum, we anticipate various benefits (including but not limited to performance, recoverability and reliability of this mechanism) which goes above and beyond what was previously considered possible using classical approaches.

Below is described how secure bipartite behavior is established algorithmically between cells (autonomous, self-contained computer nodes) using non-standard but still classical packet transfers on the network. This direct cell to cell model also applies to cells connected via a common network fabric, by enrolling the network fabric to provide these emulated protocols natively across all the hops (network segments) required in a set of bipartite links (forming a tree) for communication.

The present invention maintains architectural roles and models and a common API so that "similar or equivalent" functionality, protocols and capabilities common to the model can be made available no matter what their implementation (software, hardware, quantum devices or some combination thereof).

There are many functions which may use an underlying "entangled link" mechanism as an element upon which to compose additional distributed system functions. One previously described extension is to build an "entangled tree" (the Entangled TRee—ENTR) out of a set of links and cells (computers AND/OR routing nodes) where the entire tree is addressable as a single entity, self-healing and self-maintaining. These mechanisms are established in the network asset layer (NAL) of the Earth Computing Architecture. Fundamentally, as a classical emulation of quantum entanglement, they represent bidirectional relationships rather than pairs of back-to-back source and destination addresses (which can conflict in simultaneous time), and are capable of providing benefits to computer infrastructure, even if they are "emulated" with classical network packets.

This disclosure delineates hardware functions which may assist those mechanisms in architecture layers above the Network Asset Layer (NAL). For example, the Data Asset Layer (DAL) and Computation Asset Layer (CAL). Several such functions have been described in prior disclosures with a canonical implementation in software. This disclosure presents those and several additional functions which may benefit (in performance, reliability, maintainability, security or some other dimension of system value), by hardware support, in either the NIC(Network Interface Controller), switch, or router.

This invention addresses the problem of "Disaster Recoverable Atomicity Protocol" (DRAP). It was noticed during its invention that the atomicity protocol provided essentially the same physical capability as the laws of physics, as depicted in quantum entanglement (reversible unitary evolution), quantum erasure, quantum teleportation and the no-cloning theorem. This invention provides a classical emulation of (for example) quantum teleportation, using classical packets on a network.

Entangled Links and Entangled Transactions may be implemented in software in the device driver of an operating system or in the NIC or NIC Firmware. These functions may also be implemented in hardware or hardware assistance may be provided in the links of any kind, including those that go through a conventional network fabric.

This invention includes the design of mechanisms which use a quantum view of information to enable a network segment (an entangled link) to act as a fundamental primitive which can be leveraged by algorithms which depend on the ordering of events for their correct or optimal behavior in a distributed computing environment.

While these designs can leverage the development of real quantum links and quantum networks, the breakthrough is in recognizing that many of the benefits to the performance, reliability and security do not have to wait for these quantum technologies to mature and become available. The cost and complexity required for super cooled quantum devices may also be avoided in implementation. These benefits can, at least in part, be achieved by modifying the way conventional digital logic and/or software is organized into independent timing domains at the lowest level in a computer-network interface, and by emulating, in the simplest possible way, a reversible one (or more) qubit link on a network segment using packet exchanges.

From a purely classical computer science perspective, the benefits of entangled links can be understood as the removal of all unnecessary mechanisms (hardware and software) in the path from the application to the element that provides the atomic transfer of an encapsulated information token. Conventional distributed transactions whose atomic element is a shared memory object in application space are replaced by a fundamentally asynchronous and far simpler mechanism in the link (the network interfaces and cable/fiber between two computers). In this way, all the existing mechanism in the application path is bypassed and no longer interferes with the speed and reliability of the atomic and reversible ordering within this mechanism (the entangled link). Aspects of this invention to achieve this result include:

The temporal isolation of this reversible link mechanism, such that a conserved quality (CQ) token can be indefinitely maintained within the link and replaced by an exchanged quantity (EQ) when actual information is to be transferred (and externally observed).

A single computational entity, mutually synchronized by the simplest elements within the network interfaces on both sides of a link and indivisible packets transmitted from one side to the other, and back over the media (cable/fiber).

A mechanism to transform the received packets into transmitted packets, modulated by requests from a local agent on each side to perform higher level operations. An optional mechanism may also be included to copy the GEV (global) state of the link into a local register or memory structure which may be queried by the local agent on each side (the LOV, or Local Observer View). This optimal mechanism to copy or transform the LOV state within the link to the GEV register or memory structure may be detrimental to the ultimate performance and reliability characteristics of an entangled link. Because it interferes with (decoheres) the fragile shared state within the link.

A mechanism for the 'link' to start from a completely unconnected and unentangled state and proceed stepwise to toward a stable 'entangled' state. This stepwise process toward the entangled state may be achieved by any mechanism designed into the hardware or hardware/software combination. The goal is to achieve the minimum (or optimal) number of steps to achieve the entangled state, which may be recognized either by a symmetric state machine comprised of elements on both sides of the link, by a series of packet exchanges which move the joint state on the link toward a common state, or by the exchange of 'information matrices' which emulate the well-known Pauli matrices (or their descendants/derivatives).

A sequence of states, represented by an initial packet and a transform, which results in a 2 or more state recurrence, which can be used to distinguish orderly forward progress of the process of information transfer and can also distinguish orderly reverse progress of the process of information transfer within the entangled link.

A local mechanism to recognize that entanglement has been lost (perhaps through the loss of a packet or a failure in the NIC at either end). And a mechanism to return the link back to a stable entanglement state while verifying that the entanglement was not lost due to some nefarious activity by a 3rd party.

The fundamental communication primitive within the link is physically and logically atomic (cannot be further subdivided). They contain a data structure, with or without error correction, with or without encryption, which includes one or more (chained atomic) data structures, each comprising:

A matrix with 2×2 (or 3×3 or 4×4) elements, which is Hermitian (equal to its own conjugate transpose) and unitary (determinant=1). Each element shall have sufficient bits of prefix in order to identify the representation of the alphabet comprising the following symbols for each element: 0, +1, −1, i, −i, and * where i is the imaginary unit ($\sqrt{-1}$), and* is a 'don't care'. Note that the 2×2 matrix may also be used as an alternative representation for complex number vector, i.e. (a+ib) is equivalent to a 2×2 matrix: {a, −b,b,a} or {a,b,−b,a} depending on whether the vector is expressed in a matrix column form, or a row form.

A pair of 2×2 (3×3 or 4×4) matrices representing the local (self) and remote (other members' view of the entangled pair). A Transform 2×2 (3×3 or 4×4) is multiplied by the input packet matrix to create the output packet.

The advantage of this simplicity is that the mechanism (in hardware and/or software) is: (1) economy of mechanism; less can go wrong during perturbations (failures, disasters, attacks), and (2) the mechanism or algorithm is small enough to be formally proven, thereby eliminating large classes of hardware, software or other implementation bugs, and affords an opportunity for significant improvements in performance.

Information. We represent negative information as the local (symmetric) reversal of time. Both positive and negative entries are represented equally in this invention as the local reversibility of time in a reversible computing sense. However, this may be emulated in hardware/software in a classical sense, or it may employ real quantum mechanical implementations using, for example, polarized single photon emitters and detectors over a fiber link.

In matrix mechanics, which describes quantum theory:
1-norm is the sum of the absolute values of the entries in a vector (1 in a normalized system)
2-norm (Euclidian norm) is the square root of the sum of the squares of the entries (the Pythagorean theory).
Trace is the sum of the main diagonal (a+d).
Determinant is the expression ad-cb (where a, b, c, d are elements of a 2×2 matrix).

The Pauli matrices, a set of three 2×2 complex matrices which are Hermitian and unitary, and the Hadamard matrices (square matrices whose entries are either +1 or −1 and whose rows are mutually orthogonal) are two of several methods that may be used as operators (state transforms) to drive the joint state of computer 'link' (cable and NIC's on both ends) into different modes for the emulation of quantum entanglement, atomic information transfer (AIT), and other functions desired by the applications and operating systems which live above this mechanism. AIT represents the emulation of the no-cloning theorem or quantum teleportation.

The entangled link mechanism, by itself, or when composed into higher level graph topologies (for example, through the use of self-healing communication trees), may be used to supplement or replace existing mechanisms for:

Atomic Information Transfer (AIT) for Conserved Quantities (CQ) or Exchanged Quantities (EQ). (Emulation of quantum teleportation).
    Locking in and between computer systems (using AIT above).
    Transactions (using AIT above). For example, in the electronic trading of bitcoins or other cryptographic currencies.
    Replication of information (small-indivisible) or large—with this protocol providing flow-control and/or error detection and/or network recovery after an arbitrary number of link failures.
    Heartbeats in distributed computing systems: presence management no longer requires $N^2$ traffic to span the whole network, each link maintains a presence within itself, and network-spanning alerts are created only when presence is lost or have a need for application infrastructure spanning.
    Timeouts can now be replaced with a universal notion of "temporal intimacy", where application liveness does not require constant cross-system communication.
    Leader election (now becomes the selection of a stabilized/entangled tree, which uses the acyclic properties of the trees to create a single, deterministic, and deadlock-free result).
    Consensus (for example, the Paxos or RAFT protocols may enjoy more reliable and predictable behavior on top of the stabilized/entangled trees and become simpler: role selection is achieved through local sub-tree selection).
    Distributed counters (using EQ/CQ to achieve global increment/decrement operations).
    Algebraic queries on distributed variables (=, ≠, ≤, ≥, etc.) on the above distributed counters.

These mechanisms are of particular value in: Cloud computing, distributed computing, file (object) synchronization, financial transactions and distributed storage systems. A major advantage is that there is no logging of if up and if down functions, no observer means less log traffic, etc.

Adaptive Virtual Systems 100

FIG. 1 shows an example adaptive virtual system 100 according to an embodiment of the present invention. FIG. 1 shows the layered software stack. The adaptive virtual systems 100 includes Application Stacks #1 to #n, an Earthplane shim 110, a Cloudplane shim 112 and an EarthCore layers 102. Application Stacks #1 to #n are conventional processing stacks. The Earthplane shim 110 and the Cloudplane shim 112 provide an interface to pool of remaining cores which run applications (either under a single Operating system and containers or under a virtual machine hypervisor and guest operating machines). The earth core layers 102 comprises a Compute Asset Layer (CAL) 108 on top of physical resource (Network Asset Layer 104) and object management (Data Asset Layer 106) layers to enable itineracy of both data (files, databases, etc.) and computational entities (virtual machines, distributed application webs etc.), virtualizing both the computational environment and the data they seek to operate on in an available, secure and defensible infrastructure. The EarthCore layers 102 also includes a secure hypervisor and multicore hardware. The secure hypervisor controls initial boot of system and supervises running entities such as operating systems, containers and any number of recursively stacked virtual machines. Additional 1 to p processor cores (multicore hardware) are statically allocated to the Network Asset Layer (NAL) (104), where p is the number of ports on the cell. Additional processor cores are dynamically allocated to the Data Asset Layer (DAL) (106) and Computation Asset layer (CAL) (108), which collectively form the EarthCore layers 102.

This architecture is designed to exploit the metaphor "Earth Computing—the solid ground beneath the clouds." The metaphor has meaning in what capabilities and behaviors are exhibited by the systems in each layer. Cloud computing is ephemeral, as are clouds. The Earth's surface is the interface between the Earth and the sky, and is where all persistent modifications take place. The underground is the immutable core, where structures and data are stable and persistent and resilient to whatever perturbation may occur in the Cloudplane (sky).

The Earth Computing cell 100, is by design, an adaptive system designed to tradeoff abundant resources (CPU, Memory, Storage Capacity, Network Bandwidth, etc.) for scarce resources (Latency, Human Attention, Energy Consumption, SSD Endurance, etc.). The goal is continuous adaptivity across all networked resources.

The Earth Computing cell 100 includes a Replica Management Engine, Stacked Graph Overlays and Cell Architecture. The Replica Management Engine distills disparate and independent mechanisms for object storage, protection, migration and disposition into a single united engine that is simpler, more robust and of higher performance than the separate mechanisms it replaces. Objects may be files, databases, Virtual Machine (VM) images, patch files, virus signature files, etc. The Stacked Graph Overlays, in conjunction with a MetaData Tensor (MDT), enable the user to identify, reason about and manipulate large complex sets of digital assets and their relationships to each other. Three levels of assets (network, data and computation) are managed with overlays that progressively abstract from the physical hardware and installed network cables through a layer of data objects and their specified redundancy needs to the active itinerant computational entities and data objects that perform functions critical to an organization's mission and operations. The Cell Architecture that unifies networking, storage, and computational resources within a single, encapsulated, autonomous, and modular unit of deployment. The internal structure of the cell comprises three functional layers. The lowest layer (network/physical assets) are owned by the organization, the middle layer (object assets) is owned by the tenants of the infrastructure, and the upper layer is owned and driven by the users of the system to serve their computational objectives. Previous system architectures have failed to achieve their autonomic goals; previous declarative approaches have similarly failed to achieve their objectives. A key reason for these failures is a failure to appreciate the scope of scalability of state information as a system grows. This, in turn, is due (primarily) to a failure to achieve an architectural distinction between Global-Eye-View (GEV) and Local-Observer-View (LOV) algorithms and data structures and gain control over the complexity this entails as systems scale.

The essence of Earth Computing cell TOO and the foundation of its claim of simplicity and robustness is the establishment of just two classes of system elements at the lowest (physical) layer: Cells and Links. Within each class, all elements in the set are substitutable. Any element in the set of available cells may be regarded as a redundant alternative to any of the other elements in the set. Any element in the set of links attached to each cell may be regarded as a redundant alternative to any other link attached to that cell. This generalization and full actualization of the notion of n+1 redundancy enables us to achieve the theoretically highest degree of robustness while eliminating the need to manage each of the system elements separately.

Cells auto-discover and auto-configure themselves to recursively form cliques (multiple cells connected behind a router), colonies (multiple cliques in a campus) and complexes (many campuses connected worldwide). The Compute Asset Layer 108, the Network Asset Layer 104 and the Data Asset Layer 106 are the three main layers within an adaptive virtual systems clique structure.

Figure 2:
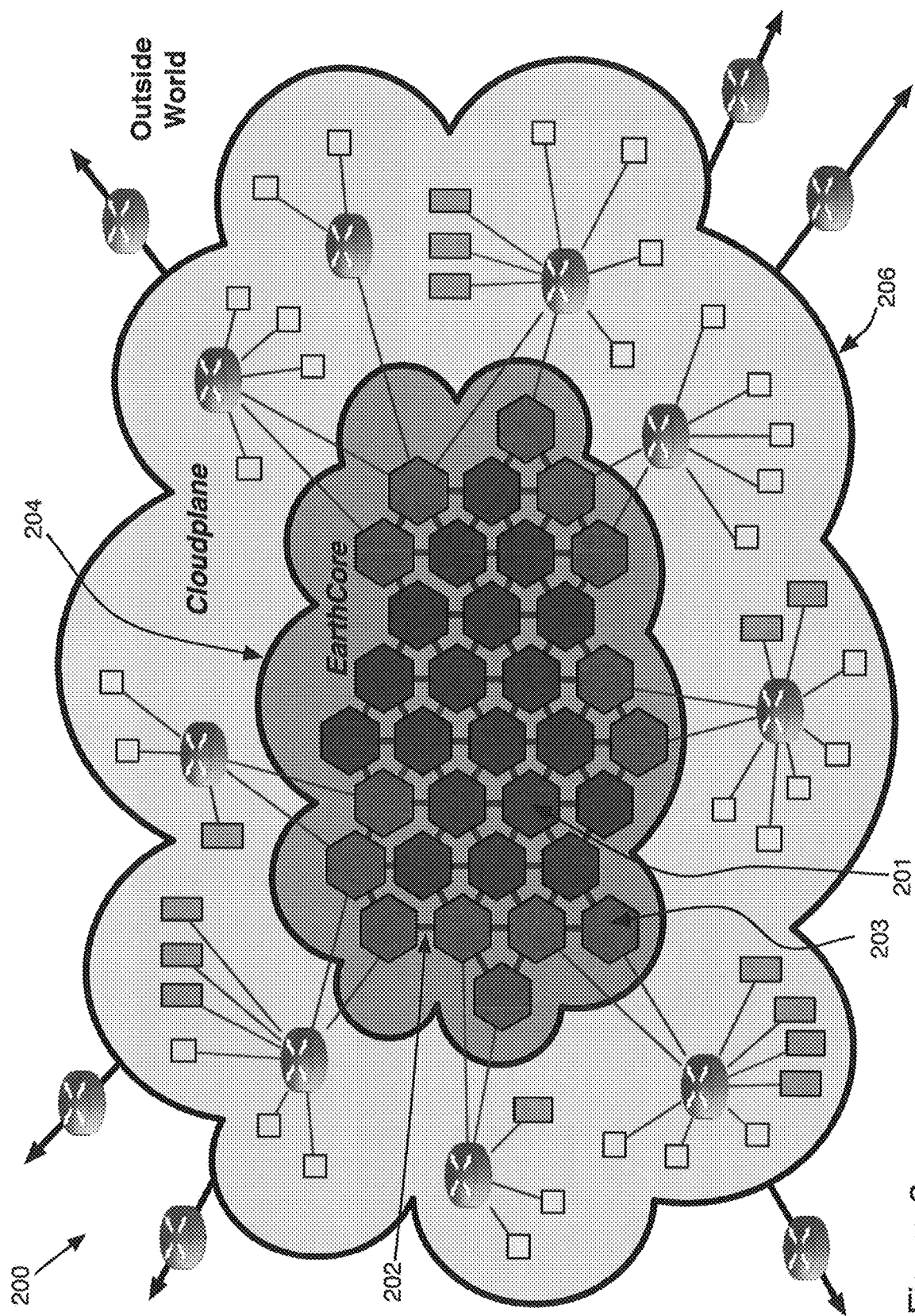
FIG. 2 shows a single Earth Computing (EC) plex.

FIG. 2 shows a block diagram of an example data center plex 200, including an entangled clique (the green EarthCore area) within a larger Datacenter or Cloudplane 202 (the blue Cloudplane area) comprising conventional (legacy) compute (servers and clients) and networking equipment such as switches, routers, software defined networking (SDN) technologies. EarthCore is an example use case of an entangled clique composed of transitively connected cells 201,203 and entangled links 202. More specifically, FIG. 2 depicts a datacenter deployment showing an EarthCore, a Cloudplane and an Earthplane/Cloudplane interface 204.

Earth Computing (this invention) is the green area (EarthCore): Entangled Trees are composed of cells 201,203 connected by entangled links 202, which directly connect cells without the need for legacy switches. EarthCore edge cells 203 connect to conventional-prior art systems through edge cells 203, which provide additional services (entangled tree roots, serialization foci, etc.). EarthCore core cells 201 connect only secure (well-known and verified) systems inside the earth core and are not directly connected to the outside world (the cloud plane 206) and provide hidden core services such as participation in entangled tree operations, tree functions, composable security, timing behavior characterization and verification and extended persistence data (immutable distributed datastore, entangled tree roots, serialization foci, etc.) security and long-term persistence.

Entangled links emulate subtime as in the Subtime Conjecture, a reversible interpretation of quantum processes, where decoherence represents an interaction of measurement with an observing system which itself remains reversible but which appears to us in a classical world as irreversible because information (memory of an event) is reversed (not merely erased by Landauer processes). This alternative interpretation of time begets engineering mechanisms which exploit these monotonic, successive and reversible processes to enable atomic information transfer between cells over a bidirectional communication link and to facilitate its ordering of events on distributed lattices. This invention embodies these processes (even though we cannot observe them), in order to provide temporal intimacy between separate systems, and provide a degree of determinism, not through conventional computer science, but through the knowledge that one or more quantities (such as information, mass-energy, charge, spin, color, etc.) are conserved in physical processes, or in this case emulated by information packets.

Figure 3:
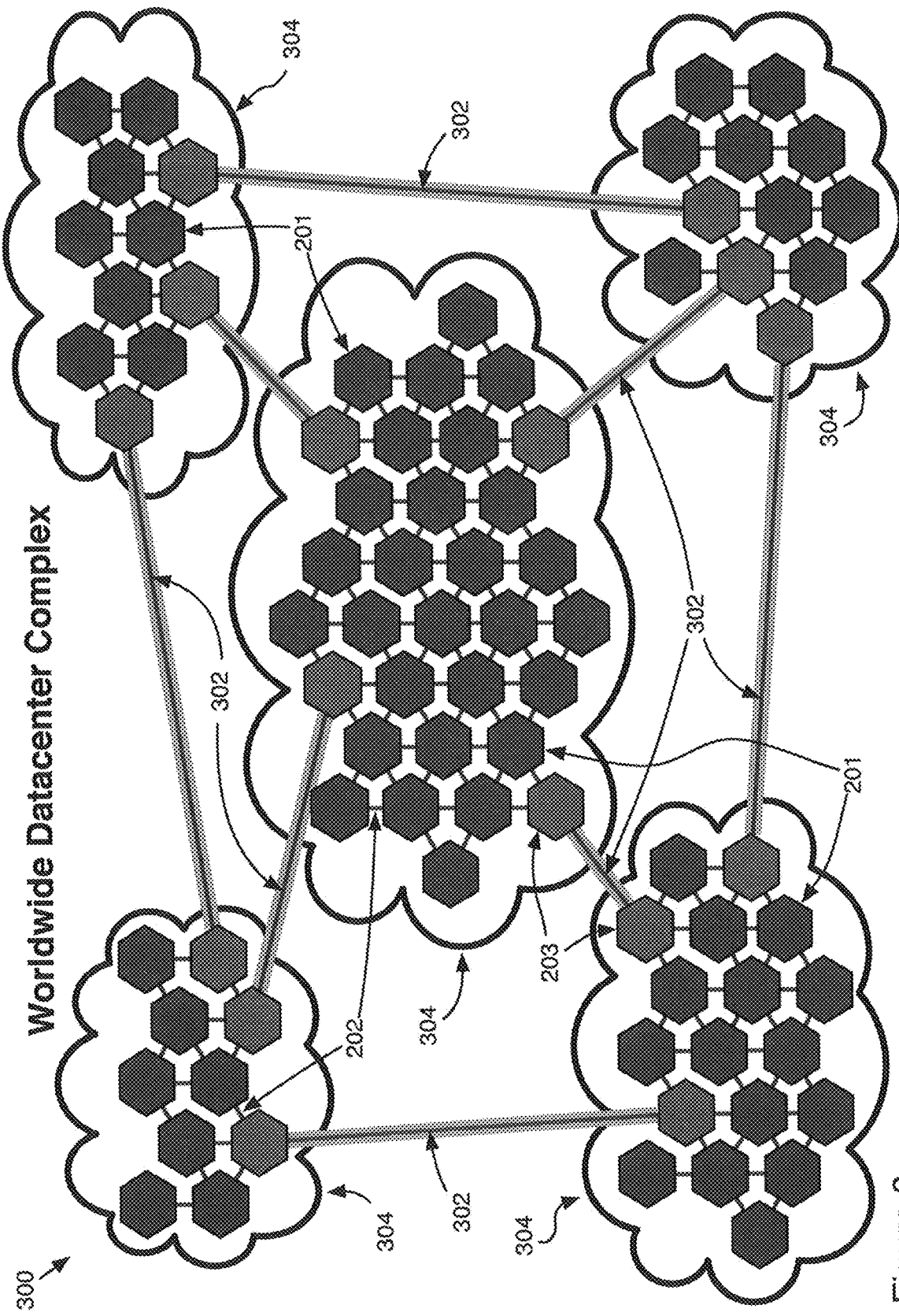
FIG. 3 shows an Earth Computing (EC) Complex: An example of a geographically distributed complex of Earth-Cores.

FIG. 3 shows an example architecture 300 of a worldwide data center complex including a plurality of distributed datacenters 304. The distributed datacenters 304 (multiple islands of entangled cells 201, 203) can be connected through network encrypted tunnels (emulating link entanglement) 302 for geographic distribution, or real quantum technology through long haul fiber links 302 between datacenters utilizing fully quantum enabled communication devices and media.

Each EarthCore (datacenter or entangled clique 304) independently maintains its own local Structural Temporal Intimacy (STI) using entangled links 202. These independent datacenters 304 may then construct (at a higher level, and when network communication is good), additional tree overlays (graph covers) over geographic distances to exploit the logical or virtual entanglement, and physical entanglement in the form of entangled transactions in the present invention over WAN distances (with or without the Meta-Data Tensor (MDT) data structures on top). The inter-datacenter links 302 above may also use full quantum implementations with fiber and individual polarized photon generators/detectors to provide the benefits of long-range communication in this architecture and event ordering/reversibility and recovery/repair compatible with the recovery model described by this invention.

Figure 4:
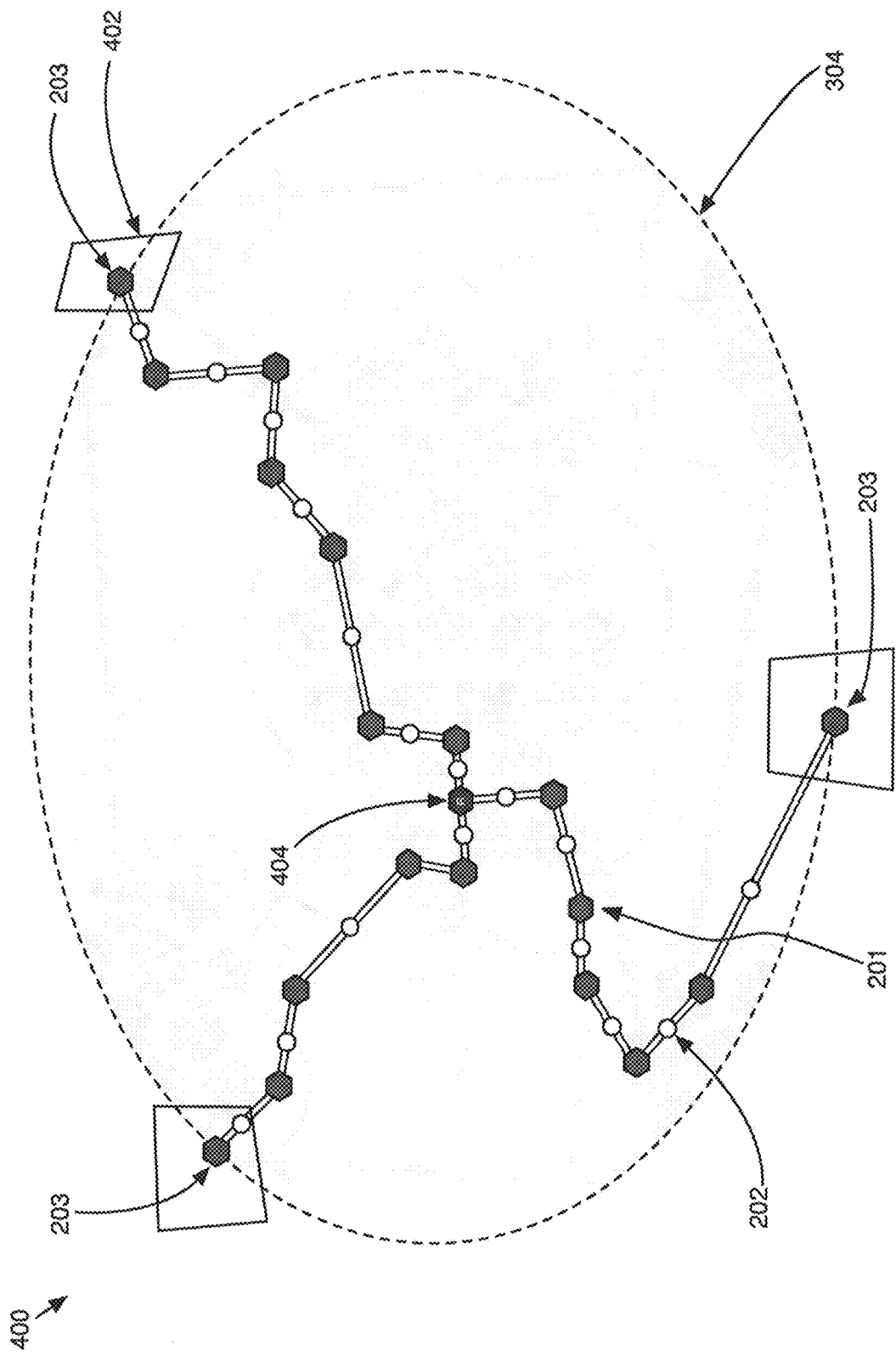
FIG. 4 is a network diagram of an example architecture showing edge cells for an earth core.

FIG. 4 shows an example EarthCore 400 (entangled clique), showing edge cells 203 and core cells 201, and their role in the serialization of data. FIG. 4 depicts a cross-section of a sphere, with edge cells 203 as information processing entities on the surface boundary 304 with internal core cells 201, and entangled links 202 being composed into entangled trees 404 for reliable and secure distributed computing and immutable storage functions 'inside' the EarthCore volume. The surface element (2D Earth Surface) 402 is serviced by that edge node 203. The entangled tree 404 shown is only one of a plurality of trees which exist in the enclosed volume. The entangled tree 404 shows a serialization focus to ensure the consistency of data being modified by the edge cells 203. This serialization tree may extend geographically to the entire plex, clique or complex. Various algorithms exist for the selection of (for example) minimum latency spanning trees that connect the cells 203 through a common Directed Acyclic Graph (DAG). Such serialization trees may also extend across the different datacenters in the entire complex, as shown in FIG. 3. The entangled tree 404 shown is only one of a plurality of trees which exist in the enclosed volume.

More particularly, FIG. 4 illustrates a use case showing only entangled link 202 cell to cell connections within the earth core. These direct connections are able to create emergent structures which are both (a) long-lived, (b) easily detected and repaired failures, (c) explicit entangled token management for recovery, (d) emergent behaviors, such as the migration of LRU/LFU (Cold) data migrating away from edge, and MRU/MFU data being created at the edge, or migrating back to the edge when accessed.

Global-Eye-View (GEV) architectures and algorithms seek to observe or perceive reality from an imaginary global view in an n-dimensional spacetime. A "vantage point" (one could legitimately equate this to an imaginary "vantage time" just as much as to an imaginary "vantage point") from which the programmer or administrator presides over a set of resources as they attempt to control or manage them; a kind of "crow's nest" from which to see the whole ship (or at least the surface of its decks), and a panoramic view out to some horizon. The canonical GEV model is shared-memory.

Local-Observer-View (LOV) architectures and algorithms recognize that the only entities we can discover, and be certain they continue to exist, are those which we touch (interact with directly). (Although we can acquire second hand information about the world through other agents, this information is necessarily obscured by delays and interpretation by intermediate nodes. We can never have "perfectly" up-to-date, complete or accurate information about remote nodes (or links) in the network. This is not something merely awkward or impractical from an engineering implementation perspective, it is fundamental.) This results from the principles of constructive mathematics, which rejects the notion of existence (∃) without explicit proof and the law of the excluded middle from first-order logic, and the relativity of simultaneity. The canonical LOV model is message passing.

This distinction may appear academic, but it becomes vitally important when building scalable distributed systems. The GEV model, employed unconsciously and implicitly in conventional architecture and algorithm design leads to systems which exhibit severely restricted scalability, concurrency and which continuously compound their complexity and cost as we try to address their shortcomings incrementally. (GEV architectures and algorithms try to represent a complete view of all available nodes, which can never compete with the reality observable by physical computers from their (physically realizable) LOV perspective.

Referring now to FIGS. 5A-5E, FIG. 5A shows the conventional abstraction within a networked environment where any conventional computing node 502 may address any other conventional computing node 504 in a flat (L2 or L3) address space. The self-node 502 assumes a 'God's-Eye-View' (GEV) of the entire system (in both space and time). The path abstraction 506 is assumed to have zero (or uniform) latency and zero (or uniform) failure rates in conventional communications between applications running on those nodes.

An implicit but frequently unacknowledged assumption in the applications is that the paths of each of those from each self-node, to each of the other n nodes is private (isolated and non-interfering). FIG. 5B shows what happens when all nodes make this assumption. Traffic (in particular—heartbeats) increases with the square of the number of nodes $n^2$, and any conventional shared network quickly becomes overwhelmed.

A further difficulty with this GEV abstraction is that each self-node must maintain a state to manage all of the potential nodes in the system, including sessions with nodes (with applications on them) that it wishes to communicate with and attempted connections from nodes (and applications, including malware) that it does not wish to communicate with.

Even considering only the nodes it wishes to communicate with, this presents a scalability challenge as the management of state from each self-node grows as $n^2$. Systems which use GEV abstractions in general suffer from this scalability difficulty.

While the $n^2$ challenge arises with the complexity caused by an increase in the number of nodes (and hence their potential connectivity), an even more pernicious scalability challenge comes with the diversity of the elements in the path from the self-node to any other node. Diversity grows as the power set ($2^n$) in the number of different nodes, i.e., an exponential.

Figure 5:
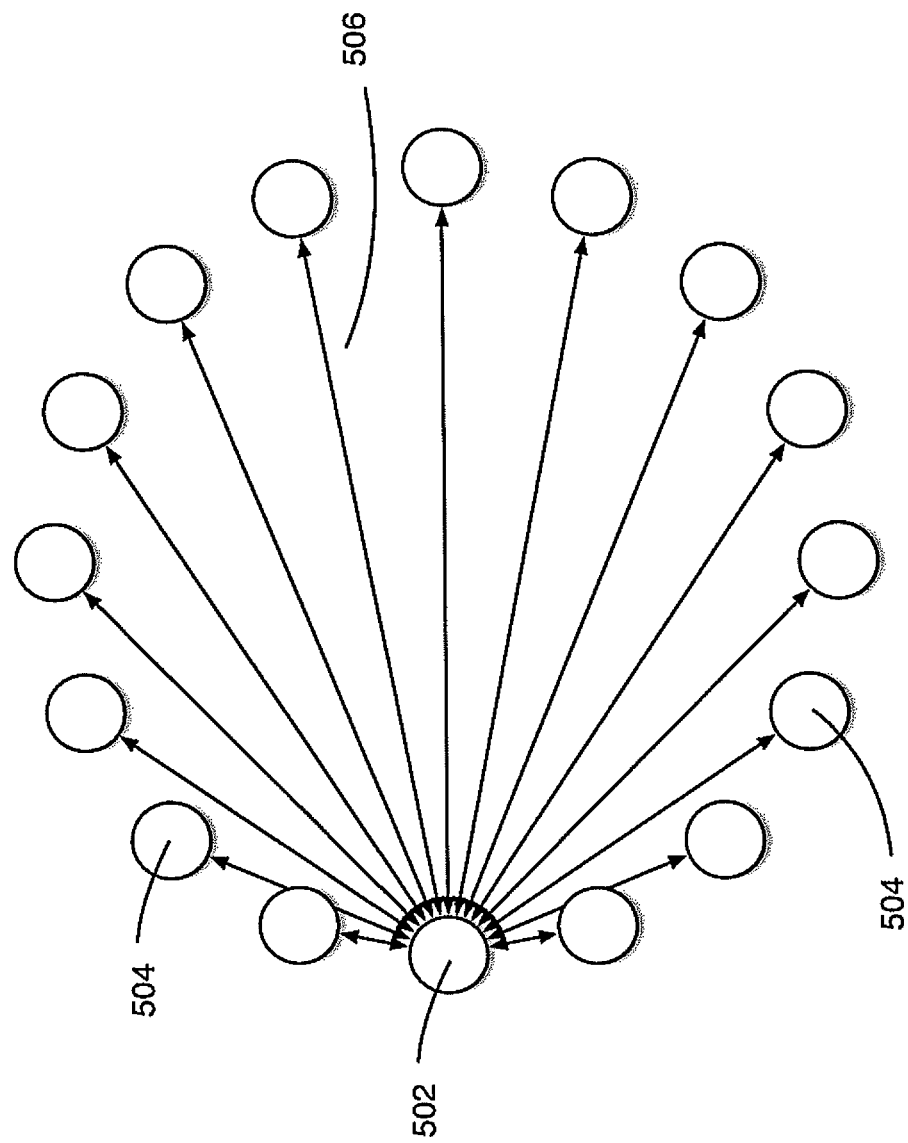
FIGS. 5A & 5B are network diagrams of conventional abstraction within a networked environment where any node may address any other node.
FIG. 5C is a network diagram of a conventional GEV or "cloud" view of a network.
FIG. 5D is a network diagram of a 16-node system illustrating evolvable networks grow as near-neighbors (N2N).
FIG. 5E shows graphs of unitary and non-unitary modes of evolution of quantum processes.
Figure 5B:
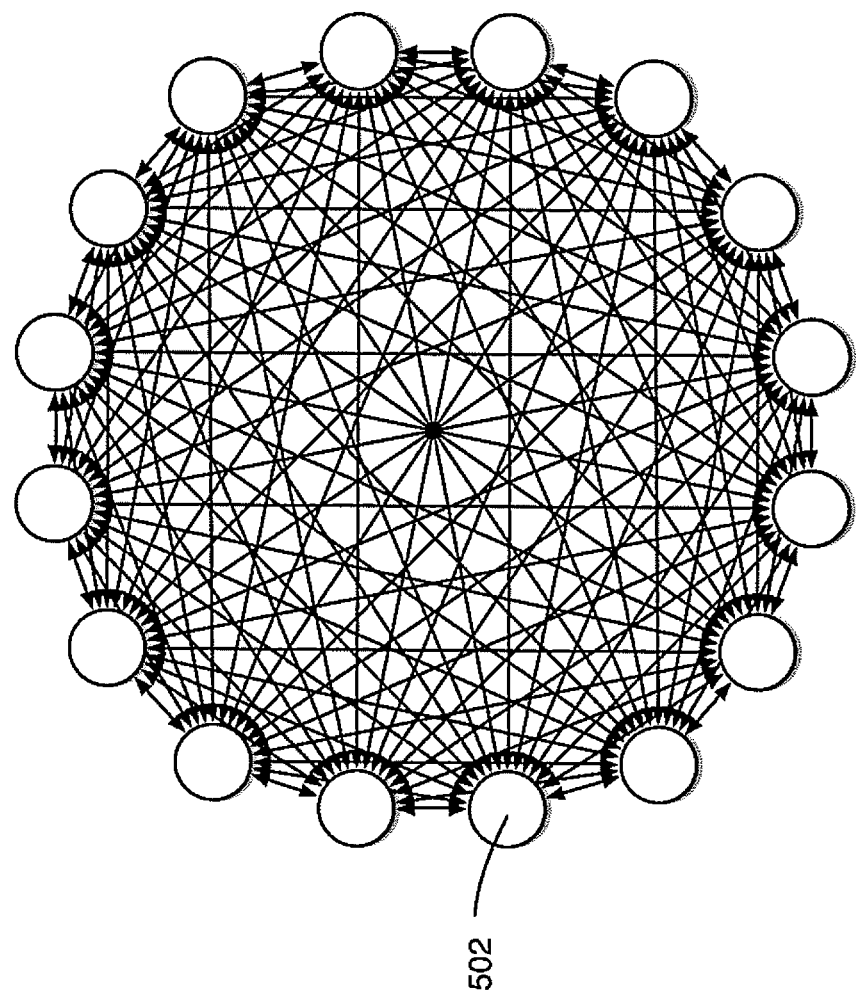
Figure 5:
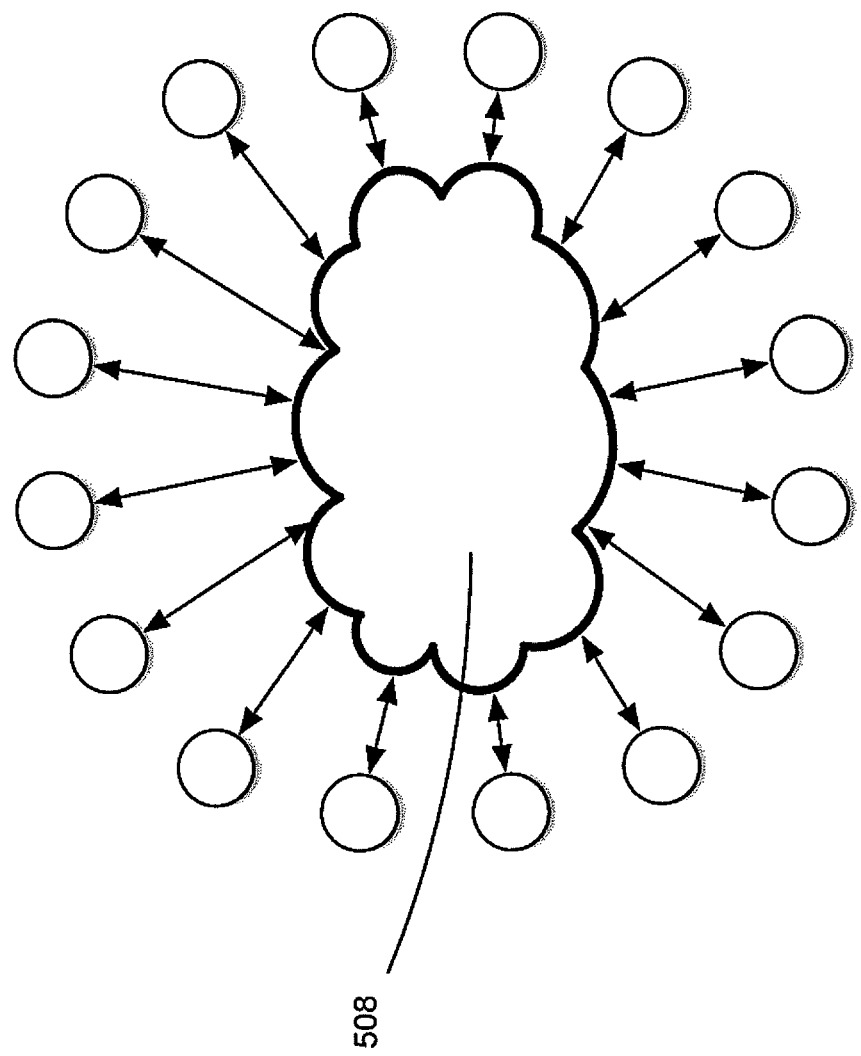
Figure 5:
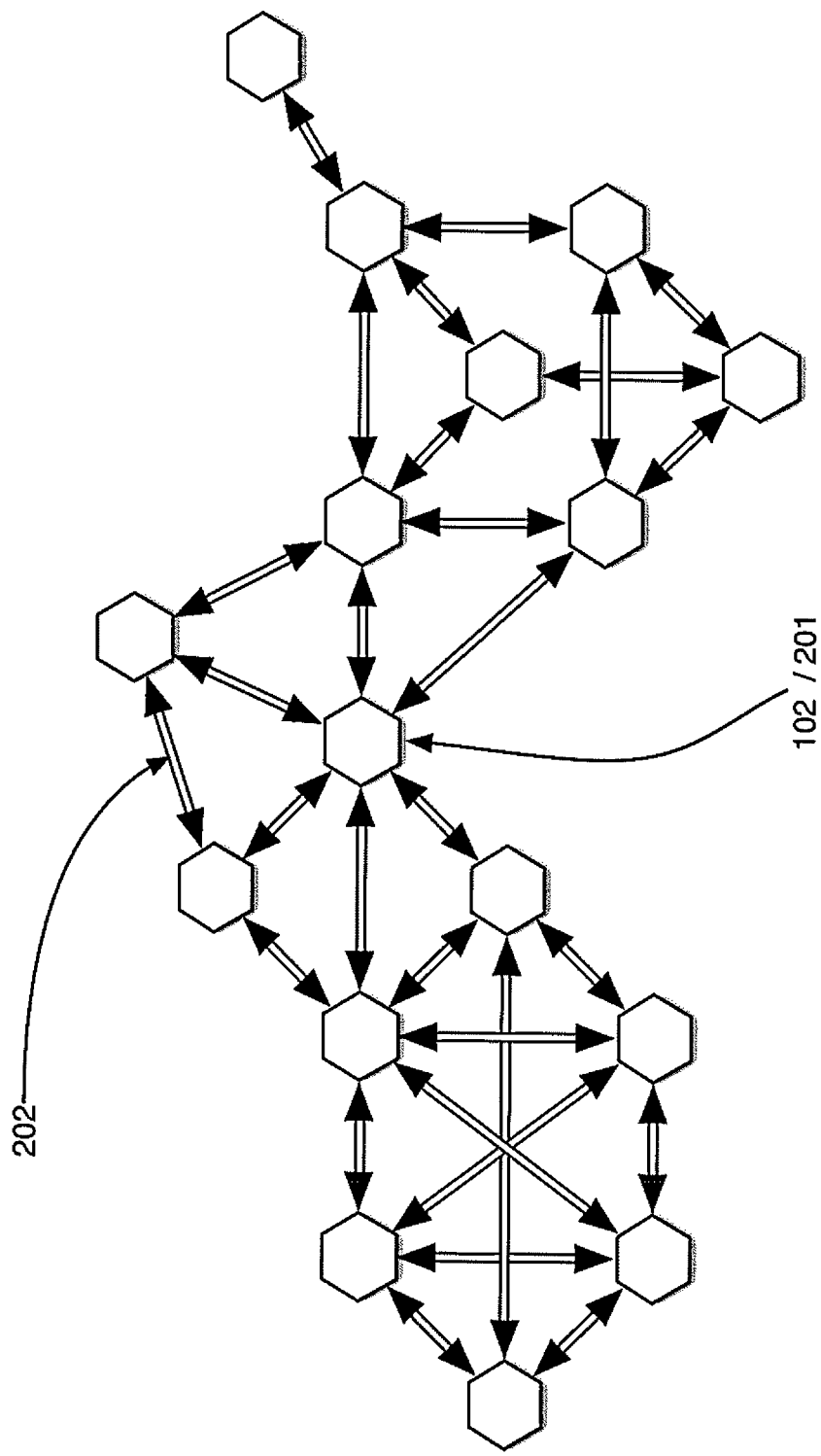
Figure 5:
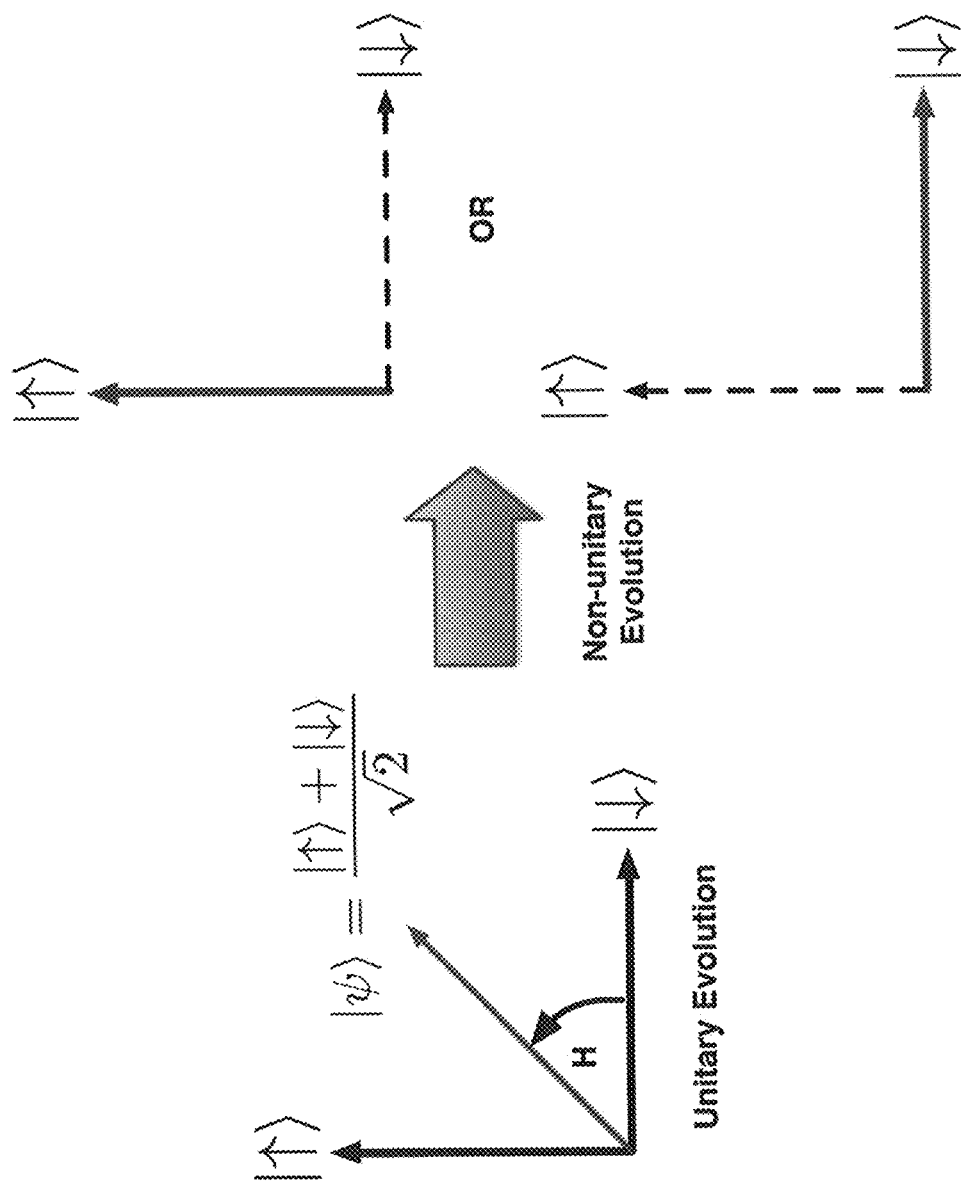

FIG. 5C is a diagram of the conventional way we try to hide this complexity (number, diversity and topology of devices) behind the "cloud" 508 abstraction of a network. Unfortunately, this re-enforces the above assumptions of zero (or uniform) latency and zero (or uniform) failure rates in the connections. E.g., a conventional computer node makes the same assumptions of latency and connected reliability for another node right next it, which may have a latency in microseconds, with another node on the other side of the network, which has a latency in milliseconds. In WAN connected datacenters, this grows to hundreds of milliseconds.

FIG. 5D shows a 16-node system where there are N(N−1)=16(15)=120 links, with each node maintaining a relationship (knowledge and status of) N−1=15 other nodes. FIG. 5A shows that the local state required in each node to do this grows as ~O (N), whereas the total number of links grows as ~O (N 2), as shown in FIG. 5B. This becomes much more dramatic as N increases. At some point, the amount of local state space in each node, and the amount of traffic on the network needed to keep that state information up-to-date, overwhelms a GEV-oriented system, and it will be unable to grow further. (Conventional clusters are an example of a GEV architecture, where just the heartbeat traffic alone dominates the system bandwidth, with as few as 100 nodes (e.g., Oracle RAC). Experience with clusters over the past 2 decades has repeatedly shown that it is impossible to scale clusters, and for this reason, most real clusters used in the IT industry run in the 2-4 node range).

Significant disadvantages are associated with this abstraction when it comes to recognizing and healing failures. The conventional view is that the cloud has its own healing mechanisms and will (e.g., through IP re-routing) find another way to connect the endpoints that are trying to address one another. However, networks do not have persistence, as their coping mechanism in the face of difficulty is to drop packets. The default assumption is that the endpoints maintain a sufficient state so that they can retry the communication.

Conventional clusters are an example of a GEV architecture, where just the heartbeat traffic alone dominates the system bandwidth, with as few as 100 nodes (e.g. Oracle RAC). Experience with clusters over the past 2 decades has repeatedly shown that it is exceedingly difficult to scale clusters, and for this reason, most real clusters used in the IT industry run in the 2-4 node range.

This is quite inadequate when it comes to providing assurance of CQ/EQ (Conserved Quantities/Exchanged Quantities) in atomic information transfer. Firstly, a transmitting node is now required to maintain separate information (state) regarding each of the other nodes it is/was/ intends to communicate with. However (such as in a multicast situation), it has no idea if disconnected nodes received an atomic information packet or not. This illuminates one of the many theoretical and practical difficulties with multicast.

Once we recognize the limitations of the GEV approach to architecture and programming, we can begin to use the LOV distinction and look at the world from a single node.

In the present invention, there are no hidden abstractions at the lowest (network) layer that do not provide promises, only explicit mechanisms (such as entangled links) that do provide promises regarding their intended behavior should they become disconnected from the neighbor, and the rest of the clique.

FIG. 5E is a graph of unitary and non-unitary modes of evolution of quantum processes. FIG. 5E describes the two modes of evolution of quantum processes (typical of entanglement), the first being the unitary evolution, which is reversible, linear and lossless; and the second, non-unitary evolution which is irreversible and dissipative. The probability amplitude (represented by the 45-degree blue vector in the figure on the left) remains indefinitely in stasis until it decoheres (the process of quantum collapse). After the collapse, the measurement reveals itself as either spin up (the vertical blue vector in the top figure), or spin down (the horizontal blue vector in the bottom figure). The √2 is a normalization factor to ensure that the probabilities (↑+↓) sum to 1. The angle between the probability amplitude for those two populations in that real Hilbert space measures the distinguishability of those two populations. "One finds oneself forced to probability amplitude by the very concept of distinguishability"—John Wheeler, 1999.

The Earth Computing Cell TOO is a node in network architecture in which the endpoints are replicas of an object, not nodes (or servers), as in conventional networking. Although we can utilize an IP networking where the connections between nodes provide a constraint overlay, the addressing of objects occurs at a layer above that, and is able to continuously adapt (follow) the replication, evaporation and apparent itinerant behavior of replicas belonging to that object.

Stacked Graph Overlays. Earth Computing builds its foundation by taking a basegraph G=(V, E), defined by the hardware resources (systems and cables), and rigorously and systematically characterizing the spatiotemporal relationships possible on top of that graph; and recognizing that all processes (agents) and their interactions (communication) are necessarily constrained to this physical graph. We explicitly do not abstract away the key issues of latency and reliability as is done in other approaches, at least not at the level of this base graph G.

We then define higher level recursive covering graphs G/ on top of G as Along Side (AS) or Recursively Constrained (RC). Every graph G/ may have zero or more AS covering graphs, each of which may be an RC overlay for a yet higher-level covering graph. Interactive Local Observer View (LOV) algorithms, at a specified security level, cannot distinguish the underlying graph G from any covering graph G/, G//, G///, etc. So this arrangement allows us to progressively manage abstractions for graphs of entities such as sets of hardware resources (physical assets), virtual resources (digital assets), administrative domains (jurisdictions and tenants) and dynamic coherency graphs, all of which may be evolving in their cardinality and topology due to resource variation, topology evolution and response to perturbations.

The fundamental toolset in Earth Computing comprises:

Entangled Links→Resiliency Web.

Cells+Links=Cell Trees/For every clique, there are Cq trees, where Cq is the number of cells in that clique. Note that Cn is an evolving number. New trees are created, and old ones are torn down as cells come and go. Each cell is built independently with the DTA algorithm. The same is true for all domains (d) where d={cell|clique|colony|complex}

Stacked Graph Overlays:

1. The fundamental physical constraint layer in Earth Computing is literally the set of cells and physical cables connecting them. In any real network, this is reasonably a sparse network with islands of densely connected cells, such as within datacenters with links with latency characteristics comprising a minimum proportional to the sum of the length of the cables and transit delays through switches and routers (under no, or low-load based conditions), and an increasing function, according to the queuing delays imposed by bandwidth load contention.

2. The "base" logical layer of Cell Trees, where each cell in the domain builds a spanning tree with itself as root, its nearest neighbors as children, and other cells as progressively more distant descendants. The net result will be an overlaid mesh of cell trees.

3. On top of the base set of cell trees (the underlay), any number of overlays may be recursively stacked, either as alongside (AS) as sibling trees on top of the same base tree on top of the graph T=(V, E(=V−1), or recursively Stacked (RS) on top of each other giving rise to T/T//T/// etc. Each tree T n=(V, E(=V−1)) spans V n≤V n−1 and En≤En−I where c \ in V.

4. Furthermore, each tree is given a "type". There are any number of types which may be assigned, these are specified in each of the three-layer descriptions. The only constraint is that CAL layer types exist only on top of DAL layer types. CAL layer types exist either on DAL layer types or on other CAL layer types, and DAL layer types exist on NAL layer types or other DAL layer types.

Definition: Cells are self-contained units of storage and include their own computation, storage, and routing resources. Cells are encapsulated by a physical and logical membrane to represent complete, autonomous units of deployment (SKU), and replacement (FRU) spanning a single, locally identifiable failure domain, e.g., has no common failure modes shared with other cells. The preferred embodiment of a cell includes its own source of energy, sufficient to manage its own graceful shutdown and power-up if the main power to the cell is either absent or has failed.

Cells are the fundamental physical units of storage. (Cells contain a number of storage devices such as spinning media, solid state or DRAM all cells have a battery which can maintain their memory in the event of a power failure and which can be used to save the contents of memory to disk in the case of a power failure used against them to both nullify their efforts (perhaps extensively prolonging them in their own game of whack-a-mole without realizing it).) From an operational perspective, cells are not divisible, they do not contain user or administrator-serviceable parts inside. A cell is an individual, identifiable failure domain. The Field-Replaceable Unit (FRU) is the cell as a whole. This strict modularization is necessary to achieve a goal of zero administration, this in-turn enables ultra-resilience. The cell is also a substitutable unit of deployment, a Stock-Keeping Unit (SKU) from a procurement and deployment perspective.

Definition: Agents are the fundamental logical units of computation Agents (like Monads) are not divisible, they do not contain programmer- or administrator-modifiable parts; they contain within themselves all the elements required for autonomous functionality and the ability to respond to events impinging on the cell.

While agents are singular computational entities (even when they fork and join sub-processes), links are a different kind of computational entity with very different characteristics: they require the interaction of both sides of the link in order to maintain their "encapsulated" property (with both connected and disconnected modes).

This is a fundamentally different computational behavior—one which is often referred to as interactions or synchronizations from the point of view of the agents. But from the point of view of the links, they see the agents as being driven causally from what they do, which can be driven equally from either side, unlike in a client-server or RPC environment, which is unidirectional in its hierarchical view of a "causality direction".

A 'channel' can be regarded as a process in which 'events' happen in pairs comprising the atomic transmission and reception of some unit of information. A CSP or π-calculus channel may be implemented readily on top of entangled links.

Definition: Links are fundamental units of communication. Links are indivisible. They are preferably a single cable (or fiber) directly connecting two cells, in combination with the receiving, transforming and transmitting mechanisms on both ends of the cable (or fiber).

Links never fail in an inconsistent state; and when perturbations do occur (through, for example, physical disruption of the path or exogenous events in the cells on either side), they 'break" in a mode which is successively reversible. This goal may be achieved by reversible state machines and an associated protocol between them.

The Benefits of Entangled Links Include:

Fast to Fail: Immediate fail. Don't need to wait for the other side to timeout.

Minimum Possible Latency: If the link is given something to transport, it will either fail immediately or transmit immediately.

Guaranteed Delivery: If the link accepts it, it promises to deliver it.

For every implementation, we would have requirements related to each of these properties. We need demonstrable proofs that ensure each of these properties is maintained by the implementation.

Links may be implemented with network ports, cables, switches, routers, etc., but they are still thought of and managed as indivisible units of communication, and by a single agent (made up from a single (distributed) state machine (DSM) with complimentary parts on each side of the link, and not a replicated state machine (RSM) with instances on each side of the link).

While agents are singular temporal entities (even when they fork and join sub-processes), links are a different kind of "singular" temporal entity: they require the interaction of both sides of the link in order to maintain their "connected" property. This is a fundamentally different temporal behavior—one which is often referred to as interactions, or synchronizations, in contrast to Recursively Enumerable (RE) (Turing Machines) from the point of view of the agents. But from the point of view of the links, they see the agents as being driven causally from what they do, which can be driven equally from either side, unlike in a client-server or RPC environment, which is unidirectional in its hierarchical view of a "causality direction".

Definition: Entangled Links (ENTL) are closely coupled bipartite relationships (across links) which can characterize, among other things, their local view of availability (current state and historical average), latency (including statistical measures of variance), and secure sessions (which require reliable events to establish and tear down).

The Earth Computing Infrastructure 304 is an element in an agent-based system: every entity (cell, link, tree, workspace, and data object) in the system has a uniquely assigned agent which manages that entity. Agents are designed to observe and adapt to their environment and to compete with other agents for resources, continually trading off abundant resources for scarce resources.

The abundant resources in a cell include network (in the form of ports and bandwidth or carrying capacity of each port), storage (in the form of disks, SSDs or battery-backed up RAM or some combination of all three), and compute (in the form of processor(s) with one or more cores).

When cells come up (either the first time or otherwise), they compare their capabilities with their siblings and go through a process of self-virtualization and self-specialization to adapt to their environment. Examples of the tradeoffs that can be made are as follows:

- If a cell discovers that it has a large amount of memory and processing power, it may virtualize itself into several independent sub-cells operating in different virtual machines on a common Hypervisor and to offer a $3^{rd}$ level of virtualization to support legacy applications.
- If a cell discovers that it has a disproportionate number of ports relative to its siblings (say 48 or 64 instead of 6 or 8), then it may choose to virtualize into independent sub-cells which specialize into routing cells, which favor serendipitous replicas for spatial performance, assigning 6-8 physical ports to each virtual cell.
- If a cell discovers it has a large amount of storage relative to its siblings, then it may specialize into a stable persistence cell, ready to archive objects rather than to host applications or file access protocols which actively modify them.

Our foundational approach is built on a strategy of adaptivity. For example, the EC network is deliberately chosen to be multi-hop (in a wormhole-routed, not a store and forward context). This not only allows us to build the structures which maintain the virtual relationships, and provide for Structural Temporal Integrity (STI), it also allows us to monitor and adapt the bandwidth utilization of the current cell with what it sees vicariously as flows passing through itself, and can adapt (for example, the temporal intimacy of its coherency layers with the availability of bandwidth to its sibling replicas).

The EC Infrastructure 304 explicitly provides for the secure communication of global policies to individual cells, entire cliques, colonies or complexes, or to some "slice" of the infrastructure defined by jurisdictions, organizations and tenants.

Entangled Links

The present invention relates to the individual connections between computers in a dynamically distributed computing environment where perturbations (reconfigurations, failures, disasters, attacks) are inevitable and expected.

Entangled links are encapsulated computational entities on which to build and maintain an active bipartite relationship over a chain of I/O mechanisms and passive elements in the communication path between pairs of computers, using an idempotent, reversible token exchange method which presents no externally observable (persistable) "change" until a transfer of information needs to occur between the cells, and which maintains the potential for bounded (or unbounded) reversibility, in case the intended information dispatched by an agent on a source cell is not received or acceptance completed by an agent on a destination cell.

Entangled links are singular computational entities comprised of packet exchanges between the most fundamental (simplest, least possible) mechanism at each end of a physical channel, connecting exactly two computers. Each half maintains entanglement only with its identifiable and authenticated other half, laying a new foundation upon which to build secure, ultra-reliable, transaction-oriented logical channels. Links are individual units, computationally independent and functionally orthogonal to all other processes (operating systems, applications or agent-individuals) in the cells they connect. They enable a rich characterization of local Local Observer View (LOV) link state based on a model of liveness where progress is held eternally in stasis until either side chooses to move their state forward by initiating or completing a transfer of information. Unlike state change in agents, which is monotonic and irreversible, state change in links is successive and reversible; providing a basis for guaranteed information transfer.

By arranging an initial negotiation protocol where the agents identify themselves and the cells they execute thereon, and requiring that any continuation of the entanglement after a perturbation is to the same cell with the same temporal characteristics, the mechanism will enable a foundation for secure (authenticated) channels, reliable events to build and tear them down, and significantly increase the difficulty of an attacker implementing man in the middle attacks.

The link entanglement mechanism resides outside the conventional notion of a program but may be recruited by programs or agents directly through language primitives (or library functions) for computation in dynamic distributed environments where computational resources may vary, their topology evolves, and each of its cooperating agents wishes to maintain data structures that represent optimal awareness of the proper functioning of and communicability with other cooperating agents in the system, without the detrimental effects of latencies, timeouts, and transient communication failures as the system scales.

A software implementation of an entangled link encapsulates the cables, the interface at each end, and the driver and interrupt handler code at both ends into a single abstraction that has properties that are (a) necessary for its composition into formal specifications and mathematical validation of network operations, and (b) to enable a programmatic context which includes a rich awareness of local connectedness that may be composed into graphs and exploited by distributed systems as they scale.

Prior means of atomic information transfer in applications rely on a GEV mechanism, where programmers use conventional memory locking or transactional memory (of software transactional memory) in shared memory. Algorithms to implement these include, for example, two-phase commit, paxos, or some other group consensus protocol based on the serializability of shared memory. This requires that any form of atomic information transfer, including that required for transactions, token conservation or distributed counting, must be implemented in the application layer.

Figure 6:
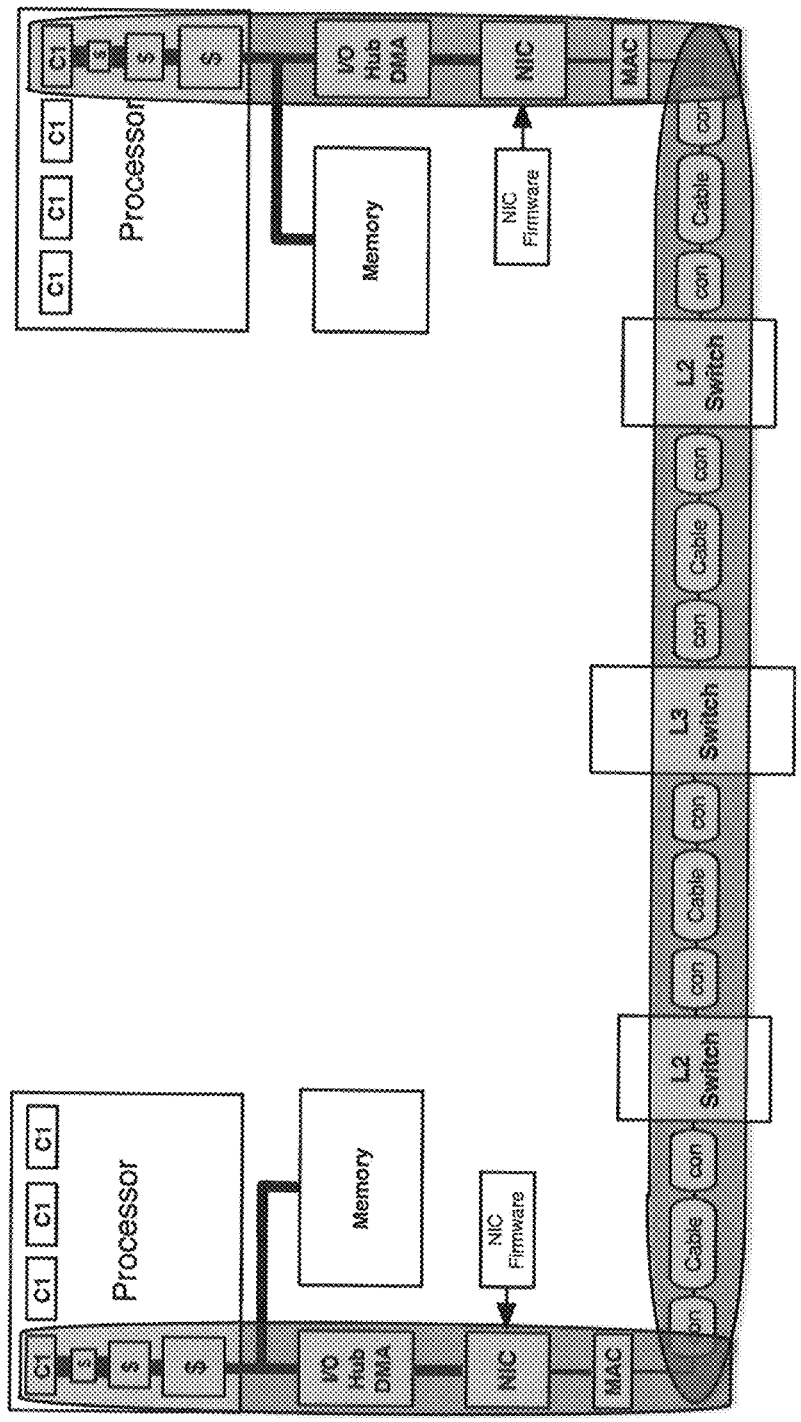
FIG. 6A shows a network diagram of a conventional architecture with conventional transactions.
FIG. 6B is a network diagram of an entangled transaction using the independent compute infrastructure of the present invention.
FIG. 6C is a network diagram of a conventional (legacy) computing and network architecture showing its performance and reliability challenges of all the components in the path.
Figure 6:
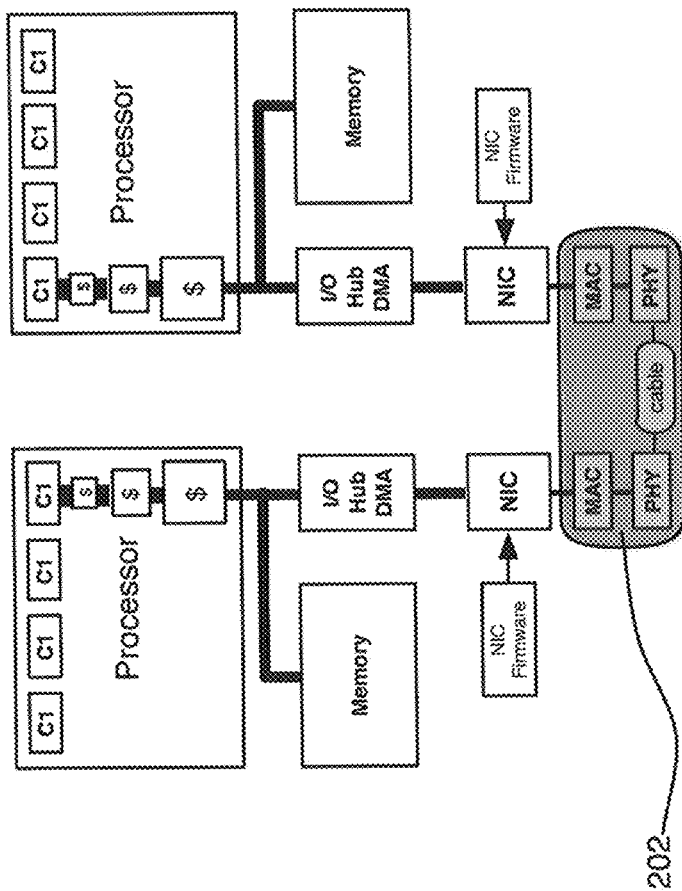
Figure 6:
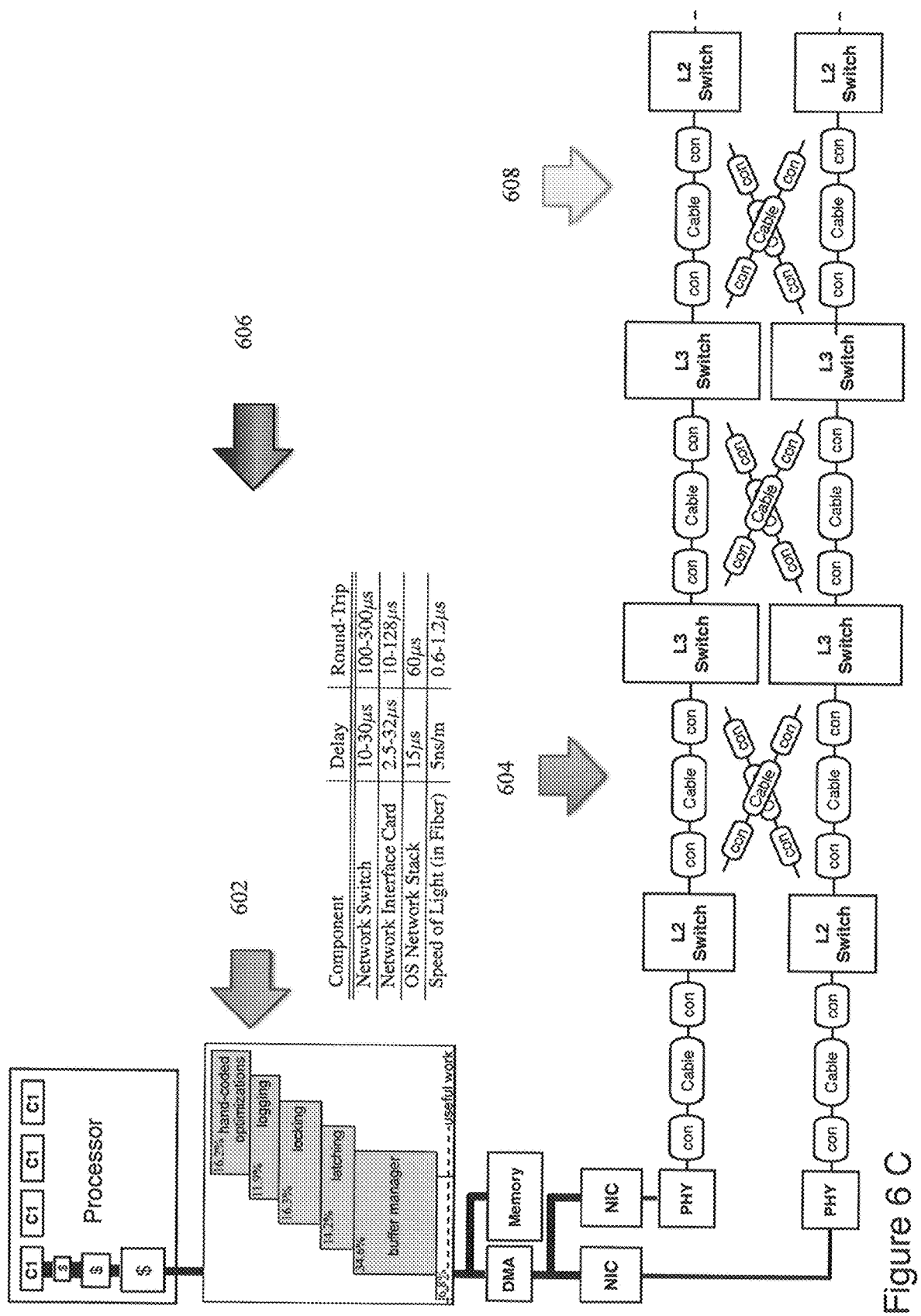

FIG. 6A shows a block diagram of a conventional architecture with conventional transactions shown as blue shading. The conventional transactions are comprised of many mechanisms and many fault domains. There are a number of disadvantages with such a configuration, including increased latency, decreased reliability, scalability challenges and an inability to achieve failure domain independence.

FIG. 6B is a block diagram of an entangled transaction using the independent compute infrastructure of the present invention. The Entangled Transactions provides one simple low-level fault domain within which the reversible computing entity lives (202).

Interworking with Conventional Networking Hardware. This invention relates to hardware support for: (a) Entangled Links (ENTL), (b) network assisted transactions, (c) reliable replication (d) distributed counting for CQ/EQ (Conserved Quantities/Exchanged Quantities), (e) Serialization Foci (f) Priority Queue Engine (PQE).

Unlike conventional network protocols, entanglement (and their associated beacon) packets do not need to be compatible with any legacy hardware or software. The only exception being that they do not cause faults or overload legacy hardware or software. A preferred embodiment is to make these mechanisms benignly incompatible in order to provide isolation between Earth Computing (EC) systems (and particularly core cells) and legacy systems.

In a nutshell, as long as the NIC hardware (and any intermediate L2/L3 switches) remain compatible within EC domains, the protocols between core cells may be distinctly incompatible with legacy systems, establishing a new industry standard for Earth Computing Installations; free of historical baggage and obsolete mechanisms of past networking technologies. It is a matter of strategic planning for the entity which owns these inventions to choose to allow them to be kept proprietary, submitted as standards, or supplemented by open-source or open-hardware strategies. However, it is in the very nature of these inventions to provide businesses with such a choice.

Special Packet Rejection

Entangled (and their associated beacon) packets are special in the sense that they should be dropped or rejected by legacy hardware and software. They may be roughly separated into two types: Those which are locally routed and those that may be routed to remote locations for the same tenant in distributed datacenter plexs. Both types of "special" packets may have a header type that identifies them easily at the lowest level processing of network packets, such as a special ether-type field in Ethernet packets or some other special field in an IP header when routed within an encapsulation protocol such as NVGRE (Network Virtualization using GenericRouting Encapsulation) or VXLAN (Virtual Extensible LAN). Selecting a format that we know will be rejected by most or all legacy hardware provides added security by isolating entanglement packets from other traffic and limiting interference to other resources in legacy systems (benign incompatibility).

Any method of isolating (or discriminating) legacy systems from Earth Computing underlay nodes may be utilized. For example, deliberately setting the packet length field of Ethernet or IP header incorrectly may make the entanglement (or beacon) packets appear to be torn, incompatible, or incorrectly formatted in the lowest layer of hardware (or firmware), creating a natural discrimination in the NIC, switch or router, which will be difficult to penetrate by conventional packets driven by legacy software, including malware.

Multi-Tenant Selection

The above packet rejection techniques may also be used as an added discrimination technique for: (a) different jurisdictions that happen to use the same infrastructure, (b) different tenants in the same infrastructure or (c) different trees that a tenant may wish to be kept separate (e.g., isolated from searches or neighbor recognition or attachment). This is in addition to any discrimination techniques provided by NVGRE or VXLAN. Keep in mind that the primary managed object in an Earth Computing environment is a cell tree (which may be entangled or not), not a "network" in the normal sense. As described in the GVM (Graph Virtual Machine) disclosure, these trees may be addressed "as a whole" (i.e., equivalent to a flooding broadcast), or as some algebraically specified graph cover or subtree.

Hardware Support for Entangled Links

Entangled Links are autonomous computational entities, independent of and isolated from the normal software (including hypervisors) running on a computer. In a previous disclosure, we have described a potential implementation in the interrupt service routine of the device driver executing on a dedicated side or sequestered core, or in the firmware of the NIC.

That same functionality may also be implemented purely in the hardware, or in some combination of hardware and firmware in the NIC in a computer or switch, and expands on the number and types of hardware supported functions that may be desirable to implement. Because one purpose of the entanglement mechanism is to maximize robustness, we recognize the importance of the entangled link mechanism (e.g. beacon packets used for discovery and rendezvous, and the entanglement packets used for presence management), which may be started immediately by the hardware as soon as it receives stable power and/or a hardware reset, even before any hypervisor or operating system initializes it.

Because another purpose of this mechanism is to ensure security of the physical link to the next cell, we also prefer an implementation where the link keys are hidden from all the software. I.e., symmetric key generation and key storage are maintained privately in the NIC. The link identifier (which may be cryptographically derived from the symmetric key) may, however, be "read" by the local secure agent in order to maintain persistence of the tree in a strict forwarding arrangement where cells forward encrypted packets through non-participating cells or switches.

A preferred implementation of the entangled link protocol is for it to be maintained by the hardware at all times, from boot up until power fails. A preferred embodiment would be for there to be no way for the software to start or stop the entanglement packets, rather it would be a property of the device itself. The NIC may, however, replace its firmware with a signed copy of new firmware that is cryptographically coherent with previous versions of the NIC firmware.

The hardware entanglement mechanism "steps aside" i.e., suspends transmission of entanglement packets when the software in the computer wishes to send conventional data via its normal protocol stack. However, one or more spare "bits" in the Ethernet header (ether-type) or UDP/IP packet header may be used to signal the ongoing "presence" of an entangled relationship.

Flow-balancing on each link may also be incorporated in the ENTL packets by the hardware. E.g., credit-based flow control is now "underneath" the operating system and protocol stacks, but may be provided as a parameter to links (encrypted to prevent visibility or corruption by man in the middle attacks).

FIG. 6C shows a conventional computing architecture showing its reliability and scalability problems. Network Virtualization Decreases Performance/Scalability & Reliability/Availability: (or why we need direct server to server connections—at least within racks, and may be between them too). There are at least four challenges with the conventional way that distributed systems manage transactions:

First Problem 602: Performance/Scalability. Locking based concurrency control inhibits scalability. Figure courtesy: Harizopoulos et. al., "OLTP through the looking glass, and what we found there", Proc. ACM SIGMOD international conference on Management of data, 2008. This is on top of the Network Stack delays described below.

Second Problem 604: Excessive Latency in the Network Path. (Table courtesy: Rumble et. al., "It's time for low Latency", Proc 13th Usenix conference on hot topics in Operating Systems, 2011.

| Component | Delay | Round-Trip |
|---|---|---|
| Network Switch | 10-30 μs | 100-300 μs |
| Network Interface Card | 2.5-32 μs | 10-128 μs |
| OS Network Stack | 15 μs | 60 μs |
| Speed of Light (in Fiber) | 5 ns/m | 0.6-1.2 μs |

Third Problem 606: Reliability/Availability. Dominant traffic is East-West. Instead of the (legacy) assumed North-South direction due to Network virtualization (SDN) and VM Migration (SDDC). (Gartner: Competitive Landscape: Data Center Ethernet Switches, Worldwide, 2011 Update).

Fourth problem 608: Unable to achieve failure domain independence (FDI). severely limits availability. Too many devices in the path for server-to-server communication. Reliability issue (Markov chain).

ENTL's exist at the lowest possible level in the computational structure of nodes (below all application, kernel and network stack processing), ensuring the minimum possible mechanism (code-paths and scheduling mechanisms) on either side of the link, enabling the maximum possible reliability of the link as a singular computational entity on which we can accommodate breaks and healing with mathematical precision, which can in turn be utilized by agents to make more diverse and potentially appropriate responses to perturbations.

Dealing with process crashes and lossy links is a well-known problem in theoretical computer science, and one which is addressed at its most fundamental level by the notion of entangled links.

In some embodiments, this mechanism is implemented as a single distributed state machine, not a replicated state machine. From these descriptions, it should be clear that a main distinction of entangled links (ENTL) is that they are a single symmetric state machine, not a classical replicated state machine (RSM), where one side must be the master and the other is the slave. ENTL contains the physical connecting media as well as the NIC/MAC and software elements, in an independent timing domain. If the packet is lost, the state machine stops. This makes entangled links exquisitely sensitive to packet loss (which is the intent). It is implemented as an event driven mechanism, where events during the entanglement state are purely local, and the events come from the outside of the links (e.g., from local cell agents).

Figure 7A:
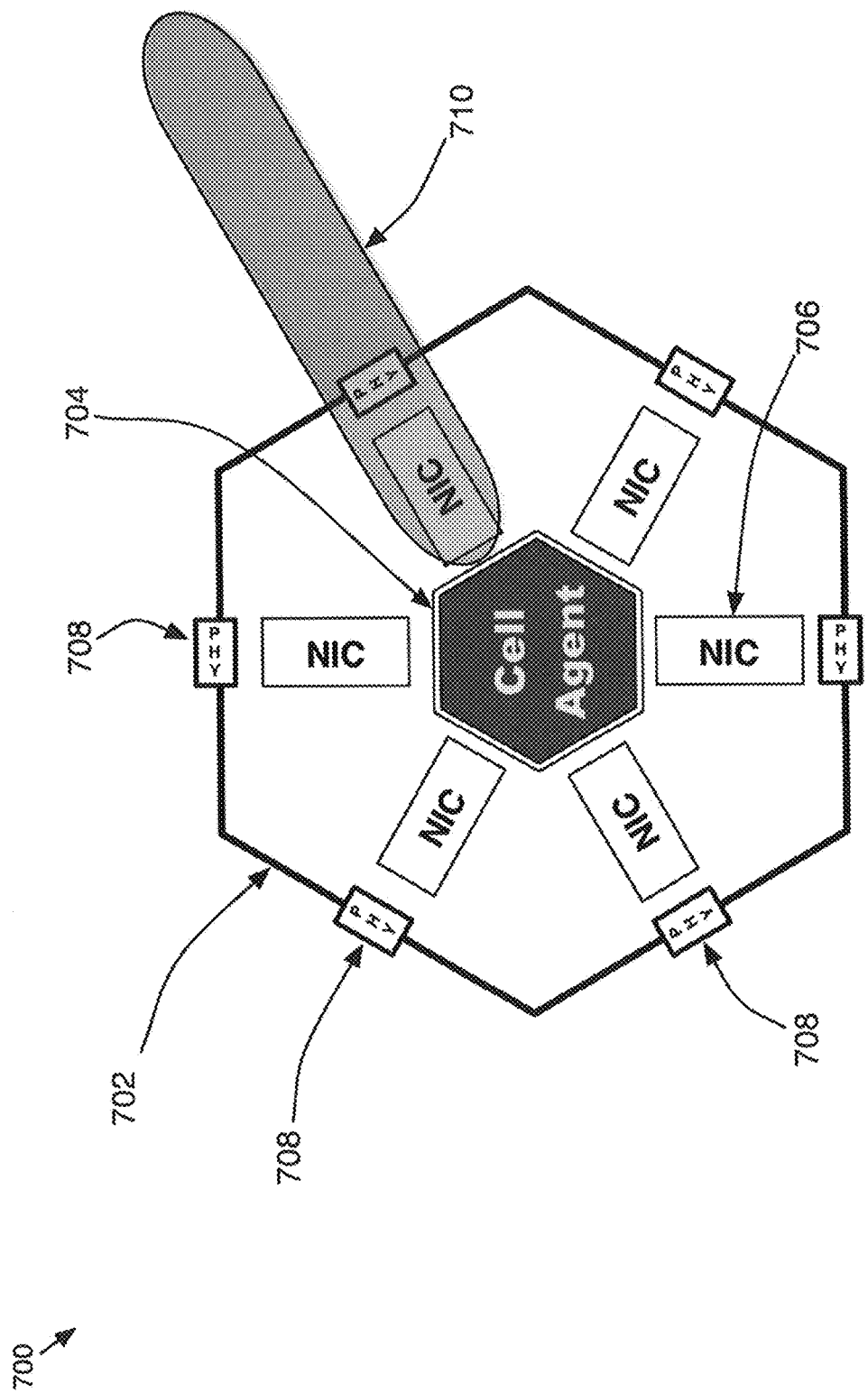
FIGS. 7A and 7B are block diagrams of embodiments of an individual cell.

Referring now to FIG. 7A, an embodiment for a cell 700 is shown. The cell 700 comprises cell hardware 702, cell software 704, a network interface controller 706 and a network connector 708. FIG. 7A illustrates the cell 7000 being formed from a cell agent and a plurality of network interface controllers 706. The cell hardware 702 is represented as a hexagon in FIG. 7 and may include a processor, memory, storage and at least four ports. In this specific example, the cell hardware 702 includes six physical network ports. Each of the physical ports corresponds to a network connector 708. The cell 700 also includes cell software 704 such as a primary or cell agent. The operation of the primary agent and the cell software 704 is operable on the cell hardware 702 and will be described in more detail below. The cell hardware 702 can be physically coupled to other cells 700 via the network connector 708 as part of forming an entangled link 710. The network connector 708 is coupled by a network interface controller 706 to the cell hardware 702.

Figure 7B:
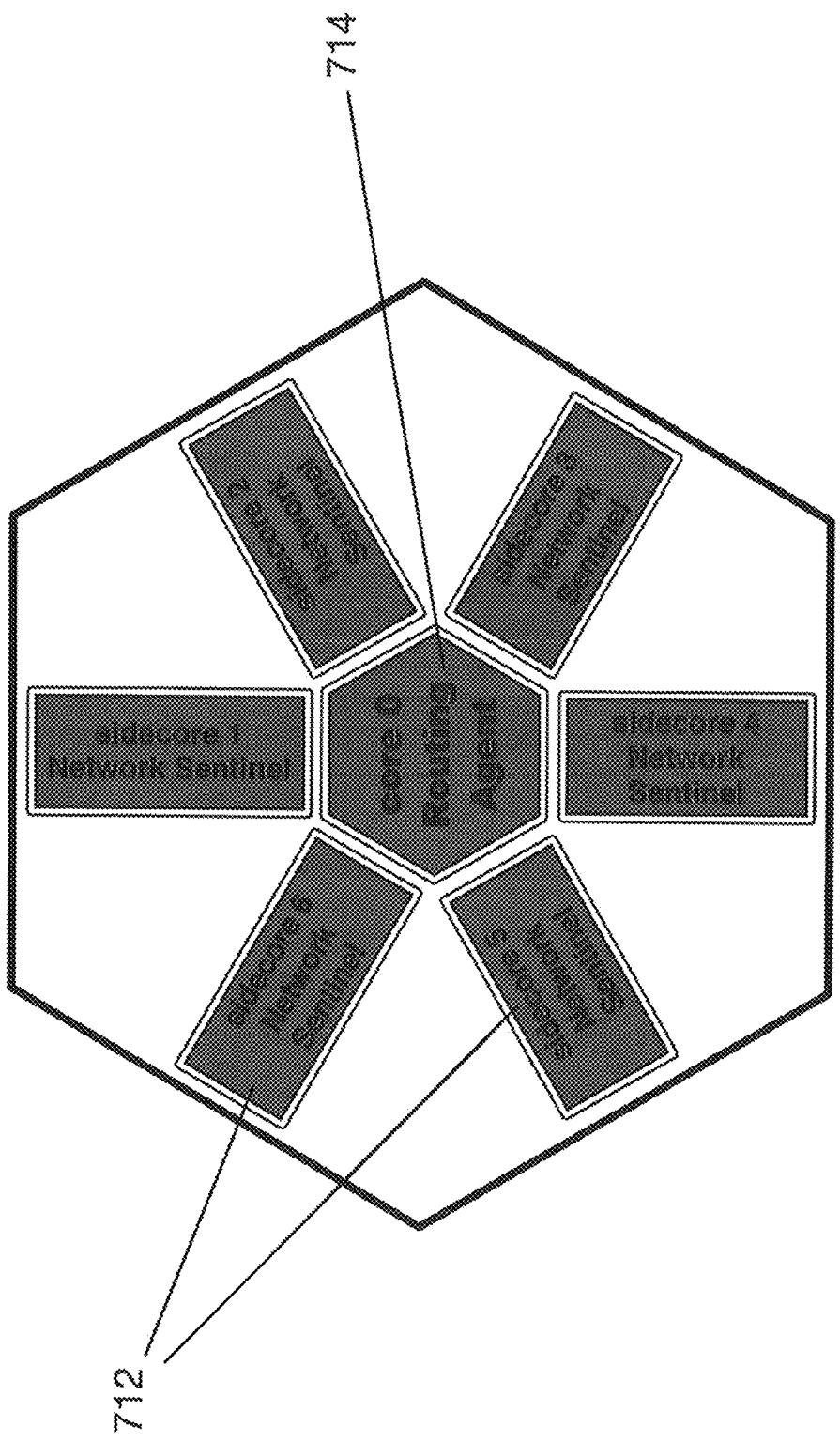

FIG. 7B illustrates another embodiment for the cell 700 being formed from a routing agent core and a plurality of side core network sentinels. Network Sentinel(s) 712 are dedicated cores per-port: interrupt driven event processing. This takes care of discovery, entanglement, tree building (and healing). This may also include encryption, packet filtering and authentication on behalf of the tree(s), and this cell. The Routing Agent 714 provides cut-through routing from one port to another in the NAL, including routing to other (hypervisor and application) cores in this cell.

Figure 8:
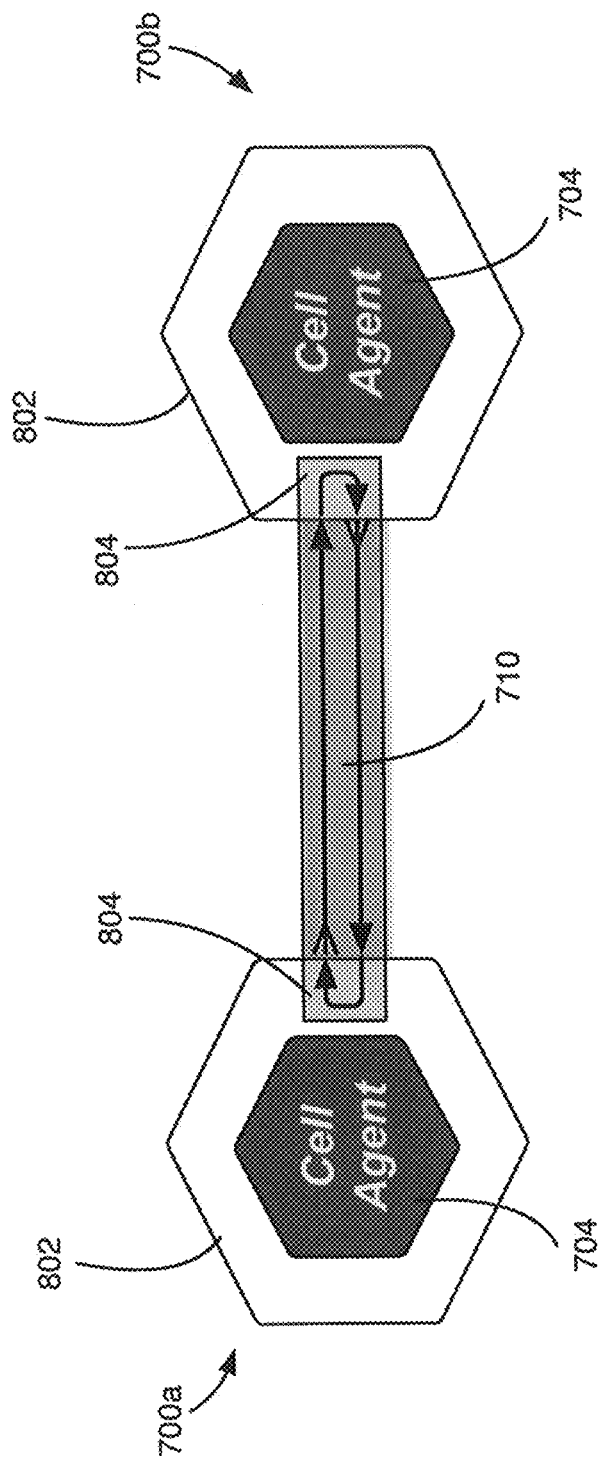
FIG. 8A is a network diagram of the computational entities of an entangled link.
FIG. 8B is a network diagram of two cooperating cells forming an entangled link: a reversible computing entity.
Figure 8:
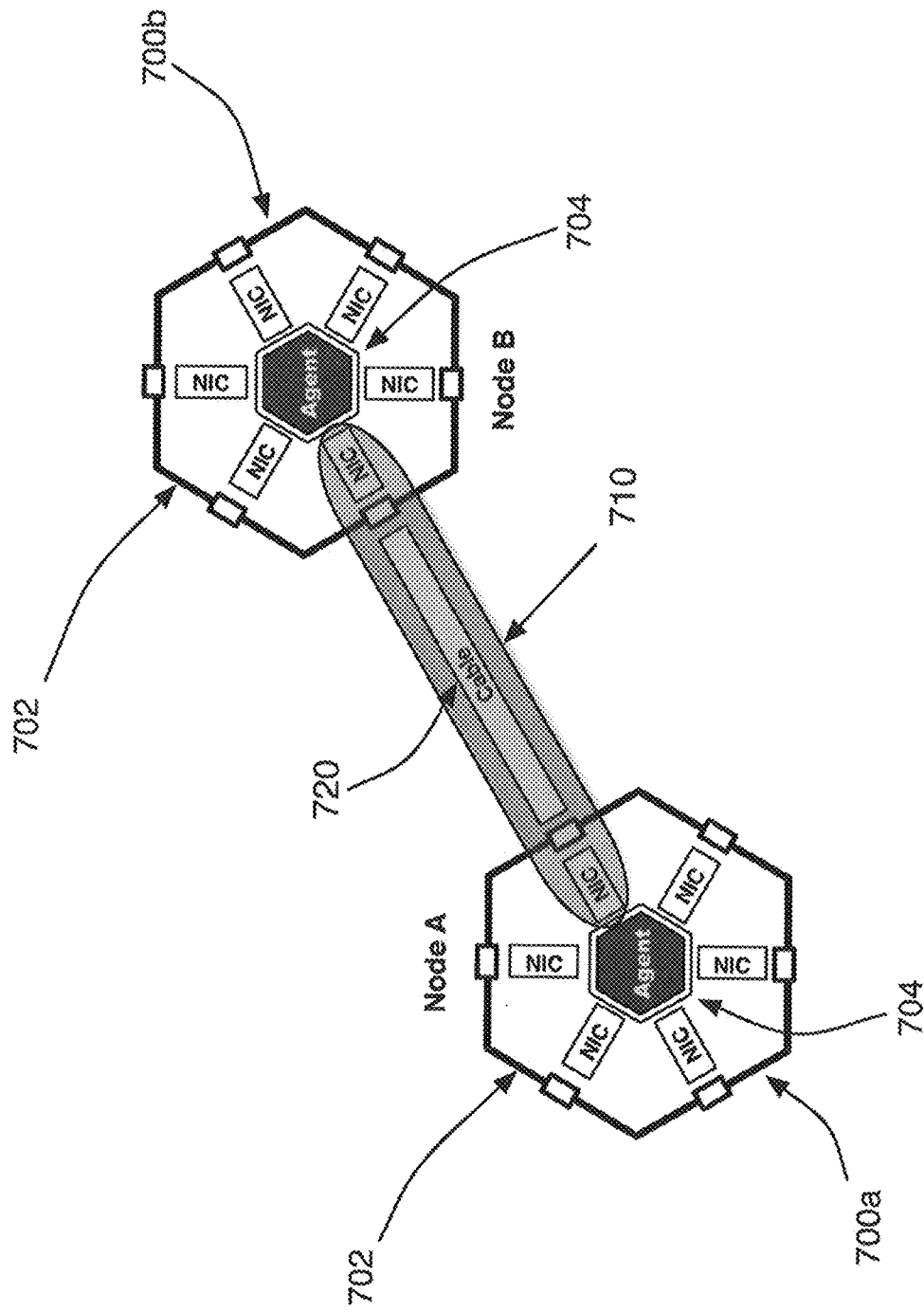

FIG. 8A is a block diagram of the computational entities necessary for an entangled link 710. The computational entities necessary to create an entangled link 710 include: a pair of cells 802, a pair of cell agents 704 each operable on a respective encapsulated computer node 802, a pair of transformation elements 804 at each end of a software synchronization domain of the entangled link 710. The cells 802 are any computing platform capable of executing action specified by the agent 704 in the cell. The agent 704 is software or routines for cooperating with another agent 704 as will be described in more detail below to maintain the software synchronization domain of the entangled link. The transformation units 804 are used to exchange a token between the cells 700. FIG. 8A the simple abstraction of cells and links, and the completely independent hardware/software synchronization domain of the entangled link and the hardware/software synchronization domain of the cell agents on either side.

Matrix Transformations.

TABLE 1

| | | Zero Vector | | | |
|---|---|---|---|---|---|
| A $A_{ij}=$ [a, -b; b, a] | B Transform (e.g. bit flip) | AB Result of Transform | | | Comments Zero Vector Transmission Mode |
| 0 0 | 0 1 | 0 0 | | | No connection. Self is simply |
| 0 0 | 1 0 | 0 0 | | | announcing its presence but not requesting entanglement. May be used for a sub-beacon packet (a periodic presence management inquiry used in low-power dissipation mode) |

TABLE 2

Identity Matrix

| A Incoming Packet | | B Transform (e.g. bit flip) | | AB Result of Transform | | Comments Identity Matrix (Pauli 0) |
|---|---|---|---|---|---|---|
| 1 | 0 | 0 | 1 | 0 | 0 | Identity Matrix. Transforms (with example bit flip operator) into Zero vector transmission mode. Pattern implies each cell is connected to itself in the GEV Adjacency Matrix, result of transform implies not in entanglement state. |
| 0 | 1 | 1 | 0 | 0 | 0 | |

TABLE 3

Skew Symmetric Matrix

| A Incoming Packet | | B Transform (e.g. bit flip) | | AB Result of Transform | | Comments Skew Symmetric Matrix |
|---|---|---|---|---|---|---|
| 0 | 1 | 0 | 1 | 0 | −1 | Skew symmetric Matrix. Trace = 0 (information is in the link) (with Pauli matrix x/1) |
| −1 | 0 | 1 | 0 | 1 | 0 | |

TABLE 4

Pauli Matrix

| A Incoming Packet | | B Transform (e.g. phase flip) | | AB Result of Transform | | Comments Pauli Matrix (z/3) |
|---|---|---|---|---|---|---|
| 1 | 1 | 1 | 0 | 1 | 0 | Pauli Matrix (z/3) |
| 1 | 1 | 0 | −1 | 0 | −1 | |

Note: the determinant of a Pauli matrix=−1, trace=0 and eigenvalues are ±1. These facts are incorporated into the mechanism described herein in order to recognize (one possible way) when the link has achieved, or has broken out of entanglement mode, or is intended (by one side or the other) to elevate the state to some application desired function, such as Atomic Information Transfer (AIT) which requires more than a simple two state view within the LOV (subtime) perspective of the link.

The above is standard matrix mathematics. This invention uses these only as one of several possible transforms to drive the behavior of the link into and out of: entanglement, AIT, and other reversible application function modes.

The following example, illustrates potential interpretations of the state of the link, when examined by either LOV or GEV modes. Assume two cells, labeled a and b:

TABLE 5

State Transformation Within The Link

| A Incoming Packet | | B Transform (e.g. bit flip) | | AB Result of Transform | | Comments Simple Entanglement Seeking Mode |
|---|---|---|---|---|---|---|
| 0 | 1 | 0 | −1 | 0 | 0 | Self receives packet A, applies transform B and responds with packet AB. From the perspective of b, this means that b has received a packet from a i.e. it has gained a unit of information (it now know that a exists) |
| 0 | 0 | 1 | 0 | 1 | 0 | |
| 0 | 0 | 0 | −1 | 0 | −1 | Self receives packet A, applies transform B and responds with packet AB. From the perspective of a, this means that a has received a packet from b i.e. it has gained a unit of information (it now know that b exists) |
| 1 | 0 | 1 | 0 | 0 | 0 | |
| 0 | −1 | 0 | −1 | 0 | 0 | Self receives packet A, applies transform B and responds with packet AB. From the perspective of a, it has now lost a unit of information to the link, which may or may not be received by b. |
| 0 | 0 | 1 | 0 | −1 | 0 | |
| 0 | 0 | 0 | −1 | 0 | 1 | Self receives packet A, applies transform B and responds with packet AB. Cycle complete, begins again as shown above, with AB being sent as {0, 1, 0, 0}, from the perspective of b, it has now lost a unit of information to the link, which may or may not be received by b. |
| −1 | 0 | 1 | 0 | 0 | 0 | |

TABLE 6

Optional Packet Counting

| A Incoming Packet | | B Transform (e.g. phase flip) | | AB Result of Transform | | Comments |
|---|---|---|---|---|---|---|
| 0 | 2 | 1 | 0 | 0 | 0 | From the perspective of b, this may be interpreted as a having sent 2 packets (or a packet containing an incrementing integer). Or, it has gained new information from a, that either (i) a continues to seek an entanglement with b, or (ii) that a has not received the reciprocal packet from b (if b sent one). |
| 0 | 0 | 0 | -1 | 0 | 0 | |

As the above table (6) shows, how an entry may continue to increment, in which case b can see that a is continuing to attempt to establish communication with a, this value can continue to increment to some ceiling, based on the size of the integer field in this data structure, with the maximum ceiling maintained indefinitely as new packets continue to arrive, or, the entry may rollover (modular arithmetic), with some notification (or not) to the local agent of some number of ticks reached (notification to GEV mode).

The entries in the above tables for the incoming packet matrix, and the transformation matrix are complimentary in LOV (Link view), but indistinguishable from the GEV (Agent view). The very act of copying the data from the synchronization domain of the link to the synchronization domain of the cell agent will unavoidably perturb the fragile entanglement and reduce some of the benefits of this invention.

A common perspective may be made by interpreting the elements in the (for example 2×2) matrix as follows (assume adjacency matrix, connecting two cells, a and b):

Top Left
+1 Cell a is connected with itself, it pushes out a positive bit of information, and receives it back. This represents connection information.
0 Cell a is not connected with itself, whatever it pushes out, it receives nothing back.
−1 Cell a is connected with itself, it pushes out a negative bit of information, and receives it back. (This may be used with one or more of the transforms to sum to zero in the following transmission). This represents connection information. When it is negative, it implies the giving up of an element of information from a's perspective.

Top Right
+1 Cell a is connected to cell b. This is the mutual information in the link, a positive bit. This may be transformed by the local operator into the next step in the state machine hunt toward or away from entanglement or some other functional mode desired by the applications/operating systems above. This represents potential entanglement information when appropriately combined with other aspects of the description below.
0 This is the mutual information in the link, Zero information.
−1 This is the mutual information in the link, a negative bit. This may be transformed by the local operator into the next step in the hunt toward or away from entanglement. When it is negative, it may imply the reversal of time from the perspective of the sender.

Bottom Left
+1 Cell b is connected to cell a. This is the mutual information in the link, a positive bit. This may be transformed by the local operator into the next step in the hunt toward or away from entanglement.
0 This is the mutual information in the link, Zero information.
−1 This is the mutual information in the link, a negative bit. This may be transformed by the local operator into the next step in the hunt toward or away from entanglement. When it is negative, it may imply the reversal of time the perspective of the receiver.

Bottom Right
+1 Cell b is connected with itself, it pushes out a positive bit of information, and receives it back. This represents connection information.
0 Cell b is not connected with itself, whatever it pushes out, it receives nothing back.
−1 Cell b is connected with itself, it pushes out a negative bit of information, and receives it back. (This may be used with one or more of the transforms to sum zero in the following transmission). This represents connection information. When it is negative, it may imply the reversal of time.

From this perspective, one can construct a number of paths (sequences within the link) to progress the link from unconnected, unentangled, to connected and entangled (or other modes to support specific application needs, such as counting, transactions or other application specific function or behaviors described in the field of use section).

The above matrix method is only one method. Other methods include the sub-synchronous exchange of packets to synchronize state machines on each side of the link. These methods may include binary codes where only one-bit changes at a time and there are sufficient bits in the packet to distinguish forward from backwards operation (and thus forward vs reversible evolution can be locally—but not globally-distinguished). Sub-synchronous implies that the link is self-synchronizing, and its time domain is fully-asynchronous with the agents in each cell on either side of the link. This implies also that, for example, the link is not slaved to the CPU clock on either side.

The matrix methods described above are only one method. Other methods include the sub-synchronous exchange of packets to synchronize state machines on each side of the link. These methods may include binary codes where only one-bit changes at a time (and thus forward vs reversible evolution can be distinguished). The word sub-synchronous implies that the link is synchronous with itself, and its time domain is itself (preferably) fully-asynchronous with the agents in each cell on either side of the link.

In Quantum Entanglement (QM), the wave function $\Psi=|\uparrow\rangle+|\downarrow\rangle$ (the sum of two complex vectors) where two alternative states (say spin-up and spin-down) are expressible as a single, shared state across two spatially separated and independent subsystems. Measurements on either subsystem yield either an up state or a down state on one end, and its compliment (down or up respectively) on the other end. This behavior has been verified to take place instantaneously (i.e., without regard to the speed of light across their spatial separation) in the time correlated event record of appropriately prepared experiments.

In a physical media such as a fiber optic cable, this shared state can be achieved with polarized single photon emitters and detectors in a true quantum sense. This invention recognizes that certain desirable properties of quantum entanglement can be emulated using conventional packets and electronic signaling, provided that mechanisms such as those described in these provisional applications obey certain constraints that are not currently used or may not even be present in today's communication systems. Also, with this invention, because of the precise nature of this shared state even with conventional packets and electronic signaling, we can achieve a much greater certainty of recoverability after failures, disasters and attacks (including cyber), than would be possible with conventional computer communication protocols, because of its more precise discrimination of the states within the computer which determine serializability operations and consistency of data.

This invention describes several methods for emulation of this shared state in a bipartite communication link. The key requirement is that information remains conserved in the link as a whole. This may be guaranteed by the electronic signaling method, the packet protocol, or both; such that under all measurable circumstances, the state of one side of the link is always the complement of the other. In a classical sense, situations where the bit (or transition) has been sent by one side, but not yet received by the other side may be identifiable by intermediate states, such as that described above for a 4-state sequence However, the temporal relationships between the bit patterns on each directional path of the connection, and in particular the self-synchronization of the link within its own timing domain, without regard to synchronization domains in the cells (computers) on both sides, is a fundamental mechanism that has not been invented to date.

In one emulation using electronic signaling, we achieve a sufficiently similar effect by using any method that maintains single reversible transition events. For example, in modem digital modulation schemes such as QAM, data is transmitted in symbols of n bits at a time in a Gray code (or other code where only 1 transition or bit at a time is changed).

A minimum of two bits of Gray code are required at either end of the bidirectional communication link to achieve a reversible Gray code. Three or more bits provide additional facility to stack successively reversible transactions on top of each other, or pipeline them on long links.

A simple arrangement for entanglement emulation would be for each transmitter/receiver pair to reflect what it sees on its incoming path back on its transmitting path so that it remains subsynchronous with its communication partner. In the case of a 2-bit reversible Gray code, which are maintained on both sides in a register, will allow either side to move the link forward or backwards in their respective states. However, the performance of this system will be limited by the speed of light traversal from one endpoint to another. This is where this invention, in conjunction with the switchless interconnection scheme described above (with the shortest possible physical connections between nodes), yields substantial benefits in performance and reliability.

Additional bits in the Gray Code, or alternative Gray code types (such as monotonic) may be used in conjunction with the entangled back to packet invention (described in this and previous provisional applications) to provide a synchronized back to back arrangement between the entangled pair, capable of forward or backwards evolution of an Atomic Information Transfer (AIT).

The entanglement protocol may use modular or monotonic Gray arithmetic. Only one-bit changes at a time. A reversal is distinguishable, and a reversal of the reversal is also distinguishable. This may be achieved with a minimum of a two-bit Gray code, but is significantly enhanced with a multiple-bit Gray code.

The protocol on each end of wire emulates a photon reflection: when one side goes forward, the other goes backwards. Entanglement may then be considered as a continuously oscillating Gray Code with no discernible forward or backward motion (short term DC balance).

Transaction flow may proceed with continuous Gray Code, to some higher modulo number (e.g., 8 bits for 10 Gb Ethernet Lane) with 8B/10B or 64B/66B or any arbitrary XB/YB encoding.

Emulation by Disparity Codes

The running disparity may be used to indicate the currently expected direction of an AIT. For example, one symbol is used for one party to express that it thinks it has the token, the other symbol (for the same code) is used for one party to express that it thinks the other party has the token. Instead of the running parity being ±1, entanglement packets may use ±n, where n is some integer. Although greater excursions of DC local balance (and transition density) may take place, long term DC balance is preserved. This reflects the property that the information is trapped inside the entangled link until such time that the cell agent on either side wishes to execute a transaction which seeds a new root for a direction of causal action on the data.

Entangled Link Synchronization Domains. 10 G bit/sec Ethernet provides multiple parallel data 'lanes' to send data between transmitters and receivers. Data bytes are sent round-robin across each of four lanes, numbered 0 to 3. The first byte aligns to Lane 0, the second to Lane 1, the third to Lane 2, the fourth to Lane 3, the fifth byte goes back-to-back to Lane 0, etc.

A hardware-based entanglement method can replace the idle packets with entanglement packets (which in turn can be replaced by atomic information transfer packets or other application desired reversible functions).

Entangled Link (ENTL) Synchronization Domains. Entangled links 710 are their own independent synchronization domains. Cell Agents 704 have their own independent synchronization domains (tied to the local computer clock). These synchronization domains are bridged by the cell interfaces.

Note that the boundaries of the entangled part of the link starts and ends at the boundary of the physical cell, as far removed as possible from the internal timing domains of the cell and cell agent.

Figure 29:
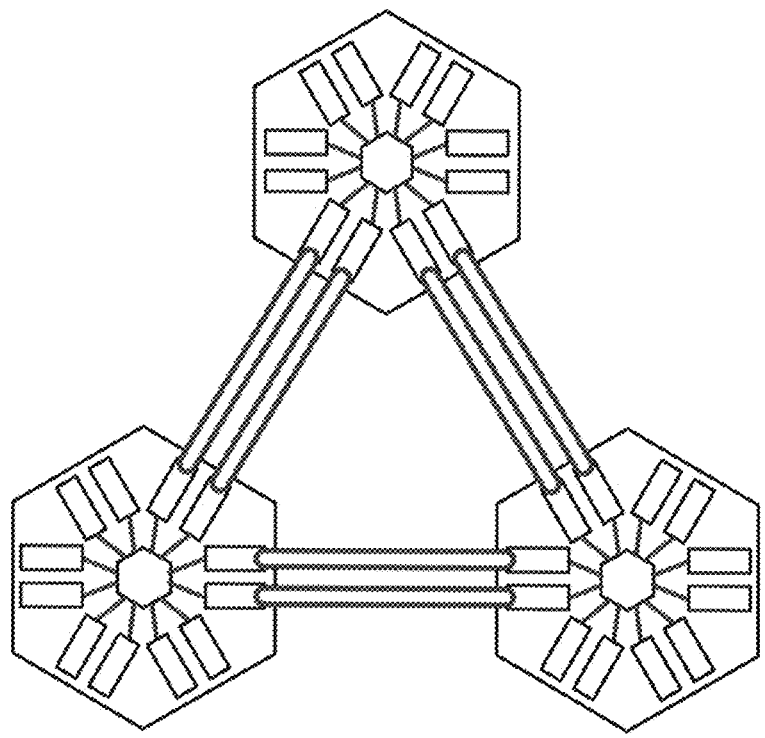
FIG. 29A shows a more detailed structure incorporating multiple separate buffers and notification channels into the agent.

Entangled Transaction (ENTT) Buffer Implementation (FIG. 29A). Entanglement transaction buffers may be included in both transmitter and receiver. These buffers may be inside the synchronization domain of the cell agents, but the preferred embodiment is for them to be included within the entangled link timing domain. The resynchronization required at either end of the bipartite link is different for transmit and receive. For the transmitter, the ENTL timing domain must occasionally sample the interface registers written by the cell agent. For receiver, the ENTL timing domain must deposit the information in a buffer that can be sampled by the cell agent. In this way, the Entanglement Link (ENTL) and Entanglement Transaction (ENTT) packets may be distinguished.

Ethernet frames have clearly defined begin and end delimiter patterns and a 12-byte inter frame gap (IFG). Traditionally, this IFG was designed to reduce the number of collisions between transmitters, and constrained the size of the Ethernet network. This was done away with in more recent Full-Duplex standards.

These buffers do not keep information regarding the state. However, when an entanglement link packet is exchanged for an entanglement transaction packet, the buffers persist in the state indefinitely, while captured entanglement transaction packets are never lost (the hot potato is not dropped).

Entanglement is explicitly dropped with a specific key, which must be represented within a locally cell-agent measured time window. The entanglement is re-enabled if it is within this mutually agreed period facilitated by the cell agent(s).

Low Power Entanglement packets can also be carried by periodic transmission of Low-Density Parity Check (LDPC) frames.

Links have entanglement IDs. This ID is completely independent of any cell ID, but may be derived from a secure key generation source in the hardware, preferably in the NIC itself. The key (as is the case in conventional symmetric key schemes, such as Needham-Schroeder) may be derived from unique information on either side of the link, and combined in some function which is unique for that session. ENTL may use a hierarchy of session levels (based on subtime durations measured at either end of the link) to maintain protection against man in the middle attacks.

Entanglement packets may be represented in asynchronous (transition) logic, or any general XB/YB control code as follows:

|↑>□ (Up Transition) (forwards in Gray code) [Consistent with previous 2×2 Matrix]

and

|↓>□ (Down Transition) (backwards in Gray code) [Consistent with previous 2×2 Matrix].

FIG. 8B shows two cooperating cells 700a, 700b forming an entangled link 710. Each of the two cells (encapsulated computer nodes) 700a, 700b have a structure similar to that described above with reference to FIG. 7 and each include cell hardware 702, cell software 704, with six Network Interface Controllers (NICs) 706, and a physical connector 708. A cable 720 connecting the two cells 700a, 700b provides a network between the two cells 700a, 700b (these are intended to be point to point connections, but the present invention also works in modified form in a conventional network using switches and routers.) Each cell 700a, 700b has a primary agent 704 responsible for controlling the NICs 706 and routing date from one NIC to another. An entanglement is created through the novel heartbeat mechanism described in this invention below.

This shows the intended conceptual and physical simplicity of the entangled link 710. There are preferably two separate channels in any communication link, which prefers full-duplex implementations (such as those found in 10 Gbit Ethernet—IEEE 10GBASE-X, and other communication links). The separate channels are however, not independent, they are associated in such a way that both channels travel the same path and experience the same environmental and other hazards. If true redundancy of paths is required, then multiple communication links are used. In principle, an entangled link can be created by a single or odd number of inverter (NOT) gates where the outputs and inputs are looped back through the other cell. This creates a classic digital oscillator, which will have a frequency inversely proportional to the distance between the connected cells.

Figure 9:
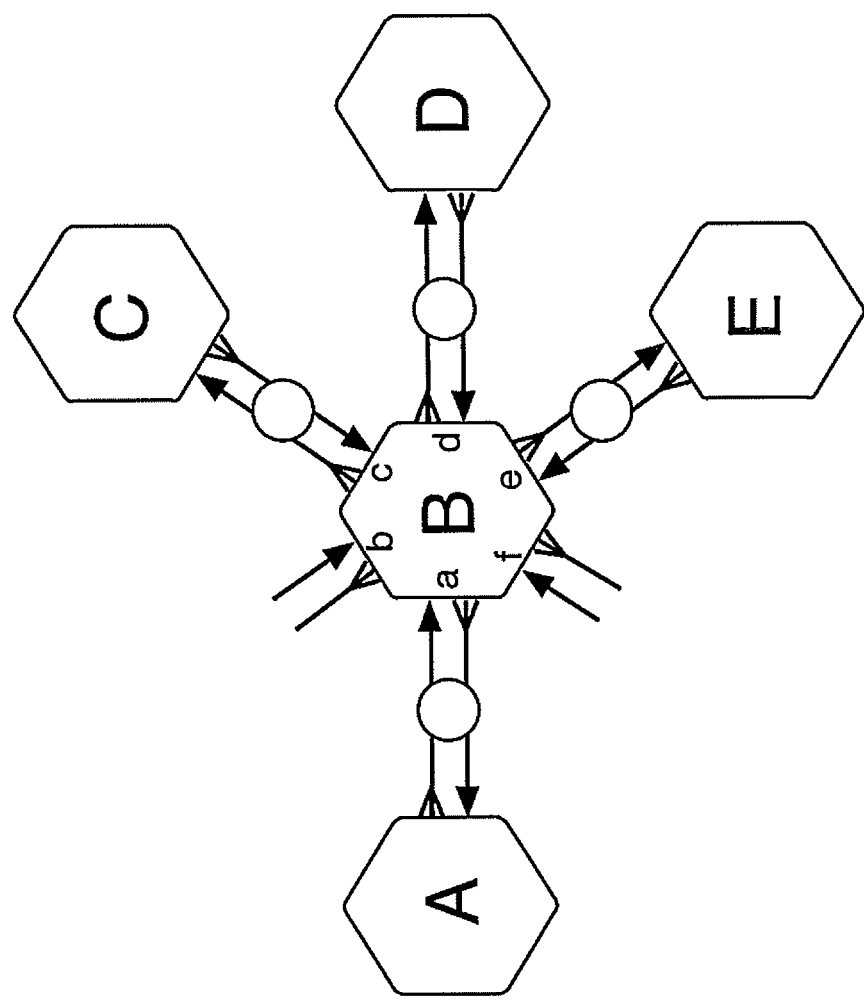
FIG. 9A is a network diagram showing the entangled model.
FIG. 9B is a network diagram of a valency limited entanglement from the self cell (in center) LOV perspective.
FIG. 9C is a network diagram of a valency limited entanglement from a GEV perspective where all connections are visible.
Figure 9:
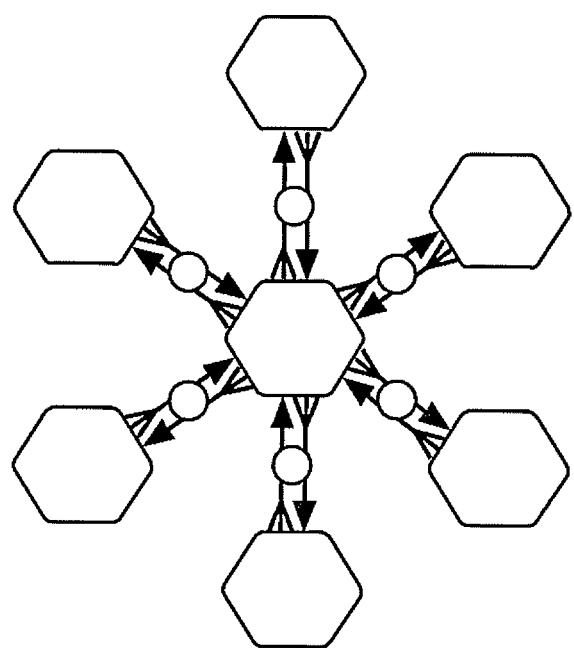
Figure 9:
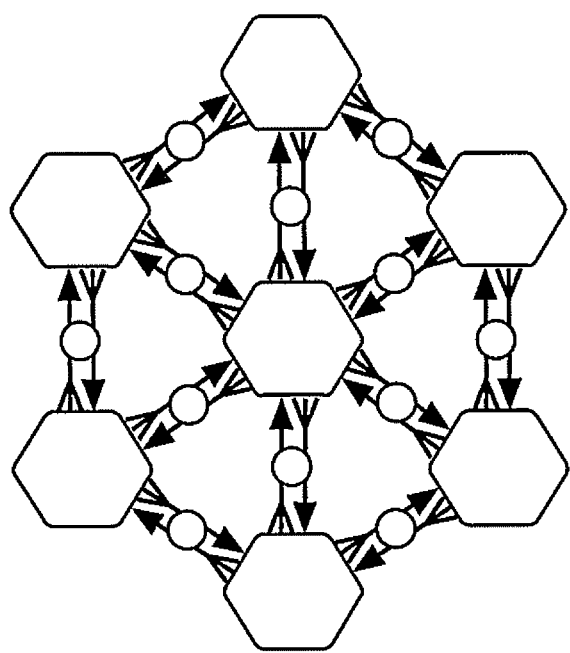

FIG. 9A shows an example of an entangled model. In this example, there are cells A, B, C, D and E. Each cell has limited valency, and each port from that cell can be unambiguously addressed by that cell. Because direct (bipartite) connections are physical connections and therefore stable over long periods of time, port addressing yields communication with a near neighbor (N2N), which preserves relationships, and in turn, can be used to maintain trust, and eliminate ambiguity about who a cell is connected to (in terms of what physical cell, OR what logical application is running on that cell). Additionally there are four entangled links: one between cell A and B, one between cell B and C, one between cell B and D and one between cell B and cell E. Entanglement requires an identifier for the link, an identifier for each of the two connected cells, and a port ID for each of the connected cells (a, b, c, d, e, f). For example, an entangled link 710 between cell B and C would require an identifier for the link: potentially composed from the ID for cell B, Port c of cell B, the ID for cell C and a port ID for cell C.

FIG. 9B shows a valency limited entanglement from an LOV perspective. For example, FIG. 9B illustrates a hub and spoke entanglement from self-cell.

FIG. 9C is a block diagram of a valency limited entanglement from a GEV perspective. For example, FIG. 9C shows a model for a resiliency web.

Figure 10:
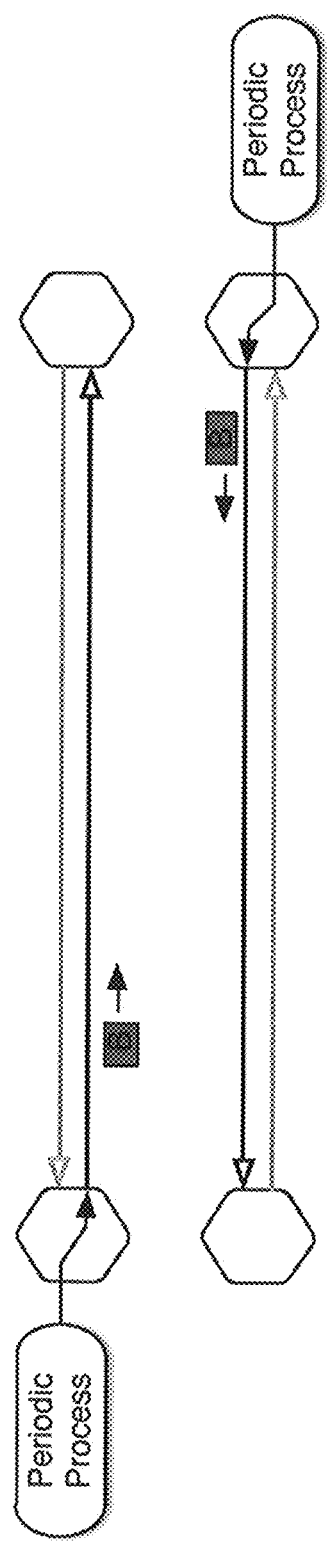
FIG. 10A is a diagram showing a beacon mechanism used for discovery and entanglement restart.
FIG. 10B is a diagram showing single packet entanglement.
FIG. 10C is a diagram showing pipelined packet entanglement.
Figure 10:
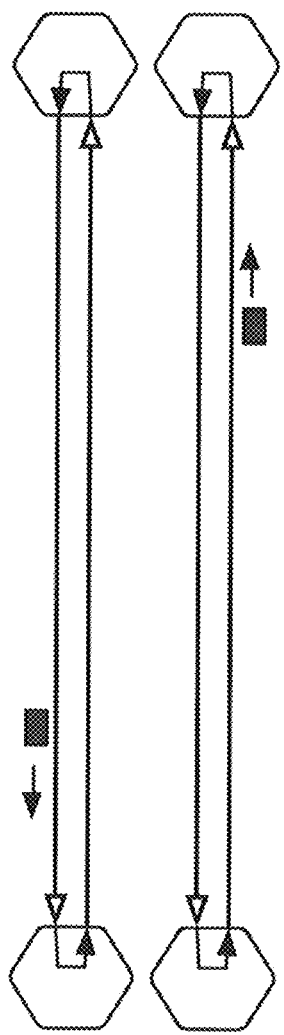
Figure 10:
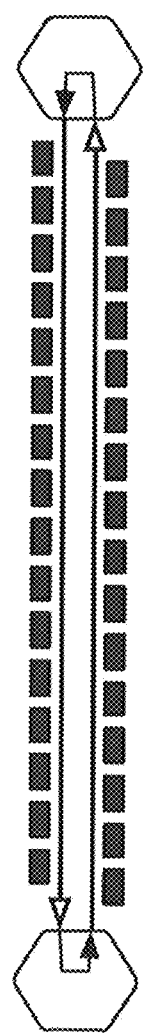

FIG. 10A shows a beacon mechanism, which is driven from within each computer node 802 by a periodic process such as a timer. Beacons serve to allow cells 700 to discover and rendezvous with each other, but are suppressed when entanglement takes over. The beacon is activated by an external watchdog timer process checking on the entanglement to see if packets have been received in the previous beacon period. For example, it may be implemented as a conventional watchdog timer In the ENTT layer shown in FIGS. 13A & 13B. Although it runs continually, advertisement packets are suppressed from being sent on the link when entanglements are active. Each (internal) timeout event of the beacon watchdog invokes a routine which checks to see if ENTL has received a packet during the previous period. If it has, the periodic process goes to sleep. If it has not, the advertisement packet is sent out on the link but this time addressed to the previously selected partner cell with a "lost entanglement" status. This continues indefinitely until the partner responds, and the entanglement is restarted. Beacons are initial TICK's that initiate an entanglement, the response to which is a TOCK from a listening cell at the end of the link. The authentication procedure (not described in this specification) then takes place to verify sibling cell credentials and map them to capabilities that can be granted higher layers up the stack.

Beacons are unacknowledged heartbeats, sent asynchronously with low periodicity (say once/second) to: (a) provide an advertisement and rendezvous mechanism for new cells, and (b) a restart mechanism when entanglements are broken. The restart mechanism can then check the last processor clock time for the last heartbeat going out, increment the packet loss counter, and restart the entanglement.

Beacons may also be used to percolate sheaf instrumentation and security type information, two potential uses of this mechanism is are described by Bennett and others are related directly to the Earthcore MetaData Tensor (MDT), which depends on the ENTL mechanism for correct operation.

FIG. 10B shows single packet entanglement mechanism. This "hot potato" algorithm is the simplest possible symmetric algorithm. Imagine a unique token: one side has it, then the other. As soon as a packet with the token comes in, it is immediately sent back. The hot potato being sent from the machine on the right to the machine on the left. On receipt of the packet, the machine on the left immediately sends the packet back to the machine on the right. A "dual hot-potato" method is the preferred embodiment. This continues indefinitely, and may allow us to measure the latency of each packet as precisely as possible (through comparison of the processor Time Stamp Counter (TSC) on the local machine—which stamps the outgoing packet, and compares its receipt against the current TSC. The blue packet represents the ENTL beat, the white boxes represent "unused" packets on the link (for longer links). It is exquisitely sensitive to losing a single packet, but either entanglement can restart the other extremely quickly and log the lost packet. This system would require 2 lost packets to stall both entanglements, requiring the beacon mechanism to then restart it from higher up in the stack.

FIG. 10C shows a pipelined mechanism, where the pipe is filled with sequentially numbered entanglement packets, and the returning packets allow each side of the link to measure both latency (in TSC ticks), and bandwidth (how many sequentially numbered packets it takes to fill the pipe). This is used in cases where the length of the cable and intermediate switches and routers in the communication link represents a significant transmission delay, then the single packet may be arbitrarily extended to multiple back to back packets which may live "on the wire" concurrently; with greater numbers of packets being in transit as the spatial distance and number of intervening devices increases. Indeed, this is a way of measuring the actual latency of the current transmission path, and if historical information on minimum and average latencies are recorded on both sides of the link, would afford a method of detecting changes to the latency in response to, for example, queuing delays. A Time Stamp Counter (TSC), a facility found on most modern processor architectures, is the software that runs as close as possible to the Network Interface Card (NIC), either in the interrupt service routine, or even the firmware of the NIC itself. The higher layer—ENtangled TRees (ENTR) running in the device driver runs the rest of the mechanism responsible for transactions, authentication and beacons. The system can be controlled by control blocks in a secure memory page accessible only to a secure hypervisor. This may be implemented by sending out a series (1 . . . N) packets each with a sequence number, and "discovering" how many TICKs it takes to fill the pipe (an initial latency measurement is be made with one packet first, to allow a calculated estimate of the number). The first TOCK received by the initiator indicates the pipe is full. The initiator records the sequence number of the last sent TICK, and subtracts the two. This is the number of packets it takes to fill the pipe. This mechanism will allow us to measure the bandwidth of a dedicated pipe.

Figure 11:
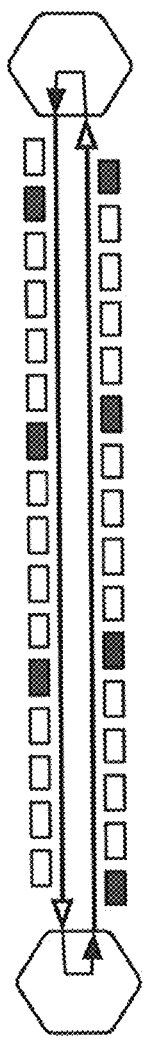
FIG. 11A shows a hybrid information & entanglement.
FIG. 11B shows a transaction mechanism, which is where the entanglement mechanism is maintained by the hot potato protocol during entangled transactions.
FIG. 11C shows burst entanglements (and burst transactions).
FIG. 11D shows a hybrid Data-Entanglement Method.
Figure 11:
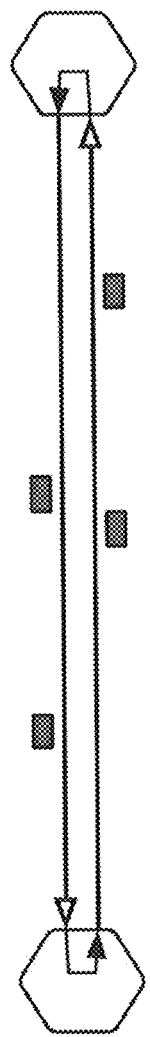
Figure 11:
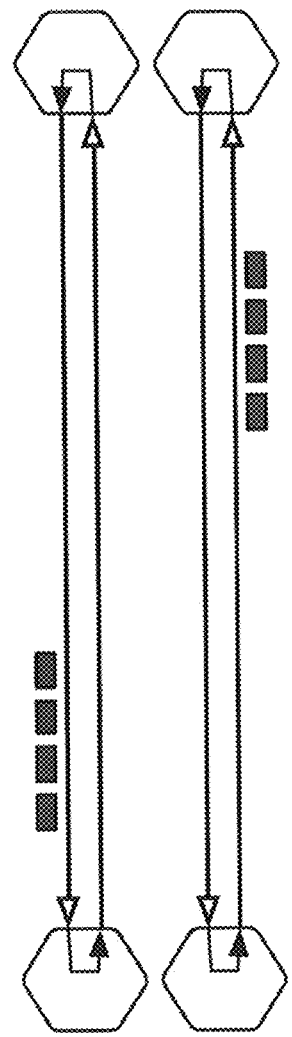
Figure 11:
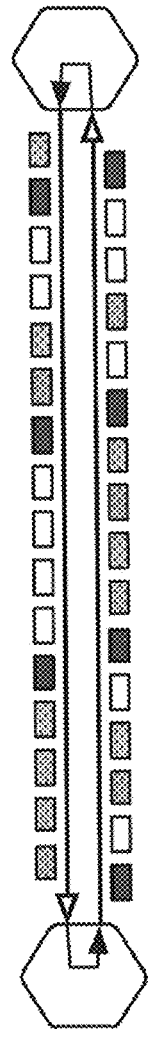

FIG. 11A shows a hybrid information and entanglement (entanglement packets in blue) mechanism, sharing the same link. Entanglement packets are generally short (as short as possible), and can be piggybacked on data packets. Data packets are generally long and take up most of the bandwidth.

FIG. 11B shows a transaction mechanism. FIG. 11B shows the case where the Transaction Engine is involved, and is sending actual data packets (in red above). This will be interspersed with TICK and TOCK packets (Blue), with the remaining slots (white) unused. Note that the entanglement packets may be periodic (every so many data packets), the data come in random bursts, and the empty packets are what are left over.

FIG. 11C shows a burst entanglement and burst transaction method mechanism.

FIG. 11C shows how multiple entanglements can be burst in order to provide redundancy to protect against individual packet loss, or to piggyback different information types.

FIG. 11D shows the case where the Transaction Engine is involved, and is sending actual data packets (in red above). This will be interspersed with TICK and TOCK packets (Blue), with the remaining slots (white) unused or used for data packets. Note that the entanglement packets are periodic (every so many packets), the data come in random bursts, and the empty packets are what are left over.

Figure 12:
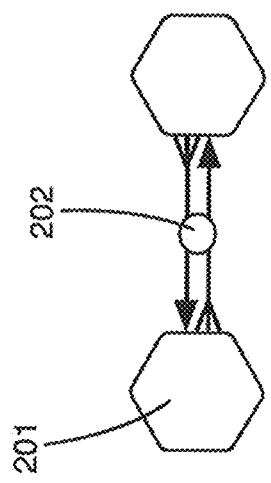
FIGS. 12A-12C are diagrams of basic entanglement types.
Figure 12:
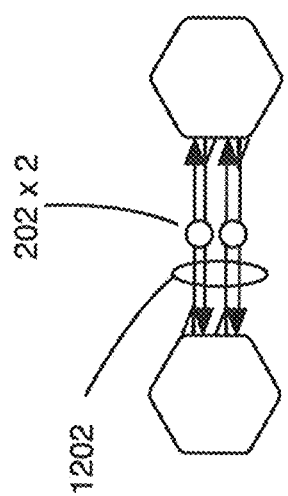
Figure 12:
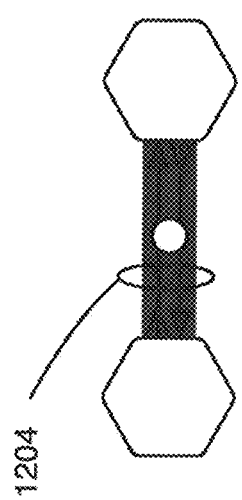

FIGS. 12A-12C show basic types of entanglement. They are all bipartite (having two corresponding parts, one for each party).

Entangled links (ENTL) are bipartite computational entities comprised of packet exchanges between the most fundamental (simplest, least possible) mechanism at each end of a physical channel. Each half maintains entanglement only with its identifiable and authenticated other half, laying a new foundation upon which to build secure, ultra-reliable, transaction-oriented logical channels. Entangled Links are "individuals", computationally independent and functionally orthogonal to all other processes (agents, processes, etc.) in the cells (encapsulated units of compute, storage and network function) they connect.

Entangled links are used to maintain and instrument a liveness relationship between two machines in an Ethernet or IP Network. They provide rich characterization of local observer view (LOV) link state based on a model of liveness where progress is held eternally in stasis until either side chooses to move their joint state forward by initiating or completing a transfer of information. Unlike state change in cells, which is monotonic and irreversible, state change in entangled links is successive and reversible; providing a basis for guaranteed information transfer. Note that the concept of irreversible time is explicitly absent from this formalism.

As shown in FIG. 12A, Entangled links are singular computational entities of first order. The white spot in the middle of the link between the hexagonal cells. They are governed by a single shared state machine, half of which resides in the cells on either side. Only incoming packets may cause transitions from one state to the next in this constrained state machine. Before the state transition is complete, it sends out a packet to its partner on the other side of the link. The other link is a mirror process, doing exactly the same, in a completely symmetric manner. The system represents a self-running oscillator, whose frequency relates to the spatial distance of the link and the hardware delays in the NICs (or MACs).

Symmetry is not perfect because one side must initiate the entanglement. We call this the TICK beat. The other half responds with a TOCK beat. Every TICK is symmetric and idempotent with every other TICK, every TOCK is symmetric and idempotent with every TOCK. However, if a packet is lost, then either side of the link may re-establish the entanglement, in which case it becomes the TICK and the other side responds with a TOCK. In the case where both sides collide sending TICK packets, they will back off and restart with a simple arbitration mechanism, such as the agent with the lowest ID (GUID compare).

FIG. 12A shows the basic entanglement which is just a single entanglement channel between the two cells. We depict the link entanglement with the circle on the links, which indicates a combined execution entity made up of the whole path. FIG. 12B shows that the multiple entanglement may have two or more channels between the two cells, each being a separate entanglement which may stall, but which any of the other entanglements may notice, and attempt to restart. This provides a capability of extremely fast restart of the entanglement without having to wait for the periodic beacon, which runs at a slower rate. FIG. 12C shows a secure entanglement (shown by shading), which simply means that once an entanglement has begun, and authentication has taken place, that the entanglement will only restart with its authenticated other half, and will create an error or security notification if other devices attempt to intervene.

Links may be in the state of transmitting, or receiving, or entangled. The first two-states transfer actual information, the third state is the special state specified herein as entanglement, where no actual information is being transferred, but an idempotent token is indefinitely exchanged between the two computers in such a way that no operating system, protocol stack or application processes need to be activated.

Figure 13:
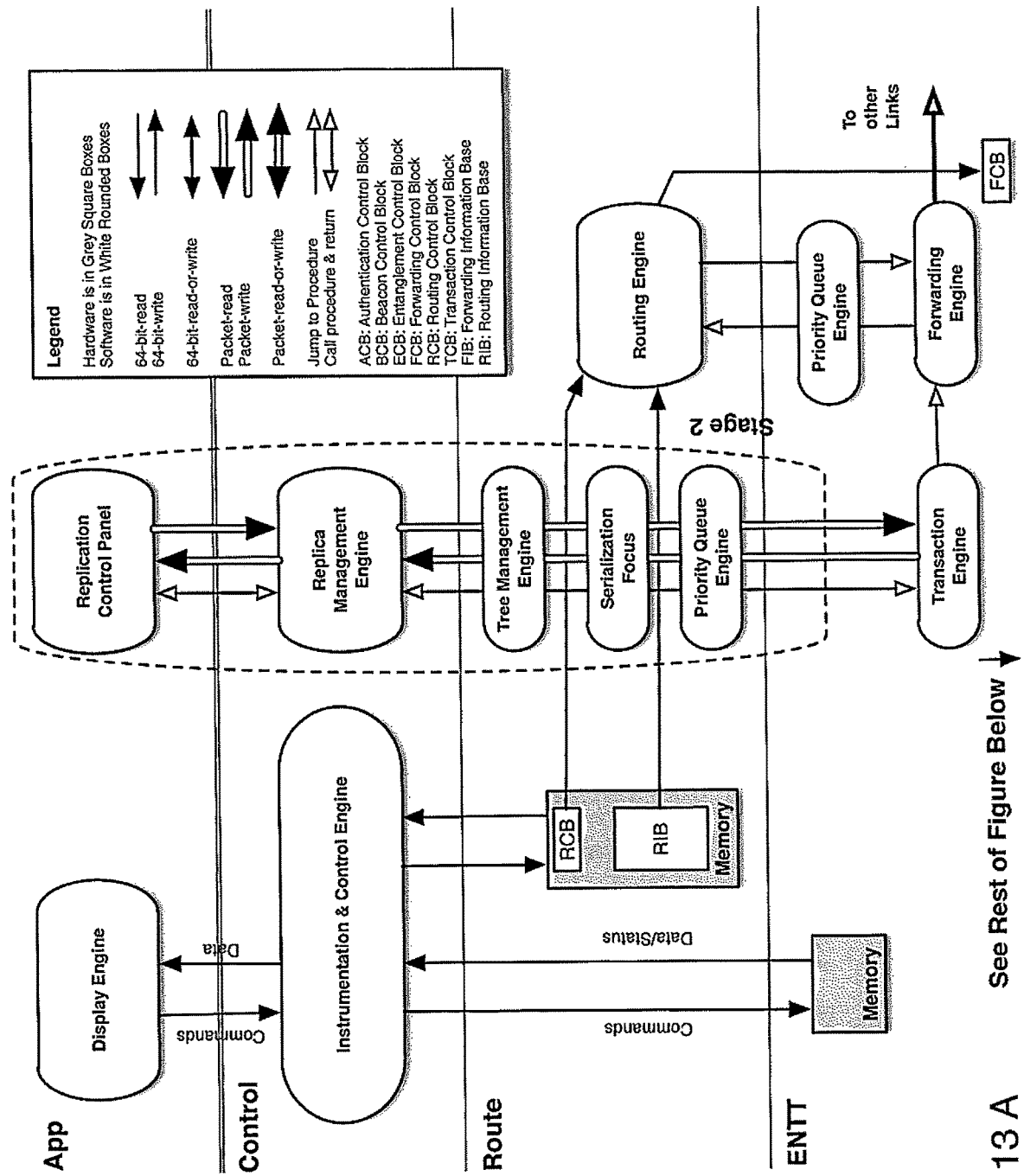
FIGS. 13A and 13B are diagrams of an entanglement link software implementation architecture.
Figure 13:
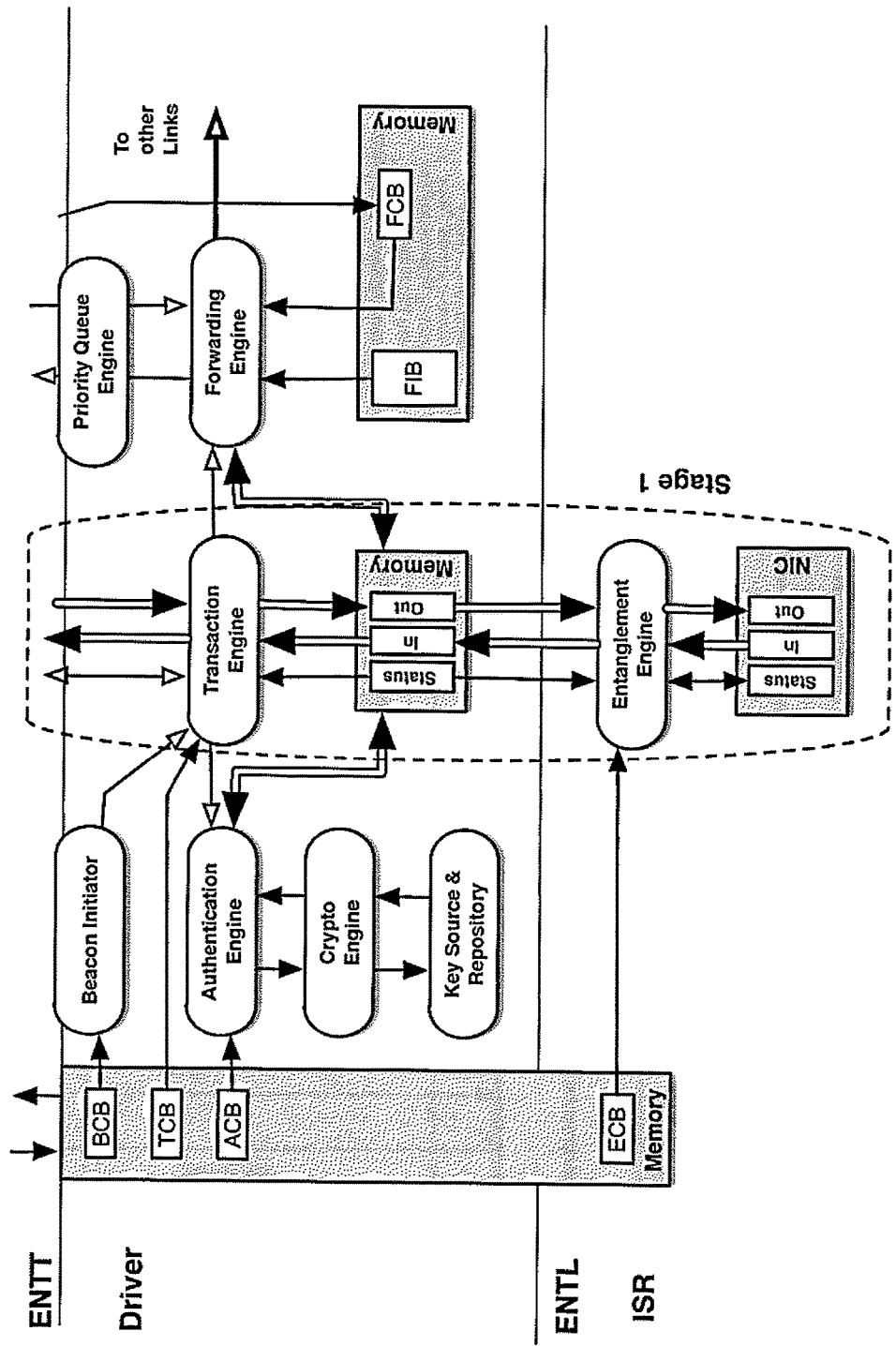

FIGS. 13A and 13B are a block diagram of an example entanglement software implementation architecture. In this example, the entanglement engine is in pipelined mode where each entanglement packet is sequentially numbered and the current round-trip latency is immediately obvious to both sides of the link by comparing the current incoming packet with the last outgoing packet. This also provides a means to measure the bandwidth capacity of the link, which may be used either continuously or in burst mode to reduce energy consumption.

The heart of ENTL is the Entanglement Engine is at the bottom of FIG. 1. This is the hot-potato function, implemented as close as possible to the NIC (in the NIC firmware, or the interrupt service routine). The code at this level is explicitly interaction code: it performs its function in as few lines as possible, there are no semaphores, no locks, no queuing, nothing whatsoever that can be blocked (as it should be for interrupt service routines). The Entanglement Engine gets its direction declaratively, though the ECB (Entanglement Control Block). This includes declarations such as start, stop, and minimalist forms of fault injection (such as miss 1 packet, send corrupted packet, and counter overflow).

The "Layer" that the Entanglement Engine runs is as close as possible to the Hardware, it is not required to be device independent. Indeed, it may need to be device dependent in order to maximally exploit the available hardware. However, the amount of code required here is small, and therefore the effort to port this to other devices will be minimal.

The next "Layer" up is where device independence should be taken seriously. The Three engines in this layer are all governed by the Transaction Engine. For the time being, we will ignore the Authentication Engine, and Forwarding Engine. They are not necessary for the first level implementation of this project.

The Transaction Engine is invoked only when the upper layers (The routing Engine) request actual data OR TRANSACTIONS to be sent on the link. Note that the Routing Engine is the pathway to the network from both other links, and internal agents which wish to use the service.

The Transaction Engine receives all packets that are not ENTL packets. It examines them for either entanglement restart, transaction control, Authentication triggers. Anything it does not recognize it routes to the Forwarding Engine (If the forwarding engine does not recognize them, it sends them to the default instrumentation & Control Engine on this cell for logging as an error. An alternative mode will be implemented which simply discards all packets that are either not from the identified sibling cell or not containing a valid packet type within the set described in this document. However, even in that mode, there will be an incrementing "bad packet" counter for this entanglement epoch.

All components installed in the ENTL and ENTT layer are not directly callable from any application. However, they can be declaratively directed through their control blocks: (Authentication Control Block (ACB), Beacon Control Block (BCB), Entanglement Control Block (ECB), Forwarding Control Block (FCB), and Transaction Control Block (TCB).

Figure 14:
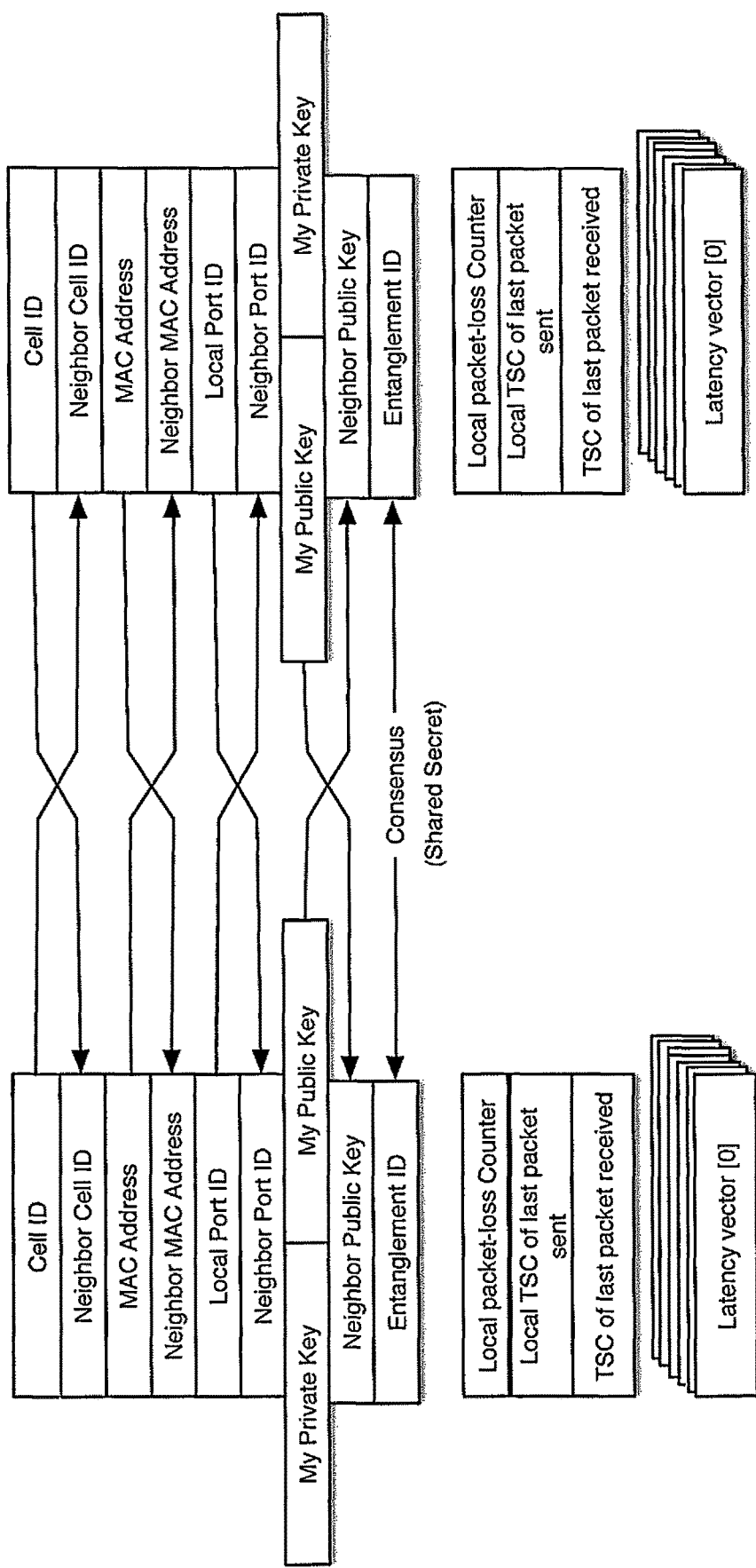
FIG. 14A shows an example set of data structures on each end of a link.
FIG. 14B shows a block diagram of an example of Protocol Phases for Atomic Information Transfer.
FIG. 14C shows a symmetric 2-bit entanglement pattern, illustrating the expected 4 states, and with the transform being a grey code from one state to the next (one-bit changes at a time per receive and transmit event).
Figure 14:
Figure 14:
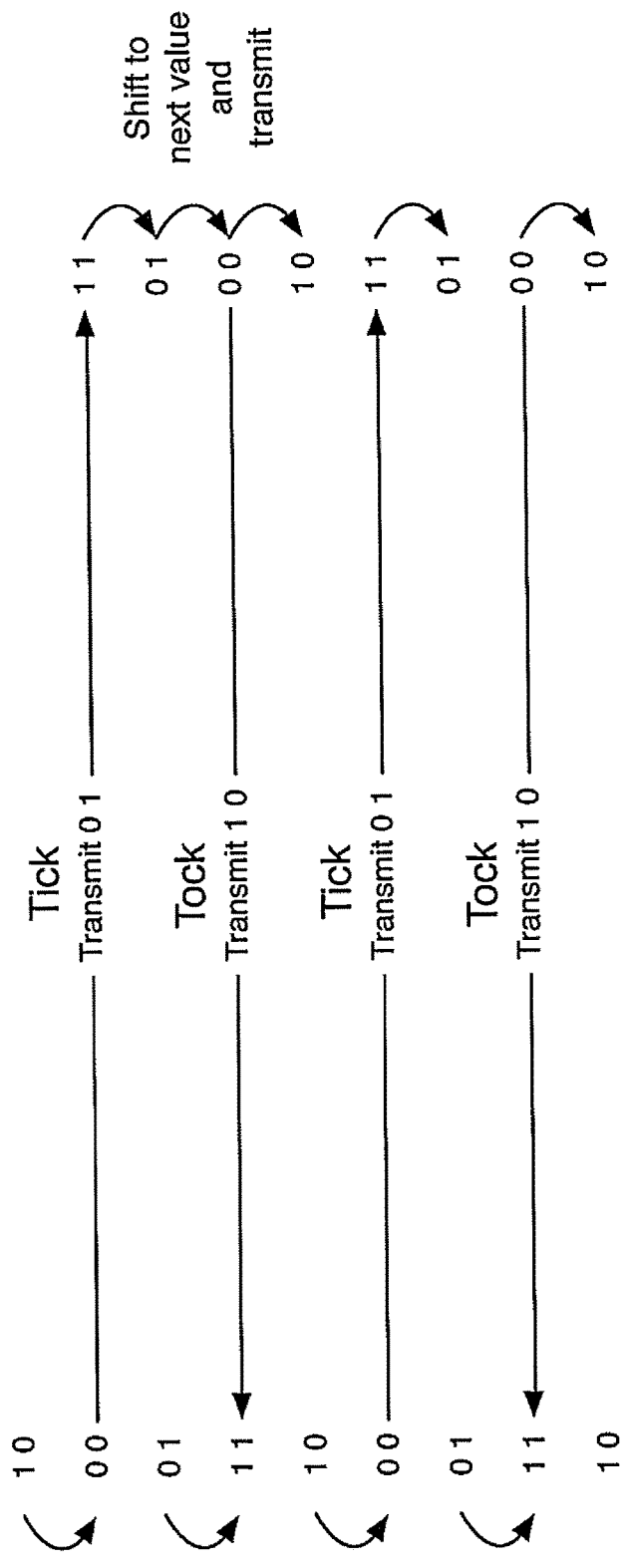

FIG. 14A shows an example set of data structures on either side of the link, with the information each side shares with the other, the consensus value for the local link identifier (a shared secret), and the packet loss and latency registers used to measure the performance and quality of the link while it is in operation. Note that the structure is symmetric, with the exception of the counter-symmetric nature of the public/private keys. The data shown is generated by the engines in the ENTL and ENTT layers, but is available for reading by any instrumentation & control function at higher layers, providing the MMU enforces read-only operations. The algorithmic constraint of 64-bit reads or writes will enable consistency to be maintained, and that all readers are non-perturbative with respect to the ENTL function(s) implemented at the lowest layers.

FIG. 14B shows a diagram of an example of Protocol Phases for Atomic Information Transfer. Application Stack vs. Atomic Packet: A very simple example of the value of emulated quantum processes (the no-cloning theorem) is that packets on a network are necessarily part of a larger CQ/EQ (Conserved/Equivalent Quantities) system. In a conventional application and database configuration, there are many layers of code that the transaction process must go through, including the operating system multithreading and storage protocol layers. However, a primary goal of a transaction is atomicity. If we identify and calculate the component chain of reliability through these components (generally a cartesian product of the failure rate of each component) then a motivation exists to find an easier way to achieve atomicity that does not need to go through this component chain. Conventional transactions (in, for example, databases) continue to increase their complexity and unreliability of the conventional mode of transactions.

In this invention, the minimum necessary components to achieve atomic information transfer are minimized and isolated. If this is done in the network, all the unreliability contributions of the application, kernel, protocol layers and device drivers become irrelevant, and a simpler, more straightforward reliability model of atomic information transfer can be achieved. As shown in FIG. 14B, Idle packets are replaced by Entangled Link Packets. Prepare phase is replaced by entangled transaction token (converted entangled link packet). Commit phase obeys ENTangled Transaction (ENTT) protocol. Acknowledge is replaced by conversion of entangled transaction token back into entangled link protocol. Indefinite number of idle packets conforms to Jim Gray proof for two-phase commit. Rollback is achieved by replacing the entangled transaction token back into prepare token. The System acts as an arbitration mechanism between the bipartite pair, deciding on the causal direction of information change.

A Network Facility for Atomic Information Transfer. The present invention aims to provide a fundamental new capability applicable to any reliable, transactional data store, using the mechanisms described in Entangled Links and Entangled Transactions, but extended for use in a conventional network where the entangled links occur between different boxes in a distributed switch environment. In one example, classic fat tree network, where all switching is carried out in one of two layers: the leafs or the spines is used. Leafs are used traditionally to connect to computers and the outside world (for example, the internet). Spines are used to connect the leaves together to form a scalable high bandwidth and low latency "flat" network core. The intention is to provide cheap (in the sense of requiring very little CPU cycles, storage and network bandwidth), reliable (in the sense of robust in the face of both expected and unexpected perturbations), and secure (in the sense of not being "eaves droppable" by unintended witnesses) "Atomic Information Transfer" in the network layer that anyone can use for any purpose whatsoever, including as a transaction service to applications, a distributed counting service to distributed object storage, and, most of all, a predictable, controllable facility for managing the recovery of systems and datacenters from disasters. This invention has the potential to enable faster and more reliable transactions than conventional (Two Phase Commit, or Paxos) transactions.

FIG. 14C shows a symmetric 2-bit entanglement pattern, illustrating the expected 4 states, and with the transform being a grey code from one state to the next (one bit changes at a time per receive and transmit event). This is the minimal (classical computing) signaling method to maintain reversibility. Each transition (receipt of a packet, transmission of a packet) causes the state machine on each side to increment its code.

The present invention is for one or more low-level primitives, Entangled Links, in a distributed computer system to express a new concept of "entangled links", which have the property that they never fail in an inconsistent state, and to do so in a mode that is "successively" reversible. The Entangled Links are implemented by reversible state machines and an associated protocol between as will be described in more detail below. Immediate practical benefit is provided by reducing the window of vulnerability for potential inconsistency in information transfer by a beneficial factor. For example, the concept of synchronous communication in the channels of process calculi presents a sending agent with the prospect that it must wait for a receiving agent to acknowledge before it can proceed with the next step in its computation. Entanglements enable us to merge the synchronous/asynchronous distinction in an interesting way, using a try primitive which is equivalent to synchronous if the entanglement is TRUE, because the probability of the message being sent immediately is extremely high because it is far more reliable to send information to an immediate neighbor (which intrinsically becomes a proxy to ensure further distribution of the information), than it is to send it "directly" to some destination which must pass through a longer software and hardware component chain, such as that represented by a WAN where none of the intervening devices contain stable storage. If the entanglement is FALSE, it becomes equivalent to an asynchronous channel by depositing the message in an output buffer and returning anyway, knowing that the underlying mechanism will act as a proxy (responsible for a promise) and endeavor to deliver the message by any means possible, even after the agent terminates or crashes. However, the agent may now use the catch primitive to detect this case of a (presumably temporarily) broken entanglement. If the catch was on a channel that happened to be a WAN, rather than a LAN or direct connection, this distinction would allow the program to make different decisions, to delay its own progress, or initiate alternative actions to achieve the intended objective (such as saving a backup copy in an alternate failure domain) based on the characterization of the entanglement which may be very different for each case, such as the WAN or LAN versions described above.

The availability of entanglement as a property of the link means that the agent can proceed much faster, and does not have to wait for the timeout to know that the acknowledgement may not be coming. The entanglement mechanism affords the agent a means to delegate responsibility in a more controlled manner to the underlying mechanisms, and reducing the window of vulnerability to inconsistency by a significant degree.

If the entanglement is neither TRUE or FALSE, we can now explicitly expose the excluded middle (an important concept in constructive mathematics), as a practical mechanism that can be tested for and responded to by the agent. For example, two additional states: UNINITIALIZED, and UNKNOWN may be provided as states which can be reported to the program(s) or agents which desire to use the link.

The primitive communication element of our system is an "entangled link" between nodes that enables logically nearest neighbor computers to be connected in a reliable manner. This approach to resilient connections ensures that breaks in communication between nodes do not have an unexpected negative impact upon the communicating applications that depend upon them, and that the nature of the break (duration, severity, etc.) can be communicated to the application and operating system processes that utilize them.

Another advantage of this protocol method is to eliminate the "prepare" phase of the conventional two-phase commit protocol, the Paxos or other transaction/consensus protocols: The entangled link is effectively (and perpetually) in the "prepared" phase already. This has the potential to substantially increase the performance, or the rate of transactions between computers.

A. Link Characterization

Entanglements are defined as closely coupled bipartite relationships (across links) which characterize (among other things) their local view of: availability (current state and historical average), latency (including statistical measures of variance), and secure sessions (bounded by reliable events to establish and tear down). Benefits of entanglements include:

1. Computational Independence (of the Guest Virtual Machines, operating systems, application, agent, process, or protocol stack). A coupling mechanism between connected computers such that communicating agents can make the fastest possible clarifying assumptions about the status of the communication channel using available information without requiring the use of timeouts or resets, being overly simplistic (abstracting away latency and unreliably), or being overly complex (requiring the application or agent to handle each type of error that may occur).

2. Maintaining secure sessions requires something below the level of processes in an application or operating system that cannot be infiltrated without detection. A very fast response and general awareness of latency and link integrity make man-in-the-middle attacks easier to detect and harder to implement.

3. Entangled Links provide a verifiable, provable, and atomic element that may be composed into higher level structures that support system-wide predicates to assist with distributed computations and enable shared awareness of exogenous events (so that other resources can be dispatched to identify and respond to them based on correlated patterns of events and historical recognition of prior behaviors).

4. Security. It is extraordinarily difficult to fake an entanglement when interactions are between the NIC hardware or firmware, or the Interrupt Service Routines of two directly connected computers. Temporal signatures cannot be hidden by attackers; latency is a quantity that can be measured and tracked, and if necessary, triangulated by cooperating agents to verify the geographic (spatial) relationships among three or more parties. Although we prefer not to use entanglements across legacy protocols or applications, the mechanisms for latency measurement can be used to triangulate the IP latency signature of nodes and assist with the identification of attack nodes in system intrusion and Distributed Denial of Service (DDoS) scenarios.

5. Virtual Machines (VM): higher level kernel routines, and especially application software is far removed (computationally) from individual heartbeat packets arriving and being responded to on a network interface. It will be effectively impossible to fake entanglement from within a guest virtual machine (VM). Simply suspending the VM (a common attack vector) will immediately break the entanglement to the VM, and trigger re-authentication procedures for sessions using, for example, the Needham-Schroeder symmetric key cryptographic protocol.

6. VM Migration, as a failover or load-balancing technique in virtualized infrastructures, will break the entanglement and require re-authentication not only of the links in the source location, but any new links in the neighborhood of the VM's new destination.

B. Beacons

Beacons are unacknowledged heartbeats, sent asynchronously with low periodicity (say once/second) to: (a) provide an advertisement and rendezvous mechanism for new cells, and (b) a restart mechanism when entanglements are broken. The restart mechanism can then check the last processor clock time for the last heartbeat going out, increment the packet loss counter, and restart the entanglement.

Beacons may also be used to percolate sheaf instrumentation and security type information, two potential uses of this mechanism is are described by Bennett and others are related directly to the Earthcore MetaData Tensor (MDT), which depends on the ENTL mechanism for correct operation.

C. Unused Packet Slots

An important refinement of the mechanism is for the Link Entanglement packets to use only unused protocol slots, i.e., those slots which would otherwise be wasted and lost forever when not used by the normal functional transfer of information. The mechanism can be designed to adaptively step aside when network buffers are waiting on the output side. Acting like the null process in an operating system, which is sometimes used non-intrusively, for calculating such things as $\pi$ to an arbitrary precision, using CPU resources that would otherwise be wasted.

Because we have complete control of the Dynamic Locality Secure Protocol (dlsp), we can merge the packet format for active data with the packet format for inactive heartbeat (entanglement) data, using a bit in the header.

This provides a large number of derivative benefits, such as percolation of locally observable data, to remote cells which subscribed to the stream, or for computational spiders which wish to perform collective functions such as distributed counting, or initiation of latency (ping) signature measurements to suspect IP addresses in the CAL to support triangulation of potential attackers.

D. Implementations

Entangled links may be implemented as a heartbeat mechanism, either directly in the hardware or firmware of the communication interface, or in the interrupt service routine of a computer and its I/O subsystem, i.e., at the lowest level of programmatic control in the system, below any application or operating system function which may be subject to failures, starvation, deadlock or other unanticipated delays. The present invention achieves the highest possible intimacy of the link between two systems, and to make the computational entities on both sides of, and which define the link, computationally independent of the other programs running on either computer. In this way, the combination of mechanisms in the communication ports (of the two computers) are tied together as a single computational entity in the link, which is autonomous and independent of the normal computational functions expressed in the operating system or applications within the rest of the computer. For example, recursively enumerable computations expressed by a $\lambda$ calculus expression.

The present invention raises the importance of this bipartite link to be of first order, equal in importance to the processes executing in the nodes themselves, instead of being perceived, considered and managed as an adjunct to those processes. This means that if either or both processes in the connected computers were to crash, stall, become deadlocked, or even terminated voluntarily, that the link continues to remain "live" as a separate "bipartite" computational entity, until it is explicitly torn down by, for example, physically disconnecting the network cable.

Entanglement Links are symmetric. There is no client-server or other asymmetric assumption where one side of the link is superior to the other. This enables valid independent actions to be initiated from either side of the connection when information is transferred. When information is not being transferred, the link is simply a bidirectional back and forth transfer of a token: tick tock, like a metronome, with no distinguishing characteristic from one tick or tock to the next. This "timeless" relationship, with the exchange of a single atomic packet, constitutes what we call an "entangled" state. The link has no sense of "change", and continues indefinitely, until either the token exchange fails, or processes in other parts of the operating system or applications in either computer wish to transfer information.

There is no limit to the rate of transfer of the packets. In principle, the communication interface on either side of the link my immediately turn around the packet and send the token back. This affords two specific benefits. The first is that it minimizes the latency of having to wait for the next handshake before information can be sent. The second is that it provides the smallest possible window of opportunity for inconsistency for the processes running in the operating system or application in the computers on either side of the link. As far as the implementation is concerned, this immediate sending back and forth of the token can be carried out in the interrupt service routine directly, without having to call some kernel routine with some specified delay. If the token exchange is implemented in the hardware or firmware of the communication port itself, this would lower the interrupt rate into the computers on each side.

Entangled Links may be implemented using any link protocol. However, the preferred embodiment is to use raw Ethernet packets, perhaps with a modified "ethertype" field to very quickly allow the NIC firmware or the Driver Interrupt service routine packet inspection code to identify and dispatch the packet before it enters the regular buffer channels of the driver leading to the protocol stack. Another preferred embodiment is to use DCE (Data Center Ethernet) as the transport mechanism, to exploit its multi-channel and lossless packet characteristics in combination with the Priority Queue Engine (PQE) described elsewhere.

E. Multicore Mapping

A significant embodiment of the invention is the potential to map the link entanglement and transaction mechanisms statically to one of the cores in a multi-core processor. It has already been proven that the performance and interrupt overhead of a routing protocol can be significantly reduced by the technique of mapping network flows to processor cores. However, a useful partitioning and optimization of the entangled link mechanism and token exchange mechanism is a non-obvious invention over and above the mapping of network flows to the process. Indeed, it would be highly efficacious to map the object trees to independent cores in the processor.

Where the length of the cable and intermediate switches and routers in the communication link represents a transmission latency, then the single packet may be arbitrarily extended to multiple packets which may live "on the wire" concurrently, with greater numbers of packets being in transit as the spatial distance and number of intervening devices increases. Indeed, this is a way of measuring the actual latency of the current transmission path, and if historical information on minimum and average latencies are recorded on both sides of the link, would afford a method of detecting changes to the latency in response to, for example, queuing delays.

In cases where the link is private between two computers, the only constraints to how fast the packets are turned around is the digital logic or firmware (if implemented in hardware) or the interrupt rate (if implemented in software), and any excess power dissipation on the wire due to the transitions of the changing information in the packets. Even then, the packet design could be such that unnecessary transitions are eliminated, optimizing for minimum power where that may be desirable.

In cases where the link is shared between more than two nodes, the entanglement is still bipartite between two nodes, and the communication is considered independent. However, heartbeat tokens need to take into account both bandwidth sharing and queuing delays (which can also be captured by any method, or in the method described above).

Entangled links may be bipartite (between only two computational entities) or in some embodiments multipartite (between three or more computational entities).

One intended use of this mechanism is to leverage its properties through language primitives (or library) as a foundation for creating and managing large-scale, distributed systems within a programmatic context. Such that these primitives may be recruited to construct relationships which maintain certain predicates as true in the face of perturbations and exogenous events which signify failure of underlying systems or topology. If a program crashes and the system reboots or another system comes online, the mechanism ensures that the predicate remains true, or becomes true again, without the need for the programs to be restarted and to reinitialize or rebuild them. This becomes important, for example, in systems with an indefinitely large number of stored objects, each of which may have an indefinite number of replicas which must maintain their structural connection to the "set" of sibling replicas, so that their structure and relationships can be maintained in spite of failures, disasters or attacks to the system. Higher level functions may be of any type, including create, replicate, evaporate (delete local replicas), update (update or append all replicas with some commutative operation), or any set of operations on the replicas specified by the application.

Another intended use: classical computer programming techniques also persist only the data (files/databases), or snapshots of program execution (virtual machine images). The mechanism described in this invention provides a foundation so that the relationships between these entities can be persisted in the form of virtual self-healing graphs managed by cooperating agents. The challenge such systems face, which is addressed by this invention, is maintaining integrity and structure of these relationships through failure and reconfiguration of the links and system components as the program executes. If this could be done simply and reliably (from the perspective of a programmer or system administrator), this would provide a rich characterization of connectedness, where previously TRUE and FALSE where the only possible values for the property of "connected" in conventional link-state management. This would allow finer graduations and more diverse responses by a program, beyond a simple timeout and a specified number of retries.

Other practical issues addressed by ENTL (shared by existing well-established methods) include subsuming: detecting if a link is up or down (electrical link state), is it going through a switch or a router or neither? Does a particular resource exist? When to trigger a link re-authentication? etc. Advanced features include Structural Temporal Integrity (STI), mitigating the disruptive effects of timeouts and eliminating their unnecessary logging mechanisms, bipartite transactions (transactional exchanges between nodes without a transaction manager) described in ENTT, and sheaf type information to enable distributed monitoring and collective management of autonomous cells across cliques, colonies and complexes.

An important purpose of ENTL is to make the communication channel tractable to formal methods, to prove its correctness, and during operation, to provide a rich characterization of a link, well beyond that typically provided in simple heartbeat mechanisms.

The present invention in this and other implementations may optionally include one or more of the following features or achieve these advantages. For example, features may include:

A packet-exchange heartbeat mechanism between pairs of computers (nodes) where both sides together maintain an active link as a single abstract computational entity (the entangled link) independent of all other computational entities in the nodes on each end of the link.

A packet-exchange heartbeat mechanism that realizes or characterizes as a "encapsulated, independent computational entity" the chain of elements between the I/O subsystem on one computer and the I/O subsystem on another in order to achieve temporal intimacy (active knowledge of each other's presence over a communication medium as those medium exhibits transient or permanent failures).

A bipartite heartbeat mechanism for maintaining temporal integrity in a distributed computer system over a communication medium through packet exchanges to maintain reliable link state independently of all operating system and application processes.

A heart-beating method that uses a unique, idempotent, and reversible token exchange which presents no visible indication of progress until a communication of information needs to occur between the computers, and which maintains the potential for bounded (or unbounded) reversibility.

An entangled link in combination with a protocol where in the "change" with respect to the link one or more unique tokens will be conserved (i.e., each token will be on one end of the link or the other but not both and not neither) $(0 < N_{link\ tokens} \leq N_{max\ tokens})$.

An Singular Computational entity which encapsulates the devices along the path, cables, and Network Interface Controller (NIC), and the controller handler on both sides of the link into a single abstract entity which has at least: connected and disconnected, and from each end of the link, the following properties may be available: (a) a latency vector which maintains a running average of recently observed latencies; (b) an estimation of average bandwidth over recent transfers; and (c) a measurement of peak bandwidth seen at some time during the period the link was up.

An entangled link between two computers where new links are first authenticated, and old links are archived (persisted) for auditability.

An entangled link where the token is uniquely identifiable only to each pair of participating nodes, and which may be used to maintain a secure session, so long as entanglement is maintained. The uniquely identifiable token being persisted when the entanglement breaks, and a fast re-authentication takes place if the heartbeat occurs within some acceptable (locally visible) timeframe or conditions. Symmetric in node type (eliminates all distinctions between masters and slaves), symmetric in protocol: message and acknowledgement, etc., uniquely identified independently of the computers on either side.

A set of links having a packet-exchange heartbeat mechanism between pairs of computers (nodes) where both sides together maintain an active link as a single abstract computational entity (the entangled link) independent of all other computational entities in the nodes on each end of the link and wherein in any combination is described by a Graph G=(V, E) or Tree T=($V^1$, $E^1$) where ($V^1$ V) ($E^1$E).

A packet-exchange heartbeat mechanism between pairs of computers (nodes) where both sides together maintain an active link as a single abstract computational entity (the entangled link) independent of all other computational entities in the nodes on each end of the link for characterizing the quality and responsiveness of a link between computer systems, including current and historical measurements on latency, characterization of packet loss both currently and over the life of the link.

A mechanism in described in the above examples, which may be used to bound the setup and teardown of secure link protocols, where heartbeat integrity monitoring may be used to detect changes in latency, packet loss, electrical link state or other detectable changes, and is able to communicate this as a complex data structure to application and operating system processes to provide a richer characterization of link quality other than TRUE or FALSE.

A mechanism as described above where the heartbeat is implemented in either hardware (or firmware) in the network interface, or in software, in the interrupt service routine, so as to be as "intimate" as possible in its temporal relationship with its neighbor.

A mechanism as described above whereby the heartbeat mechanism is mapped to a dedicated core on a multi-core computer.

A mechanism as described above, where the tokens are maintained to be cryptographically unique and/or with a large incrementing serial number which steps monotonically forward or backward in its count as information is transferred, or untransferred respectively.

A Virtual Tap that enables measurement and logging of the link state information, which may be "subscribed to" by an administrative process for the purposes of selective instrumentation of the system. The principle is to capture the headers, throw away the payload, and transmit the header information (with routing) to a central place for analysis.

Transmission of information in "spare" slots by the above mechanisms using for example:

Passive Observer (passive observer—instrumentation data is percolated (transmitted) on a space available basis. Note that this is related to active data path (audit).

Active Traffic: Instrumentation data is batched up and sent on a space (bandwidth) available basis, or when buffers get full.

Priority Traffic: information is always transmitted when these types of events occur.

Instrumentation that can make measurements and diagnostic checks inline, and, through the state-file mechanism, select a separate tree for transmission of the instrumentation data so as perturb the primary path as little as possible when debugging.

Percolation (from sheaf theory)—ability to diffuse information throughout the system based on spare (unused) data slots, non-intrusively.

Separation of autonomic behavior or activity from auditability. "Separation of concerns" enables independent audit of systems (for example for security audits).

A heartbeat mechanism in entangled link mechanism comprising a heartbeat with a unique token.

An entangled link: a single, encapsulated and independent computational entity: comprised of the chain of elements between the I/O subsystem on one computer and the I/O subsystem on another computer in order to achieve temporal intimacy (active knowledge of each other's presence over a communication medium) as those medium experiences transient or permanent failures.

A packet-exchange heartbeat mechanism having a bipartite mechanism for maintaining temporal integrity of the link in a distributed computer system over a communication medium through packet exchanges is used to maintain reliable link state, independent of all computer operating system and application processes.

A packet-exchange heartbeat mechanism, wherein a unique, idempotent, and reversible token is exchanged until information transmission needs to occur between the linked computers, and which maintains the potential for bounded (or unbounded) "reversibility".

A Beacon mechanism used to support setting up and maintaining the Entanglement. Beacons are normally unacknowledged heartbeats. They are used for initial rendezvous between cells on the network, which begins a new entanglement, and for detecting an entanglement is broken and restarting it.

A combination of computer and interconnect providing bipartite communication between to NIC's, along a single communication path.

The Entangled Link provides an indivisible information transfer from one computer (the self) to another computer (the other). These are the self-states. Each computer also maintains a data structure describing, from its perspective, its awareness of the combined state of the two computers (the entangled pair).

Each computer sends its information starting from a state of "unentangled". The information sent reflects the data structure which reflects its knowledge of the "joint" state of the link.

This data structure reflects a 2×2 matrix, with elements [a,b; c,d], which may be flattened to a vector {a,b,c,d} for the purposes of expressing and transforming this data structure.

The above data structure contained in a single (for example) 64-bit word, which may be operated upon indivisibly by a processor accessing its registers or writing into memory.

The tables above show examples of the kind of transmissions that the self may send to the other through the process of packet reception and transformation. The full table would include the combination of all the allowed symbols in the alphabet (similar to the ruleset in a Cellular Automata).

This vector is sent over the link from the self-computer to the other. Upon receipt of the vector, the receiver will perform a transformation on the input vector to create an output vector, which it now treats as its own (self) and sends to the other.

This loop of transmissions between the self and the other is a symmetric operation which remains stable until one side or the other changes the transformation. There are several starting states, and several (well-known) transformations comprising a 2×2 matrix operator (for example, the Pauli matrices which includes the identity, bit flip, phase flip, and bit and phase flip operators).

Typically a link will monitor a 'private state' which is a vector provided by its local agent. It will carry out a transformation on any input.

Logical Entanglement is a method of creating entangled links between cells through a chain of segments in a conventional network or fabric where each hop is an independent and separate entangled link (i.e., tokens are conserved in each link separately, with single, multiple or any other type of entanglement described herein). For a chain of N links, there are therefore N independently maintained entanglement tokens (one in each segment). The latency of the entanglement is accumulated as the sum of the instrumented latency measurements on each link. This allows local knowledge of not only latency of the last packet, but minimums, maximums and running averages, which are all of value in understanding, for example, what bandwidth loading and effects of queuing are in a communication link. This may be implemented in software, hardware, quantum devices or any combination thereof. Logical entanglement is under direct (opcode) control of the Graph Virtual Machine (GVM).

Virtual Entanglement is a method of establishing entangled links through a chain of segments in a conventional network or fabric, where the entire chain is treated as a single segment. This may be done through, for example, the conservation of a single token through the entire chain. I.e., Tokens are immediately forwarded at each switch node without reflecting the hot potato packet back immediately. Entanglement packets traverse the whole network and are reflected by the computers (or NIC's) at each end. The latency of the entanglement is measured by the end entities and maintained as a parameter for the whole chain. This may be implemented in software, hardware, quantum devices or any combination thereof. Virtual entanglement is under direct (opcode) control of the Graph Virtual Machine (GVM).

Network Fabric Support for Serialization Foci is a hybrid mixture of Logical Entanglement and Virtual Entanglement, where the selected serialization foci (identified by some hop-count or latency average, failure domain independence, security, reliability or other measure of appropriateness) maintains separate Virtual Entangled Links with each computer, through a series of network segments. This serialization foci may reside in any of the switch nodes in the network, although in a typical spine and leaf architecture, the spine may be the logical choice because of its centrality. This may be implemented in software, hardware, quantum devices or any combination thereof. Serialization foci are generated and managed under direct (opcode) control of the Graph Virtual Machine (GVM).

Figure 15:
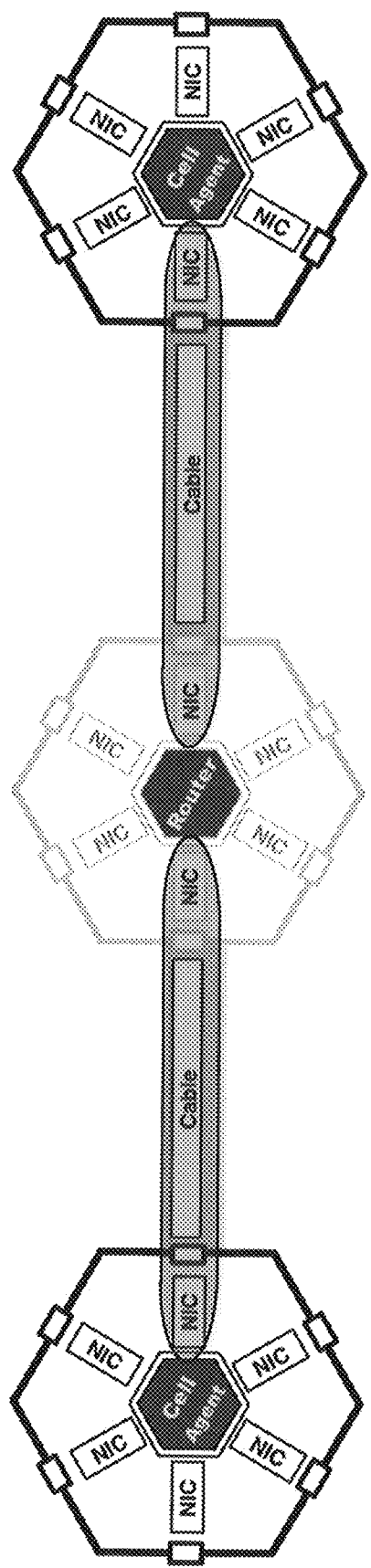
FIG. 15A is a network diagram of an example of a chained entanglement.
FIG. 15B is a network diagram of an example of cells connecting through a general interconnection network.
FIG. 15C is a network diagram of an example of link entanglement through an external switching network.
Figure 15:
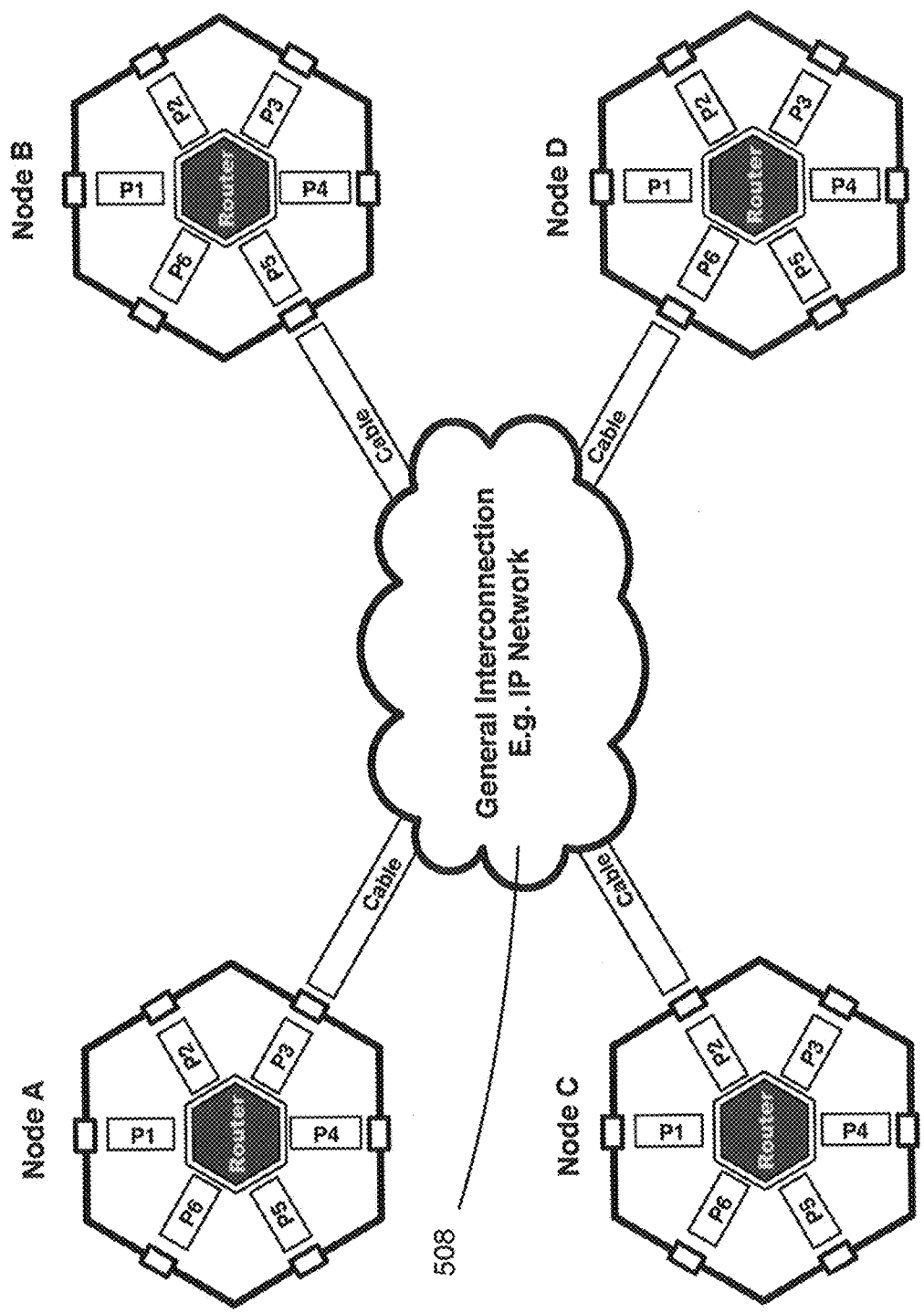
Figure 15:
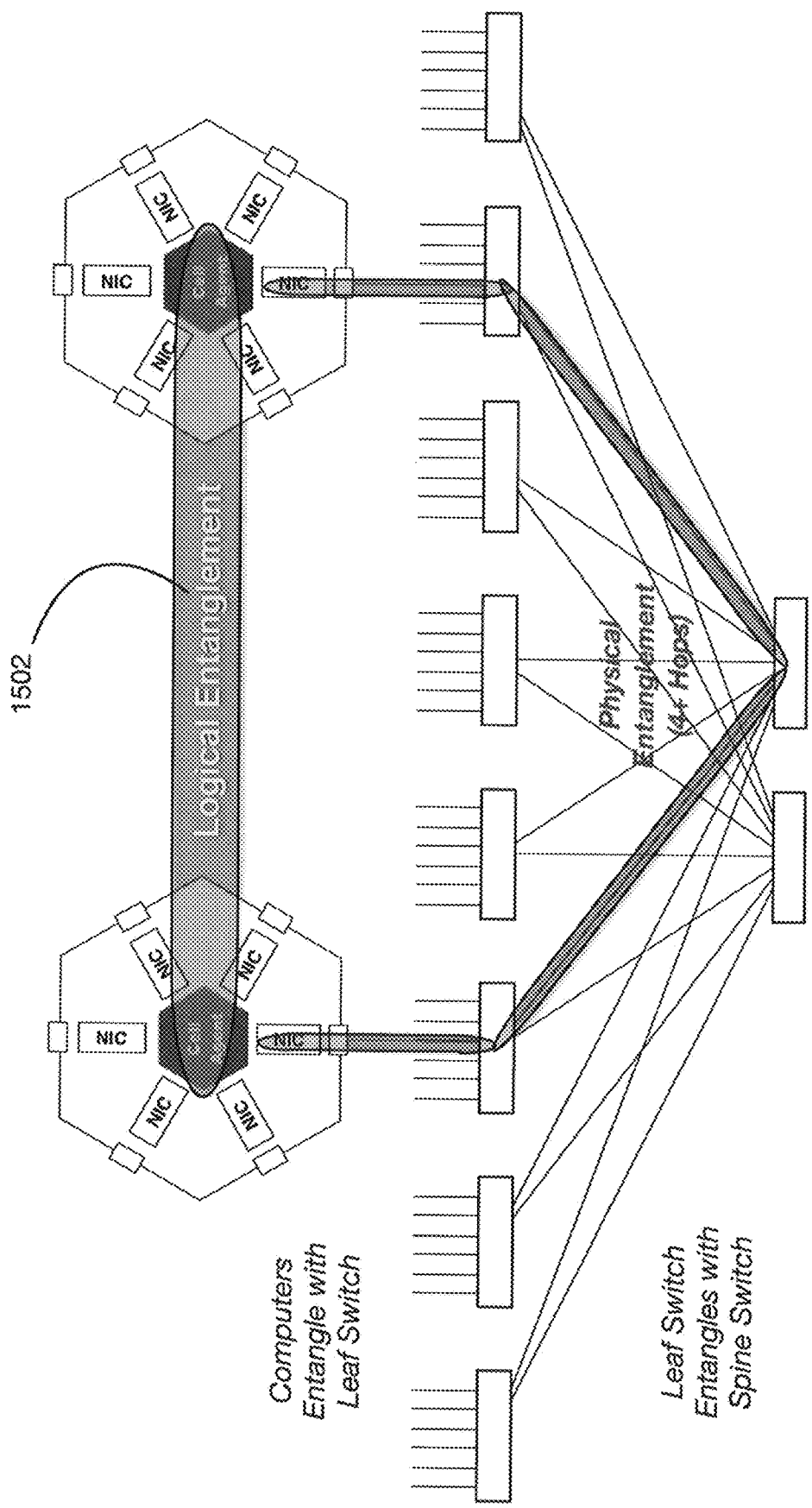

FIG. 15A shows an example of a chained entanglement. FIG. 15A shows segment by segment entangled links, or, router simply "repeats" entanglement packets as is without transformation. Multi-segment (chained) entanglement may also occur with "piggybacked" entanglement codes, where local segment continues with regular entanglement protocol, with router transforming and reflecting packet as usual, but also forwarding an additional packet, which is piggybacked on the entanglement packet in the next segment, and so on, until the piggybacked entanglement code reaches its destination and is terminated/reflected back along the path to the source.

FIG. 15B shows cells connecting through a general interconnection network. Hot potato protocol must now share resources (switches/routers) and will suffer non-scalability similar to the heartbeats, unless the network provides added primitives to maintain presence (such as segment by segment link entanglement).

FIG. 15C shows an example of link entanglement through an external switching network. In this link entanglement through an external switching network, the switch/routers are capable of the entangled link function. This provides "Logical Entanglement" that software could use with the same API abstraction when requesting entangled transactions or some other application function. Logical entanglement may also be adapted to situations where the communication paths and cells may come and go (and come back again) over long periods of time (years).

FIGS. 16A-16I show various types of entangled trees. The entangled trees may span part or all of a clique. Cells connected by links (black connections between cells) may be dormant. When trees are built all links on the tree move into the entangled state (shown by overlaid red lines between cell agents). Entangled transactions may be communicated with higher order entangled transaction packets (piggybacked on entanglement packet or otherwise) from one point on the tree to another. These trees provide a locally repairable, acyclic and deadlock-free topology, and a substrate where coherency threatening operations are guaranteed to collide.

The Earth Computing model addresses "entangled trees" with it's NAL underlay where sets of subscribed agents on cells may view some or all of the operations intended to modify its data structures (such as the MetaData Tensor (MDT), described elsewhere in this application). The logical link (or set of physical links between endpoints) may be considered a degenerate case of a simple tree. Earth computing incorporates an implicit Local-Observer-View (LOV) agent to each cell and to each physical link in the system. This "link agent" is completely autonomous (able to act alone without instructions from some other entity, including the cells it is connected to) yet it can make "promises" to these (cell) agents it is connected to, as well as participate as an autonomous entangled link in a network, forming a higher layer structure we call "entangled trees".

Being able to treat an entire tree as an entangled and addressable entity presents significant benefits to the management of datacenter equipment. These benefits include: (1) self-healing without having to alert a human being to invoke repair mechanisms (2) self-checking, by mutual verification with other agents it is connected to (3) eliminating the need for conventional "monitoring and instrumentation" logs and (4) ability to offer higher-level promises that provide system level functionality over and above the transport of packets, such as Structural Temporal Integrity (STI) described herein. These benefits translate directly into improved performance, security and scalability, and into lowered costs, especially those associated with administrative complexity. This application describes those functions which may derive particular benefit from being implemented in hardware, for example, in either the Network Interface Controller (NIC), switch or router. The Earth Computing underlay eliminates the notion of a server and the need to statically bind objects to a server. This set of functions which may benefit from hardware (or some combination of hardware and firmware) implementation is referred to a "Network Assisted Entanglement Functions".

Figure 16:
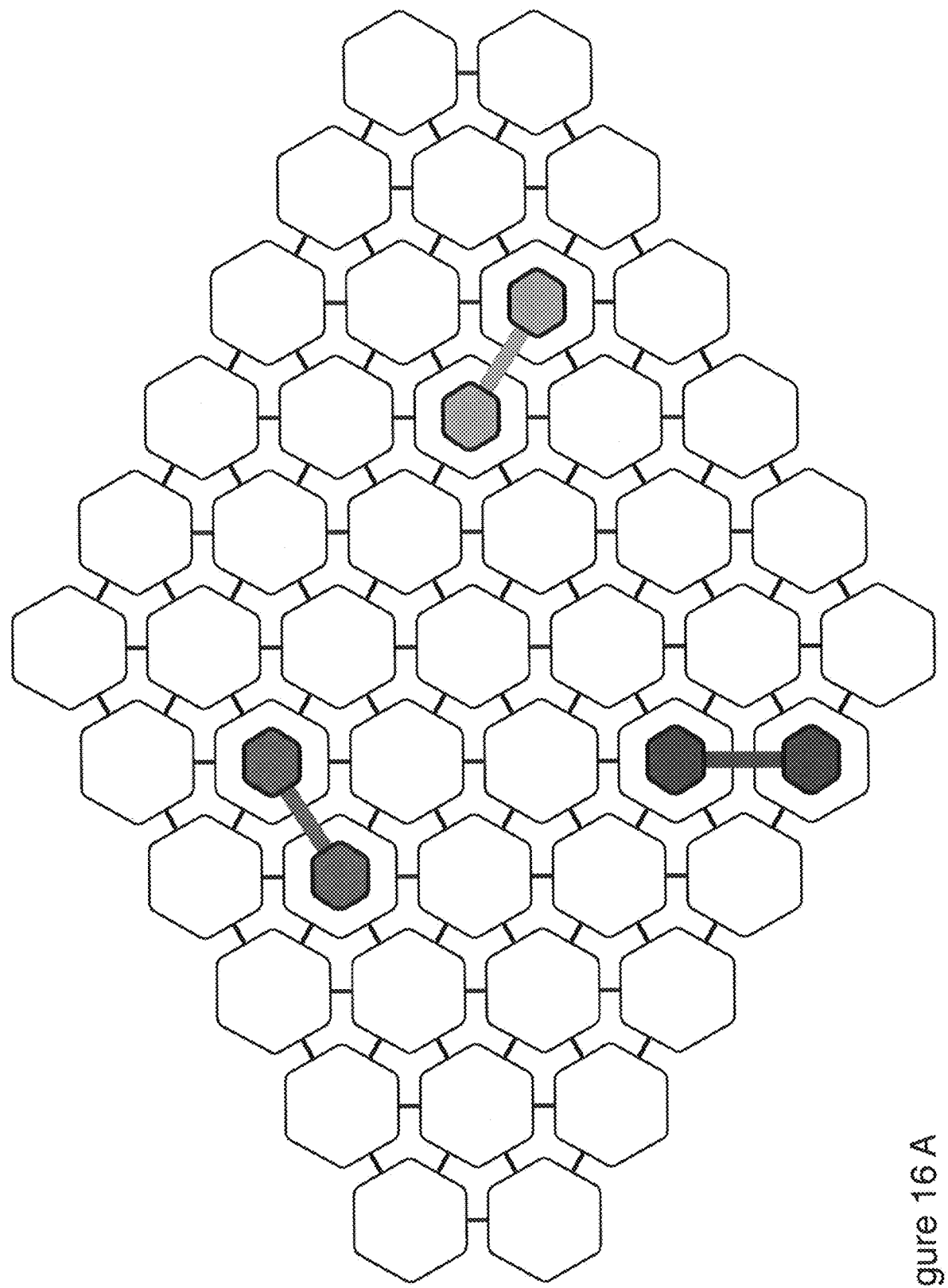
FIG. 16A is a network diagram of an example of individual independent entanglement links.
FIG. 16B is a network diagram of an example of a chained entanglement links.
FIG. 16C is a network diagram of an example of skip entanglement links.
FIGS. 16D and 16E are network diagrams and example trees of entanglement links.
FIG. 16F is a network diagram of an example of a snowflake of entanglement links.
FIG. 16G is a network diagram of an example of multiple overlaid trees routed on a center cell.
FIG. 16H is a network diagram of an example of multiple overlaid trees routed on a right cell.
FIG. 16I is a network diagram of an example of multiple independent trees of entanglement links.
Figure 16:
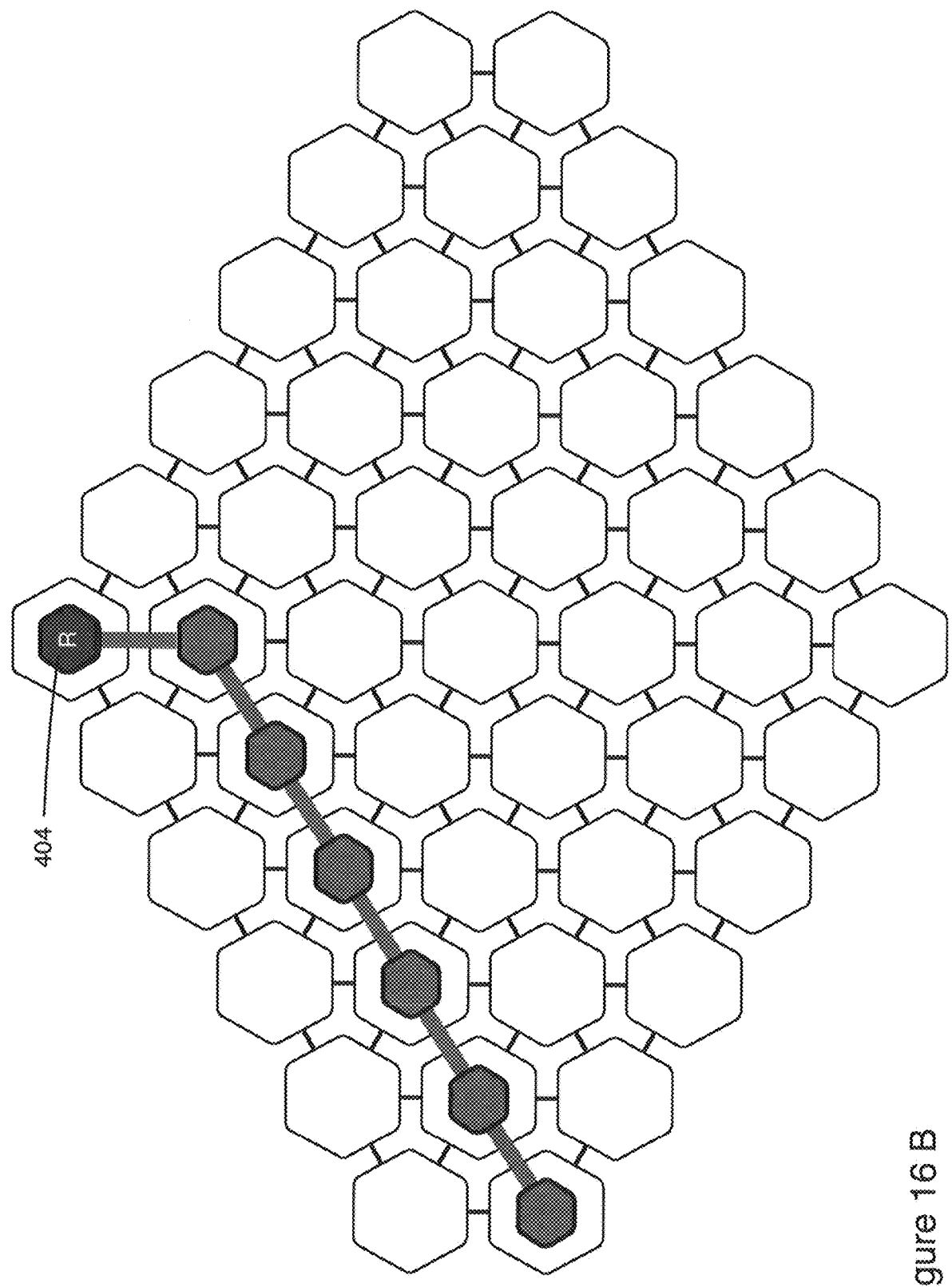
Figure 16:
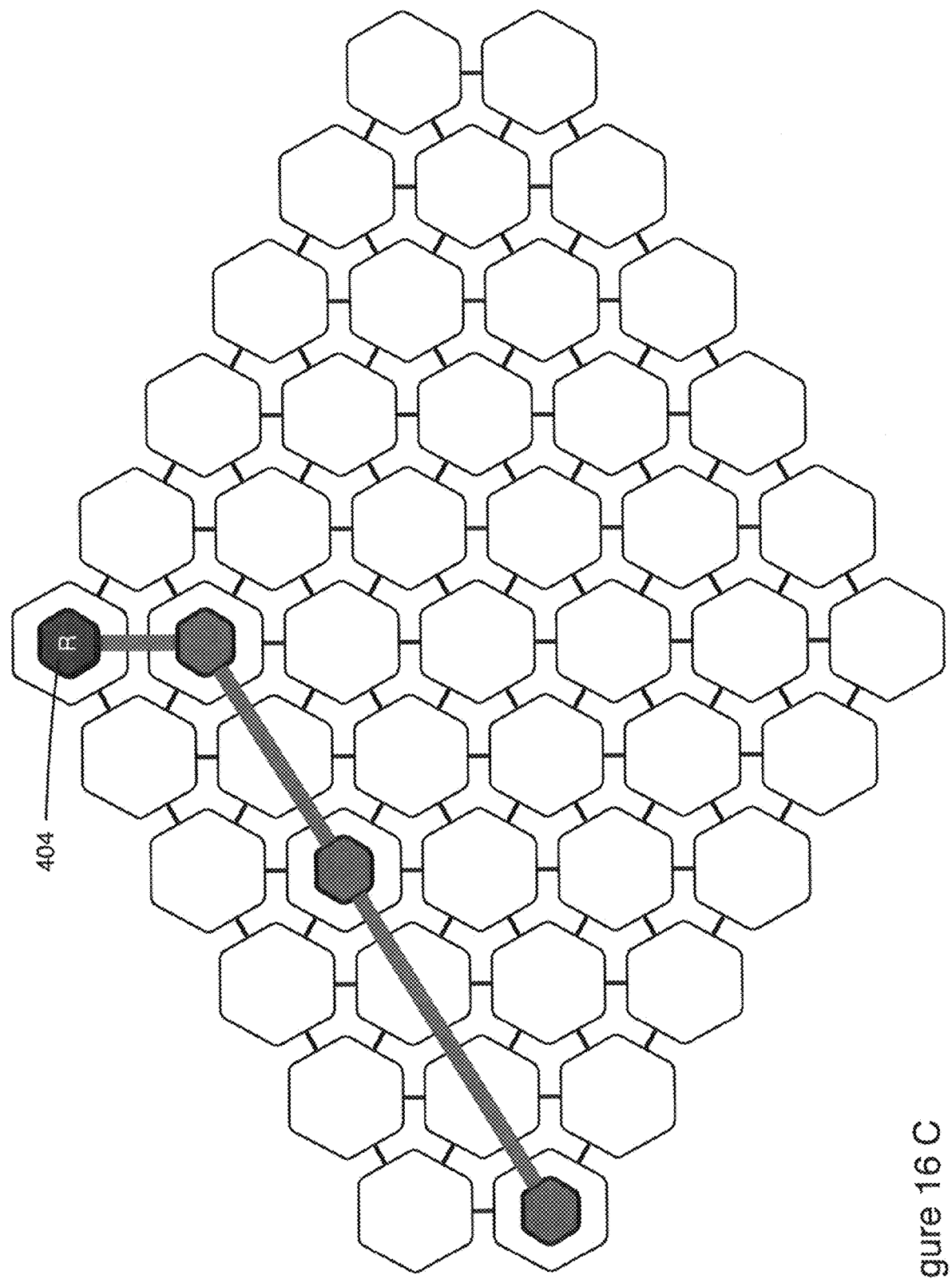
Figure 16:
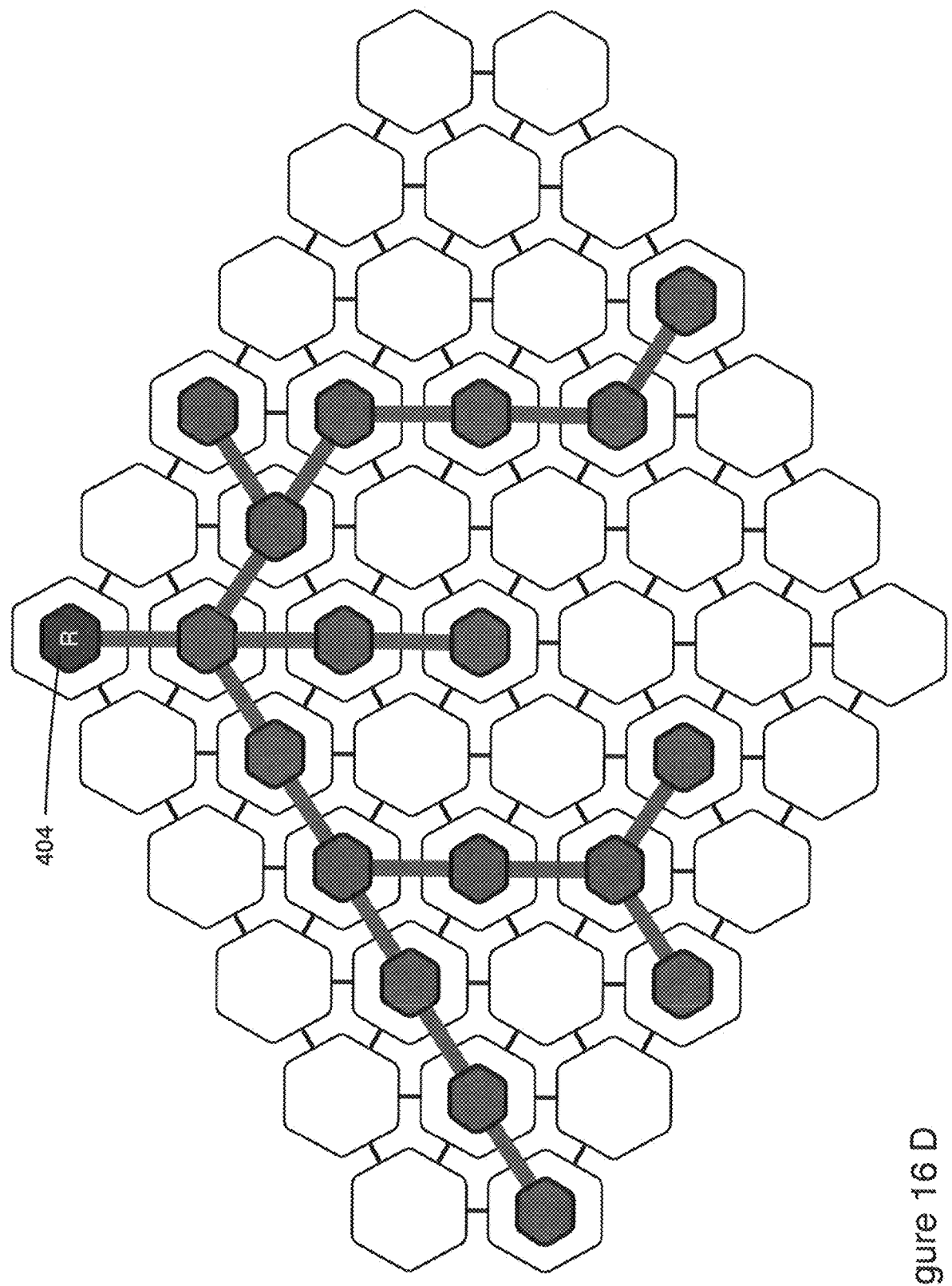
Figure 16:
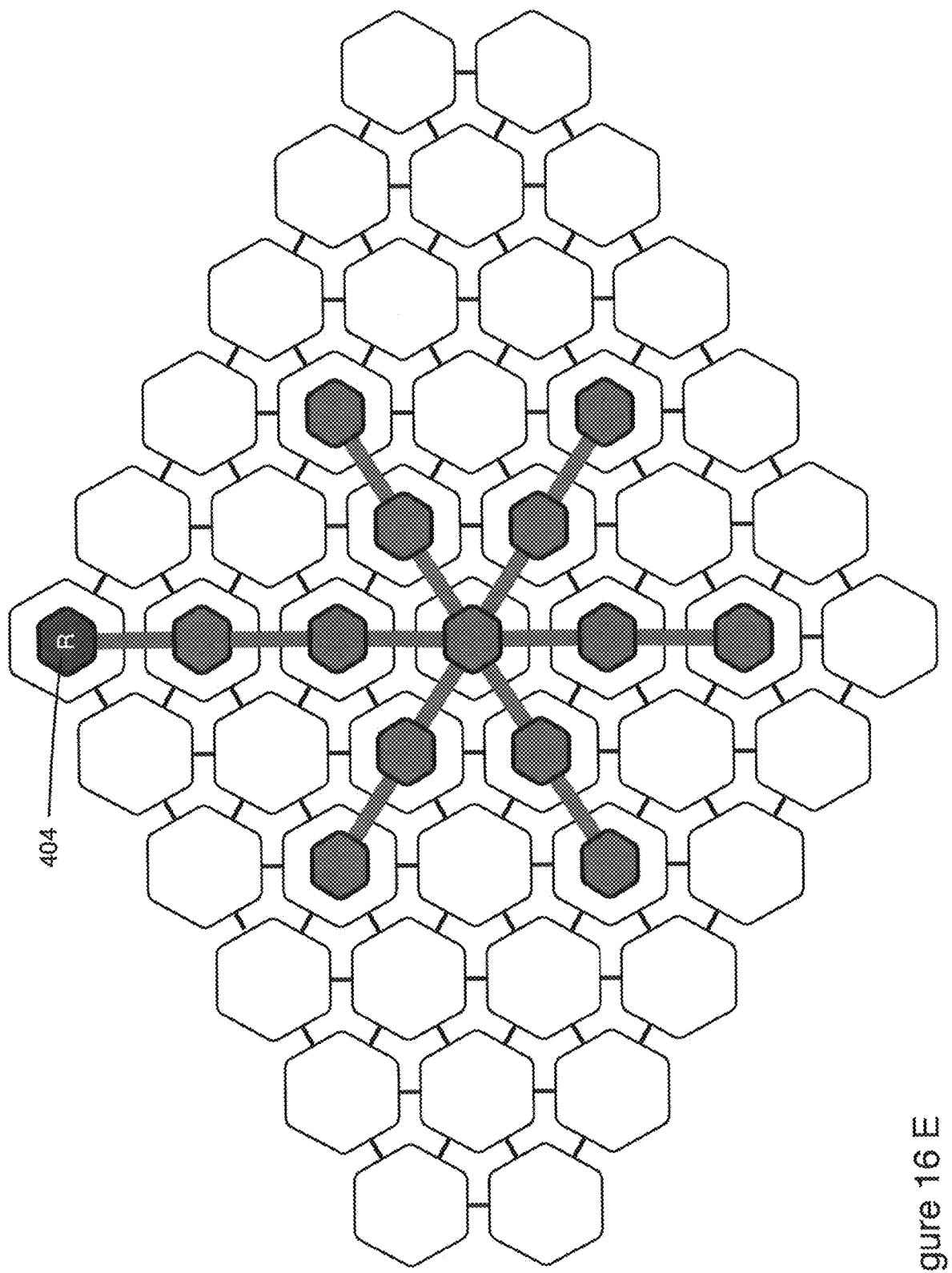
Figure 16:
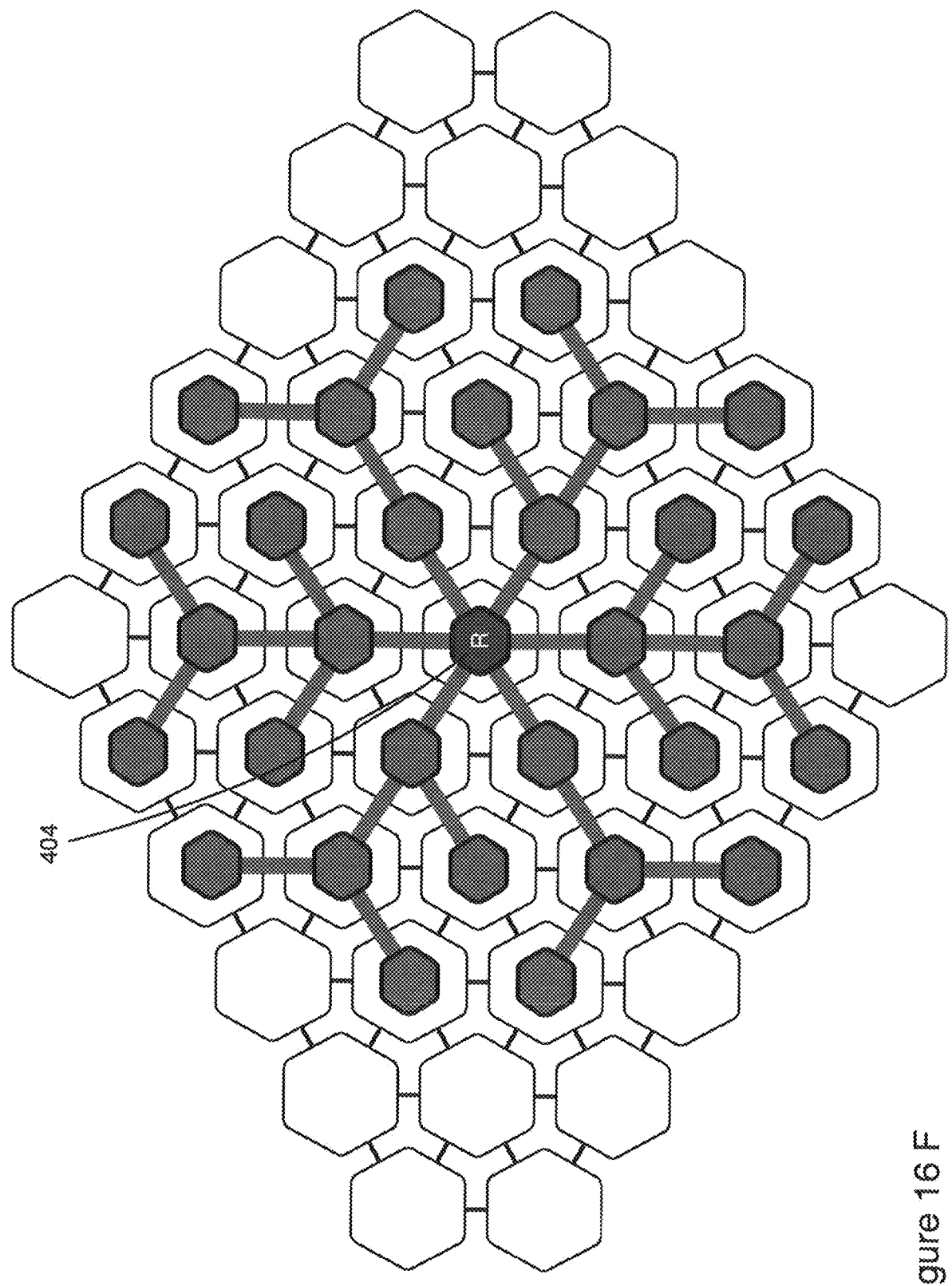
Figure 16:
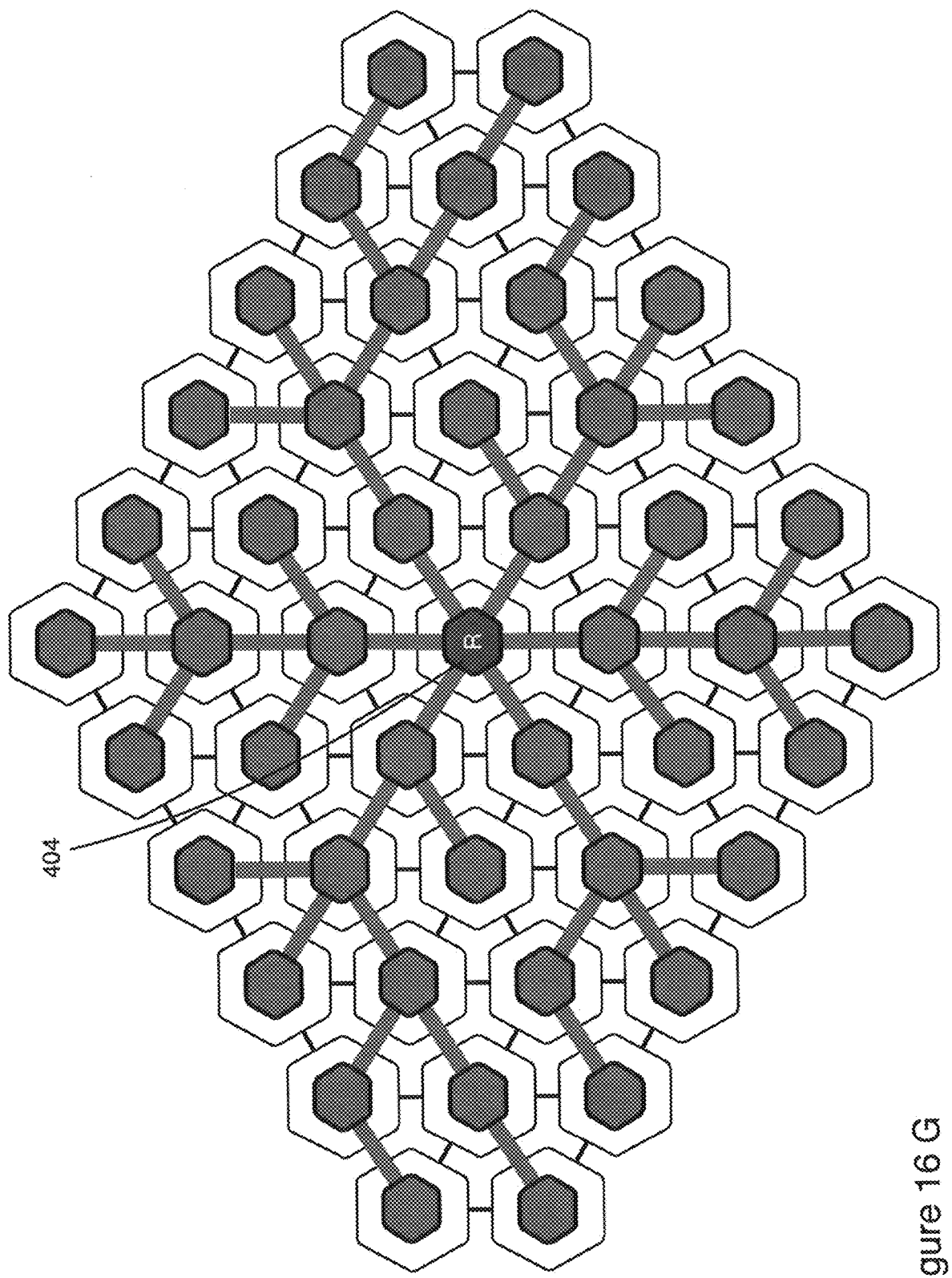
Figure 16:
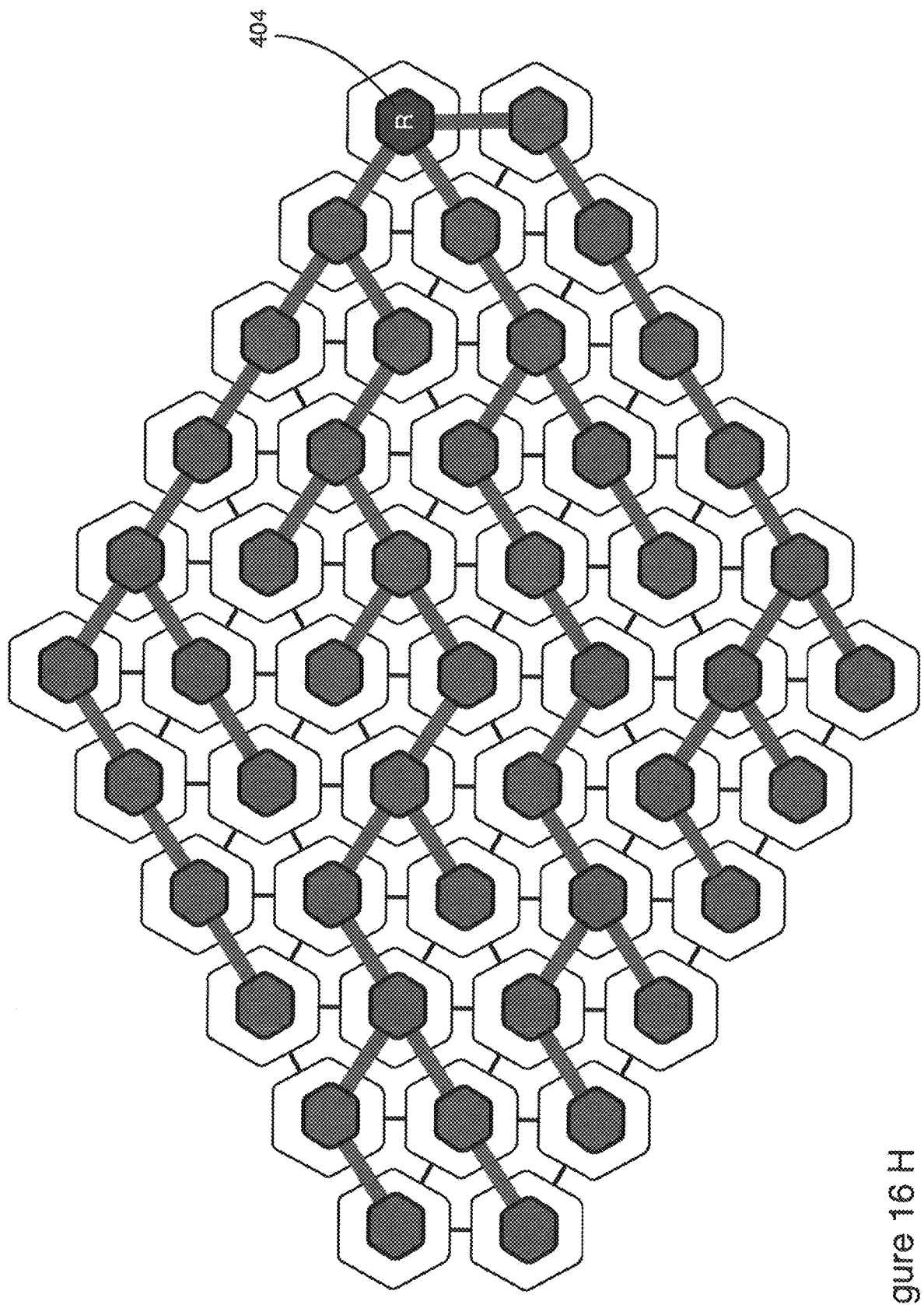
Figure 16:
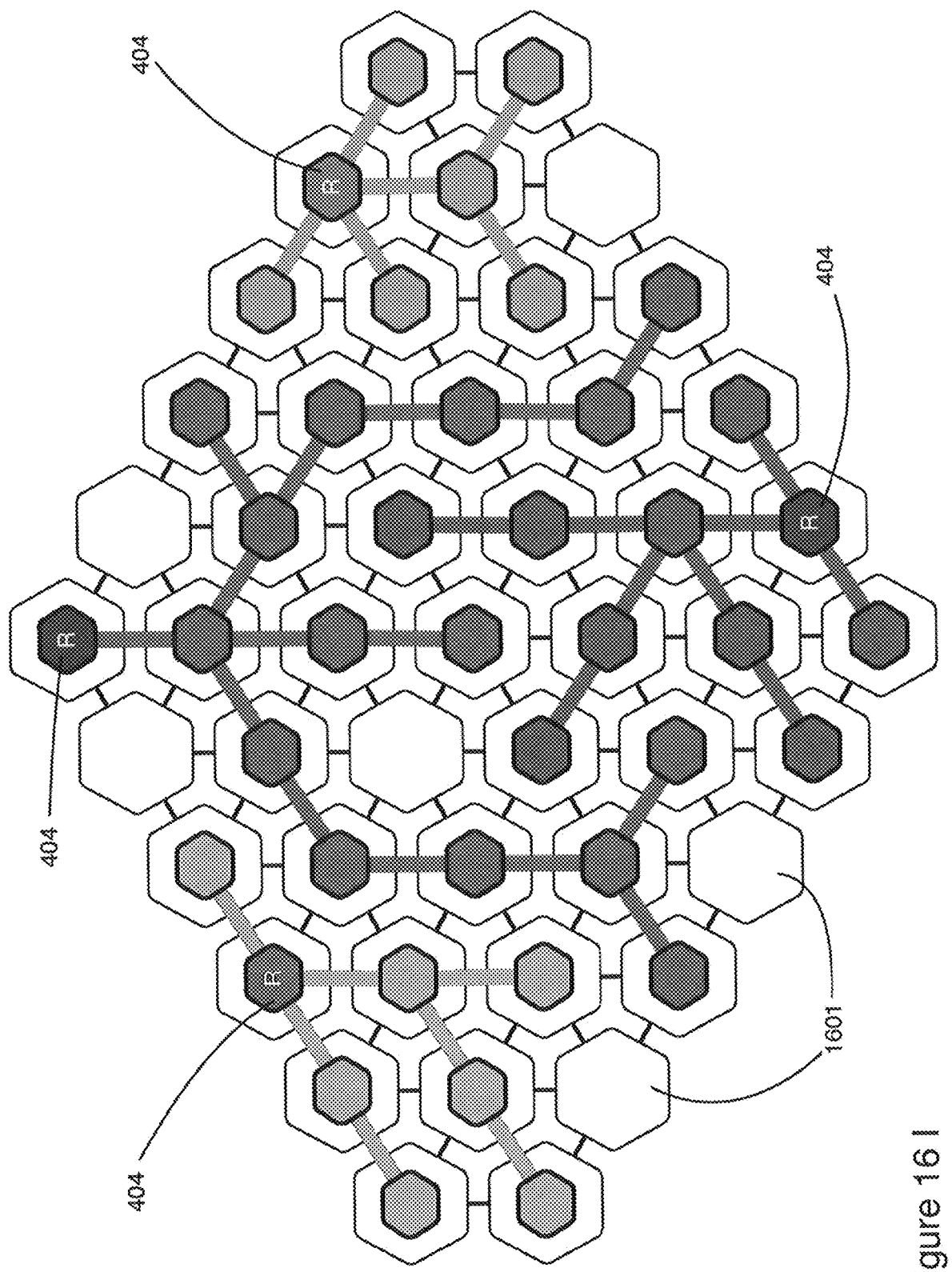

More specifically, FIG. 16A is an example of individual independent entanglement links that are independent of one another in the same infrastructure or plex. FIG. 16B is a block diagram of an example of a chained entanglement links. FIG. 16C is a block diagram of an example of skip entanglement links where intermediate cells will forward packets on the tree, but not participate in operations applied to data associated with that tree. FIGS. 16D and 16E are a block diagrams an example trees of entanglement links. FIG. 16F is a diagram of an example of a snowflake of entanglement links. FIG. 16G is a diagram of an example of multiple overlaid trees routed on a center cell. FIG. 16H is a diagram of an example of multiple overlaid trees routed on a right cell. It should be appreciated that in a clique of n cells, there may be n full spanning trees, each considered to be coexisting but functionally independent of each other (only two of which are shown on FIGS. 16G and 16H. FIG. 16I is a diagram of an example of multiple independent trees of entanglement links, with each tree spanning only a small (non-overlapping) portion of the cells in the clique.

Entangled Trees may span part or all of a clique. Cells connected by links (black connections between cells) may be dormant. When trees are built all links on the tree move into the entangled state (shown by overlaid red lines between cell agents). Entangled transactions may be communicated with higher order entangled transaction packets (piggybacked on entanglement packet or otherwise) from one point on the tree to another. The tree provides a locally repairable, acyclic and deadlock-free topology.

Tree Based Consensus Methods

Pease, Shostak and Lamport showed that the problem of reaching agreement in the presence of byzantine faults is solvable for, $p \geq 3f+1$ where f is the number of faulty processors and p the total number of processors. They also showed that if faulty processors can refuse to pass on information but cannot falsely relay information, the problem is solvable for arbitrary $p \geq f \geq 0$. The weaker assumption can be achieved in practice by using cryptographic methods.

While they proved that consensus can be solved in synchronous distributed systems despite Byzantine failures of less than one third of the processes, it cannot be solved deterministically in asynchronous systems with even a single unexpected process failure. Solutions to this problem require extensions to the model, such as failure detectors (timeouts), and randomized approaches. The ENTL invention eliminates the need for failure detectors (timeouts), and presents a new perspective on the notion of liveness in distributed computing systems.

There are at least three specific benefits of this invention in supporting distributed computations:

Resources (and topology) are unknown before the computation begins, and may vary throughout the computation as new nodes join and other nodes leave, either because they have failed or the link to them has failed. See tree building on extensible infrastructure in a previous section.

Each node is limited in the number of direct relationships it may have with immediate neighbors (a Degree Constrained Graph or DCG).

Relationships with nearest neighbors is maintained by underlying mechanisms which characterize the temporal intimacy (latency), reliability (packet loss), and capacity (bandwidth), etc. ENTL is a much simpler and more reliable method of maintaining presence (liveness) between computer systems.

Agreement

The detection of process failures is a crucial problem system designers have to cope with in order to build fault-tolerant distributed platforms. Unfortunately, it is impossible (in conventional switched networks) to distinguish with certainty a crashed process from a very slow process in a purely asynchronous distributed system. The history of this problem in the consensus literature has become quite complex. This invention addresses this problem by identifying two distinct entities in a distributed system: cells (which accommodate processes) and links (channels for repeatable and reversible communication). In a somewhat unusual step, we make the links a first-class citizen and require that they be treated as a single, encapsulated, autonomous entity, which can be named, manipulated, assigned properties, and reasoned about mathematically. Links have an identity (defined independently, and by the cell identities on both sides), individuality (unique and distinct in the network), and are able to make promises to the cell agents they discover and interact with.

We do not ignore the practical difficulty of making a bipartite link (comprising computational sub-elements in two computers, and the cables and electrical signaling in between). Indeed, we recognize the fundamental property of the link as having various degrees of temporal intimacy, instead of a simple notion of TRUE or FALSE in a property called connected. Other aspects of the link state include temporal intimacy {Connected, Not connected, Reestablishing connection, Uninitialized} as well as promise states {Kept, Not-Kept, Repaired, Uninitialized}.

Instead of having two cell agents on different computers address each other directly, we require them to interface to the link only (the channel between them). In this way, we can establish and manipulate the various properties and nature of the link quite differently to the way we manage and manipulate the various properties of the cell agents (processes), using, for example, λ-calculus, π-calculus or CSP. The limitation of λ-calculus, is that it is limited to a Turing machine, reflected in the concept of remote procedure calls (which unfortunately abstract away the latency and failure model of a distributed computation). The limitation of π-calculus is that the notion of a channel is ambiguous, incorporating any communication path between endpoints. The limitation of CSP is that its notion of a channel includes any arbitrary observer of the state change (multiple endpoints), which fails to recognize that entangled links are necessarily bipartite (between only two entities—where equivalent or conserved quantities must be exchanged).

Faulty processors can refuse to pass on information but cannot falsely relay information. In this invention, we use the tree with a skip list to enable cells on the same branch of a tree to communicate with each other privately, through one or more untrusted intermediate cells.

The problem addressed by the original Pease, Shostak and Lamport paper on consensus concerns a set of isolated processors, some unknown subset of which may be faulty, that communicate only by means of two-party messages. Each nonfaulty processor has a private value of information that must be communicated to each nonfaulty processor. Nonfaulty processors always communicate honestly, whereas faulty processors may lie. The problem is to devise an algorithm in which processors communicate their own values and relay values received from others that allows each nonfaulty processor to infer information (a value) for each other processor. The value inferred for a nonfaulty processor must be that processor's private value, and the value inferred for a faulty one must be consistent with the corresponding value inferred by each other nonfaulty processor.

Model of Time

In the model described in this invention, observable time is change: which passes only by a relative, persistent and reversible transfer of information between elements:

By change, we mean a potentially reversible transfer of information (happen).

By relative, we mean from the specific locality of the observation (the self-cell).

By persistent, we mean, it did not change back (unhappen) after bring observed.

By observable, we mean that until information is irreversibly transferred to a third party, as far as other observers observing the observer are concerned, it has not yet occurred.

The cells & links model of this invention provides for only two kinds of temporal awareness: the temporal awareness inside the cells, which we typically associate with a process and a sequential, monotonically increasing clock; and the temporal awareness of the links (which we elevate to a first-class citizen in this invention), and associate with it the transfer of information. A key distinction between our model and that typically assumed in the computer science literature, is that both of these sub-models of time can literally go forwards and backwards indefinitely by the reversible transfer of information along the links, until this information is irreversibly transferred to other observer(s) along the links, or erased in the cells (dissipating energy).

never existed at all. This is the foundational issue for data consistency, which we address in this invention.

Information can also be circulated throughout the graph, without being lost or erased, and observers tapping into this cycle of information can relay that information to other observers bringing ever larger number of edges and vertices into the entanglement. This is the basis for entangled trees.

Implications

Consensus is the process of achieving robust agreements in a pre-defined group of processes, taking account of all available inputs, and in the presence of arbitrary failures and byzantine behavior of the process members. This invention exploits the presence management and reversible aspects of the entangled links (for a connected state more reliable than that afforded by heartbeats and timeouts), and the information conservation properties bypasses some of the limitations of conventional consensus algorithms.

Figure 17:
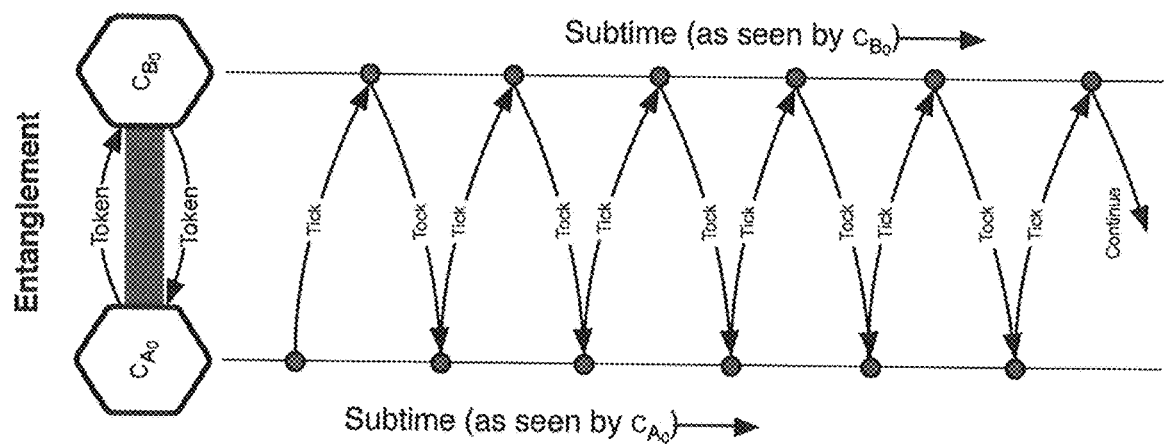
FIG. 17A is a subtime sequence diagram for an example token transfer for entanglement between of cells.
FIG. 17B is a sequence diagram for an example token transfer for entanglement between of cells including witness cells.
Figure 17:
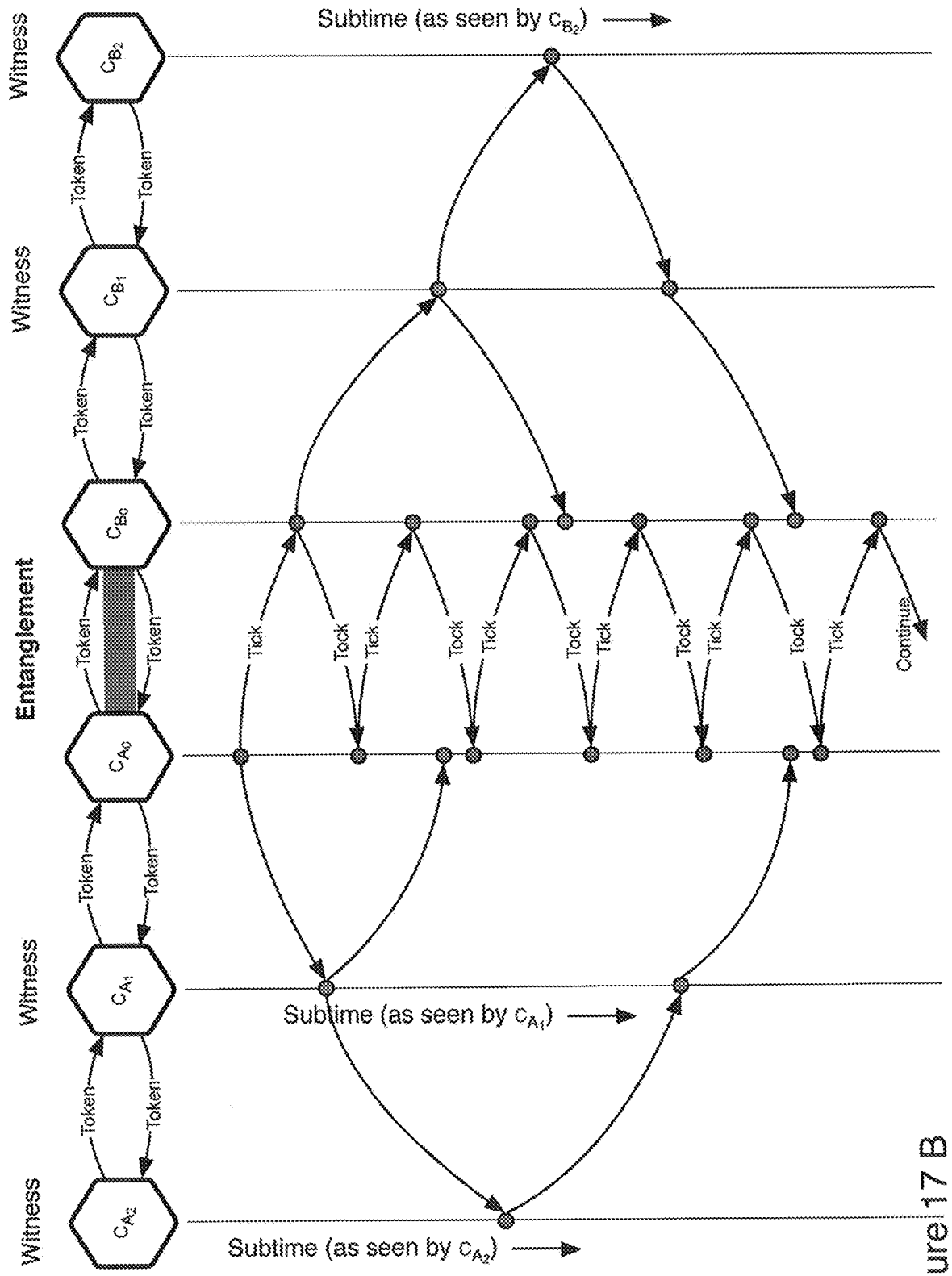

FIG. 17A shows the LOV behavior on the link when entanglement is in process (the subtime view).

FIG. 17B is a sequence diagram for an example token transfer for entanglement between of cells including witness cells. FIG. 17B is a "hypothetical" GEV perspective of the packets which foliate the entanglement when entangled transactions take place. It is important to realize that, by definition, this kind of global observability shows only the partial order taken by the paths with an assumption of a smooth, monotonic and irreversible background of time. I.e., any local reversals of information flow that were reversed will not show up in the final record. Furthermore, the more witnesses that an entangled transaction has, the less likely it will be to reverse to a prior state. Witnesses therefore create persistence and immutability of the state record.

ENABLEMENT EXAMPLE

TABLE 7

Example Entangled Link Mode Tick Tock (two state/phase sequence)

| A Initial Packet | B Transform | AB $2^{nd}$ Packet | ABB $3^{rd}$ Packet | ABBB $4^{th}$ Packet | ABBBB $5^{th}$ Packet | ABBBBB $6^{th}$ Packet | ABBBBBB $7^{th}$ Packet | ABBBBBBB $8^{th}$ Packet |
|---|---|---|---|---|---|---|---|---|
| 0 | 1 | 0 | −1 | 1 | 0 | 0 | −1 | 1 | 0 | 0 | −1 | 1 | 0 | 0 | −1 | 1 | 0 |
| 1 | 0 | 1 | 0 | 0 | −1 | 1 | 0 | 0 | −1 | 1 | 0 | 0 | −1 | 1 | 0 | 0 | −1 |
| Tr0 | Det0 | Tr0 | Det0 | Tr0 | Det0 | Tr0 | Det0 | Tr0 | Det0 | Tr0 | Det0 | Tr0 | Det0 | Tr0 | Det0 | Tr0 | Det0 |
| 0 | −1 | 0 | 1 | 0 | −1 | 0 | 1 | 0 | −1 | 0 | 1 | 0 | −1 | 0 | 1 | 0 | −1 |

TABLE 8

Second Example Entangled Link Mode Tick Tock (four state/phase sequence)

| A Initial Packet | B Transform | AB $2^{nd}$ Packet | ABB $3^{rd}$ Packet | ABBB $4^{th}$ Packet | ABBBB $5^{th}$ Packet | ABBBBB $6^{th}$ Packet | ABBBBBB $7^{th}$ Packet | ABBBBBBB $8^{th}$ Packet |
|---|---|---|---|---|---|---|---|---|
| 0 | 1 | 0 | 1 | 1 | 0 | 0 | −1 | −1 | 0 | 0 | 1 | 1 | 0 | 0 | −1 | −1 | 0 |
| −1 | 0 | 1 | 0 | 0 | −1 | −1 | 0 | 0 | 1 | 1 | 0 | 0 | −1 | −1 | 0 | 0 | 1 |
| Tr0 | Det0 | Tr0 | Det0 | Tr0 | Det0 | Tr0 | Det0 | Tr0 | Det0 | Tr0 | Det0 | Tr0 | Det0 | Tr0 | Det0 | Tr0 | Det0 |
| 0 | 1 | 0 | −1 | 0 | −1 | 0 | −1 | 0 | −1 | 0 | −1 | 0 | −1 | 0 | −1 | 0 | −1 |

An important aspect of our model of time, is that it allows the possibility of a somewhat arbitrarily long recursive transfer of information from one observer to another, and as long as it is in a chain or tree (acyclic graph), then information will not be lost or erased, but then all this progress can also be undone, all the way back to some arbitrary point in the past, and any observer outside that chain or graph will be none the wiser, as if whatever happened in the graph Tables (7 and 8) above show examples of an embodiment with bits/packets on the wire expressing a 2×2 matrix. Matrix A (the initial received packet) and Matrix B (the transform—in the receiver on each end of the link). The output (matrix multiply) AB, ABB, ABBB etc. show the series of tick tock packet exchanges of the shared data structure in the time reversibility mode of the entangled link. In this example, the trace of A is 0, while its determinant is −1. This is one way to represent a stable entanglement session. When implemented in software, or hardware in the NIC, it represents a simulation of quantum entanglement. When it is implemented in its full expression, in a completely asynchronous (separate hardware/software timing domain in the NIC's and cables in the link) as a hot potato packet in the link, it more faithfully emulates quantum entanglement. When implemented on optical connections, with polarized single photon emission and detection, actual quantum entanglement may be used as the entangled link reversibility primitive. Note that the determinant of the tick tock matrix packet in this example alternates between +1 and −1, indicating that the link is now representing one bit of information. I.e. a shared quantum state. Note that this tick tock sequence was initiated by the matrix packet A, which has a determinant of −1, i.e. negative information (information it gave up to be shared within the link in its entangled state). Also note that the main diagonal on the initial packet A and the first transformation matrix B both have a trace of 0, implying that no Global observer on either side of the link has visibility into the packet. Finally, if we add Det(A)+Det (B), we should arrive at a net zero of information (indicating a combination of positive, and negative information within the link), but not visible from the outside (GEV).

initial packets (A), symmetric packet transform matrices (matrix B) and asymmetric ($B_1$ and $B_1$) implementations are claimed in this invention.

It should also be appreciated that the 2-phase and 4-phase sequences have different utilities within the entangled link protocol set. We have already identified the 2-phase as useful for simple (timeless) entanglement and the 4-phase sequence as the minimum necessary to support reversible transactions.

Figure 21:
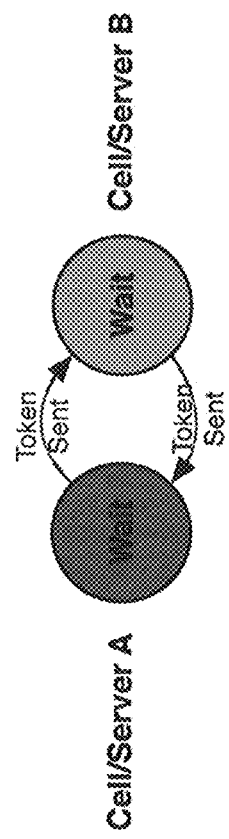
FIGS. 21A-21F are state diagrams for token transfer between cells coupled by an entangled link.
Figure 21:
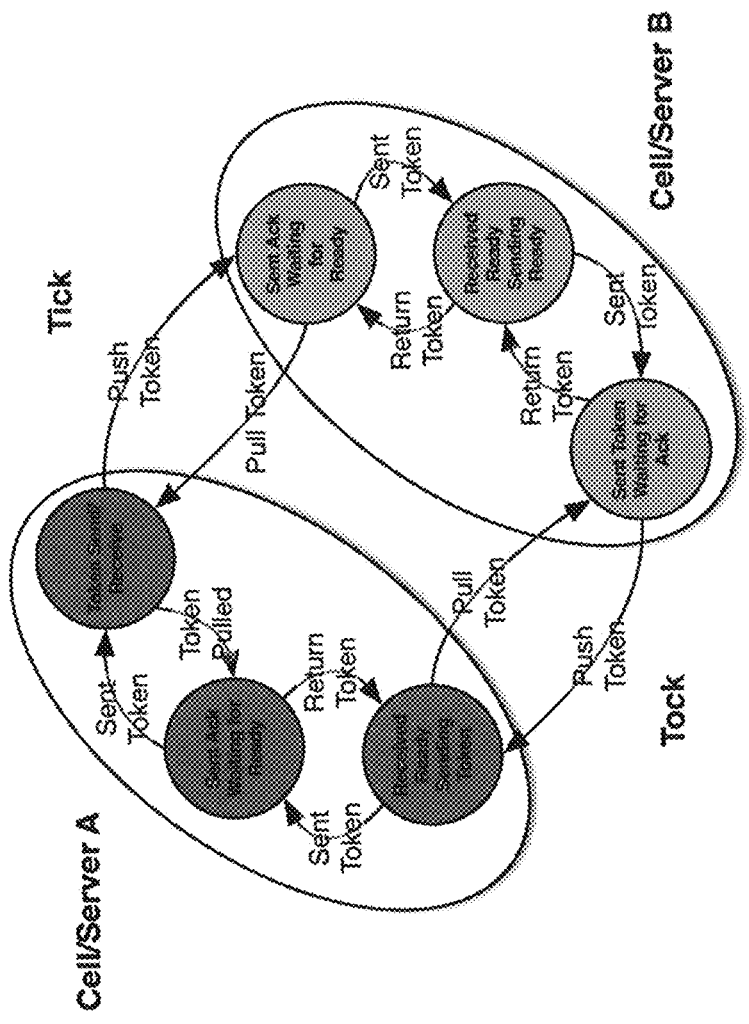
Figure 21:
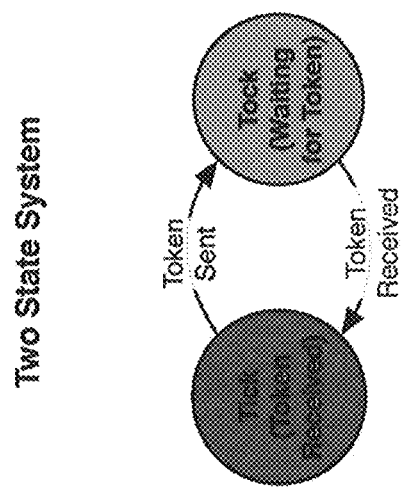
Figure 21:
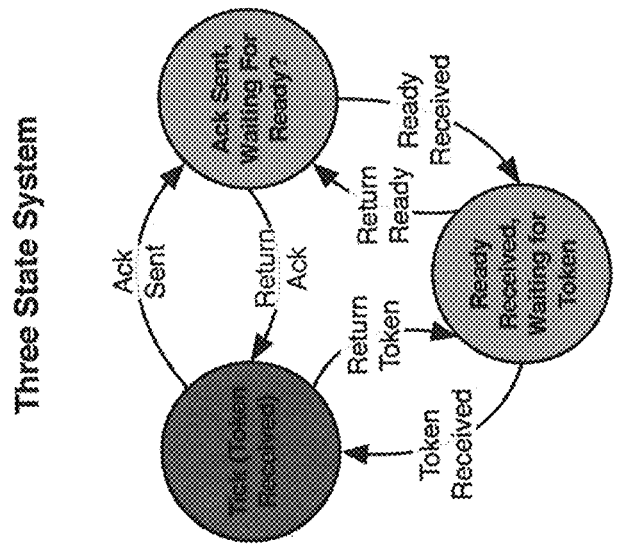
Figure 21:
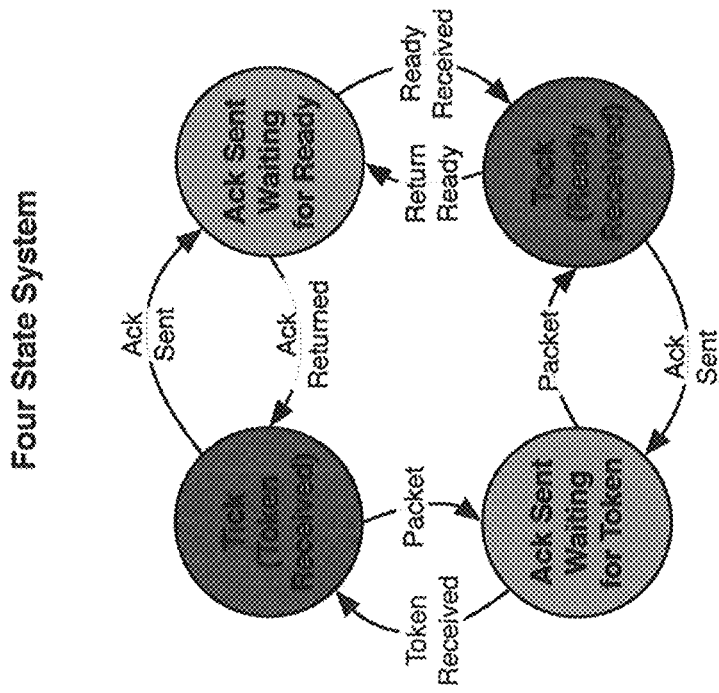
Figure 21:
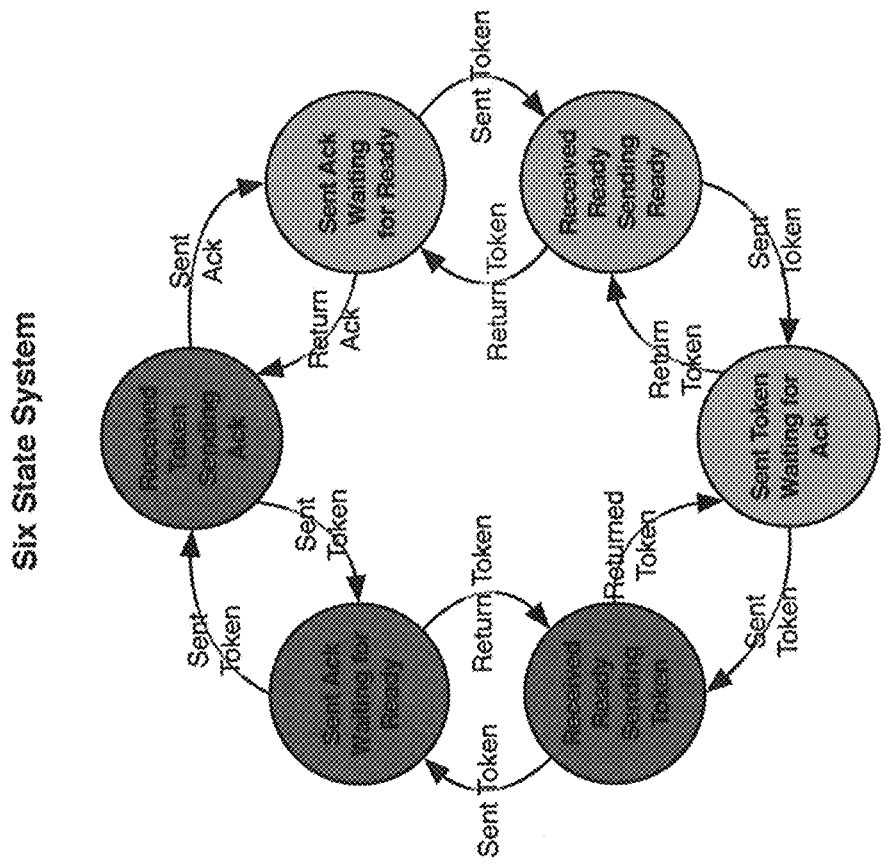

Alternative descriptions of the 2-phase, 4-phase sequences can be seen in FIG. 21 A-F, which show a more conventional computer science state machine description. 6-phase and higher sequences may be used for additional application-specific functions. Non-repeating sequences are also claimed for any combination of the input packet (A), first transform ($B_1$), and second transform ($B_2$). i.e., the cellular automata resulting from these combinations may be arbitrarily long and complex (rich).

From these descriptions, it should be clear that a main distinction of entangled links (ENTL) is that they are a single symmetric state machine, not a classical replicated state machine (RSM), where one side must be the master and the other is the slave. ENTL contains the physical connecting media as well as the NIC and software, in an independent

TABLE 9

Third Example Entangled Link Mode Tick Tock (four state/phase sequence)

| A Initial Packet | | B Transform | | AB 2$^{nd}$ Packet | | ABB 3$^{rd}$ Packet | | ABBB 4$^{th}$ Packet | | ABBBB 5$^{th}$ Packet | | ABBBBB 6$^{th}$ Packet | | ABBBBBB 7$^{th}$ Packet | | ABBBBBBB 8$^{th}$ Packet | |
|---|---|---|---|---|---|---|---|---|---|---|---|---|---|---|---|---|---|
| 0 | i | −i | 0 | 0 | −1 | 0 | i | 0 | 1 | 0 | −i | 0 | −1 | 0 | i | 0 | 1 |
| −i | 0 | 0 | i | −1 | 0 | −i | 0 | 1 | 0 | i | 0 | −1 | 0 | −i | 0 | 1 | 0 |
| Tr0 | Det0 | Tr0 | Det0 | Tr0 | Det0 | Tr0 | Det0 | Tr0 | Det0 | Tr0 | Det0 | Tr0 | Det0 | Tr0 | Det0 | Tr0 | Det0 |
| 0 | 1 | 0 | 1 | 0 | −1 | 0 | 1 | 0 | −1 | 0 | 1 | 0 | −1 | 0 | 1 | 0 | −1 |

TABLE 10

Forth Example Entangled Link Mode Tick Tock (four state/phase sequence)

| A Initial Packet | | B Transform | | AB 2$^{nd}$ Packet | | ABB 3$^{rd}$ Packet | | ABBB 4$^{th}$ Packet | | ABBBB 5$^{th}$ Packet | | ABBBBB 6$^{th}$ Packet | | ABBBBBB 7$^{th}$ Packet | | ABBBBBBB 8$^{th}$ Packet | |
|---|---|---|---|---|---|---|---|---|---|---|---|---|---|---|---|---|---|
| i | 0 | −i | 0 | 1 | 0 | −i | 0 | −1 | 0 | i | 0 | 1 | 0 | −i | 0 | −1 | 0 |
| 0 | −i | 0 | i | 0 | 1 | 0 | i | 0 | −1 | 0 | −i | 0 | 1 | 0 | i | 0 | −1 |
| Tr0 | Det0 | Tr0 | Det0 | Tr0 | Det0 | Tr0 | Det0 | Tr0 | Det0 | Tr0 | Det0 | Tr0 | Det0 | Tr0 | Det0 | Tr0 | Det0 |
| 0 | 1 | 0 | 1 | 2 | 1 | 0 | 1 | −1 | 1 | 0 | 1 | 2 | 1 | 0 | 1 | −2 | 1 |

Tables 9 and 10 show examples, with a four-state repeating sequence, using an example where the symbol $i=\sqrt{-1}$ (the imaginary unit) appears in entries in both the input packet matrix A and the transform matrix B. The traces of A and B are 0 (−i+i), and both determinants are 1.

It should be appreciated that there are many different initial starting conditions (matrix A) and transforms on each end of the link (matrix B), which will result in useful repeating (or non-repeating) sequences of ticks and tocks such as the 2-phase sequence shown in Table 7, the 4-phase sequence in Table 8 and Table 9. Entanglement may be interrupted by one side or the other changing the transform matrix applied to the incoming packet, for example, to initiate some other reversible link function, such as Atomic Information Transfer (AIT) or some other application desired function. The transforms on both sides of the link may also be asymmetric as they will be at least during transitions, in which case all combinations of symbols, timing domain. If the packet is lost, the state machine stops. This makes Entangled Links exquisitely sensitive to packet loss (which is the intent).

From these descriptions, it should be clear that a main distinction of entangled links (ENTL) is that they are a single symmetric state machine, not a classical replicated state machine (RSM), where one side must be the master and the other is the slave. ENTL contains the physical connecting media as well as the NIC and software, in an independent timing domain. If the packet is lost, the state machine stops. This makes Entangled Links exquisitely sensitive to packet loss (which is the intent).

A use of the invention is where the set of entangled links are assembled by tree-building algorithms into a substrate (graph topology of links and cells), which may be used from the set of trees spanning every cell in the clique, such that any one tree may use its acyclic topology to dynamically determine the ordering of events by packets spanning the set, or some subset (graph cover) of the tree rooted at any chosen cell. Because each link is individually reversible, in a very simple and highly reliable manner, the AIT tokens within this link may be used for several higher-level functions, especially the recovery of the link, or an entire tree (or a subset thereof), after perturbations (failures, disasters, attacks). As a recoverable entity (e.g., going around the failed link and repairing the graph with a new acyclic structure), this affords a mechanism that does not require cross-network heartbeats to detect a vague notion of 'network partition'. Instead, this recoverable entity is locally reachable and repairable and not subject to the common mode failures of many node/link communications as experienced by conventional server/network architectures.

The invention works best when all the links in the computer system have the capability of being entangled. One way to do this would be to have each computer have a valency (number of connection ports) equal to the number of neighbors it can directly connect to without going through switches or routers. Another way is to simply assume that switches and routers are also cells with the same low-level entanglement capabilities (mechanisms and software) contained in the cells.

The ultimate solution would be to define a cell to contain the agents and mechanisms described above, with each port able to create and maintain entangled links with their neighbors, as in FIG. 7B. This equivalence can be seen by recognizing that switches/routers and computers are all 'cells'. Note that one may then consider a switch/router to be a wimpy server, and a server to be a wimpy switch/router.

An important benefit of this arrangement (eliminating the distinction between computers and switches/routers) would be to ensure that packets are not dropped arbitrarily, as they are in current networking systems, and that token preservation is promoted to a first-class principle in the presence of perturbations (failures, disasters, attacks).

The most important benefit of this generalized arrangement of cells and links is to provide the foundation on top of which to create a network automaton, which is similar to a cellular automaton, but with communication going over arbitrary long links and a potentially evolving topology.

For use in the preferred embodiment: more confined sets of claims, where cells (hardware) are directly connected by links (not through switches or routers), and can benefit the most from these environments.

FIG. 18A is a block diagram of an example token transfers with no order.

FIG. 18B is a block diagram of an example token transfers with order in the entangled chain.

FIG. 18C is a block diagram of an example token transfers with a serialization focus.

Hardware Support for Network Assisted Transactions

A transaction is a transformation of state which has the properties of atomicity (all or nothing), consistency (a correct transformation), indivisibility (serializability) and durability (effects survive failures). The transaction concept is key to the structuring of data management applications. The concept has applicability to programming systems in general, and not just databases. However, full ACID-compliant transactions are often considered "too expensive" for anything but the most mission critical aspects of IT infrastructures. If transactions were "cheap" i.e., used very few CPU resources, they could be used much more pervasively throughout an IT infrastructure to provide a reliable foundation on which data can be more safely modified and more reliably retained.

Network assisted transactions use Entangled Links (ENTL) to maintain constant preparedness for "atomic information transfer". Entanglement (NUL) packets are replaced by an"Atomic Information Transfer" (AIT) packet when a program in the upper layers in the Earth Computing architecture wishes to use the transaction service as a replacement for or supplement to the normal two-phase commit or paxos protocols used to provide ACID transactions in the application layer.

There are two essential properties of atomic information transfer which may benefit from a combination of hardware or firmware assistance:

Maintenance of Atomicity: I.e., complete delivery or complete non-delivery of packets between two entities. The simplicity of the entanglement and AIT packets enables a simple mechanism in the hardware to provide guarantees for this atomicity. For example, in the case of tom packets (when connections are broken) and corrupted packets (in the case of interference). This mechanism is especially important in the case where real quantum devices are used for entanglement to replace the "emulated" version described here and in prior disclosures.

Conservation of Tokens: In entanglement, a single semantic-free token is maintained in the system (i.e., only one token exists at a time, which oscillates from traveling in one direction and then the other). In multiple entanglements, two or more tokens may exist in the bipartite relationship, and any of the tokens may be used as a trigger to test for the liveness of other entanglements. This provides for rapid recovery in the case of lost or tom packets in an individual bipartite entanglement.

Buffering of Tokens or Transaction Data: One of the simplest ways to support the durability of transactions is to (as fast as possible) share critical data in an independent failure domain. In traditional systems, logs are used because they can write sequentially to a device. However, in an Earth Computing (EC) environment, it may be orders of magnitude faster to share the data on both sides of a link until the upper layers of the computing system or application have had a chance to invoke its own durability measures, which may mean, for example, writing to a Non-Volatile memory of SSD. Networks and NIC's are much faster than waiting for the traffic to percolate up the virtualization layers, protocol stacks and cache hierarchy of an executing application.

Direct Support for Serialization Foci. Serializing transactions in the main memory of multiple computers (including a transaction manager) can be profoundly slower than exchanging packets directly between NIC's.

All of these above properties are sufficiently simple in their operation in the NIC that they could be effectively maintained by the hardware. Many different implementations may be possible in standard logic with the need only for a simple state machine in the case of "normal" failures that can be automatically restored. Only in the case of unusual failures may it be necessary to hand over to the NIC firmware to process more sophisticated state machines, and only in the case of extreme failures may it be necessary to invoke software to handle a failure that is not covered by the hardware or firmware capabilities for automatic recovery.

Another important embodiment of hardware support in the NIC is a potentially completely asynchronous implementation, e.g., an event-based asynchronous logic which is initiated by an incoming packet and quiesced by the completion of the outgoing packet. Such an implementation would enable the maximum performance and "transaction readiness" benefits of the entanglement method by maintaining its temporal independence of the digital clocks in the CPU's on both sides of the link. A completely asynchronous implementation allows the system to become a "free running" oscillator: free of all unnecessary synchronization boundaries and their associated time delays on both ends. The link agent will therefore be truly an "independent computational entity", autonomous and independent of other software entities in the computers on each end, forming its own timing domain; executing the link agent completely independent of the cell agents (which may also be autonomous and in their separate and independent timing domains on both sides of the link).

Hardware Support for Reliable Replication

Replication (copying and migration of data structures across a link) is a function carried out on behalf of the Data Asset Layer (DAL), the layer above the Network Asset Layer. Reliable replication may build on the atomic information transfer capability (the ability to maintain idempotent semantics in the face of perturbations) as described above. Replication may be supported by the priority queue engine (PQE) as described below and shown in FIG. 23. Because it is desirable to transfer entire data structures (or some simply defined subset) in a consistent way, hardware mechanisms may be useful to ensure the reliable transfer of integer multiples of those segments in order to support larger data structures.

This is similar in concept to the notion of an offload engine (a popular method of improving the performance of networks) by using hardware assist techniques (and indeed, many of the implementation techniques used there may be used here), but with one important distinction: the maintenance of "entangled clones" of data structures on both sides of a link; i.e., this is not simply a "copy" from some "master" on one side of the link to a "slave" on the other side of the link. Mechanisms on both sides (up to and including the IOMMU on each side of the link) may be used to detect and trigger synchronization updates to the opposite side. The entanglement mechanism preserves the "serialization" foci to alternately offer one side or the other a chance to orderly update from one clone of the data structure or the other and to detect "collisions" where the data structure may be attempted to be updated from both sides at the same time (collision detection is guaranteed by the acyclic nature of entangled trees).

An important distinction exists between what is described above (entangled data structures) and RDMA (remote DMA). Remote DMA is a master-slave arrangement, with one side being statically assigned a role of master and the other side statically assigned the role of slave. The concept in RDMA is that one side is "writing into the memory" of the other side. The entangled data structures approach in this replication technique allows the symmetric synchronization of data from one side to another, with alternating turns being offered by the current direction of the entanglement token.

The Priority Queue Engine (PQE) description below describes various data sizes in binary multiples, which may be supported by the hardware-assisted replication function (see FIG. 23). The smallest size (<4K) is typically used for the entanglement protocol and may also be used to carry additional information regarding the integrity of the entangled tree to maintain Structural Temporal Integrity (STI) as described previously (note that the minimum size of an entanglement packet is the smallest number of bits to encapsulate the atomic token for the qubit) the rest of the packet may be used, for example, to piggyback instrumentation or obfuscate the packet cryptographically. The next smallest size (8K) is designed to fit within a standard Ethernet Jumbo packet; corresponding with what we anticipate being the largest reasonable atomic data structure supportable by the atomic information transfer mechanism. It is intended that the replication mechanism be used to implement the transfer of n contiguous (in physical or virtual memory) atomic segments of 8K. This is because hardware can normally support the detection and resending of torn packets up to this size and that the receiver can detect and discard torn packets even if the link is temporarily or permanently broken.

Hardware Support for Distributed Counting for CQ/EQ Operations

By its simple nature, the entanglement packets are singular entities. The software and hardware mechanisms described above are designed to conserve this singular quantity in each entanglement, or a set of independent singular quantities in multiple entanglement links. However, values expressing other than unity may be carried in each AIT packet: one field in the packet carries the value, another field carries the units. For example, a quantity of $1B (or any other representation of currency) may be carried in the AIT packet. While atomicity may be maintained by the hardware, with appropriate formal methods verifying correctness (i.e., consistency with the CQ/EQ constraint) each packet may carry any integer multiple of unity as a value. We do not anticipate that continuous (i.e., non-discrete) entities will be carried by this mechanism.

While the CQ/EQ constraint may be the relevant conservation operation at the link level, system-wide conservation is monitored and verified at the Computation Asset Layer (CAL) by the MetaData Tensor (MDT) which uses the mathematical techniques of Tensor Networks to manage total system conservation.

Clearly, counting of packets is a trivial use case for this mechanism and simple ratios of packets to Time Stamp Counter (TSC) values provide performance and latency instrumentation.

A further embodiment of this mechanism is the support of arithmetic functions on a named value. For example, a new value is to be added or subtracted from a current value in a cell. This may be used, for example, to keep count of the number of active (or otherwise) replicas on a tree; an important redundancy management mechanism in the Data Asset Layer (DAL). An extension of this embodiment is to provide not only the name of a value to be counted along with the new value that is to be "added" but to provide a "currently expected" value; this serves as an important end to end error check mechanism. A secure version of this may be implemented cryptographically using both the link keys and the cell keys for basic encryption and a data key for the owner of the data.

A further embodiment of this mechanism is the support of Distributed Algebraic Queries. Queries such as: {><, ≥, ≤, =, ≠, ...} may be applied to any named data value (scalar, vector, etc.).

A further embodiment of this mechanism may be used to support queries on any named data object, or set, a full set of linear algebra operations may be applied to a data structure defined as a tensor of any arbitrary rank (see MDT disclosure for further details). Tensor contraction is also an important mechanism for adaptive resource management in all layers of the Earth Computing (EC) architecture.

Hardware Support for Serialization Foci

An important mechanism to support both legacy software and future serialization architectures is the support of serialization foci. A "serialization focus" is a single point in time and space which defines (and persists) the ordering of events. Event ordering is a critical requirement for data consistency and any uncertainty or vagueness in its definition, or undisciplined observance or modification by multiple entities will threaten the consistency of data. However, while it is possible to define event ordering on say a single master—multiple slave architecture, it is not possible to define it (in the same way) on a multiple master environment without guaranteeing that operators are commutative.

The theory of relativity demonstrates that "simultaneity" is relative (i.e., different for different observers) in a distributed system. So a simplistic notion of data coherency (up-to-date-ness) is in conflict with notions of consistency (correct, usable without conflict).

In Earth Computing, a serialization focus may be singular (e.g., a master is statically assigned the serialization focus; therefore, all updates must go through the master) or plural, i.e., any node may update an object, but different tradeoffs may be made for coherency; allowing, for example, stale data to be meaningful, but still correct (readable as a consistent entity, not corrupted). Alternatively, it may be maintained declaratively as "coherent" (up to date as far as possible within the constraints of the speed of light) but controllably inconsistent (different data objects contain the same data, but potentially in a different order). The latter may be achieved in a vector data structure (e.g., file system) by using "append-only" protocols. An example of a use case is error logs, where the logs do not have to be in identical order on different systems, but ultimately contain the same information.

Serialization foci are a generalization of this principle: that two or more serialization points may be defined in a single distributed system, but there is a consistent (commutative) way to update them. In theory, databases have this potential if they are sharded and each shard is on a different node and ACID properties are maintained within each shard. The serialization foci concept and method does not care how it is used, it only provides "promises" regarding its capabilities and expected space/time tradeoffs. An example would be "eventual consistency" which is a belated update mechanism provided under best-effort conditions. There are many other tradeoffs allowed under this mechanism. We anticipate they will be compatible with many current and future (currently unspecified) use cases.

Hardware support for serialization foci build on the notions of hardware support for entanglement and atomic information transfer. The invention is as follows: use the transaction token as "permission to write" to an object. It is similar to a lock, but with the "writing" being contingent on presence of the serialization token on that cell. The integrity and reliability of the atomic mechanism is defined by the hardware assisted mechanisms described above. A further alternative incorporates the mechanisms of "lock-free" or "wait-free" serialization methods, but using the entanglement/token as a pass/fail through the data structure. Such methods may also be used in conjunction with the transactional memory instruction(s) available on modern processors to eliminate the deleterious effects of locks and thread blocking in conventional multithreaded systems.

Hardware Support for Mutual Attestation

An important issue in many "Software Defined" systems is that the functionality of the various mechanisms can much more easily be subverted or redirected for nefarious purposes when they are in software. We therefore highlight a specific aspect of the EC security architecture for which it is critical that it is not software defined. Mutual attestation is the process where the entangled link mechanism (semi-agent) in the cells on both sides of the link either discover each other for the first time, or rediscover each other after some physical (or logical) reconfiguration of the network. We have noted earlier that symmetric key protocols (such as the Needham-Schroeder protocol) should be implemented in hardware. Using this in combination with the techniques described in the disclosures referred to above, which use the essence of the Entangled Link mechanism, to ensure that both sides of the link are constrained by the laws of physics (in particular, the speed of light). Instead of using the current program counter (plus or minus some address distance) to solve some cryptographic problem within a (neighbor specified) time bound as a validation technique, a preferred embodiment would be to use certified hardware to initially establish these links, and to validate that neighbor cells are who they say they are (a particularly important aspect of self-healing of networks).

The preferred embodiment is for initial rendezvous, re-rendezvous, late-historical rendezvous, in combination with entangled links, is therefore that they are implemented in the hardware of the NIC, switch or router, and not in software.

Hardware Support for Failover and Load Balancing

Failover and load balancing are essentially the same logical function. Failover provides routing to a primary destination (or tree) and if an error occurs on the primary destination, then it fails over to a secondary destination (or tree). Load balancing (through algorithms such as round robin or dynamic load sensing) routes packets to a set of possible destinations one at a time, either in some round robin sequence, randomly, or based on some feedback mechanism that is aware of the current load on each target cell. These functions are intrinsic to the Earth Computing Underlay, specifiable by a simple algebraic expression in the GVM (Graph Virtual Machine) language, however hardware support in the switch or router would greatly improve the performance and resolution sensitivity when load balancing is carried out by the network fabric. In the Earth Computing Underlay (ECU) model, the valency (graph degree) of each node is parametrically constrained. This is to force the system into a multi-hop behavior, where complex network structures emerge on top of (overlaid on) the entangled trees, and can be used for self-organization of, for example, data (LFU-MRU chains, etc.). When failures occur, normally there will be a healing function around the cell, and a reconnecting of entangled trees. This function can be made much faster and automatic if carried out in hardware (or dedicated cores per port, as shown in FIG. 7B).

Entangled Transactions

Entangled Transactions (ENTT) are a mechanism to manage exchanged and conserved quantities (EQ/CQ), awareness of time, and recovery from failures in distributed computer systems. They extend the notion of an entangled link between two computers, to a network of computers, where the "temporal awareness" of each link can be used as an element (an architectural brick) which is composed into higher level transactions among an arbitrary number of machines (ENTT), over an arbitrary amount of time (SMPT). Entangled Transactions replace conventional locking, commit coordinators, and two-phase commit protocols which are currently the mainstay of the database and financial services, and e-commerce industry.

Where transactions stall, they jeopardize the consistency of the database. The longer the stall, the greater this hazard becomes. There are three main sources of transaction stalls:

Disk Stalls: are caused by the enormous disparity between CPU speed (ns) and disk speed (ms). In conventional thinking, it would appear to make no sense to allow the CPU to do nothing during the interval while it is waiting for a disk. This is a motivation for multithreading, and because consistency threatening operations can be carried out by different threads on the same CPU, mechanisms for concurrency control were introduced, including locks and latches over the data structures.

Network Stalls: are intrinsic to the nature of networks, which have highly variable latencies (with very long tails—all the way out to infinity for some types of failures) as networks partition and heal. Network stalls are antithetical to the client-server and object-oriented programming paradigms, neither of which account for failure models or latency, both of which they abstract away (without justification) of conventional network setups. Thus they inject a large uncertainty into the reliability of transactions, because packets can be lost, and they incur a large performance penalty because the overhead of detecting such failures is especially costly in latency.

User Stalls: are caused by the client applications attempting to do "higher level" transactions (i.e., several atomic actions at once, in an overall transaction that must (eventually) be ACID, OR two or more elements separated by a user delayed decision, such as a multiple purchase choice on a website prior to a final checkout procedure. For example, when a customer (user) on eBay clicks "buy" she activates a DataBase transaction (perhaps via PayPal) which remains in stasis until the customer comes back after shopping and clicks on "go to shopping cart". This may also be referred to as a "long-lived" transaction.

It is straightforward to dispatch the issue of disk stalls from our hazard portfolio, using either NVRAM (Battery or Software) or SSDs for conventional databases. More importantly, they are solved directly by re-architecting the database to be entirely memory resident.

The Entangled Links (ENTL) also enables us to straightforwardly dispatch the issue of network stalls from our performance and reliability hazard inventory: this method enables us to minimize transaction uncertainty by limiting the window of time where uncertainty can occur to the minimum theoretically possible under currently understood laws of physics. The ENTL patent is necessary, but insufficient, to redefine the conventional mechanism of transaction commit in database systems. The property that we use from ENTT is "atomic commit OR Entanglement"—that is—we either know (on both sides of the transaction) that the transaction committed and is confirmed, OR, that the transaction was trapped "in stasis" some way through the protocol. i.e., one or both sides remain uncertain as to the status of the transaction.

While ENTL minimizes this uncertainty by the mechanism described in that invention, this invention exploits this uncertainty to enable "long-lived transactions" where this stasis lasts well beyond the normally expected interval of compute failures and recoveries in clustered or distributed systems.

In particular, we enable long-lived transactions by conserving one or more entanglement and transaction tokens in the computational structure of the system involved. This computational structure maintains "persistence" (as opposed to durability) of the transaction in stasis. Entangled transactions may last for seconds, hours, days, weeks or years. The mathematical ordering of events in the structure defined enables this ordering to be maintained indefinitely.

Entangled transactions lend themselves very well to chains of events.

| | Conventional Transactions | Entangled Transactions |
|---|---|---|
| Time Model | Global-Eye-View (GEV) (The Commit Coordinator observes both parties in the transactions and itself). | Local-Eye-View (LOV). The participants in the transaction is purely bipartite (between pairs of cells). |
| Elements | Three-Party (transaction pair + commit coordinator) | Two (transaction pair only), plus an Entangled Link between them. |
| Failure Model | Two Phase Commit (or consensus protocol such as Paxos, Zookeeper or RAFT) | Indefinitely Reversible Links (boundedor unbounded). |
| Implementation | Application Level (Database) using linearizability. | In the Network. The atomic operation is the absolute minim (one minimum size packet in each direction). |
| Heartbeats | Conventional Heartbeats (periodic from some management server) | Intrinsic to the protocol. Unrelated to any separate source of timing, either in the operating system or network. |

There are a number of problems associated with the conventional GEV style of programming: 1) Dirty Read (returning data from uncommitted transactions); 2) Deadlock; and 3) Livelock.

The "two generals" problem for which no fixed length protocol exists to guarantee a reliable solution in an environment where messages can get lost.

The two-phase commit protocol was designed to address this problem.

Locks and Latches: Locks are used to protect the data or resources from the simultaneous use of them by multiple sessions which might set them in inconsistent state. Locks are external mechanism, means user can also set locks on objects by using various oracle statements.

Latches are for the same purpose but works at internal level. Latches are used to Protect and control access to internal data structures like various SGA buffers. They are handled and maintained by Oracle and we can't access or set it and this is the main difference.

Entangled links address the problem of lost messages in at least two ways: First, by keeping a pair of computers in a "constant state of preparation" for atomic operations to occur. The smaller the interval of time between receipt and transmission of entanglement packets, the smaller will be the probability of a failure occurring in that interval, with the number of failures tending to zero as the interval tends to zero. Second, by directly connecting the computers (either by a private cable or direct radio channel) we eliminate all unnecessary devices, and their failure hazards in the communication path. This raises the reliability of the link, and lowers the potential loss of packets in switches and routers, which contribute to unreliability.

When considering hardware or other failure modes, one may calculate the number of failures within a certain interval using standard probability theory. The smaller the interval of time in consideration, the smaller will be the probability of a failure.

A. Entangled Transactions

Instead of treating concurrency control as a lock over a shared data object, entangled links emulate the physical world where possession of the object itself regulates the serializability of the object in space. In principle, a single bit can represent the "serialization foci". More bits allow the token to be uniquely identified, and signed as having occurred over that particular link with those two computers.

One can imagine that entangled links are constantly doing "null" atomic operations within the link. When processes in the local computer are ready to do real transactions, they simply replace the null token with a real token to carry out an atomic operation. As soon as the real atomic operation is complete, the link returns to swapping the null entanglement token.

Some of the issues solved with the entangled link protocol include:
- Maximum possible reliability, eliminating the potential for lost packets. Now, when packets are lost, there is a high probability (within a datacenter) that something serious has happened, and less confusion about where (in what device or cable in the path, or whether it is the server at the other end or not).
- Elimination of the commit coordinator. Now the only participants in the protocol are the transacting entities. This eliminates hazards due to the failure of the coordinator, as well as the message cost for including the coordinator.
- Transactions begin only when link entanglement is current, i.e., we have extremely recent evidence that the other party is alive, and the communication path is active.
- Full reversibility. Instead of a special abort and "rollback" mechanism in two-phase commit, we now have a general-purpose reversible computing mechanism, bounded only by the extra memory it takes to create a logically reversible system.
- Link synchrony. Instead of having to have synchronous.

Entangled Transactions can be leveraged to support any kind of transaction management in distributed systems. There is no more need for "Transaction middleware" as the fundamental mechanism for managing transactions is now built into the network itself.

Atomic commits are essential for multi-step updates to data. This can be clearly shown in a simple example of a money transfer between two checking accounts.

This example is complicated by a transaction to check the balance of account Y during a transaction for transferring 100 dollars from account X to Y. To start, first 100 dollars is removed from account X. Second, 100 dollars is added to account Y. If the entire operation is not completed as one atomic commit, then several problems could occur. If the system fails in the middle of the operation, after removing the money from X and before adding into Y, then 100 dollars has just disappeared. Another issue is if the balance of Y is checked before the 100 dollars is added. The wrong balance for Y will be reported.

With atomic commits neither of these cases can happen, in the first case of the system failure, the atomic commit would be rolled back and the money returned to X. In the second case, the request of the balance of Y cannot occur until the atomic commit is fully completed.

Atomic commits in database systems fulfill two of the key properties of ACID, atomicity and consistency. Consistency is only achieved if each change in the atomic commit is consistent.

As shown in the example atomic commits are critical to multistep operations in databases. Due to modem hardware design the physical disk on which the database resides true atomic commits cannot exist. The smallest area that can be written to on disk is known as a sector (and errors, including Silent Data Corruption (SDC) can occur even on a single sector). A single database entry may span several different sectors. Only one sector can be written at a time. This writing limit is why true atomic commits are not possible. After the database entries in memory have been modified, they are queued up to be written to disk. This means the same problems identified in the example have reoccurred. Any algorithmic solution to this problem will still encounter the Two Generals Problem. The two-phase commit protocol and three-phase commit protocol attempt to solve this and some of the other problems associated with atomic commits.

The two-phase commit protocol requires a coordinator to maintain all the information needed to recover the original state of the database if something goes wrong. As the name indicates there are two phases, voting and commit.

During the voting phase each node writes the changes in the atomic commit to its own disk. The nodes then report their status to the coordinator. If any node does not report to the coordinator or their status message is lost the coordinator assumes the nodes write failed. Once all of the nodes have reported to the coordinator the second phase begins.

During the commit phase the coordinator sends a commit message to each of the nodes to record in their individual logs. Until this message is added to a node's log, any changes made will be recorded as incomplete. If any of the nodes reported a failure the coordinator will instead send a rollback message. This will remove any changes the nodes have written to disk.

The three-phase commit protocol seeks to remove the main problem with the two-phase commit protocol which occurs if a coordinator and another node fail at the same time during the commit phase neither can tell what action should occur. To solve this problem a third phase is added to the protocol. The prepare to commit phase occurs after the voting phase and before the commit phase.

In the voting phase, similar to the two-phase commit, the coordinator requests that each node is ready to commit. If any node fails the coordinator will timeout while waiting for the failed node. If this happens the coordinator sends an abort message to every node. The same action will be undertaken if any of the nodes return a failure message.

Upon receiving success messages from each node in the voting phase the prepare to commit phase begins. During this phase the coordinator sends a prepare message to each node. Each node must acknowledge the prepare message and reply. If any reply is missed or any node return that they are not prepared then the coordinator sends an abort message. Any node that does not receive a prepare message before the timeout expires aborts the commit.

After all nodes have replied to the prepare message then the commit phase begins. In this phase the coordinator sends a commit message to each node. When each node receives this message, it performs the actual commit. If the commit message does not reach a node due to the message being lost or the coordinator fails, they will perform the commit if the timeout expires.

If the coordinator fails upon recovery, it will send a commit message to each node.

B. CQ/EQ

A typical consistency constraint is that that the number of dollars in a system (such as an economy) is constant, or at least the money supply is carefully managed. However, one may need to temporarily violate the consistency of the system state while modifying it. For example, in moving money from one bank account to another, there may be an interval of time where one account has been debited and the other not yet credited. The notion of an account on a single machine is entirely inconsistent with the idea of persistence, because total data loss can occur with many different failure hazards, not only the physical destruction of the machine.

Entangled Transactions solve this problem by explicitly exposing the inconsistent state, and providing full reversibility in the operations within the entangled link itself (described in a separate patent application).

For classical transaction processing systems, in general, consistency assertions cannot be enforced before the end of a transaction. This presupposes two assumptions:

1. That one can define a transaction to have definitively "ended".
2. That forward progress (liveness) can be assumed because "time moves forward" irreversibly and at a constant pace (for an inertial system).

There are specific issues with each of these assumptions. For example, many high-level transactions do not have an explicit "end". If a customer wishes to return a product to a retail store, its transaction may need to be reversed. Also, for a loan, the transactions remain suspended in a legal agreement until such time that a loan is paid off. This can delay the notion of "completion" of the transaction for many years.

For our second assumption, time may not be reversible in conventional transaction processing systems. When a computer crashes, the typical procedure is to replay a log file into the database and return it to a consistent state at a previous point in time. More generally, Virtual Machines may be suspended or their clocks set to some arbitrary time in the past (or in the future).

CQ/EQ solves this problem by emulating consistency assertions such as conserved quantities, not by enforcing them at the end of a transaction, but by conserving them during the transaction in the entangled links, through the use of unforgeable tokens which are unique to each link, and this can be made to appear "atomic" in the exchange (one and only one can appear in the link).

For the case where packets get lost, the link is held in a deliberately inconsistent state that is recognizable by agents on both sides of the link (and their witnesses), and can thereby be recovered using an orderly process.

Links that are disconnected (the probability is small) or cells which are powered down will record (on any persistent media such as SSD's), the ID's and sequence numbers of each of its links. They then can be recovered "offline". Links that are disconnected and then if the cells power-down, they will first record (on any persistent media such as NVRAM or SSDs), the IDs and sequence numbers of the tokens on each of its links. These IDs and transactions can then be recovered "offline". For example, when cells are powered back up they can connect and verify the very same neighbors they went down with, and (through alternate routes) communicate the state of the transaction and recover it to completion. This is consistent the notion of a Tc time record in the attached paper "TimeOne" which is incorporated herein by reference.

The trees of Entangled Links form a lattice where order can align from one direction to another based on the operations one wishes to carry out.

Serialization may also occur through a single token which may be migrated to where it is needed in the barycenter of the network of "currently cooperating cohorts". For example, 404 in FIG. 4.

C. Transactions

Conventional transaction processing systems use a three-party transaction: a sender, a receiver (each with their own (linearizable) consistency mechanisms on a master data object), and a 3rd party "commit coordinator" (transaction Manager) to coordinate the activity between the sender and receiver. If both entities do not report a consistent update of their data structures, the transaction manager backs out the transaction so that both parties can return to being free, independent and unchanged. Typically, ACID (Atomic, Consistent, Indivisible and Durable) are the properties considered important in a correct and reliable transaction. A related requirement, of conventional accounting systems, is to provide double-entry bookkeeping, to ensure the conservation of transactions and provide visible audit mechanisms.

This conventional notion of a transaction in a transaction processing system is inconsistent with the dictionary definition of a transaction where physical assets or currency are exchanged; or the notion of transactions in physics, where physical quantities such as energy, momentum, mass, charge, spin, and color are conserved. Unlike transaction processing systems, the dictionary and physics definitions require only two parties in the transaction. The theoretical minimum for a usable concept of a transaction is therefore two participating cells or nodes, not three in the case of conventional databases. In order for this bipartite system to persistently preserve the transaction in the event of failures, either or both nodes may have any number of "witnesses", either directly connected, or recursively connected in a chain or tree (the witness tree). This allows the transaction operation itself to be parameterized by various forms of witness requirements and promises, such as being propagated through and "snarled" by one or more local cells (nodes) as it is on its way to a more geographically remote datacenter or location to mitigate the potential impact of local disasters such as earthquakes, fires or floods.

The present invention relates to a cellular algorithm, and a protocol, that operates at its core as a reversible two-party local Cellular Automata Transaction (CAT), where a given quantity is either conserved, or an equivalent quantity is exchanged, but with any number of witnesses that can validate that the transaction took place. The (consensually validated) trust is based on emulation of the fundamental characteristics of physical objects or quantities that cannot be created nor destroyed in nature (such as information). In a computer system such entities can be composed and labeled by cryptographic techniques. This invention provides a method for automatically discovering and assigning roles in a transaction, validating that their mutually agreed upon conditions are met, and ensuring that neither side will be stuck with responsibility for a failed transaction or is able to dump responsibility if the transaction fails (repudiation).

Cellular automata are discrete dynamical systems whose behavior is completely specified in terms of a local relation (or rule), much as is the case for a large class of continuous dynamical systems defined by partial differential equations D. Two-Phase Commit Protocol From Gray "If however, the restriction that the protocol has some finite fixed maximum length is related then a solution is possible. A protocol may require arbitrarily many messages". "The key to the success of this approach (the two-phase commit) is that the decision to commit has been centralized to a single place and is not time constrained."

E. Locking

Locking is a concurrency control mechanism used over files, databases and data structures in general. They were designed when most applications were written for execution on a single multi-programmed computer, so that multiple users can work on the same data at the same time and not interfere with each other. In systems with more available hardware concurrency, such as multicore or distributed systems, locking has become the single largest factor in limiting performance and scalability.

Lock contention occurs when one process holds the lock(s) that prevent another process from accessing the data structure. These other processes blocked by the lock must either wait or sleep until the lock is released. Not only does this dramatically limit the concurrency of a system, it also represents a serious failure hazard in that the process that holds the lock can fail.

Another problem with locks, which is less easy to characterize, but nonetheless significant, is the complexity that they cause in application programming when trying to "tune" the performance of the application instance.

A more serious locking impact on performance arises from deadlocks. A deadlock occurs when two user processes each have a lock on a separate page or table and each wants to acquire a lock on the same page or table held by the other process. The transaction with the least accumulated CPU time is killed and all of its work is rolled back.

F. Reversibility

This reversible two party transaction may be extended to other parties or other witnesses along a linear chain or a tree-based set of arbitrarily cascaded cells interspersed between various substitutable transacting entities, and a reversible protocol that guarantees that the conserved (CQ) or exchanged quantities (EQ) are: (a) Safe, i.e., never lost in the face of failures, disasters or attacks, (b) Live: i.e., execute deadlock-free in every conceivable circumstance of cell, network or software failures, including arbitrary network partitioning and merges, and (c) Conserve certain quantities within a defined domain of discourse, with guarantees that cannot be repudiated by either side of a transaction. Note that the concept of live-lock, although preventable by policies agreed upon by the transacting parties, is an integral and desirable property of the system, unlike in conventional distributed systems which regards such a possibility as undesirable.

This invention is designed so that a system based on its principles can be deliberately maintained in continuous interminable live-lock, until the transactions are either fully completed and disentangled, or they are fully terminated and disentangled. It is this capability of the invention that we designate as entanglement, and which we claim is a new and significant property of transactions that has heretofore never been made mathematically and operationally discernible in order to provide valuable functionality enabling systems to intrinsically recover from failures, disasters and attacks without the need for human administration in the first line of response, as well as providing a key interface for automated audit and verification of logical quantities in a systems, to ensure the integrity of individual commercial or other transactions, or for an economic environment as a whole, where it is important to guarantee the conservation of some quantity (such as the money supply in an economy), and visibility, at least into the extent of fraudulent or counterfeiting activities within the system.

Such a transaction system has the capability to fundamentally simplify the business environment, particularly in an eCommerce, multi-party electronic transaction, by eliminating many modes of fraudulent or exploitive behavior, by ensuring the correct and robust progression of states from beginning to end, with no single party being able to gain advantage without the protocol being able to make this transparent to both sides. Such a property enables other desirable capabilities in securing robustness in an extended business environment, because most transactions in this arena are necessarily extended in time; and maintaining a robust, verifiable and audit-able intermediate, or entangled, state, allows both parties to trust the new transaction system more than conventional systems that remain vague or often undefined in the mechanism, leaving business exposed to the need for complex and error-prone legal documents to moderate the behavior of traders in an economy.

Entangled transactions may be implemented by any marked graph (petri-net style) protocol augmented to guarantee to the conversation of resources. Such a protocol must also be modified to be fully and completely reversible at the fundamental bit/byte/packet level in a communication between two or more distinct nodes or cells; and can be countably specialized into, for example, escrow and observer cells. This notion of a reversible-tension during the finite window of two parties transacting business, creates a deliberately entangled transaction, with an extensible but finite number of distributed states that can be controlled by an appropriate protocol, in accordance to a set of agreed upon rules by the parties. In business, this agreed upon set of rules is referred to as a contract. This invention allows such contracts to be mathematically specified, formally verified, and automatically validated during operations, especially in real-time high frequency systems.

Unlike the tokenized approach of May, we seek a fully reversible notion of token passing that precisely mimics the EQ/CQ principles for digital objects, and which serves as a foundation for the principle of entangled links described above. These entanglements may, in turn, be used to establish a form of spatiotemporal "structural cohesion" across sets of cooperating nodes, which persist in spite of failures in individual nodes and links, and which may evolve over time to accommodate extensions, reconfiguration and general evolution of the infrastructure, such as described in Patent No. 60/762,286: "Attack and Disaster Resilient Cellular Storage Systems and Methods", and patent #20100165886 "Self-Healing Communication Trees."

The first goal of this invention is to provide a reversible action that can transfer (and when necessary, untransfer) a unit of information in a way that is robust to failures, beyond that available in conventional computer to computer communications in a distributed system. Conserved or exchanged quantities are fundamental to the new protocol, and provide a new correctness criterion for a distributed system, with guarantees of both safety and liveness, even in a byzantine environment (anything at can go wrong, will, and some actors may be malicious in addition to being faulty).

G. Theoretical Foundation

In addition to the quantum mechanical foundation described earlier, the computer science essence of this invention exploits the theory of marked graphs, which were obvious to developers in this field as an extension to Petri Nets in the 1970s, although marked graphs are one way to implement such systems, there are others. In fact, any physical system which is capable of guaranteeing (at a fundamental level), the conservation of some quantity, is a candidate for an implementation technology for entangled links. Quantum entanglement, where spin is conserved, is an example described previously. What this invention is about, is: extending the essential property of an entangled pair of entities (conserving a quantity), into the classical domain, and composing active relationships among other classical objects in a distributed computer system to maintain the conserved quantity (CQ) or exchanged quantity (EQ) property, in order to provide fundamentally robust communications and information transfer in a distributed system.

A "channel" can be regarded as a process in which "events" happen in pairs comprising the atomic transmission and reception of some unit of information. However, the conventional nature of a process commonly accepted in computer science, is fundamentally different to the nature of the characteristic behavior desired in a channel as described above.

With the right mechanisms in place, relationships between processes in a distributed system can be characterized with greater richness and that has been done so far, and with mathematical precision. This presents a new kind of link between processes in a graph structure, and provides a fundamental property that may feasibly be exploited by a programmer through language primitives that enable this fundamental property to be directly accessed simply and reliably.

This becomes important, for example, in systems with an indefinitely large number of stored objects, each of which may have an indefinite number of replicas which must maintain their structural connection to the "set" of sibling replicas, so that their structure and relationships can be maintained in spite of perturbations (failures, disasters or attacks—including cyber) to the system. Higher level functions may be of any type, including create, replicate, evaporate (delete local replicas), update (update or append all replicas with some commutative operation), or any set of operations on the replicas specified by the application.

Another intended use: Classical computer programming techniques also persist only the data (files/databases), or snapshots of program execution (virtual machine images). The mechanism described in this invention provides a foundation so that the relationships between these entities can be persisted in the form of virtual self-healing graphs managed by cooperating agents, such as that described in Patent No. 60/762,286: "Attack and Disaster Resilient Cellular Storage Systems and Methods". The challenge such systems face, which is addressed by this invention, is maintaining integrity and structure of these relationships through failure and reconfiguration of the links and system components as the program executes. If this could be done simply and reliably (from the perspective of a programmer or system administrator), this would provide a rich characterization of connectedness, where previously TRUE and FALSE where the only possible values for the property of "connected" in conventional link-state management. This would allow finer graduations and more diverse responses by a program, beyond a simple timeout and a specified number of retries.

Entangled Links provide a verifiable, provable, and atomic element that may be composed into higher level structures that support system-wide predicates to assist with distributed computations and enable shared awareness of exogenous events (so that other resources can be dispatched to identify and respond to them based on correlated patterns of events and historical recognition of prior behaviors).

This provides a large number of derivative benefits, such as percolation of locally observable data to remote cells subscribed to the stream for instrumentation purposes, computational spiders that wish to perform collective functions such as distributed counting, or initiation of latency (ping) signature measurements of suspected hostile IP addresses to support triangulation of potential attackers.

Time

This invention does not claim a scientific discovery, but rather how to innovatively use this insight to achieve certain overall goals in the design and deployment of distributed systems, particularly those which are intended to be robust to perturbations, and scale-independent. The precise identification of the time-and-irreversibility related issues in distributed systems are resolved through the mechanisms described in this disclosure.

The issues include relativity (absolute simultaneity) and quantum mechanics (absolute determinism). We challenge the implicit and often unspoken assumptions regarding simultaneity, monotonicity and irreversibility in in the computer science literature (see appendix in provisional). Our belief is that existing "models of time" in distributed algorithms lead to either failure of those algorithms, an unnecessarily constrained thought process regarding concurrency, or both. The Entangled Links mechanism is the first "brick" in a new foundation of network computing. From this "brick" we can compose many recoverability mechanisms, cyber-defense mechanisms, and establish the feedback mechanisms that enable systems to self-organize.

The fundamental idea is to create a new model of 'time", which avoids these known limitations of absolute simultaneity, monotonicity and irreversibility; allowing us to build more resilient distributed systems. As a very minimum, we expect to provide a simpler and more correct model for use in reasoning about time in infrastructures that make extensive use of virtual machine (virtualization) technology.

Eternal time has three basic qualities: It can last forever; It is contains everything that can ever happen, It is always in the present—never in the past or the future. Entangled links may (because of resource constraints) be bounded in how far back a computation may go. However, in principle, by "reversing" information rather than "erasing" information we can safely eliminate the need for storage of intermediate states that have been safely reversed.

In the model described in this invention, observable time is change: which passes only by a relative, persistent and observable transfer of information between elements:

By change, we mean a potentially reversible transfer of information (happen).

By relative, we mean from the specific locality of the observation (the self-vertex).

By persistent, we mean, it did not change back (unhappen) before being observed.

By observable, we mean that until information is irreversibly transferred to a third party, as far as other observers observing the observer are concerned, it has not yet occurred.

The vertices & edges model of this invention provides for only two kinds of temporal awareness: the temporal awareness inside the vertices, which we typically associate with a process and a sequential, monotonically increasing clock; and the temporal awareness of the edges (which we elevate to a first-class citizen in this invention), and associate with it the transfer of information. A key distinction between our model and that typically assumed in the computer science literature, is that both of these sub-models of time can literally go forwards and backwards indefinitely by the reversible transfer of information along the edges, until this information is irreversibly transferred to other observer(s) along the edges, or erased in the vertices (dissipating energy).

An important aspect of our model of time, is that it allows the possibility of a somewhat arbitrarily long recursive transfer of information from one observer to another, and as long as it is in a chain or tree (acyclic graph), then information will not be lost or erased, but then all this progress can also be undone, all the way back to some arbitrary point in the past, and any observer outside that chain or graph will be none the wiser, as if whatever happened in the graph never existed at all. This is the foundational issue for data consistency, which we address in this invention.

Information can also be circulated throughout the graph, without being lost or erased, and observers tapping into this cycle of information can relay that information to other observers bringing ever larger number of edges and vertices into the entanglement. This is the basis for entangled trees.
Protocol This mechanism works in conjunction with the ENTL to ensure that distributed nodes in a network can communicate on a logically nearest neighbor basis in a reliable manner, that arriving messages passed over these links are handled in a manner that does not produce conflict or exceed the constraints of available resource. It does this, for example, by having a priority of packet transfers such that the ENTL packets are displaced (set aside) when transaction (ENTT) packets are in the buffer, or if other "higher priority buffers are ready to go. See FIG. 23 for the Priority Queue Engine.

Classical techniques also persist only the data (files/databases), or snapshots of program execution (virtual machine images). What is missing is a foundation for the relationships between these entities to be persisted, managed and more richly characterized, in the form of self-healing graphs, across an evolving physical infrastructure, managed by cooperating agents. (Such as those described in Patent 60/762,286: "Attack and Disaster Resilient Cellular Storage Systems and Methods").

Timeouts are inconsistent with delay-and-disruption-tolerant networking, support for which is a key architectural goal of Earth core. In conventional TCP communication: the agent says "send this message on this link" and notify me only if the communication fails. This means that the TCP stack buffers and schedules the message and, if the message is synchronous, blocks the agent until the message goes out, and an acknowledge is received, or (if the message is asynchronous, attempt to send a message with an arbitrary timeout). In Entangled link heartbeats (non-TCP traffic), we have independent distinctions of connection state, enabling us to distinguish (at least): (a) local electrical link state, (b) heartbeat state with a local neighbor one hop away (which is be our proxy for more distant communication on the network), (c) heartbeat state on 2nd or subsequent hops further away from the sender, and (d) loss of connection with a final destination, which may be an actual cell-down situation. Entanglements allow us to respond more quickly than waiting for a timeout that covers the conditions (b) through (d).

The latency awareness, packet-loss awareness and mutual interrupt service routine code certification of entanglements helps guard against both code infiltration at higher levels in the nodes, and man-in-the middle attacks between nodes. The two sub-mechanisms are: first, the link management code is implemented at a low level, possibly in kernel mode within the device driver.

However, the conventional nature of a "process" commonly accepted in computer science, is fundamentally different to the nature of the characteristic behavior desired in an entangled channel as described above.

With the right mechanisms in place, relationships between processes in a distributed system can be characterized with greater richness than has been done so far, and with mathematical precision. This presents a new kind of "link" between "processes" in a graph structure, and provides a fundamental property that may be exploited by a programmer through language primitives that enable this fundamental property to be directly accessed simply and reliably.

The Dynamic Locality Secure Protocol (dlsp) extends the properties across long links such as those on a WAN that use IP (internet protocol), either with TCP or with SCTP as the transport. The desired property is that "both sides" know exactly what state the other side is in immediately after any physical or other break in the communication path between them. The ENTL design, in conjunction with dlsp goes as far as is theoretically possible in maintaining this "awareness". Even though packets can be lost, and senders will be unable to know if a packet arrived at a receiver, it can still maintain the entangled link "in stasis" indefinitely while requesting the lower-level mechanisms to "heal" or find alternate paths around which to dynamically evolve through failures and recoveries. For example, using the "Self-Healing Communication Trees" patent.

Because Earthcore cells are directly connected to each other, and most operations are expected to be "multi-hop", this enables a higher-level property we call a "recursive proxy"; this is the ability for a cell (for example, when ingesting data), to pass data along in the most reliable way possible to an immediate neighbor with an independent and isolatable failure domain.

Each cell is, by definition, independent, autonomous and self-contained: a truly "independent" failure domain is isolatable. Even the power supplies and UPS for each cell are completely independent of its neighbor (cells have their own private battery to ensure orderly shutdown and persistence of data in the event of power loss).

'Successive reversibility' is the ability of the link to move backwards and forwards from an observed information perspective. Information is "reversed" (as if it didn't exist) when the party on either side wishes to "back up" or "reverse" the computation. For example, in a way that might be analogous to "rollback" in conventional two-phase commit protocol.

There are two mechanisms: firstly, the link management code is implemented at a low level, possibly in kernel mode within the device driver. Secondly, the very fast response and general awareness of latency and link integrity make man-in-the-middle attacks easier to detect and harder to implement.

Protocol Details

The primitive communication element of our system (the building block) is an "entangled link" between nodes that enables logically nearest neighbor computers to be connected in a reliable manner. This approach to resilient connections helps ensure that breaks in communication between nodes do not have an unexpected negative impact upon the agents or communicating applications that depend upon them and that the nature of the break (duration, severity, etc.) can be communicated to the application and operating system processes that utilize them, while the underlying mechanisms continue their process of recovery and healing.

Our intention is to recognize that this relationship will become fundamental to the engineering of reliable and saleable (scale-independent) distributed systems, as is the difference between fermions and bosons in physics, and that their temporal behavior exhibits fundamentally different characteristics from each of their perspectives, and that this distinction can fruitfully be exploited to build scalable distributed systems.

Reactive systems are those whose role is to maintain an ongoing interaction with their environment rather than produce some result upon termination of an algorithm. Typical examples of reactive systems are air traffic control systems, mechanical devices such as thermostats, airplanes, or complex industrial control processes such as nuclear reactor monitoring and control.

Objects, agents, actors, or whatever is the reader's favorite metaphor for an "encapsulated, namable entity" saturates the computer science literature to such an extent that their properties become so diversely defined that they are no longer mathematically tractable. However, even with clear definitions of these entities that would satisfy a mathematician's penchant for precision and perspicuity, no mechanisms, processes or language exists to program resilient infrastructures because current approaches focus only on a single dominant entity type in a distributed system: the entity we refer to as the cell. What is missing, as a first-class citizen, is the fully developed concept of a link.

What is important are the relationships between these entities, carried by the links that connect them. We know from the study of other systems in nature and sociology that properties such as "trust" lies in the relationships, not in the entities themselves. We promote the relationships (in the form of physical connections between cells, and logical connections between replicas) to first class citizens in our architecture. When we consider the characteristics of both cells and links. Vertices and edges, nodes and interconnections: any category treating entities and their relationships equally.} as bona fide and equally valid citizens in the architecture, we can now develop a "theory of resilient infrastructure".

In this way, the links between the cells can be considered as separate, independent computational entities in their own right: a self-propelling heartbeat mechanism triggered by a hot potato packet on both ends of the link maintains mutual awareness of the state of the link, and is semantically and temporally independent of the agents, operating systems, virtual machines, and applications running on the cells.

EXAMPLES OF APPLICATION AREAS

1. Entangled Bipartite Transactions
2. Replication
3. Transactions
4. Multi-Party Transactions (See SMPT)
5. Escrow Services
6. Consensus/Leader Election
7. Multi-Tenant Cloud Infrastructures
8. Secure Information Exchanges The present invention in this and other implementations may optionally include one or more of the following features or achieve these advantages. For example, features may include:

A set of entangled links in any combination described by a Graph G=(V, E) or Tree T=(V', E') where (V'⊆V)V (E' ⊂ E), and where one or more E is an entangled link.

Instrumentation that can make measurements and diagnostic checks inline and, through the state-file mechanism, select a separate tree for transmission of the instrumentation data so as to not perturb the primary path as little as possible when debugging.

Percolation (from sheaf theory)—the ability to diffuse information throughout the system based on spare (unused) data slots, non-intrusively. Additionally, methods where data percolation is used to diffuse information throughout the system based on link state information.

Separation of autonomic behavior or activity from auditability. "Separation of concerns" enables independent audit of systems (for example for security audits). This includes separation of timestamps for reversible transactions and simple statistics for irreversible transactions. Timestamps and log entries are normally absent from the entangled link. They are conceptually incompatible with the notion of reversible time within the link. i.e. in conventional networks, a linkup or link down signal would be recorded in a log. This is not the case for entangled links. They simply go into a perpetual healing mode and wait to find themselves reconnected (either physically or otherwise). This will reduce the traffic and storage used by log messages. The operator always knows what is going on. The entangled link either remains perpetually in entanglement mode until it breaks or it remains perpetually in repair mode until it is healed. There is no need to log these events.

A set of entangled links in any combination with a set of nodes forming an arbitrarily large connected set of nodes with a temporal awareness of the collective through the aggregation of the information provided by the entangled links and percolation (the passage of background information in otherwise unused packet slots over the entangled links).

Entangled trees having a set of cells connected by entangled links in an arbitrary graph as described above, with a one or more spanning tree overlay networks each of which is rooted on the cell which initiates the spanning tree. Each tree is individually identified as an Entanglement Tree, and is labeled with the identifier of the initiating cell, and remains in existence as long as the initiating cell remains in existence and offspring cells remain as long as they are transitively connected to each other through some finite number of cells.

Alternate path selection for percolation information using instrumentation similar to that described above to select a separate tree for transmission of the instrumentation data so as not to perturb the primary path when debugging. This selection may be negotiated with the owner of that tree as part of the Metadata Tensor Mechanism (MDTM)

A unique, idempotent, and reversible cryptographic token exchange which presents no visible indication of progress until communication of information needs to occur between the computers and which maintains the potential for bounded (or unbounded) "reversibility".

Secure Multi-Party Transactions (SMPT)

Secure Multi-Party Transactions (SMPT) refer to a multi-cellular distributed system and a protocol that operates at its core as a reversible two-party local Cellular Automata Transaction (CAT), where a given quantity is either conserved or an equivalent quantity is exchanged, but with any number of witnesses that can validate that the transaction took place. The (consensually validated) trust is based on emulation of the fundamental characteristics of physics where quantities that cannot be created not destroyed in nature. In a computer system, such quantities can be created and persisted by cryptographic techniques. SMPT provides a method for automatically discovering and assigning roles in a transaction, validating that their mutually agreed upon promises are met, and ensuring that neither side will be stuck with the responsibility for a failed transaction or is able to dump responsibility if the transaction fails, or repudiate if the transaction succeeds.

Conventional transaction processing systems use a three-party transaction: a sender, a receiver (each with their own [linearizable] consistency mechanisms on a master data object), and a third-party Transaction Manager to coordinate the activity between the sender and receiver. If both entities do not report a consistent update of their data structures, the Transaction Manager rolls back the transaction so that both parties can return to being free, independent and unchanged.

Typically, ACID (Atomic, Consistent, Indivisible and Durable) are the properties considered important in a correct and reliable transaction. A related requirement of conventional accounting systems is to provide double-entry bookkeeping, to ensure the conservation of transactions and provide visible audit mechanisms.

This conventional notion of a transaction in a transaction processing system is inconsistent with the dictionary definition of a transaction where physical assets or currency are exchanged; or the notion of transactions in physics, where physical quantities such as energy or momentum are conserved. Unlike transaction processing systems, the dictionary and physics definitions require only two parties in the transaction.

This invention relates to a multi-cellular algorithm and a protocol that operates at its core as a reversible two-party local Cellular Automata Transaction (CAT), where a given quantity is either conserved or an equivalent quantity is exchanged but with any number of witnesses that can validate that the transaction took place. The (consensually validated) trust is based on emulation of the fundamental characteristics of physical objects or quantities that cannot be created not destroyed in nature. In a computer system, such quantities can be created and memorized by cryptographic techniques. This invention provides a method for automatically discovering and assigning roles in a transaction, validating that their mutually agreed upon conditions are met and ensuring that neither side will be stuck with the responsibility for a failed transaction or is able to dump responsibility or repudiate if the transaction fails or succeeds.

Cellular automata are discrete dynamical systems whose behavior is completely specified in terms of a local relation (or rule), much as is the case for a large class of continuous dynamical systems defined by partial differential equations. In this sense, cellular automata are the commuter scientist's counterpart to the physicist's concept of field.

Reversibility is a universal characteristic of physical law. In particular, it is a precondition for the second law of thermodynamics to hold (for locally-interacting systems having a finite amount of information per site, such as cellular automata, reversibility is equivalent to the second law of thermodynamics) and a sufficient condition for the existence of conserved quantities. (In physics, a reversible system having n degrees of freedom possesses 2n−1 conserved quantity, some of which [e.g., energy, momentum, etc.] are of special significance because of their connection with fundamental symmetries of the physical laws. The arguments that lead to these conservation laws can be generalized to cellular automata: the key idea is that a given state encodes all of the information necessary to identify the particular dynamical trajectory it lies on, and if the system is reversible, none of this information is lost in the course of evolution or de-evolution).

This reversible two-party transaction may be extended to other parties or witnesses along a linear chain or a tree-based set of arbitrarily cascaded cells interspersed between various substitutable transacting entities, and a reversible protocol that guarantees that the quantities are conserved (CQ) or exchanged quantities (EQ) are: (a) safe, i.e., never lost in the face of failures, disasters or attacks; (b) live, i.e., execute deadlock-free in every conceivable circumstance of cell, network or software failures, including arbitrary network partitioning and merges, and; (c) conserve (quantities can be conserved in a distributed system through the generation of cryptographically unique tokens from the equivalent of a "treasury" or certificate server). Certain quantities within a defined domain of discourse, with guarantees that cannot be repudiated by either side of a transaction (i.e., no net loss or gain of that quantity. This provides a mathematically provable system, such that no party in a multi-party transaction can be swindled by any combination of the other parties). Note that the concept of live-lock, although preventable by policies agreed upon by the transacting parties, is an integral and desirable property of this system, unlike in conventional distributed systems which regard such a possibility as undesirable.

This invention is designed so that a system based on its principles can be deliberately maintained in continuous, interminable live-lock, until the transactions are either fully completed and disentangled, or they are fully terminated and disentangled. It is this capability of the invention that we designate as entangled in a transaction sense. We aim to provide a new and significant property of transactions that is mathematically and operationally discernible and provide practical mechanisms to help distributed systems recover from failures, disasters and attacks without the need for human administration in the first line of response. We also provide a key interface for automated audit and verification of logical quantities in a distributed system to ensure the integrity of individual commercial or other transactions. The field of application extends to economic environments where it is important to guarantee the conservation of some quantity (such as the money supply in an economy) and visibility, at least to the extent that it can readily expose fraudulent or counterfeiting activities. These capabilities may be hidden from normal or malicious users of the system but will be transparent to the system owners and their supervisory personnel.

Such a transaction system has the capability to fundamentally simplify the business environment, particularly in an e-commerce multi-party electronic transaction, eliminating many modes of fraudulent or exploitive behavior by ensuring the correct and robust progression of states from beginning to end with no single party being able to gain advantage without the protocol being able to make this transparent to both sides.

Such property enables other desirable capabilities in securing robustness in an extended business environment because: (a) many transactions in the business arena are necessarily extended in time; (b) maintaining a robust, verifiable and auditable intermediate or entangled state allows both parties to trust the new "transaction system" more than conventional systems that remain vague or often undefined in this property; (c) conventional businesses are exposed to the need for complex and error-prone legal documents to moderate the behavior of traders in an economy. This can now be replaced by automated predicates in the entangled transaction system that save in both human labor and human error.

Entangled transactions may be implemented by any marked graph (petri-net style) protocol augmented to guarantee the conversation of resources. Such a protocol must also be modified to be fully and completely reversible at the fundamental bit/byte/packet level in a communication between two or more distinct nodes or cells; and can be countably specialized into, e.g., escrow and observer cells. This notion of a reversible-tension during the finite window of two parties transacting business creates a deliberately entangled transaction, with an extensible but finite number of distributed states that can be controlled by an appropriate protocol, in accordance with a set of agreed upon rules by the parties. In business, this agreed upon set of rules is referred to as a contract. This invention allows such contracts to be mathematically specified, formally verified, and automatically validated during operations, especially in real-time high frequency systems.

The first goal of Secure Multi-Party Transactions is to provide a transaction system that is robust to failures, far beyond the single master data nodes in conventional transaction processing systems. Conserved or exchanged quantities are fundamental to the new protocol and provide a new correctness criterion for a distributed system, with guarantees of both safety and liveness, even in a byzantine environment (anything that can go wrong, will—and some actors will be malicious in addition to being faulty).

A second goal is to extend the intermediate cells to provide redundancy and node specialization, such as any kind of intermediate holding buffer where quantities are staged in readiness for the entire transaction to complete, e.g., various forms of an escrow account, an independent jurisdiction, or a trusted 3rd party. However, because the whole system is designed to be cryptographically secure (with hierarchical and recursively encapsulated data objects), the only visibility the escrow has is in the outer-wrapper of the objects themselves being exchanged.

A third goal is to improve transaction latency in transaction-sensitive applications. By pre-staging data to the physical location(s) an application requires to complete the transaction, we transmit only the confirmatory change data to commit the transaction. Note: automatic repayment, transaction reversals/rescissions/etc., occupy the realm of application logic, not infrastructure requirements. Further, these issues have already been solved by application systems years ago (whether they work well or not is a different issue in a different market). The essence of this invention relates to marked graphs, which were obvious to developers in this field as an extension to Petri Nets in the 1970s. Although marked graphs are one way to implement such systems, there are others. In fact, any physical system which is capable of guaranteeing (at a fundamental level) the conservation of some quantity, is a candidate for an implementation technology. What this invention is about is: emulating the essential property of a quantum entangled pair of entities (with the Hermitian conservation of energy) into the classical world, and composing active relationships among other classical objects in a distributed computer system. This enables us to maintain conserved quantities (CQ) or exchanged (EQ) quantities as a digital property in the computer system. This in turn enables fundamentally more robust distributed transactions for e-commerce, and other systems where transactionality and persistency "promises" are essential to the reliable and trustable functions expected by the users of the system.

Figure 19:
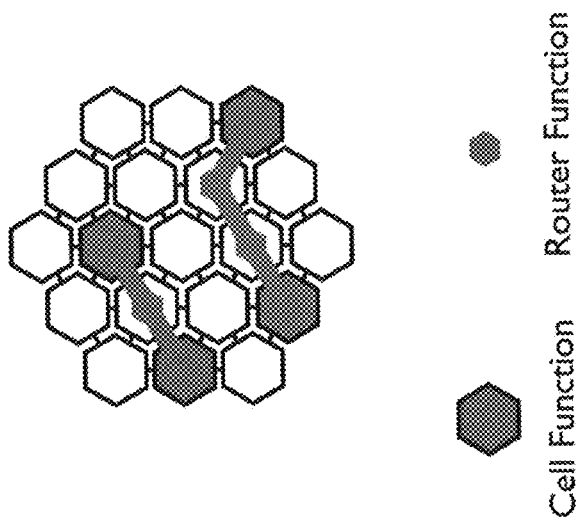
FIG. 19A shows an example entangled transactions through earth core and conventional routers.
FIG. 19B shows an example atomic information transfer through earth core and conventional routers.
Figure 19:
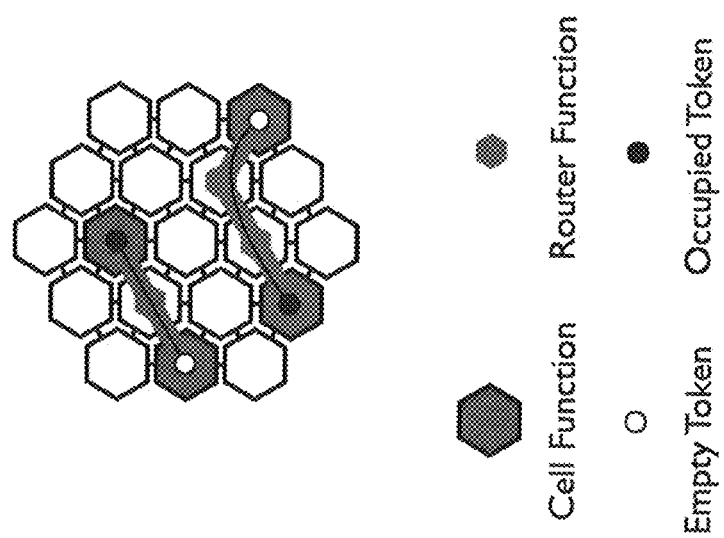

FIG. 19A is a network diagram of example entangled transactions through earth core and conventional routers. FIG. 19A is a network diagram of example of entanglement through intermediate cells, without those cells participating in the endpoint function (such as entangled transactions).

Figure showing chained entanglement spanning multiple cells. All links between cells in have independent entanglements. Higher-level bipartite entanglements (piggybacked on the entanglement packets) can be created across multiple cells with intermediate cells fast forwarding entanglement packets, and endpoints acting as reflectors.

FIG. 19A shows a chained entanglement spanning multiple cells. All links between cells in have independent entanglements. Higher-level bipartite entanglements (piggybacked on the entanglement packets) can be created across multiple cells with intermediate cells fast forwarding entanglement packets, and endpoints acting as reflectors.

Entangled Transactions. One of the principal problems with Application infrastructures is the inability to count on a router or switch to not drop packets. While the loss of a router or switch may be a major perturbation event, the loss of packets is commonplace and the normal expectation of networking hardware. If those packets contain critical data, such as that in an Atomic Information Transfer (AIT), used in Entangled Transactions above, then, even though the amount of data is small, it would have a very large impact on the ability to recover. This causes applications (and databases) to have to take on the responsibility for failure protection and recovery, which is an extraordinarily complex and difficult undertaking to burden the application with, and which fails for all but the simplest perturbation scenarios.

The essence of this invention is the ability to build an end-to-end system where each element along the chain provides guarantees (promises) not to drop certain types of packets. While the majority of application (data) traffic may still be subject to the normally expected loss of packets and the need to retry, this invention now allows a special kind of traffic (entangled transactions) where the intermediate cells (including switches/routers or servers) promise to maintain the CQ/EQ properties required to create reliable delivery of Atomic Information Transfer (AIT) tokens.

The availability of an Entangled Link over the next hop in the network indicates the availability of a cell that is able to promise to not drop packets. Indeed, the mere offer of an entanglement mode over this hop implies this promise.

FIG. 19B is a block diagram of example entangled transactions through non-participating intermediate cells and/or and conventional routers. FIG. 19B shows Atomic Information Transfer of conserved quantity (the entanglement token) over an entangled chain. Protocol designed to ensure that black and white states on these tokens are always complimentary (emulation of quantum teleportation).

Multicast and Knowledge of Lost Tokens. In theory and in practice, it is far easier to detect, diagnose and recover from failures when there are only two entities communicating, and there are no intermediate mechanisms such as switches or routers. The entangled links comprising both ends of the connection have 4 possibilities regarding the maintenance of CQ/EQ tokens (side A has it, side B has it, both side A and B have it, and neither side has it). That is it: 4 combinations, two of which are desirable, and two of which are undesirable, but detectable and recoverable, as reflected in an earlier section of this application.

In a network where there are N nodes attached to the interconnect, discovering which of the N nodes has a lost token (or none of them) becomes exponentially complex.

In a cell/link system, every cell knows which other cell (and which port) it is associated with. Sessions are created below the protocol stack such that presence is managed, failures are detected (and healed) and privacy is maintained. Security is also significantly enhanced by the extremely low and predictable latency between the neighboring cells over a single link. Although it may still be possible for man-in-the-middle attacks prior to rendezvous of the entangled links, it would be significantly more difficult to introduce one after two cells have gotten to know each other and to characterize the link that separates them.

A significant benefit of direct (most proximate, minimum length) connections between cells is in their ability to detect and reconcile atomic information transfer tokens both in the link during transient failures, as well as around healed connections after a permanent failure. Clique-wide, colony-wide and complex-wide validation checks for accurate conservation checking of tokens is provided by the metadata tensor (distributed calculation of the determinant of the adjacency matrix). When used in conjunction with the local knowledge of lost tokens (i.e., on which link the token was lost), this affords a significant benefit to system reliability and recoverability, as well as a verification mechanism to provide assurance of correctness during system operation, particularly after a large-scale failure, disaster or attack.

Figure 20:
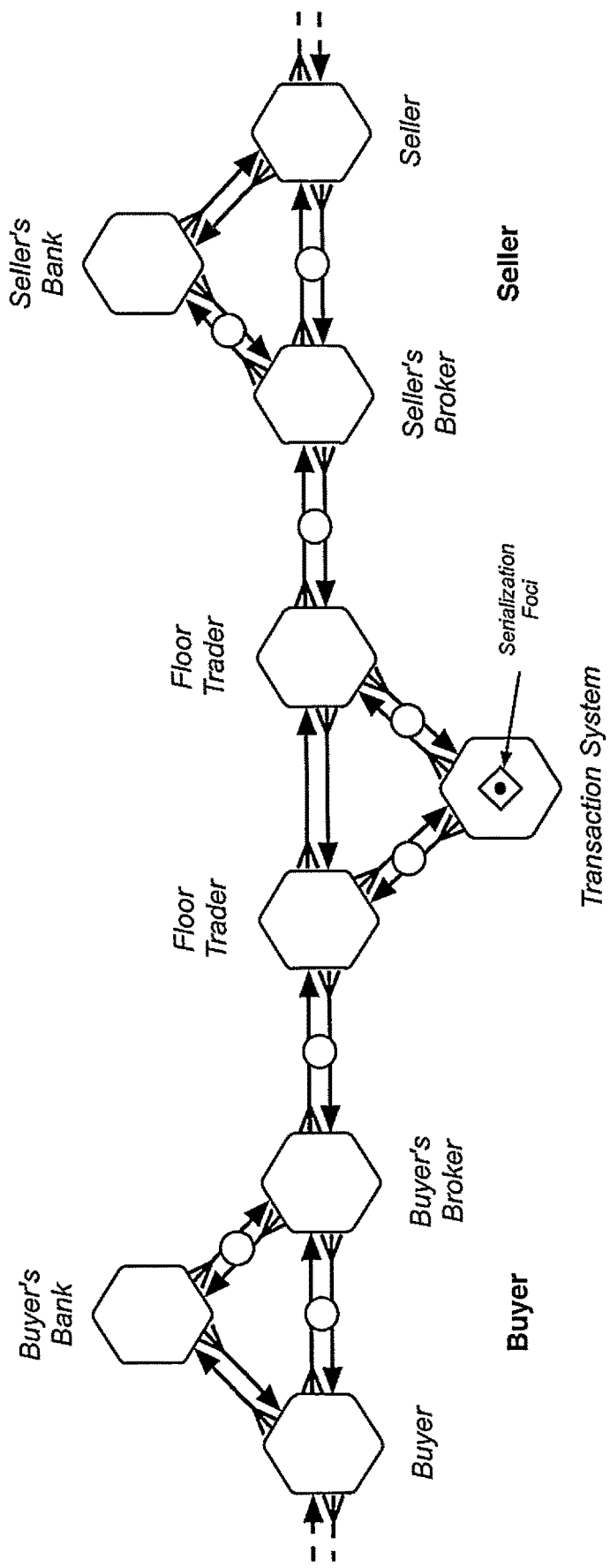
FIG. 20A shows an example entangled transaction system for stock market transactions.
FIGS. 20B and 20C show examples of entangled transaction systems for a multiparty financial transaction.
Figure 20:
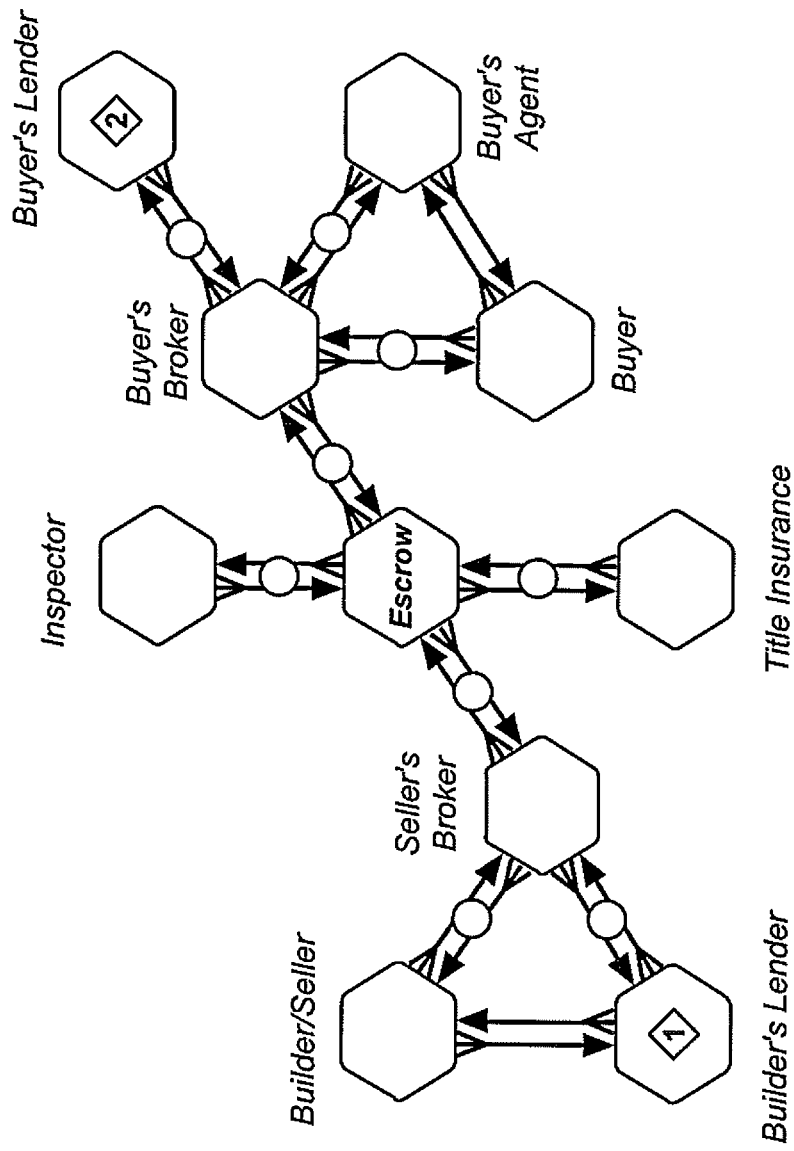
Figure 20:
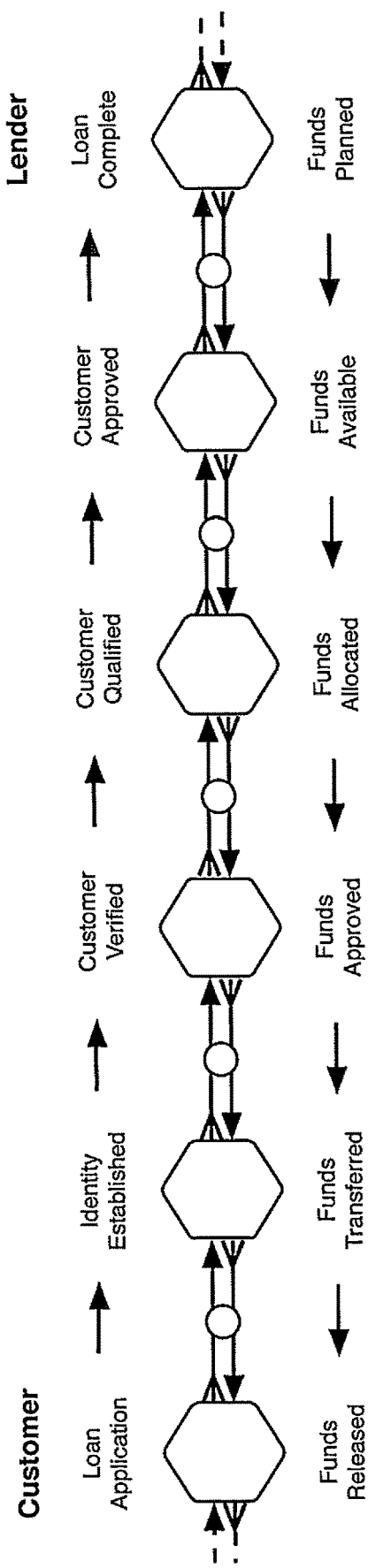

FIG. 20A shows an example entangled transaction system for administration-free stock market transactions. FIG. 20A shows an entangled stock market transaction where traders are acting on behalf of brokers, who are acting on behalf of their clients. The entanglements are set up pending some threshold for buy or sell. The seller's and buyer's banks are already notified that a transaction is entangled—and can verify, for example—that sufficient funds are available before the transaction goes through. The two-way communication on the links is a regular (asynchronous) communication where entanglements are not needed, and those elements with an entanglement are indicated with a white bullet indicating the pending transaction is entangled. Note that deadlocks are eliminated by requiring all the entangled links to form a Directed Acyclic Graph (DAG) for the entangled links. Any one of several spanning tree algorithms may be used to create this DAG (a tree). For example, the Dynamic Tree Algorithm specified in U.S. Pat. No. 8,259,620 B2 (Self-Healing Communication Trees) may be used.

FIG. 20C shows a simple customer/lender relationship. Although this is a single dimensional chain—from the perspective of a customer for example—the lender may have many of these overlapping one-dimensional trees going on concurrently, and at the last minute is able to approve funds down one path at the expense of another, based on the latest information they have. However, once funds are approved and released, the lender can no more back out of the transaction than the customer, who has signed a legal commitment to return the funds according to some schedule and with some interest, indicated by the conditions that fire the transitions between the cells.

Keep in mind, each of these cells in this path may have a different owner, or even a different legal jurisdiction. This separation of concerns affords an opportunity to mitigate certain failure modes—where for example, a single owner has control over multiple parts of the system—and can subvert any swindle countermeasures that the system otherwise would provide to independent owners. Each set of entanglement rules can be verified (and certified) by a model checker to guarantee that the system has no conflict of interest or other flaws that would weaken the trust in the system. FIG. 20B shows an example of how the system could work in a multi-party system, but where the principal relationship is between a builder and a home buyer. This shows only the initial entanglement transaction. However, because the relationship between the customer and the lender remains in effect for the life of the loan (which for a real estate transaction could be 30 years), this structure can easily be extended to automatic refinancing, interest rate changes, or even a complete loan modification process.

The valuable characteristic of such a system is in its ability to conduct reliable and secure e-commerce transactions amongst multiple anonymous parties where the legal guarantees are built into the rules of the transitions, and the system affords all parties in a multi-party system verifiable assurance against theft by any of the other parties, even if they are working in collusion.

FIG. 20A shows a simplified example of a stock market trading application of this technology. Notice that this marked-graph system can grow, shrink and maintain consistent entanglements among all parties. For example, a trust relationship may already have been set up between a buyer and a broker, which transcends any individual transaction. A common trust of the transaction system is agreed to by each of the floor traders, and this trust is validated every time a successful transaction is reliably executed. A key advantage of this system is that the time-critical transaction can be set up in a serialization focus—for example between a broker in San Francisco, and a broker in New York—but the key latency (speed of light) sensitive operation is confined to a very narrow time/space domain in the center. This has the potential to significantly speed up high speed trading; subsuming the Wissner-Gross, and Freer, Relativistic statistical arbitrage model. Keep in mind that the cells shown in the diagram are separate agent-based computer systems, which replace their human counterparts with a similar name.

A similar diagram would represent the relationships between buyers and sellers—in an electronic market such as eBay, for example. But, in this case the buyer's (or buyer's broker's) reputation is built into the system (as additional cells), maintaining that reputation as a digital quantity that can be used, with a threshold, to fire the intermediate transaction.

The whole purpose of this system is to ensure that buyers and sellers can rely on the system to ensure that their transaction completes reliably and securely, and to mathematically characterize each transaction according to some risk (Bayesian) relationship that can be managed in real time (as opposed to some overnight clearing system currently used in the banking industry).

Support for SMPT in the Earthcore Layers

Transactions may be expressed in a formal language, such as the Graph Virtual Machine (GVM). Desired behaviors in the Cloudplane and Earthplane layers are expressed by predicates—which are mathematical statements in the CAL—that guide the underlying DAL and NAL layers to do their best to maintain their promises whatever else happens, despite perturbations (failures, disasters, attacks).

Predicates include self (cryptographically monotonic durations) and encrypted timestamp-server based rules, which the system maintains for the "period" of the entanglement. For example, the transient period (locally-observed TSC) to complete a stock market transaction, or the period of the loan (months or years) for a bank and a customer).

GVM expressions are minimalist, simple, and provable. Entanglement statements can be composed from lower-level, already proven or tested elements of the language. The language is explicitly NOT a Universal Turing Machine. The code/data separation in the Graph Virtual Machine is NOT a von-Neumann architecture, making it substantially more difficult for the code to be compromised by a running program or malformed rules or statements. This reduction in Turing Universality allows systems to be built with far more constrained security exposure, even down to a complete entanglement (running on a secure operating system or hypervisor). Although Entanglements can be composed of simpler elements, they can be incrementally extended in their functionality to form provable rule-trees that allow one or more forms of business logic to be applied. Simple examples include the automatic triggering of remedies and penalties in case of default, late payments or once a year forgiveness of a monthly loan payment. The goal is to make the rules resilient to Byzantine failures in the system: either natural failures and disasters or malicious physical or cyber-attacks.

An important aspect of the system is that two or more cells may be involved in the multi-party entanglement. Although any number of witnesses can be attached to observe the entanglement, to ensure that auditable transaction streams (in a preferably idempotent and immutable data structure, such as that provided by the MetaData Tensor) can be observed and verified by any number of witnesses.

Witnesses are independent cells, owned by separate business entities, potentially in independent jurisdictions. They may be simply backup record keepers, or they may be more formal auditors. In Earthcore, the identification of these witness cells can be specified by the transaction parties, or they may be automatically discovered and allocated (based on verification by some certificate authority) by the underlying self-organizing mechanisms of Earthcore.

FIGS. 21A-21F are state diagrams for token transfer between cells coupled by an entangled link.

FIG. 21A shows the simplest possible symmetric bipartite entanglement. The token received by one side would simply be retransmitted by the other side.

FIG. 21B shows a three-state symmetric protocol, when a token is received, the first state is entered. The local transform status is then tested, where the protocol goes into the second state, the second state is exited and third state entered when the packet has been sent back. By having two different packet types (tick and tock) this state machine can (in principle) be reversed by sending the opposite packet type (pull instead of push token).

FIG. 21C shows a Two States, One Packet: Token method. No forward/backward observability. Every token is identical. (Until information is transferred) Problem: Each side doesn't know if/when the other side has the token, until it sends the token back (and then the other side doesn't have the token again!). Can use Token payload to indicate different packet types. E.g. Ack of information (persistent on this cell), and neighbor Ack (persistent on neighbor cell—this is useful for ingest reliability as well as entangled transactions).

FIG. 21D shows a three-state protocol. Three States, Two Packets: Token+Ack. Transaction Confirmation: explicit (from Ack) Token now has explicit ack (to provide information that token has been received by the other side). Problem is that the other side has to send two packets in succession with only a single event coming in. Also, this side has two states that are really the same—wait for Token, and "still waiting for token"—there is no event distinguishing them that is observable from this side of the link.

This effectively collapses back into a 2-state system. This will happen with any "odd" number of states. This illustrates that odd numbers of states implies an asymmetric two party relationship. Whereas, we are seeking (with Link Entanglement) a purely symmetric situation to maintain entanglement, where the symmetry is broken by either party wishing to move the communication mode away from this equilibrium.

FIG. 21E shows a three-state protocol. Four States Three Packets: Token, Ack, Ready, Token. Forward/backward flow is observable, as well as failure modes when intermediate packets are sent.

FIG. 21F shows a six-state protocol. Six States Three Packets: Token, Ack, Ready. Forward/backward flow is observable, as well as failure modes when intermediate packets are sent (or lost). Note that a 4-state system (using matrix transforms is sufficient to emulate QM.

Figure 22:
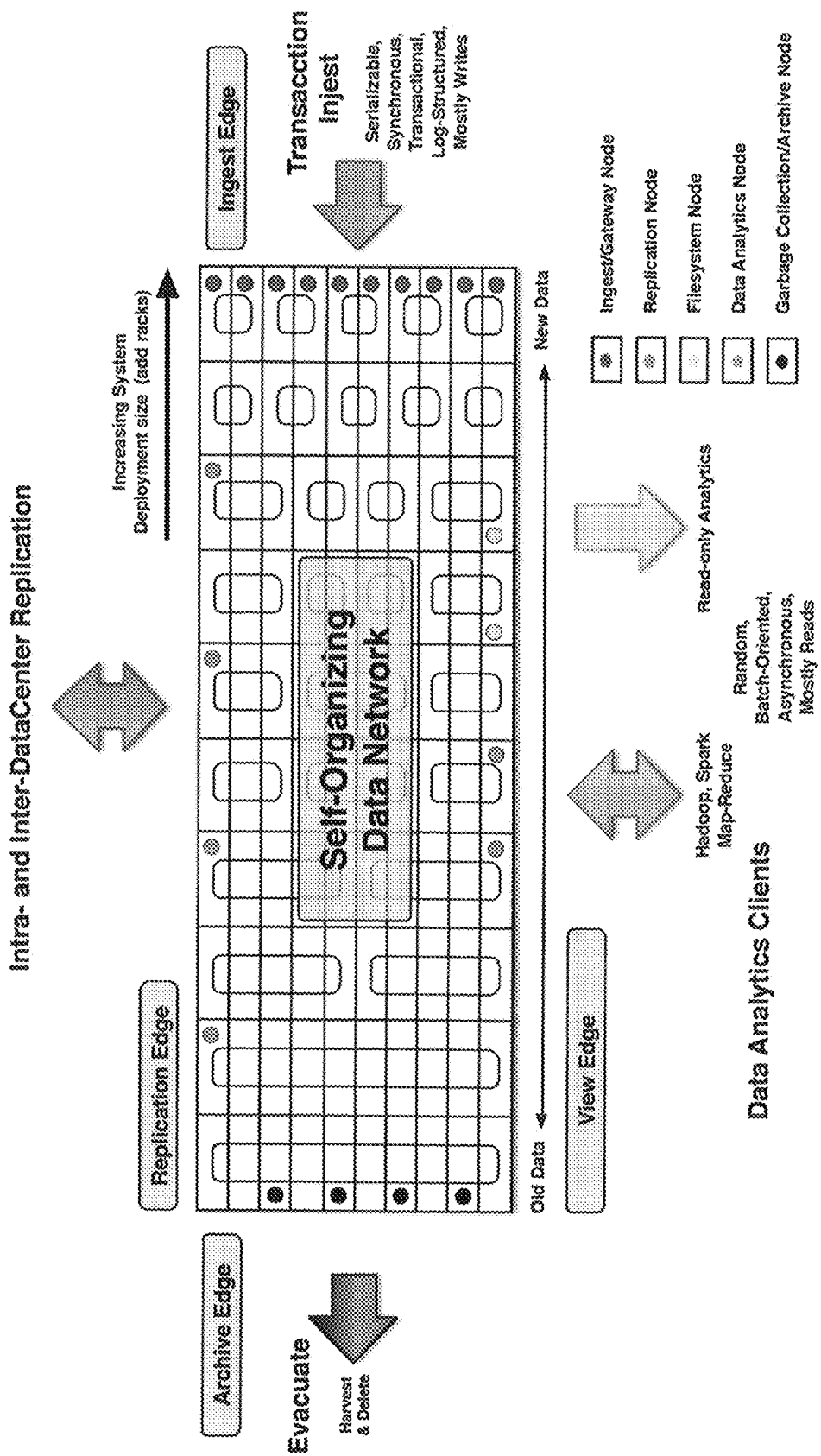
FIG. 22A is a diagram showing a self-organizing data network for a set of computer systems.
FIGS. 22B-22C are heat maps showing example temporal activity following entangled link trees.
Figure 22:
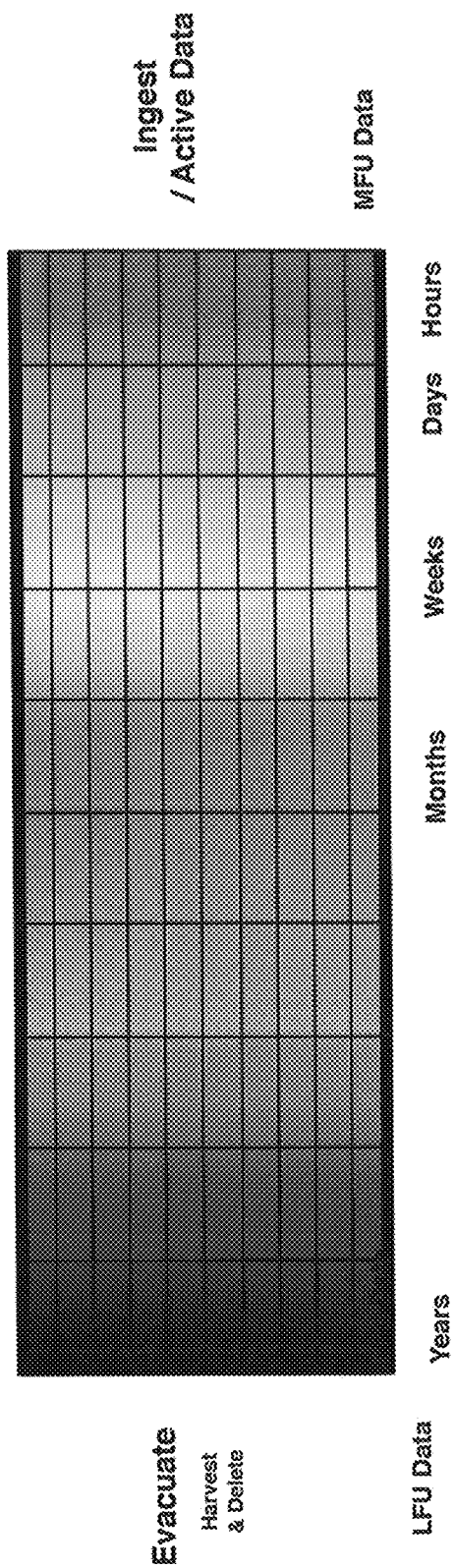
Figure 22:
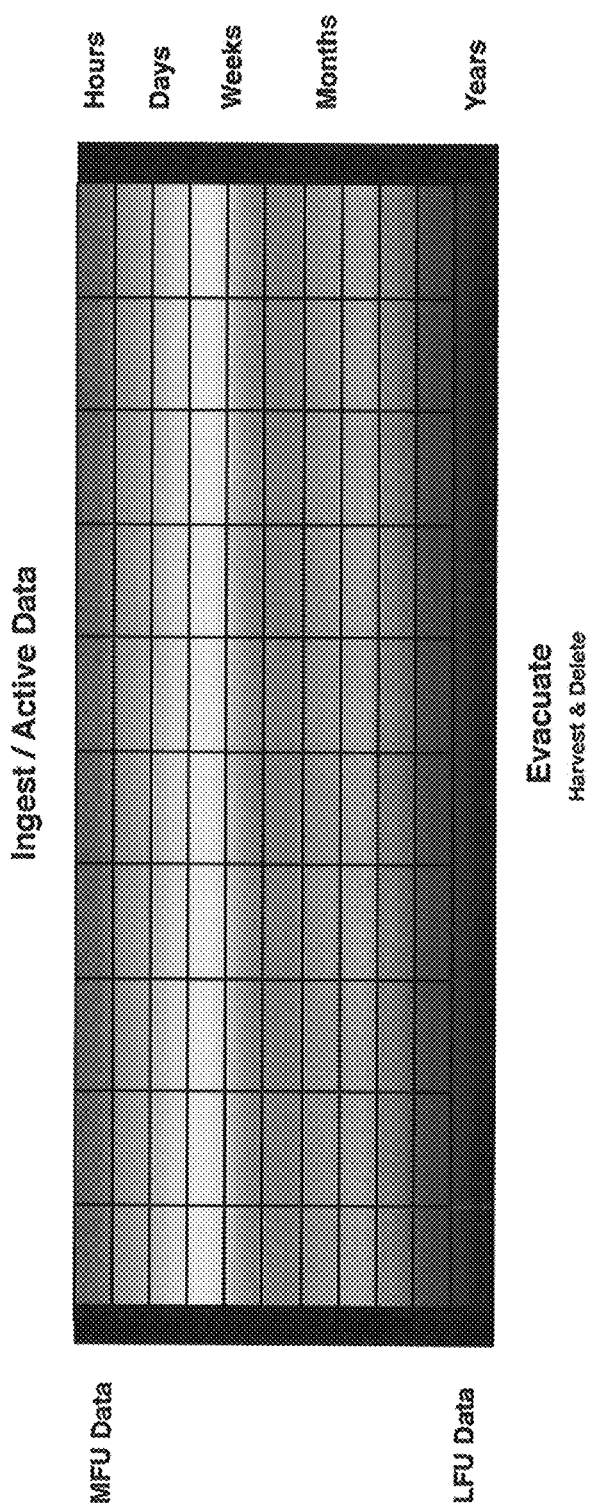

FIG. 22A is a block diagram showing a self-organizing data network for a set of computer systems. FIG. 22A shows a self-organizing data network including a set of rack compute systems.

FIGS. 22B-22C are heat maps showing example temporal activity following entangled link trees. FIG. 22B shows temporal activity following entangled link trees, from top of rack (ingest/active data edge where serialization foci live), down to bottom of rack (where entangled link trees terminate in leaves). Alternative FIG. 22B, FIG. 22C shows temporal activity with hot data coming in on the right side, and cold data being evacuated or deleted on the left side. The FIGS. 22B-22C are an example use case of the entangled link trees. Where hot (active) data is ingested at the top (or right), with load-balancing, application connections, and transaction requests coming in from the outside world, and the migration of data via consistency preserving pathways on the entangled trees from the hot end (roots) to the cold end (leaves).

Figure 23:
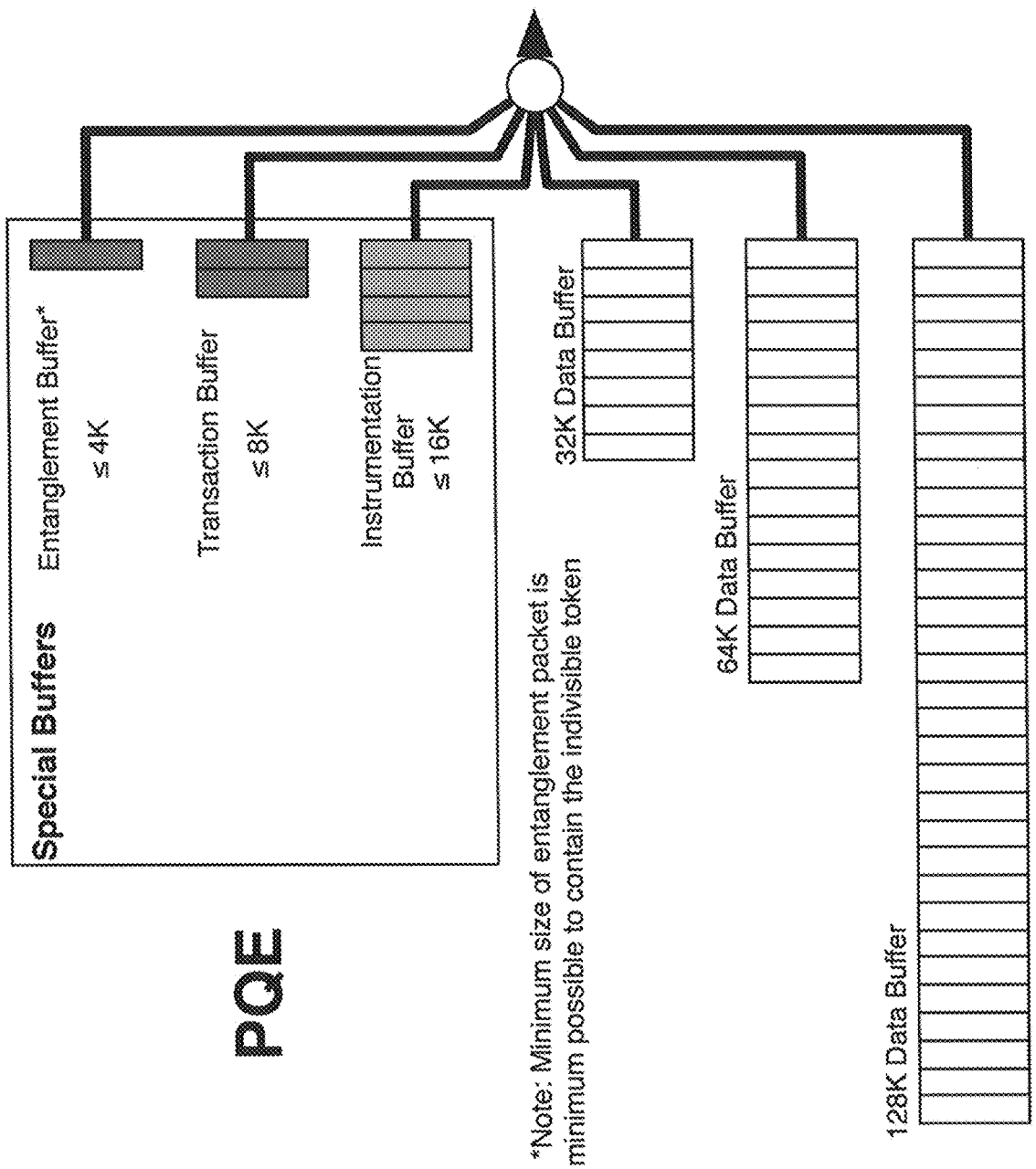
FIG. 23 is a diagram of an example of a priority queue engine and special buffers.

FIG. 23 is a block diagram of an example of a priority queue engine and special buffers. The Priority Queue Engine (PQE) of FIG. 23 may be implemented in software but its preferred embodiment is in hardware. The PQE enforces the following precedence in the sending of packets: Buffer size represents the maximum amount of data that may be sent by the device driver in one uninterrupted session. In general: every 2nd packet can be a (32K) data buffer send. Every 4th Packet can be a (64K) data buffer send. Every 8th Packet can be a (128K) data buffer send, and so on. Except for: special buffers: which must be sent before any data buffer can be sent (they may be sent to the DMA engine/NIC back-to-back).

At the beginning of each new session: If no packets exist in any other buffer, then entanglement packets are sent each time an entanglement packet is received. If packets exist in the transaction buffer, then entanglement packets are suppressed, and transaction packets are sent out, regardless of whatever exists in the data buffers. If packets exist in the instrumentation buffer, then they may alternate with transaction buffers (may be sent to the DMA engine/NIC back-to-back before returning).

Figure 24:
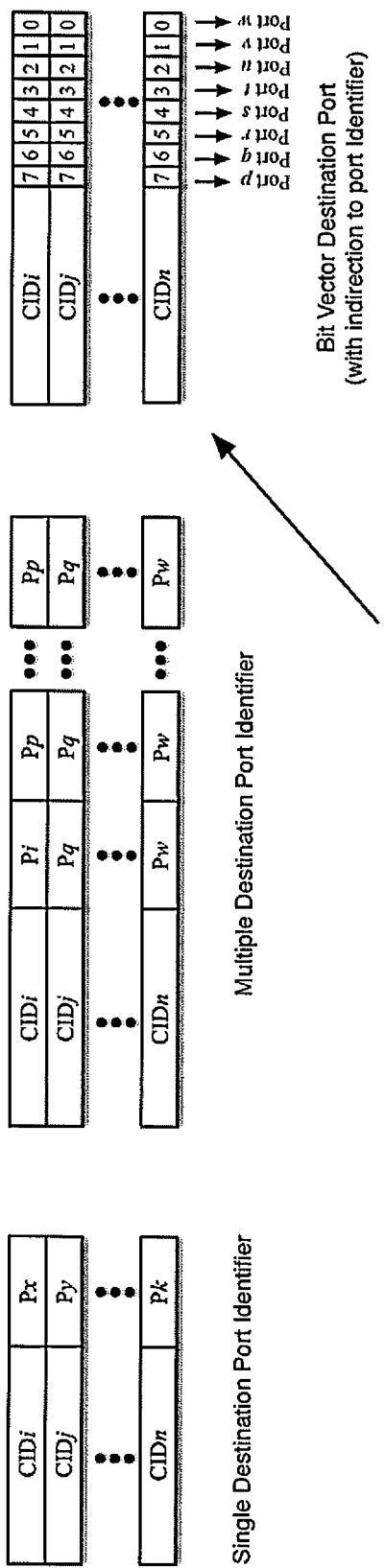
FIG. 24 is a diagram showing an example addressing scheme for cells.

FIG. 24 is a block diagram showing an example addressing scheme for cells. FIG. 24 shows an addressing method compatible self-healing communication tree, and attack and disaster resilient cellular storage systems and methods. In particular, FIG. 24 illustrates the identifiers used for classic endpoint routing (L2/L3, or V4/V6) can also be used for tree/branch addressing, i.e., the hardware is the same, only the interpretation of the packets by the cells need be different (i.e., to recognize entangled link packets, entangled transaction packets, tree building discovery packets, etc. The identifier 2402 is matched in CAM. It may be a L2 address, L4 (V4 or V6) address or any other identifier to predicate routing decisions (for example, an identifier indicating an itinerant object—for content-based routing). Note that the entanglement packets can be combined with routing packets. Whereas content-based routing (routing within cells that forwards to the output port(s) indicated by the presence of the targeted content in that direction (uses the TCAM (don't-care prefix in the routing table).

Structural Temporal Integrity (STI)

Structural Temporal Integrity (STI) refers to techniques for maintaining a persistent spatiotemporal structure between entities in a scale-independent distributed computing system by means of managed and observed temporal relationships. Software entanglements or hardware-assisted functions in the NIC or switch (timers, counters, threshold and anomaly detectors) supplement or replace conventional concepts of heartbeats, liveness, failure detectors and partition management in distributed systems. The structured aggregation of these relationships into networks provides emergent properties similar to structural integrity in mechanical systems, which may be exploited to provide robustness to perturbations (failures, disasters, attacks-including cyber).

Individual relationships such as those described above in the Entangled Links [ENTL] have properties including persistence (remembering whom they were connected to when communication is broken), latency (minimum, average), reliability (packet loss), bandwidth, and immutable history of past relationships and failures on that port. These properties are observed and maintained by mechanisms at the lowest levels in the operating system and I/O devices, quite independently of any processes running at the application layer or kernel, with the exception that they provide services to them. Typically, they are implemented on dedicated (side/sequestered) cores in order to provide isolation from legacy OS and applications and their security vulnerabilities, as described in FIG. 7B.

STI provides the ability to dynamically discover, name, and monitor the health of entire sets of nodes (cells) as a whole. To identify storage, bandwidth and computation carrying capacities and their current loading and rates of usage. While this information is monitored locally, it can be made available to higher layers for aggregation (and management reporting).

The primary purpose of STI stems from its ability to support persistent computation and data storage over a dynamic graph of vertices and edges in spite of ongoing partitions and merging (healing) of the network. This, in turn, supports dynamic computation among a group of cooperating agents, elastic expansion of the computation as new resources is made available, and the potential for dynamic reconfiguration to complete the computation even though agents or subsets of agents are failing and must be withdrawn from the resource pool.

Various characteristics of the network are measured precisely at the local level, and information on liveness, averages, diameter, etc., percolates across the network through the transitive neighbor to neighbor interactions between individual nodes.

In mechanical engineering, tensegrity (tensional integrity) is a structural principle based on the use of isolated components in compression inside a net of continuous tension. In addition to large scale Geodesic Domes, small scale molecules like carbon fullerenes and nanotubes share their remarkable mechanical properties, including tensile strength.

Structural integrity is a widely known and well understood phenomenon in mechanical systems. This invention enables equivalent can be achieved in distributed system in a temporal fashion (through latency awareness and anomaly detection thresholds).

Packet exchanges between computers can form a system-wide collective integrity, and if any part of the system is disturbed, other parts of even a large distributed system can be made aware of this disturbance in remarkably short order. Whereas typical heartbeat packets and protocol-stack based communication in distributed systems work from a few milliseconds to many tens of seconds, a clique of cells exhibiting TSI can distribute awareness of temporal disturbances in hundreds of microseconds over conventional network fabric or even in a few microseconds when NICs on different cells are directly connected.

Applications of this technique include attack awareness when systems are penetrated, mutual testing of health properties, collective responses to system-wide events during disasters, and simple real-time awareness of physical reconfiguration events—either through human action, or mechanical damage.

A geodesic dome is a lattice of mechanical nodes and links based on a network of great circles (geodesics) on the surface of a sphere. The geodesics intersect to form triangular elements that have local triangular rigidity and also distribute the stress across the structure. Geodesic designs are used to enclose a space.

Tensegrity is a property of a structure indicating a reliance on a balance between components that are either in pure compression or pure tension for stability. Tensegrity structures exhibit extremely high strength-to-weight ratios and great resilience, and are, therefore, widely used in engineering, robotics and architecture.

Tensegrity is the engineering principle of continuous tension and discontinuous compression that allows geodesic domes to deploy a lightweight lattice of interlocking icosahedrons and yet be incredibly strong and rigid, despite failures or damage to parts of the structure. A "three-way grid" of structural members results in substantially uniform stressing of all members, and the framework itself acts almost as a membrane in absorbing and distributing loads. The resultant structure is a spidery framework of many light pieces, such as aluminum rods, tubes, sheets or extruded sections which complement each other in a spatially distributed vertex and link structure.

Classic examples of tensegrity structures are the sculptures of Kenneth Snelson that suspend isolated rigid columns in mid-air by interconnecting them with a continuous tensile cable network that prestresses the whole system, and the geodesic domes of Buckminster Fuller that utilize triangulation and minimal tensional paths between all pairs of neighboring vertices to maintain their stability. Prestressed tensegrity structures are found at all size scales in living systems and play a central role in cellular mechanotransduction. A number of wireframe structures have been built from DNA; however, these are relatively static shapes that do not display many of the novel mechanical features of prestressed tensegrity structures, such as the ability to globally reorient internal members and thereby strengthen in response to local stress.

In the field of distributed systems, we advocate using closely analogous principles to create a lightweight but rigid "spatiotemporal structure" which grows stronger and more robust to perturbations as it gets larger. By incorporating authentication and temporal awareness directly into a model of persistent relationships, we can build far more robust systems than is currently possible with remote procedures and other common client-server or network computing technologies and provide new foundations to make our systems secure.

Just as structural integrity is fundamental to the cohesion and resilience of mechanical systems (e.g., bridges, geodesic domes, aircraft, ships and buildings), Structural Temporal Integrity (STI) is fundamental to the cohesion and resilience of IT infrastructures.

Without STI, IT systems must be individually designed, installed, configured, managed and monitored. When they fail, they require individual attention to bring them back to their intended state of operation.

With STI, IT systems are autonomously-configured, self-monitoring, and managed as self-organized and substitutable sets, ready to respond and adapt to service requests (continuous or event) or perturbations (failures, disasters, attacks).

Structural Temporal Integrity (STI) is the result of research into the nature of time in distributed systems. This is a model for interactions between computers—that emulates the interactions between fermions and bosons in physics—and powerfully exploits these simple, subtle and fundamental characteristics that hold our universe together.

STI provides a temporal cohesion—an awareness of various spatiotemporal properties of the relationship between neighbors in a network. Using the mathematics of sheaf theory and percolation, we maintain knowledge through transitive-closure for system-wide integrity without the need for direct communication across the network, which would otherwise inhibit scalability and performance and impose unnecessary failure modes that cause widespread disruption in the operation of distributed computations.

STI is layered. Neighbor cells, at their lowest level of abstraction, share a common entangled link to maintain neighbor awareness. Connectivity is actively monitored; symmetric packets maintain this mutual awareness, while missed packets initiate a progressive decay in the integrity of the connection with each lost packet—from a maximum value integer down to a floor of one (zero may be reserved for uninitialized connections). Many things are monitored locally in this connection, including the electrical link state of the NIC, to the latency profile (min, max, moving average) of the entanglement packets themselves, and the packet loss.

In this way, properties of the link (shared by reactive entities on both sides), may be used by higher-level functions to make decisions on routing, security domains, failover paths, load/capacity-balancing, or response to perturbations.

Higher-level entanglements occur between passive agents, which exist on cells distributed one or more hops away in the network. These multipartite entanglements maintain distributed knowledge of each other through arbitrary network partitions and merges and enable algebraic operations to be performed to maintain data safety and persistence, as well as to perform damage assessments due to regional—or system wide—infrastructure disruptions.

Still, higher-level entanglements may occur between active agents in the system, where: 1) Streaming is required for the ingestion of new data, local protection, distribution to an arbitrary number of remote agents, and its contemporaneous delivery to a recording archive. (Single-writer, multiple-reader); or 2) Coherence is required, for example, between replicas of a data object shared by a few or many agents (multiple readers/writers).

These relationships are specified by the MetaData Tensor (in, for example, a cascaded synchrony path through multiple cells). The entire path transitively maintains its entanglement properties, while the MDT provides adaptive coherency.

STI also enables various security mechanisms to be deployed:

Each cell transmits a unique cryptographic token to the other, containing its public key. There are two slots in the message: the last token received and the current token being sent (the Cell IDs are the public key for that cell). When this is the first packet (e.g., after a cell has been brought up) the second slot is zero.

STI allows variations in spatiotemporal relationships to be monitored locally, and exceptions to trigger messages to security monitors in different parts of the system.

STI maintains virtual connectivity between cells and the agents on them. Virtual connectivity means that if a link is intermittent (i.e., a WAN with packet loss), then a reconnected link between the same two cells (or the same failover group in a clique) will quickly re-establish the link awareness without initiating network healing operations, or a heavyweight authentication protocol. However, each side of the failed link may require the other side to perform an irreversible computation task which verifies that no additional code is in the path of execution on the core of its neighbor node. This test may include a cryptographic signature of itself as it executes the code.

STI: A New Security Toolset

Language Support for STI: Structural Temporal Entanglement is integrated directly into and driven by the Earthcore Language System—discovery, mobility, network evolution etc., are represented as continuously updated resource manifests and global aggregations of distributed state, available directly to the language where we can compose proven, robust, and secure elements into functions and applications that drive the ingest, migration and persistence of the data.

Underlying each of these elements in the language system, are the STI mechanisms, available as first-class primitives in the language so that declarations can be made to—for example—maintain a mirror for safely ingesting data, perform continuous backups for protecting active data, and retire inactive data to an archive under some specified Information Lifecycle Management (ILM) rule, or a set of rules comprising a coherent regulatory compliance system for that dataset.

Support for STI in the Earthcore DAL Layer

STI provides advantages similar to and complementary to structural integrity in systems constructed in 3D space. In physics, space and time are inseparable, so a rich temporal relationship that allows agents and applications to zoom in and out of temporal awareness can eliminate much of the fragility, brittleness and uncertainty of conventional networks with flapping routes, high packet loss, or DDoS attacks. STI brings a whole new meaning to the concept of liveness in distributed systems.

Most importantly, STI provides temporal cohesiveness to a scale-independent information infrastructure. Each part is intrinsically connected to the whole, with a protocol architecture that uses a small fraction of the bandwidth between cells and scales as a constant-no matter how large the system grows.

Earthcore overcomes many common psuedo-failures due to disks or file systems becoming full. By automatically replicating objects to other cells on ingest (synchronously or asynchronously), the ingest disk can simply evaporate least-recently used objects on the edge cells, thereby making room for new data. This (capacity balancing) mechanism is recursive; least-recently used objects progressively migrate away from edge cells to core cells in the network, creating an administrator-less, self-tiering gradient of most-recently to least-recently used objects across the system. In addition to eliminating unnecessary human attention for this common migration operation, it eliminates one of the most common and pervasive failures seen by applications.

No longer do we need to respond immediately to disks failing, lost connections to backup systems, or non-responding remote archive systems. A simple algebraic expression describes the predicates that the system should maintain, and the underlying self-healing mechanisms take care of the rest. Failed devices and systems are simply retired from use and added to the maintenance manifest.

Because Earthcore is built from nothing but substitutable cells, any cell can be used as a sibling in a failover group (clique) to replace any other. Because agents (and the replicas of objects they represent) can be created or migrated to any cell dynamically, any of them can represent any storage function: a primary, mirror, backup, remote replica, cache, archive, etc. And failures can recover from any of them to transparently recreate what was lost.

Security Architecture and Methods

Encryption

Earthcore maintains all objects in the DAL as encrypted. Objects (and their replicas) may therefore be itinerant, and migrate around the clique, colony and complex in their encrypted state. This eliminates much of the performance overhead of encrypting "on the wire", allows cells with a lower security clearance to store data of a higher classification, and eliminates several potential attack vectors for the exposure of sensitive information should these cells be compromised or physically stolen. Keys are never distributed to or through intermediate cells without at least an additional layer of encryption and alternate paths for redundancy.

Earthcore cells are fully substitutable. However, they may specialize based on relationships to client accesses, e.g., into "edge" cells (those with access through potentially insecure legacy protocols), and "core" cells, which are accessible only via the Dynamic Locally Secure Protocol (DLSP). The distinction is made by what the cells see from its vantage point as inputs to its network ports. Objects are ingested and encrypted (and keys are managed) and decrypted on edge cells. See FIGS. 22B and C.

There are cases where it is impossible or undesirable to maintain all replicas of an object in an encrypted state. Examples include partner (or mirror) replicas, to protect newly ingested data from disk errors [SDC, etc.]—Cascaded Synchrony, where backups progressively flow from synchronous fast updates to updates, to slower updates and then eventual updates across a distributed system, and active sharing of objects across different cliques.

In these cases, the stacked security trees provide a constraint overlay to bind the flow of unencrypted or lightly encrypted data (one of the various forms of "block" encryption that allows modification in place or appends protocols to minimize the amount of information to be sent on each update), so that it can be efficiently combined at each replica to cause the smooth evolution of those replicas from one stable state (snapshot) to another.

Time

One of the most widely under-appreciated attack vectors on computer systems is the notion of "time," which is frequently implemented in computer systems as if it were a single monotonically increasing function on the real line.

The theoretical difficulty of this lies in the physical reality that time (as an observable change; an information flow) moves successively within a graph of vertices (not in some linear or total order), passing information both forward and backward along the links between them in a partial order. However, our devices, systems and even our own memory sees only the only the decoherence effects of information accumulating (along a direction we experience as going "forwards" in time).

The fact that a ten-year-old child can exploit mobile games by disconnecting her device from the network, manipulating the clock settings and then reconnecting it to the network is an example of how trivially easy it is to circumvent the security of an application. However, these problems are in a general class of security mechanisms which fail because the underlying axiom regarding time is flawed. In a virtualized world, every computer system must recognize that time is a variable that may be manipulated, both for legitimate operational purposes as well as maliciously. Operating systems as well as applications, must be prepared for their executions and/or their "Real-Time-Clocks" (RTCs) to be stalled for indefinite periods relative to other systems. RTCs may also be set forward, backward or arbitrarily stalled and cannot be relied upon to deliver a monotonically increasing function independently of some higher-level trusted source of time. The most common method of accounting for clock drift is synchronizing itself to some well-known time server. Unfortunately, those time servers may not be trustable and can be impersonated. There is no general solution to this problem that is both practical and theoretically correct because of the relativity of simultaneity (both special and general) and the nature of information transfer in quantum entanglement/decoherence. Time must therefore be examined extremely carefully in any distributed algorithm. There are situations (for example, in regular transactions) where a local notion of time must be able to go backwards to reverse a transaction which was unable to proceed and guarantee its atomic, consistent, independent and durable properties.

While we cannot, in general, trust either an internal or external source of time (especially a virtual machine), there are situations where "successiveness" violations can be detected, for example, in the entangled links mechanism. Entangled Links exploit the difference between reversible computing and irreversible computing, and lie at the heart of Landauer and Bennett's definitions. They can be composed into higher level functions, such as Entangled Transactions and Structural Temporal Integrity (STI) which is described below as a mechanism to trigger re-authentication when "successiveness" violations are detected.

STI, therefore, creates its own 'temporal intimacy." It recognizes that the only objectively verifiable progress of time is in the links themselves, where we emulate a reversible computation. This emulation is silent when it is operating correctly, "exquisitely sensitive" to lost packets and uses a beacon mechanism driven by a hardware timer to restart the entanglement when entanglement is lost. The normal operating mode of the links is for time to appear "frozen".

Collections of cells connected by such links can be aggregated into a higher level "temporal intimacy" where each of the cells is mutually re-enforcing regarding their awareness of time. Capable of "sensing" that a potential sibling cell is running more code than it should respond to the entanglement and other "test" packets (for example, if someone tried to run the Earthcore itself in a virtual machine).

This awareness can be used for a number of security countermeasures. For example, it no longer needs to "trust" external sources of time information from the network, which can be impersonated or compromised. It can be used as a collective "immune system" to detect malicious code through anomalous timing signatures. It can also be used to provide high-resolution latency triangulation for network packets coming in from outside the secure system and (through an even higher-level cooperation across data centers) provide malicious attack analysis on a "real-time" evolving set of blacklists, whitelists and greylists.

Secure Domains

One of the many theoretical and practical advantages of Earthcore's cellular structure is the physical and logical boundary afforded by a cell and the software which runs on it. This affords an opportunity to (at some level) provide a clear and unique identity that may be secured and authenticated and which the system as a whole can detect if it has been illegitimately cloned.

At the heart of all security protocols is the notion of a trusted object: some hardware or software kernel that cannot be compromised. See 114 in FIG. 1.

Secure Links

Just as agents are encapsulated, complete, and autonomous computational elements, links also represent the same. Although agents get their sense of time from the internal clock of the computer, links get their sense of time from the active protocol relationships occurring over them: if a link fails, as far as the link (on both sides) is concerned, the time has stopped.

Communication

Our approach to communication explicitly recognizes the informational value in the relationships between entities. All communication is strictly bipartite at the fundamental level (cell to cell, agent to agent). In particular, a broadcast is disallowed, along with any virtual synchrony or other mechanisms implemented in a low-level multicast arrangement.

This one-to-one mapping of communication between cells affords several mathematically useful properties:

Cells each have their own local identity, known only to the link.

The link is treated as an independent and autonomous computational entity. If the link fails, the progress of "time" relative to that link is compromised.

Security Trees

Computation spiders (dynamic graphs of cooperating agents) exist at all three layers of the Earthcore infrastructure: CAL, DAL and NAL.

Only the infrastructure spiders can build trees (Directed Acyclic Graphs—DAGs) on top of an arbitrary graph. Object spiders build trees on top of the already established and declaratively maintained infrastructure trees for inactive objects. Computation spiders build higher level tree covers which define and maintain the set of resources where active computations are allowed to write to the now active objects. Each layer may be built on its own set of security trees, which is invisible to the spiders at a higher level, but which inherits its security properties from spiders at lower levels.

The Earthcore architecture allows the definition of subgraphs (cells and links) which are secure and authenticated relative to the namespaces and objects. This requires that the spanning tree and healing algorithms participate in the security and integrity aspects of the securetrees.

Authentication

Edge cells are able to deploy various intruder and impersonator countermeasures. The first, and most important, is the limitation that legacy protocols are required to be from clients in the same subnet. Subnet presence can be verified by the authentication (log-on) mechanism and further validated by their latency signature (for example, using the Distributed Address Source Triangulation method described in the DAST patent disclosure).

Authentication in Earthcore involves a client device (one that attempts to connect via legacy protocols, e.g., cifs, nfs, ftp, http, etc.) first establishing its security clearance with the Earthcore system. This is, in effect, a log-on at the organization level, which specifies that this client device is "fit" for accessing files in this organization's namespace. This does not provide actual access to files, it only validates that that organization has certified (or accepted someone else's certification) that the device belongs to the security class that it claims and that its security countermeasures are properly functioning and up to date. This may be validated by verifying the hardware and software configuration and relationship with a VM hypervisor by various cryptographic means that overcome replay attacks from a potential man in the middle.

Client devices are assigned certain properties by the system, which allow modulation of their privileges based on, for example, whether or not they are accessing the system from within the same subnet of the cell that fielded the request or has some specific latency signature that can be used to verify their position to a known or trusted location.

The next level of authentication is between the user on that client device and their own personal namespace. This requires the user to present their policy-enabled authentication procedure (for example, a two or three factor authentication, depending on the clearance level of the individual and the potential damage that might be caused by an impersonator). Continuous Adaptive Authentication mechanisms may be deployed, in conjunction with the client, to ensure that they remain clean during the session.

Specific applications that are run by the user may be subject to further degrees of authentication to ensure non-repudiability and provide resistance to the falsification of information.

Figure 25:
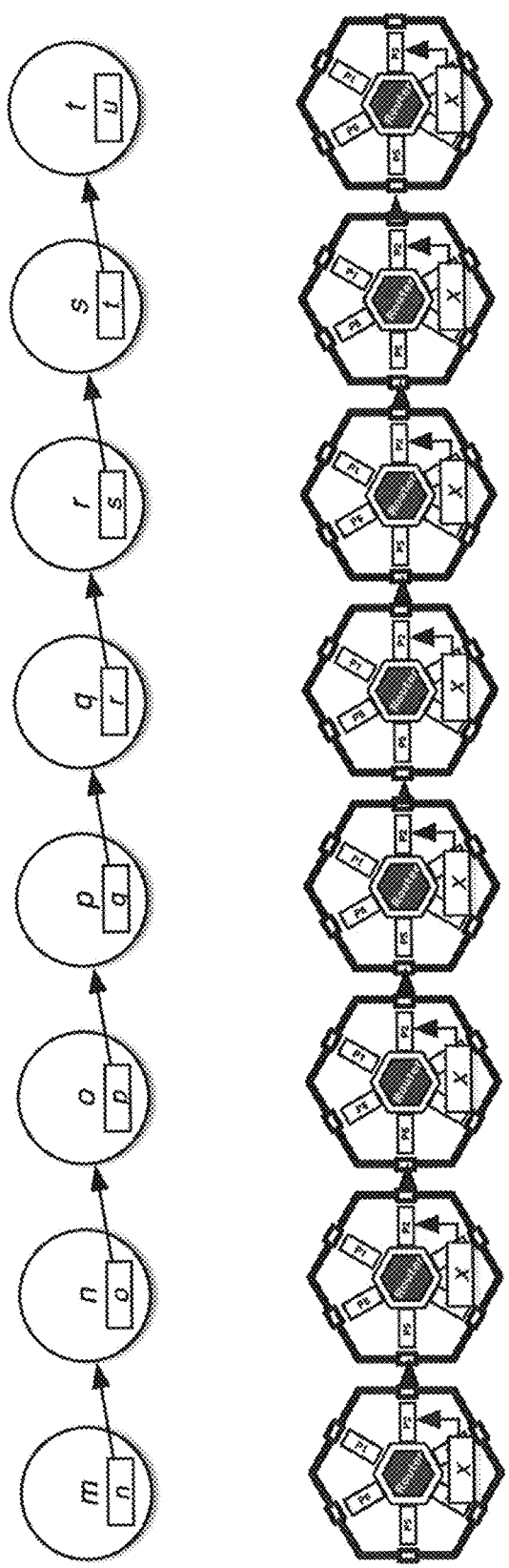
FIG. 25 compares the complexity (indirect addressing state space) of conventional application networks and entangles chains.

FIG. 25 compares the complexity (indirect addressing state space) of conventional application networks and entangled chains. In a conventional chain application (pipeline), the address of the next node maps through an indirect pointer, which can take on any values from the full address space. In the entangled chain, the address of the next cell may be either the port identifier (perhaps 3-4 bits for 8–16 possibilities), or always the same value (e.g. opposite the port it came in on).

Figure 26:
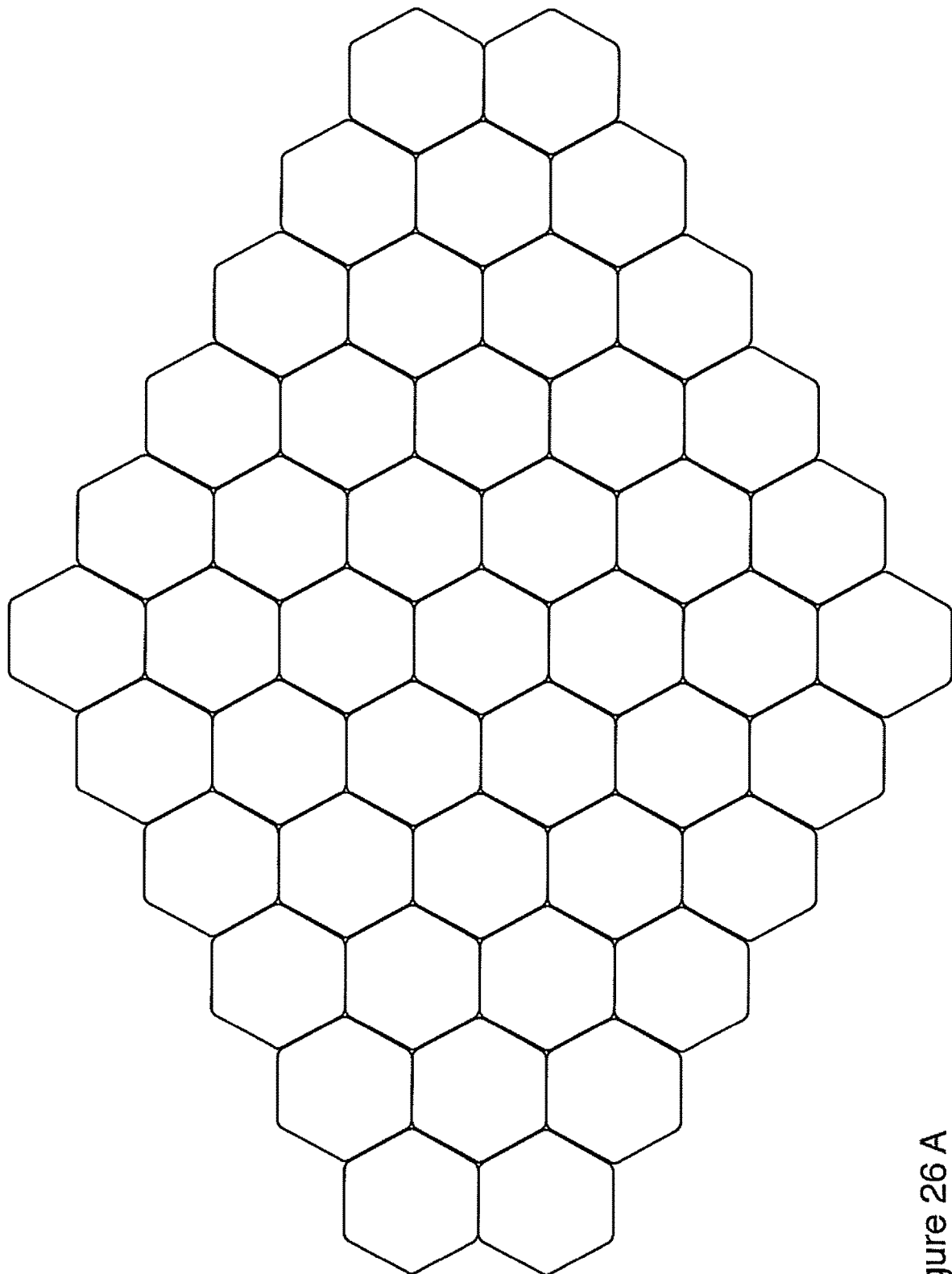
FIG. 26A shows a set of closely synchronized cells in a clique depicting Structural Temporal Integrity (STI).
FIG. 26B is a diagram showing how cliques can grow arbitrarily large in any direction, demonstrating their scale-independence.
FIG. 26C is a diagram showing how cells in arbitrary networks will naturally form (self-organize) into communities, with the latency of each entangled link representing a natural boundary defining the community/clique. Scale independent, but naturally forms into cliques.
Figure 26:
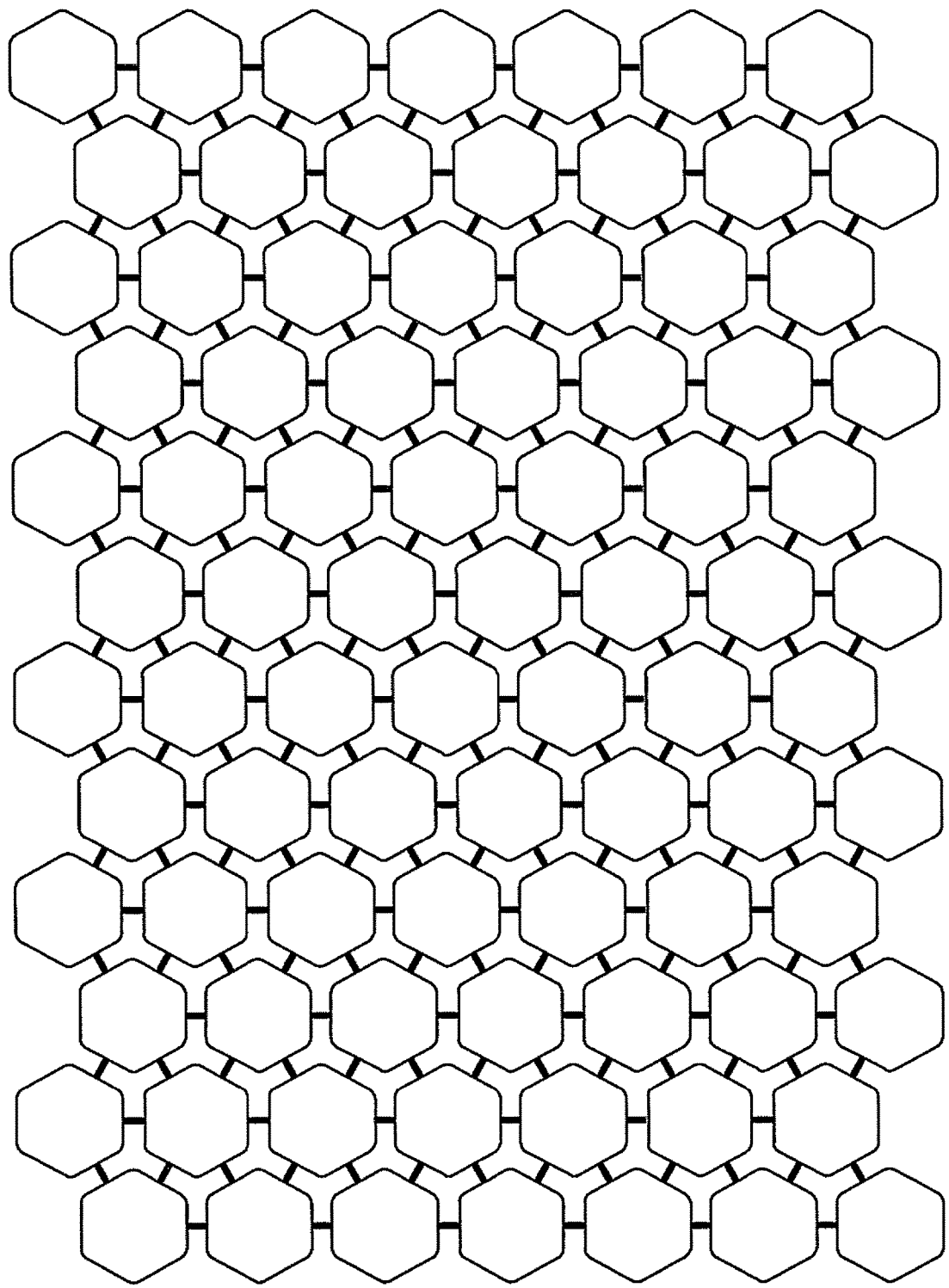

FIG. 26A shows a set of closely synchronized cells in a clique depicting Structural Temporal Integrity (STI). There are several ways that hardware can help support Structural Temporal Integrity (their software equivalent can also be supported in the device driver or interrupt service routing in the absence of hardware support):

Automatic Measurement of entanglement latency: establishing baseline, running averages, and threshold detection (of say 2×, 4× or 8× violation). In order to eliminate security hazards, these parameters should be baked into the firmware and not modifiable by normal software.

Automatic measurement of entanglement loss. This follows the description in the original ENTL and ENTT disclosure.

Automatic forwarding of packets. Although this is a normal function for a router (forwarding plane), it takes on a special meaning when we wish to distinguish between Virtual Entanglement and Logical Entanglement (See VIRE disclosure in the provisional application). In this case, the hardware forwarding function needs to distinguish between the operation mode (perhaps triggered by entanglement packet type) by (a) returning the entanglement token back to the entangled NIC which sent it and (b) forwarding the entanglement token onto the specified subtree, or (c) both.

System-Wide Temporal Awareness. Entangled packets support Structural Temporal Integrity (STI) via rapid propagation of awareness of events throughout its trees. This is particularly important in scenarios where major damage is being experienced by many cells at or around the same time. Early warning of correlated system-wide perturbations (failures, disasters and attacks—including cyber) enables cells to take pre-emptive action to protect and save their data and to shut down their own activities into a safe mode until the event has subsided.

A particularly important aspect of STI to support defense against cyber attacks is if instrumentation in one of the "edge" cells detects an event (for example, suspicion of an intrusion from a particular IP address DDOS attack), it can utilize its Virtual (as opposed to logical) Entangled Links through the core cells to all other "edge" cells to communicate this information as rapidly as possible. This would allow the fastest possible "cut through" routing of packets through the core, but with all edge cells receiving the data as fast as possible, in order to instigate their countermeasures, and potentially share attacker information on, for example, load-balanced cells. Such information may include the update of blacklists (definitely bad), whitelists (definitely good) and greylists (suspected) IP addresses.

Instrumentation propagation. Entanglement packets are effectively NUL packets to maintain temporal intimacy but have no semantic meaning. However, in principle, there is no reason why one or more elements of "background instrumentation" cannot be transmitted within the spare space of an entangled packet. This is particularly useful when we might wish to replace, for example, much of the error-logging machinery of modern servers. Since the bandwidth used by entanglement packets is otherwise "spare", it can be used without affecting the rest of the system or the normal application traffic. The particular case of timeout errors is treated specifically below in this document, however, there are many other ways that the combination of entanglement packets, supported by the hardware, can reduce or even potentially eliminate much of the excessive logging of errors in a distributed infrastructure.

FIG. 26B shows how cliques can grow arbitrarily large in any direction, demonstrating their scale-independence. FIG. 26B is a block diagram showing structural temporal integrity is scale independent, if we use entangled links between cells, there is no common simultaneity plane, but there is an ability to "time order" behaviors in the system by managing the serialization foci.

Figure 26C:
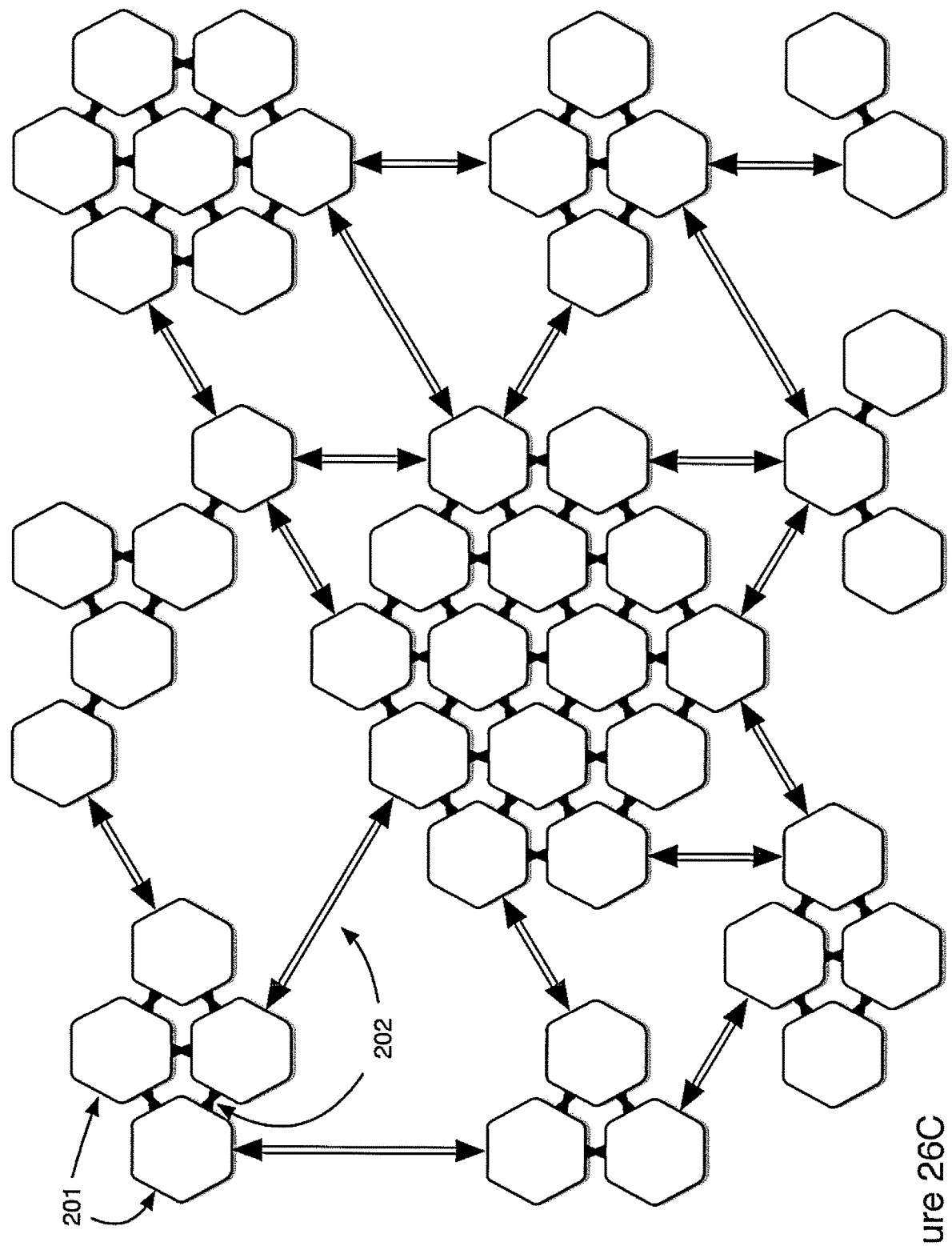

FIG. 26C shows how cells in arbitrary networks will naturally form (self-organize) into communities, with the latency of each entangled link representing a natural boundary defining the community/clique.

Figure 27:
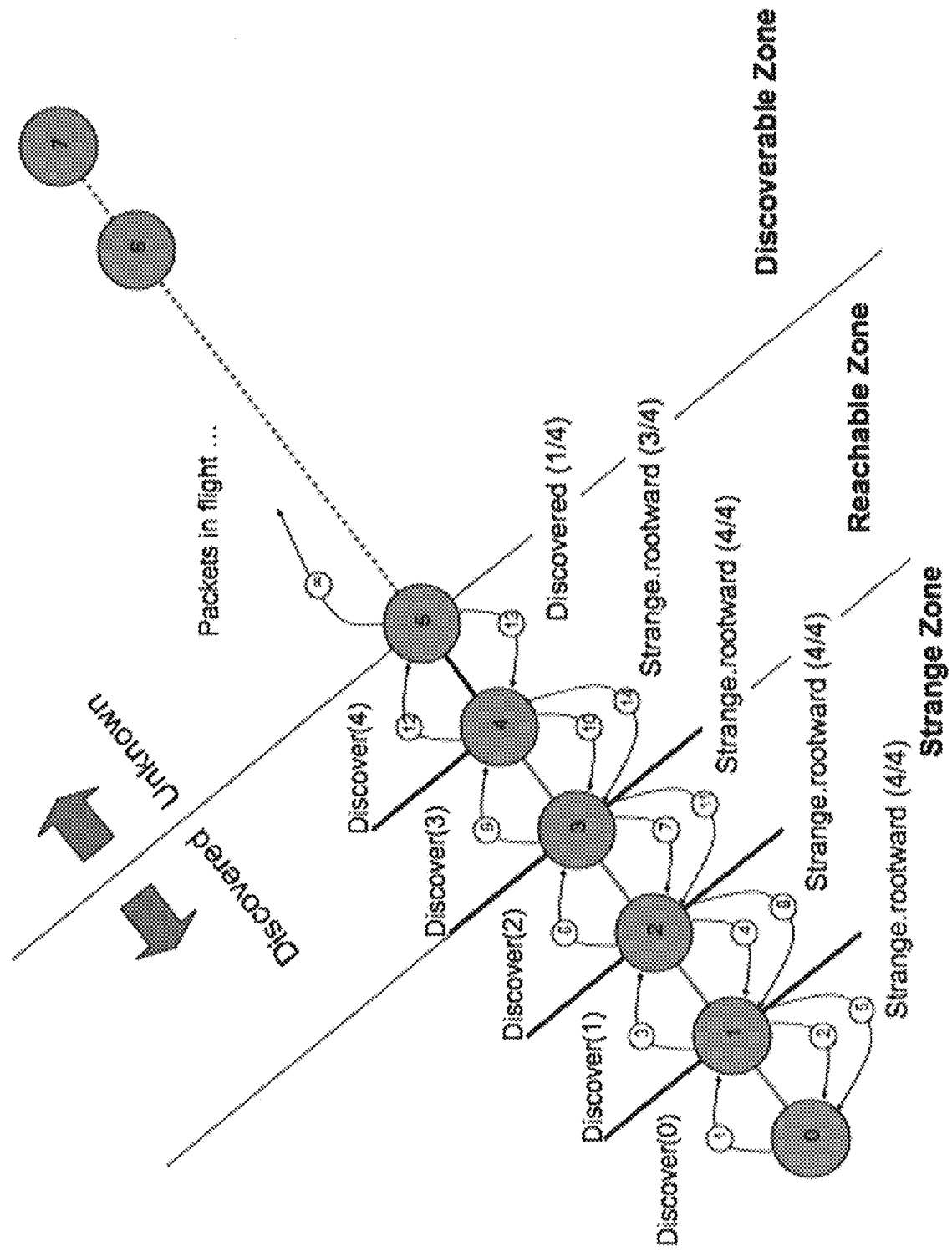
FIG. 27 is an example state diagram of a process for discovering a cell.

FIG. 27 is a state diagram of a process for discovering a cell. The transition is for "strange." The criteria for decision are that all ports present & accounted for (have either sent or received a discover packet on all active ports). At least one port is charmed (leaf). There may still end up with later arrival of a discover packet on other ports, but at least the cell now has a basis on which to make a preliminary decision. Code: message. Modifier (p/P) p ports discovered, of a total of P. Key Transition, is for 'strange" (Taken from patent "Self-Healing CommunicationTrees". Criteria for decision—all ports present & accounted for (have either sent or received a discover packet on all active ports). At least one port is charmed (leaf). We may still end up with the later arrival of a discover packet on other ports, but at least the cell now has a basis on which to make a preliminary decision. Cells and links may be constantly added or deleted; the protocol must therefore be capable of handling a dynamically changing protocol. Entanglement is automatic, as soon as a cell is connected, it will be discovered. The next step would be for the cell to "publish" its tree as an overlay over the entangled links. This publish contains an public key so that any other cell that wishes to subscribe and communicate privately with the root cell on its tree. In principle, cells cannot subscribe before they have (a) joined the network and (b) have received a publish packet which build the tree.

Figure 28:
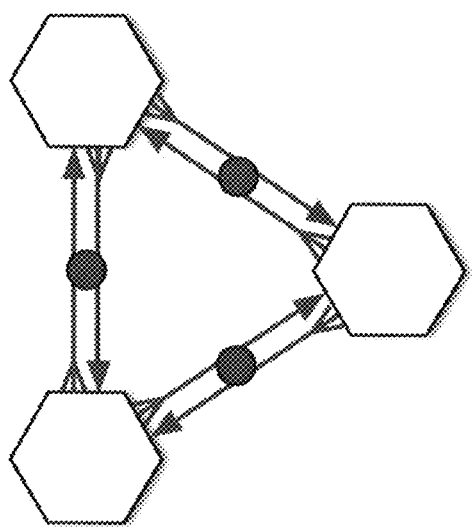
FIG. 28A is a diagram showing a 3-way relationship using bipartite links.
FIG. 28B is a diagram showing an entangled multi-link structure including a plurality of pairs (or some higher number) on the same link.
Figure 28:
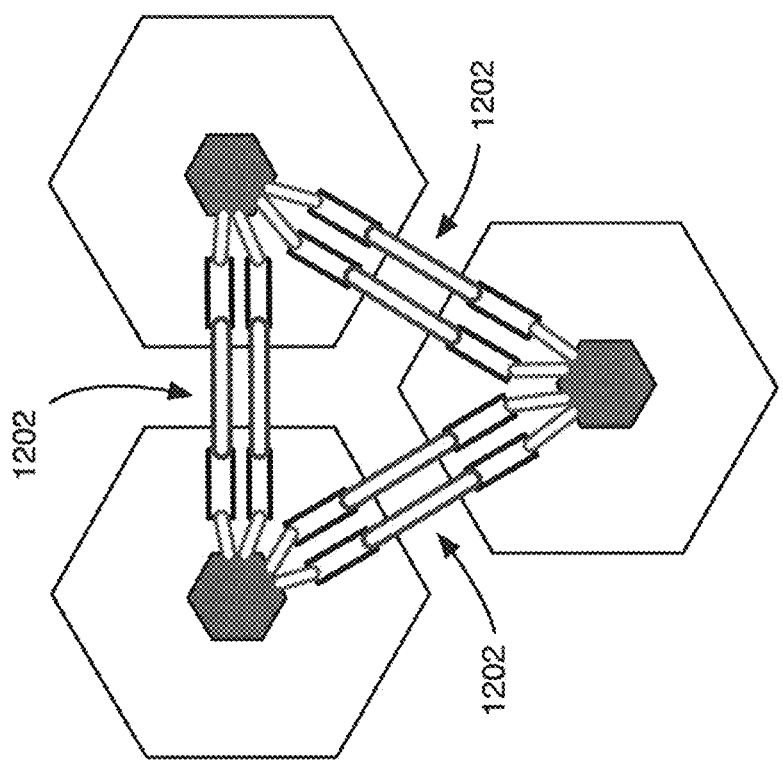

FIG. 28A shows a 3-way relationship using bipartite links. Each cell can inform its neighbor if entanglement (or some higher session presence) is broken. Two or more neighbors can cooperate via promises to organize higher levels of perturbation detection and recovery. This figure shows a single full-duplex link (one transmits, one receives channel).

FIG. 28B shows the entangled multi-link structure 1202 can be created in pairs (or some higher number) on the same link. This is either multiple entanglement or by utilizing a different signaling method on the media (e.g., 8 copper wires/4 twisted pairs) on the Ethernet cable to accommodate independent entanglement processes, each capable of providing events to check that the other is still running.

FIG. 29A shows a more detailed structure incorporating multiple separate buffers and notification channels into the agent. The blue segments contain the entanglement protocol in the independent subsynchronous timing domain.

Figure 30:
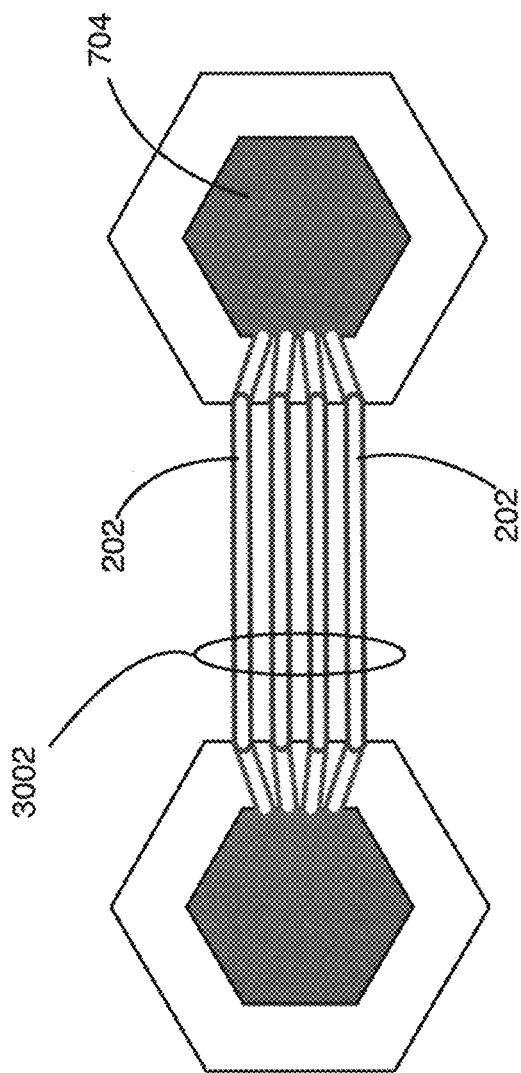
FIG. 30A shows an example of a multiple entangled link having four entangled links.
FIG. 30B shows an example of a four-lane implementation of an entangled link.
FIG. 30C shows an example of an entangled link using Network Interface Controllers (NICs).
Figure 30:
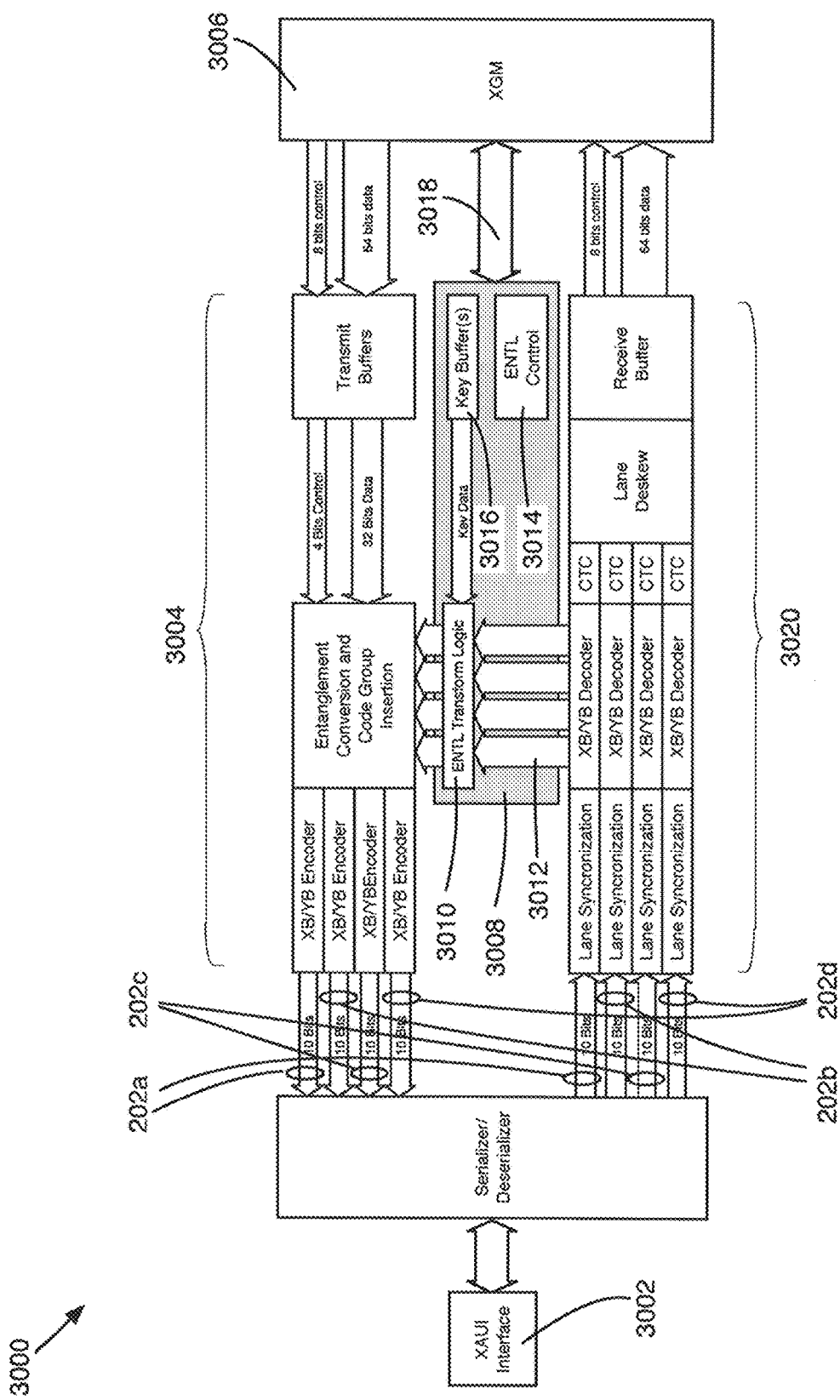
Figure 30:
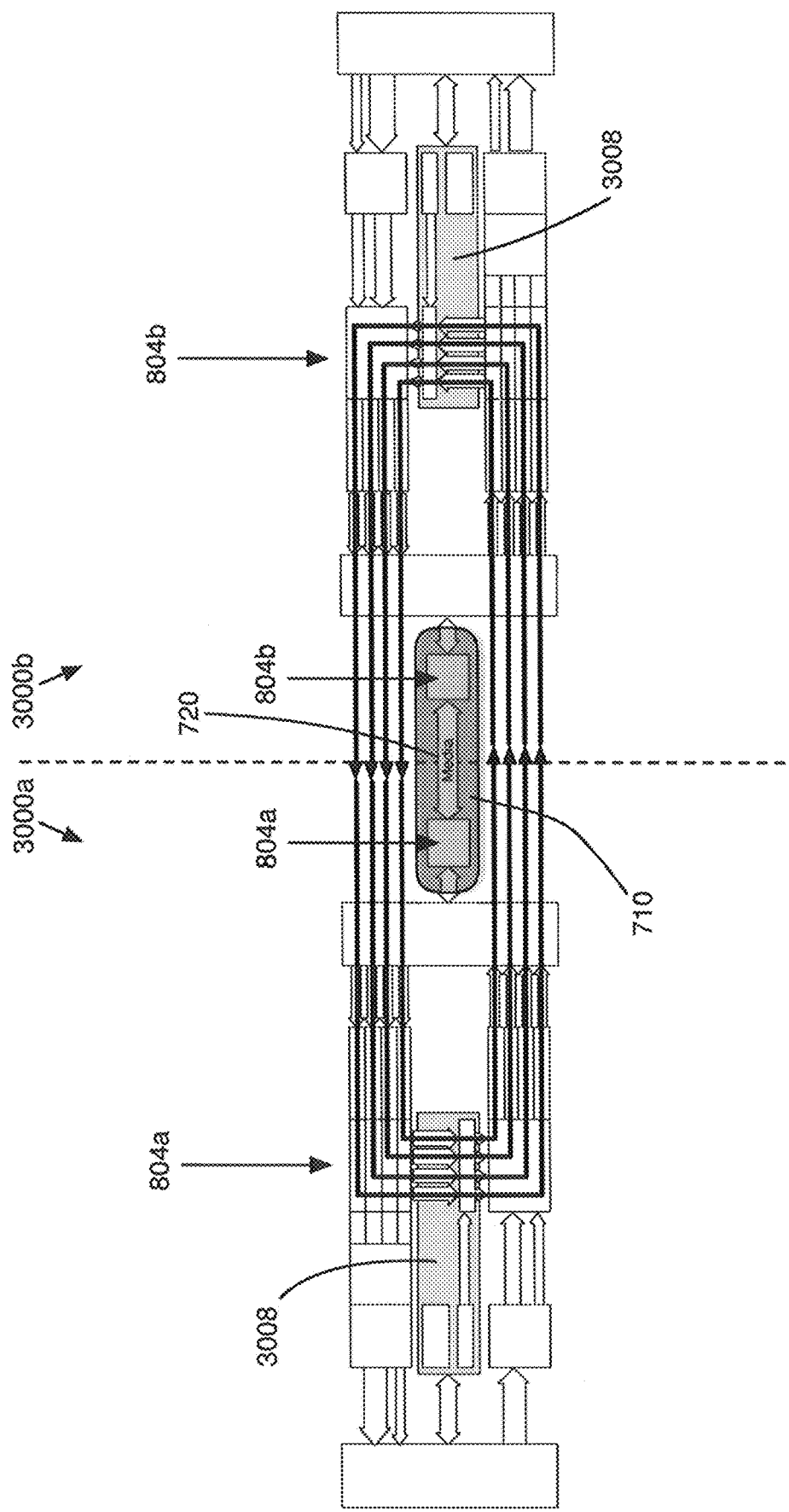

FIG. 30A is a block diagram of a multiple entangled link having four entangled links. FIG. 30A illustrate how two computing devices can be coupled by multiple entangled links 202. In this example, four individual entangled links 202 are used to form a multiple entangles link 3002.

Hardware Support for Latency, Bandwidth, Packet Loss & Other Instrumentation.

The notion of "time" in physics and computer science is a deep and controversial subject. However, the essence of the entangled link emulation of quantum entanglement is that we get closer to the nature of what time really is by removing all unnecessary mechanisms and CPU cycles as possible between two communicating devices and measuring latency at the lowest possible level between them. It is, therefore, preferable for the hardware in the NIC (or network switch) to carry simple mechanisms for instrumentation.

This allows not only the highest accuracy and reliability for the functions described in this disclosure but also enables services to be provided for higher levels in the hypervisor, network protocol stack, kernel or application layer to improve its security, availability, recoverability, or simply to provide system health.

FIG. 30B is a block diagram of an example of a four-lane implementation of an entangled link 3000. FIG. 30B shows a block diagram of an example classical hardware implementation of a full duplex Media Access Controller (MAC) showing signal mapping of receive 3004 and transmit 3020 channels from the media via interface 3002 to the XGM 3006, where it interfaces to the Network Interface Controller (NIC), and thence to the computer where it interfaces to the software. Because of the parallel nature of the 10G Ethernet MAC layer, it is impossible to predict the lane in which the ending byte of the previous packet stream will fall. This makes finding the starting byte (a requirement for maintaining synchronization) more difficult. IEEE 802.3ae mandates any "start control character," or first byte of a new data frame must align with Lane 0. However, this solution complicates the way the MAC handles the Inter Packet Gap (IPG), which, along with the physical length constraints specified for the media, directly affects the packet overhead, which indirectly affects performance.

Interface 3002 is a conventional (standard) interface between the MAC layer and the PHY layer for 10 GbE. Similar methods may be used for other contemporary Ethernet baud rates e.g., 25 GbE, 40 GbE, 100 GbE, up to and beyond 1 TbE.

FIG. 30B shows a MultiGigaBit Network Interface Controller (NIC) with 4 lanes modified to support multiple entangled links. An additional mechanism 3008 to support the Entangled Link 3000, using any one of several matrices transformed and/or monotonic and reversible coding mechanisms to maintain an independent (asynchronous) timing domain of the hot potato packets in the link is shown in grey. This is an example, in principle, how the hot potato information transforms and retransmit should occur at the earliest possible place in the path of incoming data. All hot potato information detection, transformation and retransmission paths anywhere within structures such as this are claimed. Functions in the grey box are added to allow early recognition and reflection of entanglement packets, which may be emulated by various mechanisms, with or without encryption. In true quantum entanglement, this would include a single qubit (unit of quantum information). In various embodiments of this invention, various patterns of bits recognizable by the lane synchronization and XB/YB encoders provide an emulation of a qubit with a 2-bit, 8-bit, 32-bit or 64-bit quantity, which provides practical benefits that can be realizable in the classical domain.

Entanglement emulation packets are recognized and returned at the earliest possible moment of detection in the lane receiver and retransmitted (with or without static or evolving encryption). The additional mechanism 3008 shows the additional logic required for ENTL transform (hardware transform of input packets to output packets within the NIC). For example, the additional mechanism 3008 can include ENTL transform logic 3010, a decoder interface 3012, ENTL control 3014, key buffers 3016, and an XGM interface 3018.

If quantum devices are used, the shared quantum state (entanglement) may be created directly between these interfaces over the fiber, without the need for 'observation' by the rest of the MAC (which would decohere the shared state). The interface logic then uses conventional quantum single photon emitter/detector technology to manage the shared state and detect correlations for use in, for example, QKD.

When quantum devices are not used, the mechanism provides a hardware emulation of quantum processes through the hot potato information exchange protocol described in this invention. With the data serialized/de-serialized separately for one of N lanes (4 lanes are shown above, but any number of lanes is claimed from 1 upwards (including fractional lanes used for forward error correction, etc.). The advantage of multiple lanes is: (a) compatibility with existing networking infrastructure (both copper and fiber) in modern datacenters. (b) potential timing independence of each lane, creating a redundant packet entanglement within the same link as described earlier in "multiple entangled links".

Entangled links represent timeless entities. They emulate quantum processes by allowing an isolated computational entity to express the equivalent of unitary evolution, which exhibits a property of superposition and reversibility in the wave function (the shared state in the entangled link). These functions are generally assumed to be inaccessible in classical systems. The FIG. 30B show one embodiment in which (some of) the benefits of quantum processes can be achieved with classical algorithms and packets on the network if the conventional assumptions regarding time are re-defined.

FIG. 30C shows an example hardware implementation of an entangled link 710 using Network Interface Controllers (NICs). FIG. 30C depicts a (back to back) embodiment of the entangled link 710, using two of these NICs, connected back to back by some media 720 (such as copper transmission line(s), or optical (single or multiple mode) fiber. It shows the completely independent temporal domain of the entangled link(s). While entanglement is active, there are no synchronization events (which may involve metastable glitches) between the local computers on either side of the link. The temporal domain within the link creates its own mutually synchronous temporal relationship independent of the timing domains on either side. This relationship may be emulated by software on either side of the link running on any core of a processor (dedicated or otherwise). The preferred embodiment in software is within the interrupt service routine of the device driver. The overall preferred embodiment is implementation in hardware, as described below.

The segment 710 shows the preferred confinement of the entangled link to the smallest physical mechanism possible, shared between the two halves of the link. The media (720) may be copper or fiber. When it is fiber, single polarized photon emitters and detectors may be used on either side (804*a* and 804*b*). Together, they comprise an entangled link Back-to-back ENTL interfaces using each of 4 lanes within the link for multiple entanglements. The example corresponds to 10/40/100 Gbit Interconnect (more or less than 4 lanes are claimed, any future baud-rate is also claimed). Each lane is a back-to-back self-synchronous domain, with no synchronization relationship whatsoever between the computers on either end outside of the link. The measurement of time is not permitted.

Entanglement may be emulated in a number of ways with classical connections: 1) Full packets; 2) 8B/10B, 64B/66B or any other XB/YB Encoding; 3) Disparity Codes; 4) Gray Codes; 5) Lane packets (as shown above), where each lane is a separate entanglement (multiple entanglements); 6) Modified (clear or encrypted) preambles (which may or may not be incompatible with legacy hardware); 7) Modified (clear or encrypted) idle patterns (which may or may not be incompatible with legacy hardware); 8 Any recognizable pattern in the inter-frame gap (IFG); and 9) Transition signaling.

Full Packets were described in previous provisional applications with or without special Ethertype code. i.e., full Ethernet packets were reflected (echoed directly by the device driver ISR or NIC Firmware). This method remains useful when modified hardware is not available to take advantage of the embodiments described herein.

In 8B/10B and 64B/66B or any XB/YB encoding, there are a number of special symbols for control (as opposed to data) communication. The control symbols typically may be used for the start/end of frame, link idle, skip, etc. One embodiment of this invention is to use one of these link control symbols to indicate entanglement ($\Psi = |\uparrow\rangle + |\downarrow\rangle$). For Fiber channel, these control symbols indicate arbitration, fill words (similar to idle), link reset, etc.

Lane Packets

Transition signaling recognizes that pulses are fundamentally unreliable (they can get lost or not be seen). In copper interconnects, in particular, another opportunity exists: transitions from a low level to high (on) and transitions from a high level to low (off), are both events which may equally be used to signal information transfer. Control circuits for transition signaling are built from Merge (XOR), Muller C-elements (AND) and Toggle elements; well known for implementing asynchronous (self-timed) logic. One embodiment of this invention uses these circuits in conjunction with the properties described above and in the provisional applications that are incorporated into this application by reference to support independent timing domains, self-synchronization and atomic (reversible) token exchange for entangled links and entangled transactions.

Entangled links employ a different model for time than is assumed in conventional computer science. Only the sender and receiver agree on the interval bounded by the event recurrences (transitions) inside the entangled loop. This will generally have no relationship whatsoever to the awareness of time by the cell agents on either end. A measurement of latency may be requested by the cell agent to characterize a link, but in general, there should be no requirement for measurements to be made on the entangled link. From the perspective of a cell agent, they are timeless, stateless and invisible.

Preamble Implementation

The first seven bytes of the Ethernet preamble are a repetition of the pattern: 10101010. The last byte, Start of Frame (SOF), differs by one bit: 10101011. These 8 bytes of the preamble and the SOF create a pattern of 64 bits. These are not counted as part of the Ethernet frame. The frame begins immediately after the SOF without a gap. An alternative preamble pattern of, for example: 10100101 or 10101111 (or any other easily discernible bistable state change) may be used to indicate entanglement, i.e. distinction between $|\uparrow\rangle$ and $|\downarrow\rangle$.

The preamble demonstrates the pace of the arriving data and allows the receivers to synchronize to the frequency and phase of the transmitter. The preamble, therefore, serves as a clock synchronization mechanism allowing the receiver to distinguish where one bit ends and the other one starts.

The preamble may also be dynamically shortened because of the use of short cables connecting the cells in the switchless interconnection scheme described above. This provides improved latency, reliability and more faithfully emulates the concept of entanglement.

Idle Pattern as Entanglement

Idle replaces the Normal Link Pulses (NLPs) used in 10Base-T. For some Ethernet protocols, there is no maximum amount of idle specified between frames. This may be used to create a time warp on that link when, for example, transaction packets are in process, which must be dealt with atomically in the cell agent. However, we expect that the implementation of this atomicity will be non-blocking (wait-free) from both a conventional time and an entanglement (subtime) perspective. Entanglement can replace the idle pattern.

Inter-Frame Gap Implementation

With a Neighbor to Neighbor (N2N) connected network of cells, as shown in the switchless interconnection scheme above, the cables can be much shorter (perhaps 100th of the size: 100 m down to 1M, or 10M down to 10 cm). Therefore, the IFG can be much shorter. Shorter IFGs translate to lower latency, higher bandwidth capability and an improved temporal domain for the emulation of entanglement.

Hardware or software can detect (through the round-trip delay) that cable lengths are short and automatically reduce the Inter-Frame Gap. Software can also detect that only another cell is connected on the other end and make certain assumptions about the bipartite nature of the link, which may be used to defend against man-in-the-middle and Sybil attacks.

Low Power Considerations

The concept of Low Power Idle (LPI) is a method explored by the IEEE 802.3 working group to save energy by cycling between active and low power modes. Entanglement can be combined with this low-power idle mode.

While the low-power idle mode is intended for applications where link utilizations are low, this can easily be adapted to the entanglement link invention. One way to do this requires parameterization of the period for the beacon packet, along with a programmed window of expectation—which would allow the entanglement to continue with a minor re-authentication check (key cycle verification).

Another approach to combining with the LPI mode is to use burst entanglement as described in the provisional.

This invention claims any and all methods of establishing a minimum temporal domain for entanglement links, including those at the serializer/deserializer and any other element inside the media interface on either side of the bidirectional link or dual unidirectional links used to implement the entangled link mechanism.

In real quantum entanglement implementation, this architecture coincides with this requirement.

Systems and methods for entangled links and entangled transactions have been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above are primarily in the context of online services; however, the disclosed technologies apply to other data sources and other data types (e.g., collections of other resources, for example images, audio, and web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk, including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during the actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language or for any specific operating system or environment. Accordingly, the disclosure of the present techniques and technologies is intended to be illustrative but not limiting.

What is claimed is:

1. A computer-implemented method in a first computing entity within a data center for creating an entangled link with a second computing entity within the data center, comprising:

discovering, using one or more processors, the second computing entity by the first computing entity and a third computing entity by the second computing entity using a beacon;

connecting, using the one or more processors, the first computing entity to the second computing entity over a medium to establish an entanglement between the first computing entity and the second computing entity, forming the entangled link, the entangled link is maintained using an atomic information transfer between the first computing entity and the second computing entity;

creating a second entangled link between the second computing entity and a third computing entity over a medium to establish an entangled transaction between the first computing entity and the third computing entity by associating the entangled link and the second entangled link for atomic information transfer between the first computing entity and the third computing entity;

continually sending and receiving a token over the medium which is dedicated to the circulation of the token between the first computing entity and the second computing entity and over the medium which is dedicated to the circulation of the token between the first computing entity and the third computing entity; and maintaining bipartite temporal intimacy between the first, second and third computing entities, wherein the states are complementary between the first and second computing entities, between the second and the third computing entities, and between the first and the third computing entities as a single abstract computational entity, without a master and slave relationship.

2. The computer-implemented method of claim 1, wherein the atomic information transfer synchronizes a first data structure for the first computing entity, the first data structure describing a combined state of the first computing entity and the second computing entity from a perspective of the first computing entity a second data structure for the second computing entity, the second data structure describing the combined state of the first computing entity and the second computing entity from a perspective of the second computing entity.

3. The computer-implemented method of claim 1, wherein the method further comprises detecting unentanglement of a departing computing entity and another computing entity and reconnecting the set of computer entities without the departing computing entity by establishing at least one entangled link between two computing entities from a set of computer entities.

4. The computer-implemented method of claim 1, wherein the beacon is an unacknowledged heartbeat, the beacon is used for:
   discovering the second computing entity by the first computing entity to create an entanglement between the first computing entity and the second computing entity;
   detecting an entanglement is broken; or
   restarting the entanglement.

5. The computer-implemented method of claim 1, wherein the bipartite temporal intimacy preserves the transaction of the token between the first computing entity and the second computing entity in the event of a failure of the entangled link between the first computing entity and the second computing entity.

6. The computer-implemented method of claim 1, wherein the method further comprises:
   detecting unentanglement between the second computing entity and the third computing entity;
   creating a third entangled link between the third computing entity and a fourth computing entity; and
   reassigning the entangled transaction between the first computing entity and the third computing entity by associating the entangled link and the third entangled link for atomic information transfer between the first computing entity and the third computing entity.

7. The computer-implemented method of claim 1, wherein communication for the entangled transaction uses an entangled transaction packet associated with one or more tokens used to maintain the entangled links between the first computing entity, the second computing entity, and the third computing entity.

8. The computer-implemented method of claim 1, wherein forming an entangled link comprises:
   a pair of cells;
   a pair of cell agents, each operable on a respective encapsulated computer node; and
   a pair of transformation elements at each end of a software synchronization domain of the entangled links to exchange a token between the cells.

9. The computer-implemented method of claim 8, wherein the pair of cell agents maintain the software synchronization domain of the entangled link.

10. The computer-implemented method of claim 8, wherein cells are a computing platform capable of executing action specifying the agent in the cell.

11. A computer-implemented method in a first computing entity within a data center for creating an entangled link with a second computing entity within the data center, comprising:
   discovering, using one or more processors, the second computing entity by the first computing entity with a beacon;
   connecting, using the one or more processors, the first computing entity to the second computing entity over a medium to establish an entanglement between the first computing entity and the second computing entity, forming the entangled link, the entangled link is maintained using a packet-exchange hot potato protocol mechanism between the first computing entity and the second computing entity;
   continually sending and receiving a token over the medium, which is dedicated to the circulation of the token between the first computing entity and the second computing entity; and
   maintaining bipartite temporal intimacy between the first and second computing entities, wherein the states are complementary between the first and second computing entities as a single abstract computational entity, without a master and slave relationship and wherein the bipartite temporal intimacy preserves the transaction of the token between the first computing entity and the second computing entity in the event of a failure of the entangled link between the first computing entity and the second computing entity.

12. The computer-implemented method of claim 11, wherein the first computing entity and the second computing entity together maintain the entangled link as a single abstract computational entity.

13. The computer-implemented method of claim 12, wherein the packet-exchange heartbeat mechanism is a reversible token exchange presenting no visible indication of progress until a communication of information exchange between the first computing entity and the second computing entity.

14. The computer-implemented method of claim 13, wherein the token exchange uses a token, the token is encrypted information and uniquely identifiable only to each of the first computing entity and the second computing entity.

15. The computer-implemented method of claim 13, wherein discovering the second computing entity by the first computing entity is using a beacon.

16. The computer-implemented method of claim 15, wherein the beacon is an unacknowledged heartbeat, the beacon is used for:
   discovering the second computing entity by the first computing entity to create an entanglement between the first computing entity and the second computing entity;
   detecting an entanglement is broken; or
   restarting the entanglement.

17. The computer-implemented method of claim 16, wherein the beacon creates an entanglement by sending a token from the first computing entity to the second computing entity and receiving a response from the second computing entity by the first computing entity.

18. The computer-implemented method of claim 13, wherein the method further comprises detecting unentanglement of a departing computing entity and another computing entity and reconnecting the set of computer entities without the departing computing entity by establishing at least one entangled link between two computing entities from a set of computer entities.

19. The computer-implemented method of claim 11, wherein the packet-exchange heartbeat mechanism maintains a potential for bounded or unbounded reversibility of token exchange.

20. The computer-implemented method of claim 4, wherein the beacon creates an entanglement by sending a token from the first computing entity to the second computing entity and receiving a response from the second computing entity by the first computing entity.

* * * * *